United States Patent [19]
Yoshizaki et al.

[11] Patent Number: 5,582,805
[45] Date of Patent: Dec. 10, 1996

[54] ELECTRICALLY HEATED CATALYTIC APPARATUS

[75] Inventors: Kouji Yoshizaki, Numazu; Takaaki Itou, Mishima; Hiroshi Hirayama, Okazaki; Tetsuo Nagami, Nagoya; Masakatsu Sanada, Numazu; Kiyohiko Watanabe, Okazaki; Osamu Fujishiro, Nagoya; Tohru Yoshinaga, Okazaki; Yukihiro Shinohara, Anjo; Yasuyuki Kawabe, Okazaki; Toshihiko Igashira, Toyokawa; Akihiro Izawa, Nukata-gun; Hiroaki Ichikawa, Okazaki; Kenichi Hirada; Toshihiro Takada, both of Susono; Kazuhiro Sakurai, Gotenba; Masahiko Ogai, Toyota, all of Japan

[73] Assignees: Toyota Jidosha Kabushiki Kaisha; Nippon Soken, Inc., both of Japan

[21] Appl. No.: 201,972

[22] Filed: Feb. 25, 1994

Related U.S. Application Data

[63] Continuation-in-part of Ser. No. 170,571, Dec. 20, 1993, abandoned.

[30] Foreign Application Priority Data

| Dec. 21, 1992 | [JP] | Japan | 4-340614 |
| Mar. 9, 1993 | [JP] | Japan | 5-048352 |
| Mar. 24, 1993 | [JP] | Japan | 5-65620 |
| Jun. 11, 1993 | [JP] | Japan | 5-140854 |
| Jun. 11, 1993 | [JP] | Japan | 5-140855 |
| Jun. 21, 1993 | [JP] | Japan | 5-149379 |
| Dec. 21, 1993 | [JP] | Japan | 5-322634 |
| Dec. 21, 1993 | [JP] | Japan | 5-322734 |
| Dec. 29, 1993 | [JP] | Japan | 5-352156 |

[51] Int. Cl.⁶ ................................ F01N 3/28
[52] U.S. Cl. .................. 422/174; 60/300; 422/180
[58] Field of Search .................... 422/173, 174, 422/177, 211, 180, 199; 60/300, 303, 320

[56] References Cited

U.S. PATENT DOCUMENTS

| 3,768,982 | 10/1973 | Kitzner et al. | 422/174 |
| 3,770,389 | 10/1973 | Kitzner et al. | 422/174 |
| 3,979,905 | 9/1976 | Masaki et al. | 60/289 |
| 4,160,897 | 7/1979 | Makino | 219/543 |
| 4,733,057 | 3/1988 | Stanzel et al. | 219/548 |
| 4,801,915 | 1/1989 | Hahnewald | 338/293 |
| 4,901,904 | 2/1990 | Tsuno | 228/56.3 |
| 4,928,485 | 5/1990 | Whittenberger | 60/299 |
| 4,958,428 | 9/1990 | Humpolik | 29/890 |
| 5,050,790 | 9/1991 | Takikawa et al. | 288/181 |
| 5,063,029 | 11/1991 | Mizuno et al. | 422/175 |

(List continued on next page.)

FOREIGN PATENT DOCUMENTS

| 0567034 | 10/1993 | European Pat. Off. . |
| 2333092 | 1/1975 | Germany . |
| 8900439 | 4/1989 | Germany . |
| 452125 | 10/1991 | Germany . |
| 456919 | 11/1991 | Germany . |
| 9200701 | 3/1992 | Germany . |
| 4102890 | 8/1992 | Germany . |
| 503445 | 9/1992 | Germany . |
| 92-18245 | 10/1992 | WIPO . |

OTHER PUBLICATIONS

Translation of DE 2333092.
Translation of DE 4102890.

*Primary Examiner*—Jill Warden
*Assistant Examiner*—Robert Carpenter
*Attorney, Agent, or Firm*—Kenyon & Kenyon

[57] ABSTRACT

An electrically heating catalytic apparatus that quickly heats catalyst to an activation temperature even when the engine is started at a low temperature below the catalyst activation temperature. The apparatus employs an electrically conductive catalyst carrier that is electrically heated. The carrier is provided with local hot spots to be energized. Since the heat is locally generated, the heat capacity of the catalyst carrier is small to shorten a temperature increasing time.

12 Claims, 96 Drawing Sheets

U.S. PATENT DOCUMENTS

| | | | |
|---|---|---|---|
| 5,070,694 | 12/1991 | Whittenberger | 60/300 |
| 5,094,074 | 3/1992 | Nixhizawa et al. | 60/300 |
| 5,140,812 | 8/1992 | Cornelision et al. | 60/300 |
| 5,140,813 | 8/1992 | Whittenberger | 60/300 |
| 5,146,743 | 9/1992 | Maus et al. | 60/274 |
| 5,174,968 | 12/1992 | Whittenberger | 422/174 |
| 5,202,547 | 4/1993 | Abe et al. | 219/552 |
| 5,215,722 | 6/1993 | Nishizawa | 422/174 |
| 5,382,774 | 1/1995 | Bruck et al. | 219/553 |

R: RESISTANCE OF JOINT
r: RESISTANCE OF FLAT AND CORRUGATED SHEETS $R_T = n \cdot R + (n-1) \cdot r$ Fig.53(a) Fig.53(b)
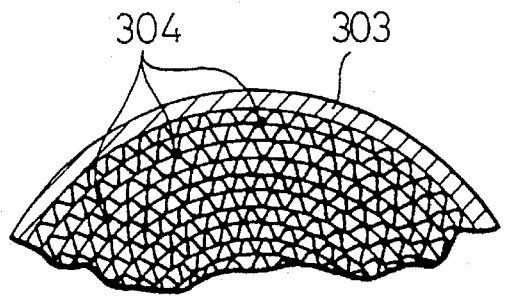
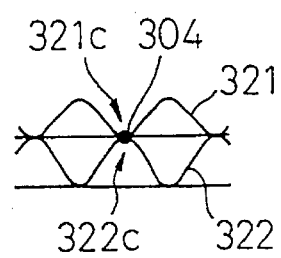
Fig.54
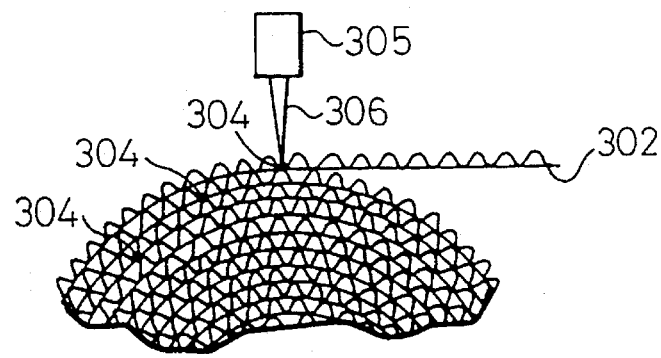
Fig.55(a) Fig.55(b)
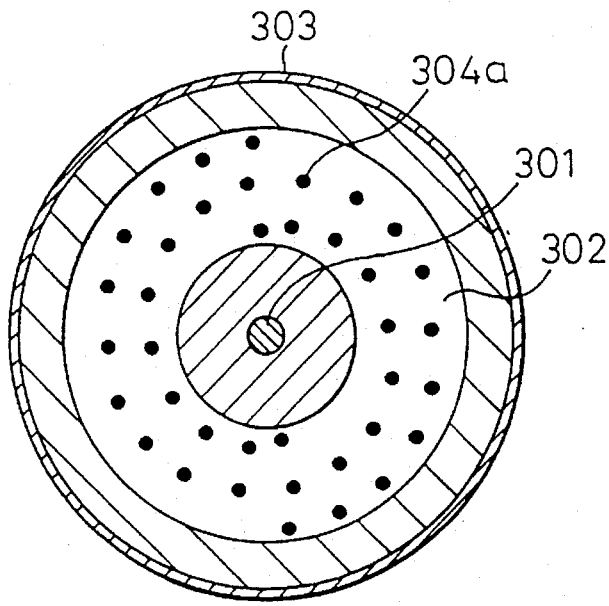
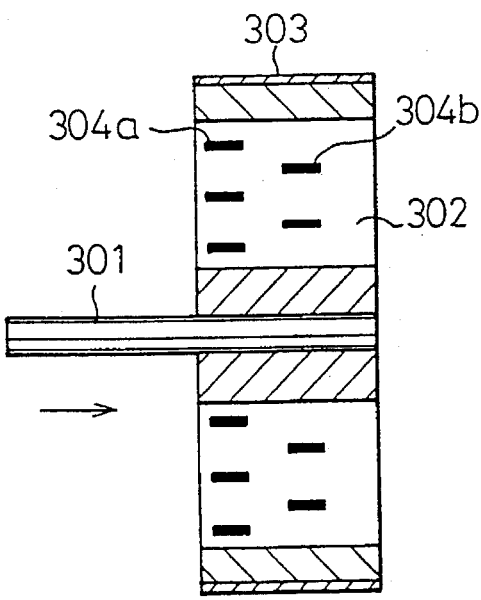

B A B $Q_A = V^2/R_A$ $Q_B = V^2/R_B$

HEAT QUANTITY AND OPTIMUM DISTANCE

Fig.97
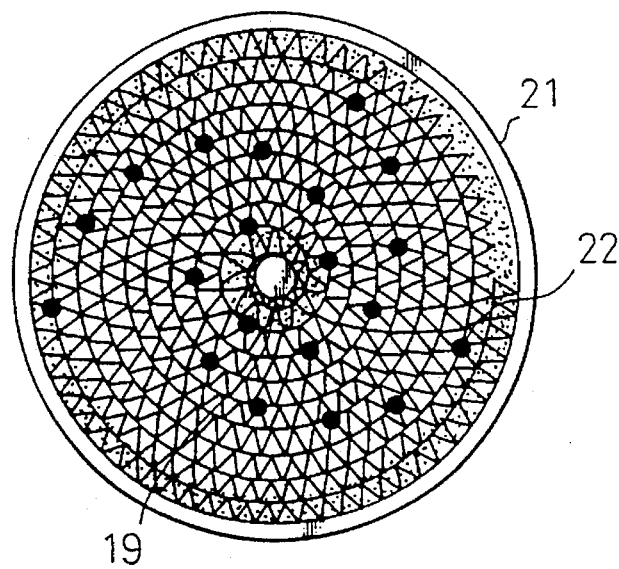
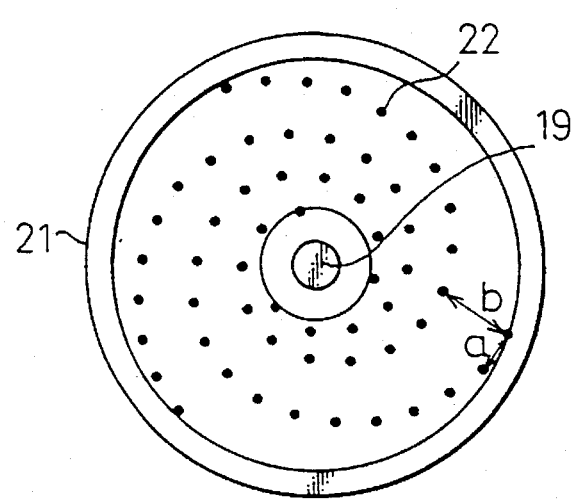
Fig.98(a)
EQUIDISTANT ARRANGEMENT
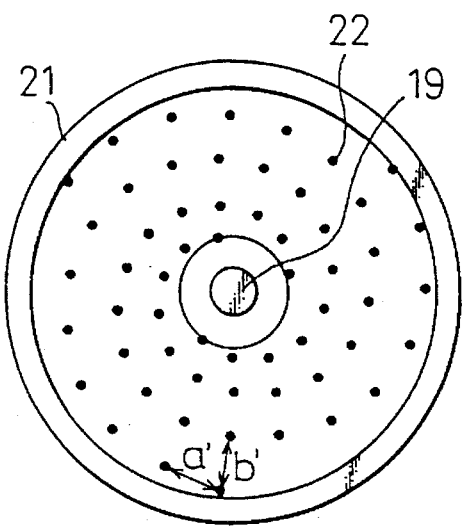
Fig.98(b)
VARIABLE DISTANCE ARRANGEMENT

EXHAUST GAS →

Fig.143
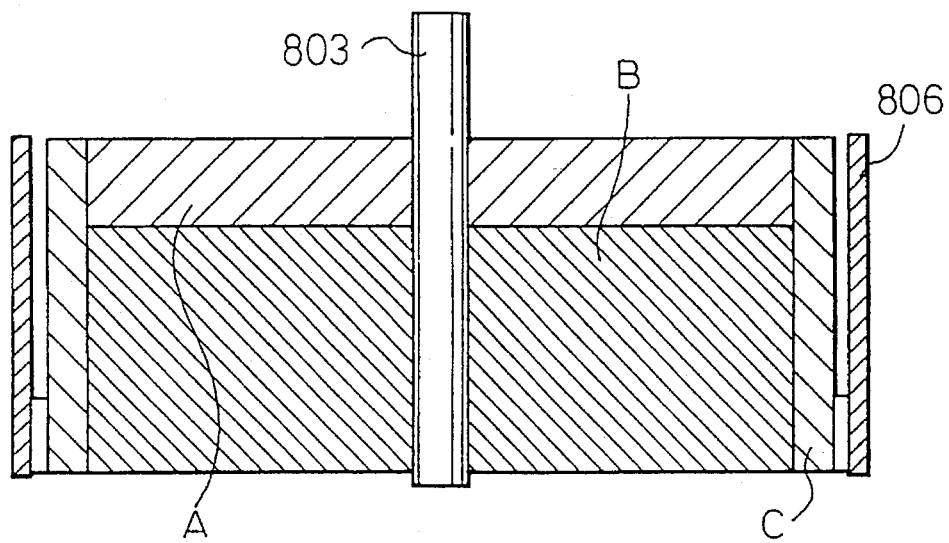
Fig.144(a)    Fig.144(b)
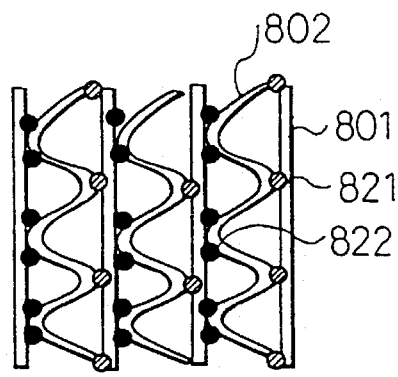    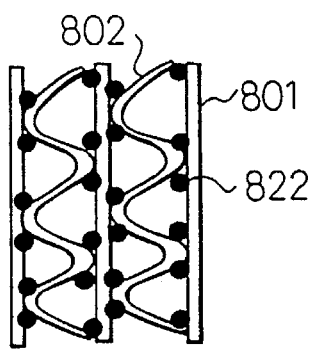
Fig.144(c)
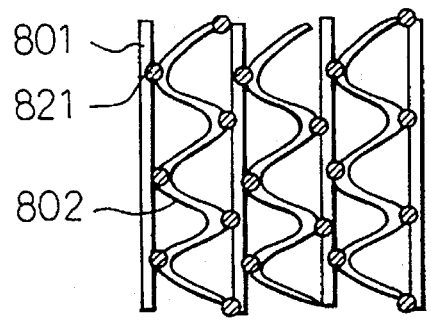
⊘ HIGH RESISTANSE BRAZING MATERIAL
● LOW RESISTANSE BRAZING MATERIAL

LARGE GRINDING WIDTH

SMOLL GRINDING WIDTH

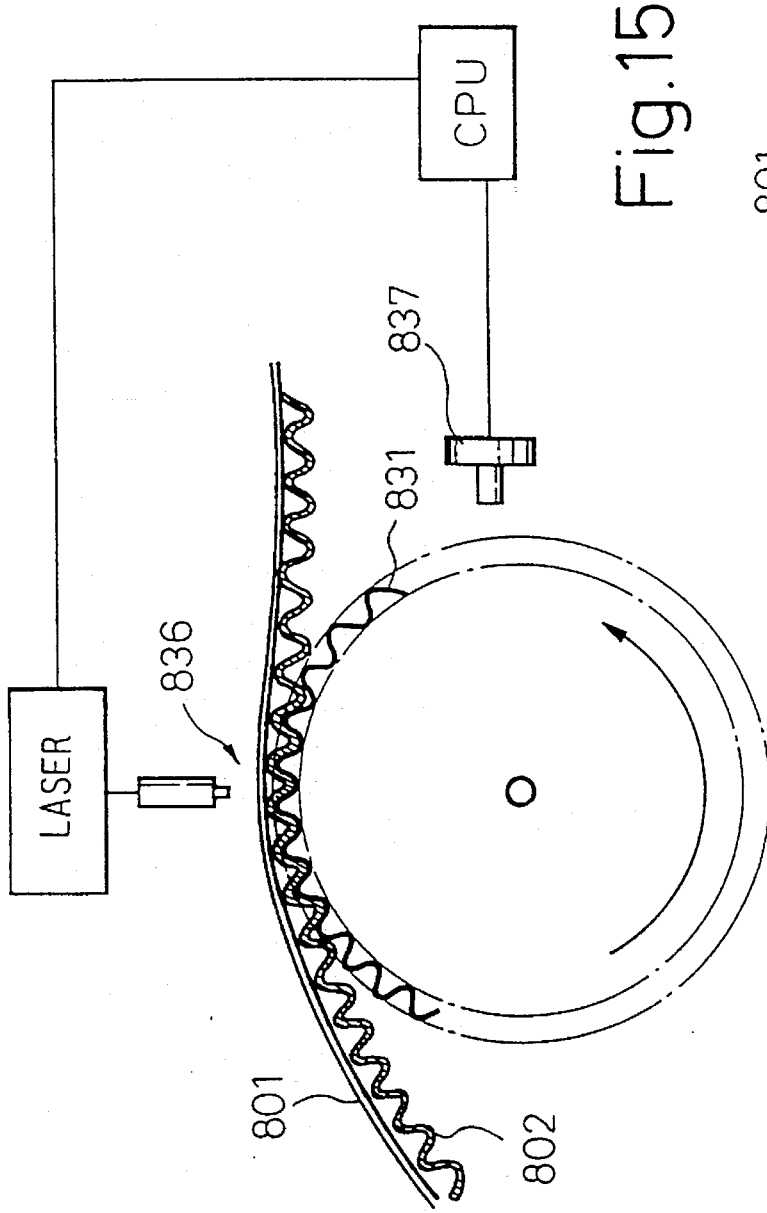
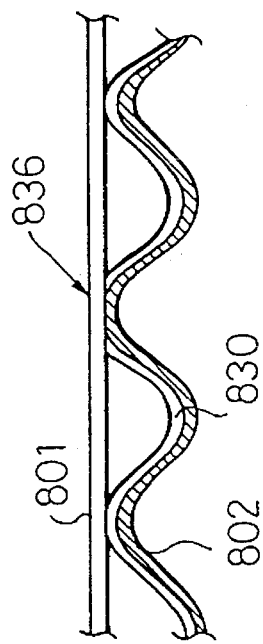
Fig.153(a)
Fig.153(b)

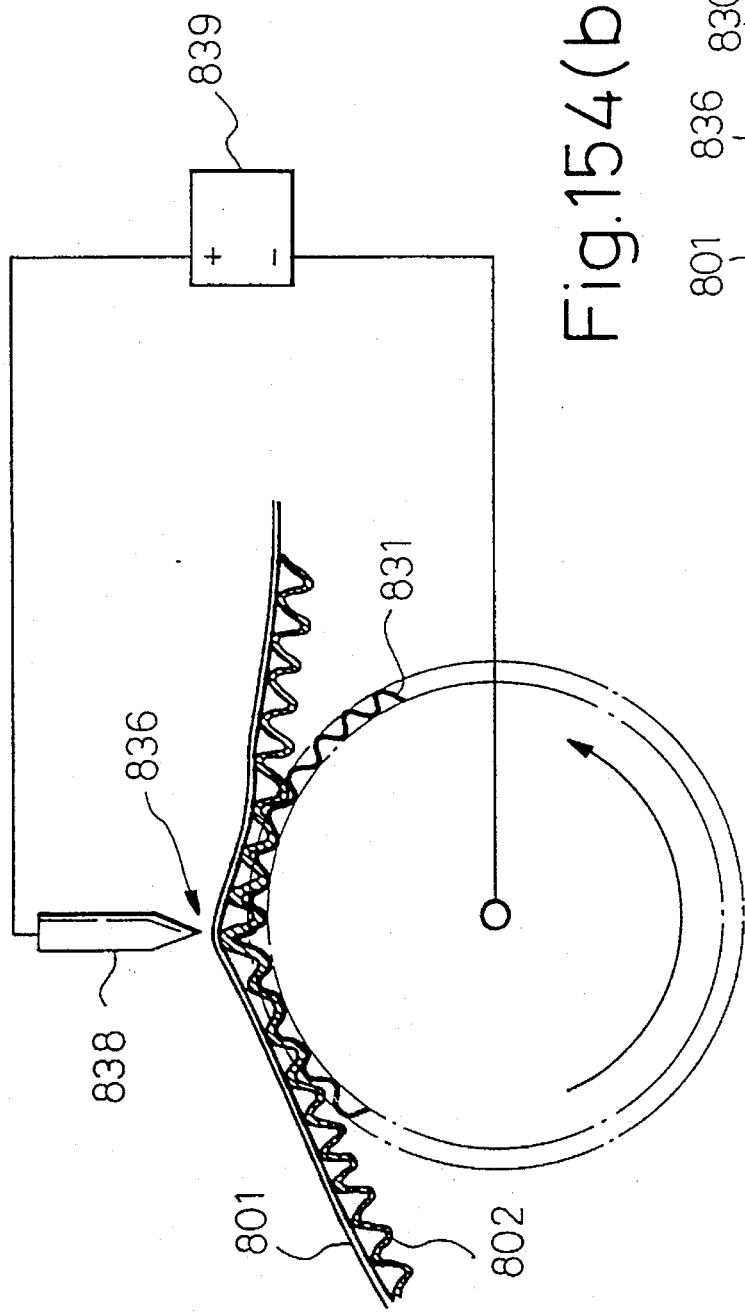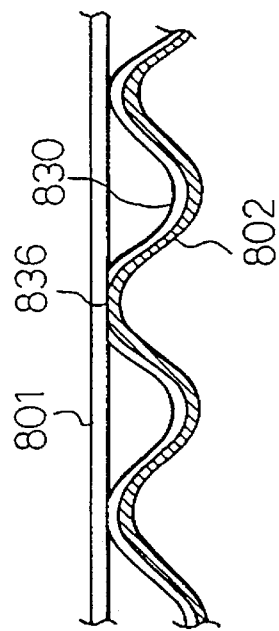

ELECTRICALLY HEATED CATALYTIC APPARATUS

BACKGROUND OF THE INVENTION

1. Field of the Invention

This application is a continuation-in-part application of U.S. application Ser. No. 08/170,571, filed Dec. 20, 1993, now abandoned.

The present invention relates to a catalytic apparatus for purifying exhaust gas from an internal combustion engine of, for example, an automobile, and particularly, to an improvement of an electrically heated catalytic apparatus that quickly heats catalyst to an activation temperature even when the engine is started at a low temperature below the catalyst activation temperature.

2. Description of the Related Art

A metallic catalyst carrier or support is formed by laminating metal sheets into a honeycomb structure. The carrier is coated with, for example, activated alumina, and the coat holds a catalyst made of, for example, precious metal such as platinum. The carrier serves as a catalytic converter for purifying exhaust gas from an internal combustion engine. Just after the start of the engine, the temperature of the catalyst is too low to activate the catalyst and purify exhaust gas. At this time, the carrier is energized to generate heat to quickly increase the temperature thereof up to the catalyst activation temperature of about 350 degrees centigrade, to thereby start the exhaust gas purifying reactions as soon as possible after the start of the engine. An example of such an electrically heated catalytic apparatus is disclosed in Japanese Unexamined Patent Publication No. 3-72953. The disclosed apparatus includes thin metal sheets wound a core toward an outer casing, to thereby form a catalyst carrier. The disclosed apparatus electrically heats the whole of the catalyst carrier, so that it requires a large quantity of energy.

SUMMARY OF THE INVENTION

An object of the present invention is to locally heat a catalyst carrier with electric energy and let the remaining parts be heated by the heat of catalytic reactions at the electrically heated part, thereby reducing power consumption while securing the catalytic reactions.

According to the present invention, there is provided with an electrically heated catalytic apparatus, characterized in that a catalytic carrier is provided with an electric path extending from an outer periphery of the carrier to a central portion thereof, and again extending therefrom to the outer periphery of the carrier, wherein only a part of the carrier along the electric path is a heated region, and wherein a remaining part of the carrier is an unheated region which is practically not heated.

The catalytic carrier, particularly the heated region, is locally electrically heated by an electric current supplied from the outer periphery of the catalytic carrier.

An insulation area is provided so as to extend from the outer periphery of the carrier to the central portion of the carrier, said electric path is formed around said insulation area, a region of the catalyst upstream of the insulation area is at least partially formed as the heated region and a region of the catalyst downstream of the insulation area is formed as the unheated region which is practically not heated.

In this case, the upstream region of the carrier is first electrically heated and the heat flows with an exhaust gas to the downstream catalytic region which is then heated.

According to another aspect of the present invention, there is provided an electrically heated catalytic apparatus, characterized in that an electrically conductive catalyst carrier is prepared by laminating metal sheets having insulation layers. The catalyst carrier is provided with local hot spots to be energized to electrically heat the carrier wherein the local hot spots are made by deforming edge portions of the adjacent laminated metal sheets toward each other so that the adjacent metal sheets are partially electrically joined at said deformed portions.

In another embodiment, a width of at least one of the metal sheets is larger than a width of the other metal sheets, and the local hot spots are made by deforming the edge portions of the metal sheets having a larger width, after said sheets are laminated, so that adjacent metal sheets having the larger width are partially electrically joined at said deformed portions.

According to still another aspect of the present invention, there is provided an electrically heated catalytic apparatus, characterized in that an electrically conductive catalyst carrier is prepared by alternately laminating metal sheets and insulation layers, wherein the insulation layer is locally cut out to provide notches at optional positions, edge portions of the adjacent metal sheets are deformed toward each other through the notches of the insulating layers so that the adjacent metal sheets are partially electrically joined through said notches.

According to a further aspect of the present invention, there is provided an electrically heated catalytic apparatus, characterized in that an electrically conductive catalyst carrier is prepared by laminating metal sheets having insulation layers formed thereon, wherein the adjacent metal sheets are adhered to each other by brazing and a resistance of the brazing material is locally different so that the catalyst carrier is provided with local hot spots to be energized to electrically heat the carrier.

According to a still further aspect of the present invention, there is provided an electrically heated catalytic apparatus, characterized in that an electrically conductive catalyst carrier is prepared by laminating metal sheets having insulation film formed thereon, wherein the insulation film is locally removed by passing the metal sheet through a grinding means arranged opposite a feed roller, the adjacent metal sheets being locally adhered to each other at positions where the insulation film is removed, so that the catalyst carrier is provided with local hot spots to be energized to electrically heat the carrier.

In one embodiment of this invention, there is provided an electrically heated catalytic apparatus, characterized in that an insulating layer is formed on an adhering surface of a flat sheet or a corrugated sheet, wherein the sheets are fed by a gear having a tooth pitch substantially corresponding to the corrugated sheet. While the sheets are fed, the flat and corrugated sheets are locally adhered to be electrically connected to each other at predetermined positions.

In another embodiment of this invention, an electrically heated catalytic apparatus is characterized in that a catalytic carrier is made of an electrically conductive material and provided with local heat spots, and an exhaust gas biasing means for biasing an exhaust gas from a heated portion to unheated portion is provided in the catalytic carrier.

In this case, the heated portion may be provided at a downstream side of an upstream end of the catalytic carrier, and a second exhaust gas biasing means for biasing the exhaust gas toward the heated portion may be provided in the catalytic carrier.

In still another embodiment of this invention, an electrically heated catalytic apparatus is characterized in that a catalytic carrier is made by laminating a combined sheet comprising a metal corrugated and a flat sheet, wherein the flat sheet is provided with projections which protruded from the combined sheet, and the adjacent combined sheets are adhered to each other to be electrically connected at the projections.

In a further embodiment of this invention, an electrically heated catalytic apparatus is characterized in that a catalytic carrier is made by laminating a combined sheet comprising a metal corrugated and flat sheets, the corrugated sheet is provided on a crest thereof with projections protruded from the combined sheet, and the adjacent combined sheets are adhered to each other to be electrically connected at the projections.

BRIEF DESCRIPTION OF THE DRAWINGS

FIG. 53(a) is a front view explaining joints between metal sheets of the 24th embodiment;

FIG. 53(b) is an enlarged view showing a part of FIG. 53(a);

FIG. 54 is a view showing a process of laser-welding the metal sheets of the 24th embodiment;

FIG. 55(a) is a front view showing an electrically heating catalytic converter according to a 25th embodiment of the present invention;

FIG. 55(b) is a longitudinal section of the 25th embodiment;

FIG. 97 is a view showing an arrangement of hot spots of the 43rd embodiment;

FIG. 98(a) is a view showing an arrangement of hot spots with metal sheets of a catalyst carrier being equidistantly joined;

FIG. 98(b) is a view showing an arrangement of hot spots with metal sheets of a catalyst carrier being joined at variable distances;

Figure 102A:
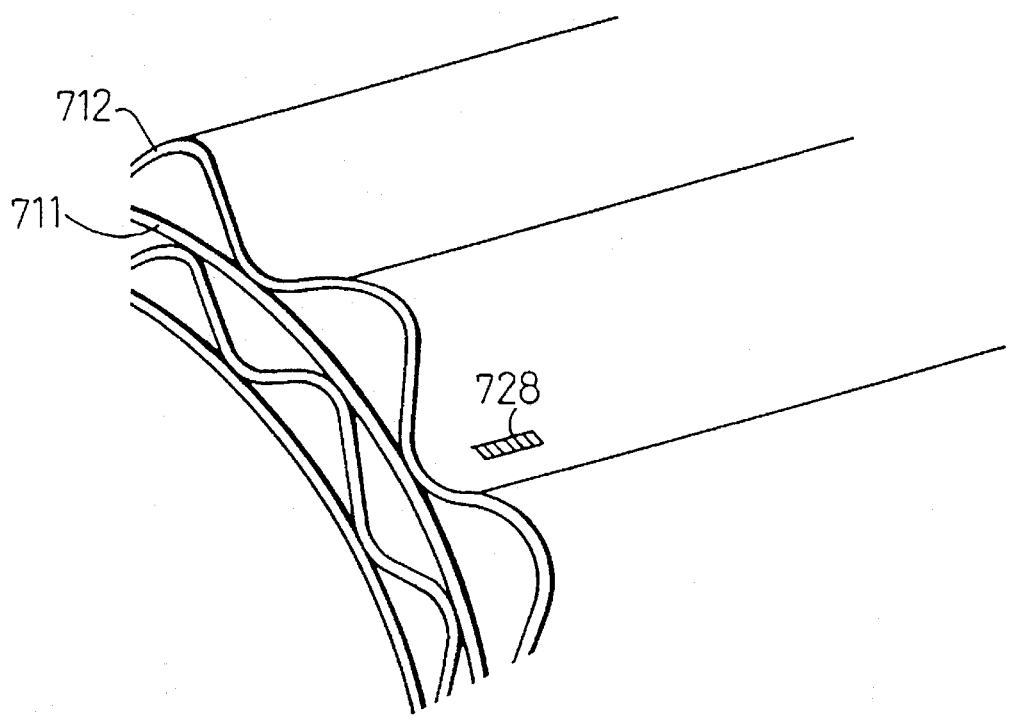
Figure 102B:
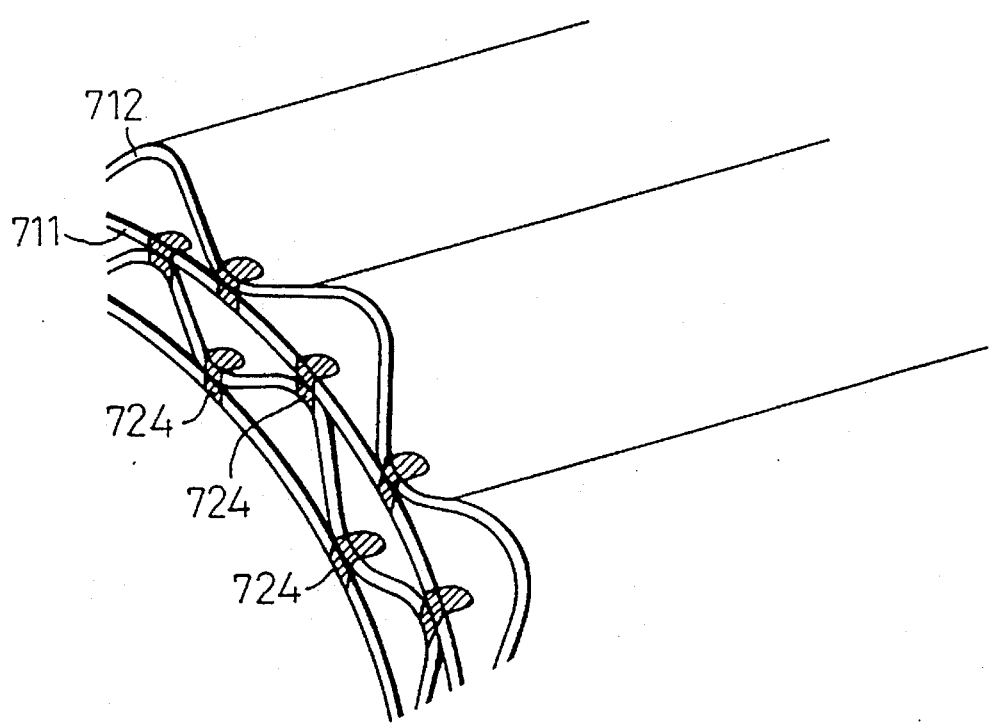
Figure 103:
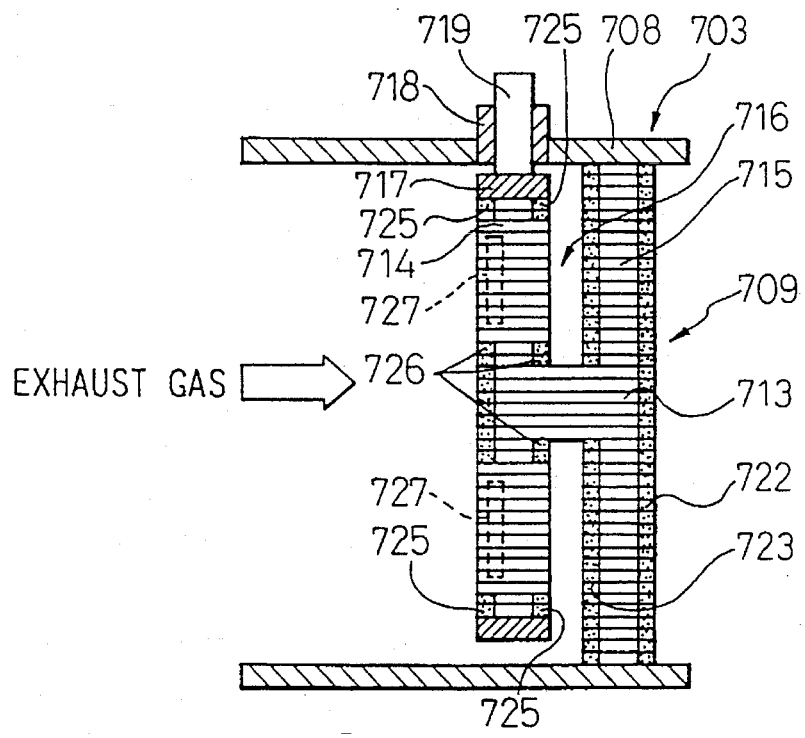
Figure 104:
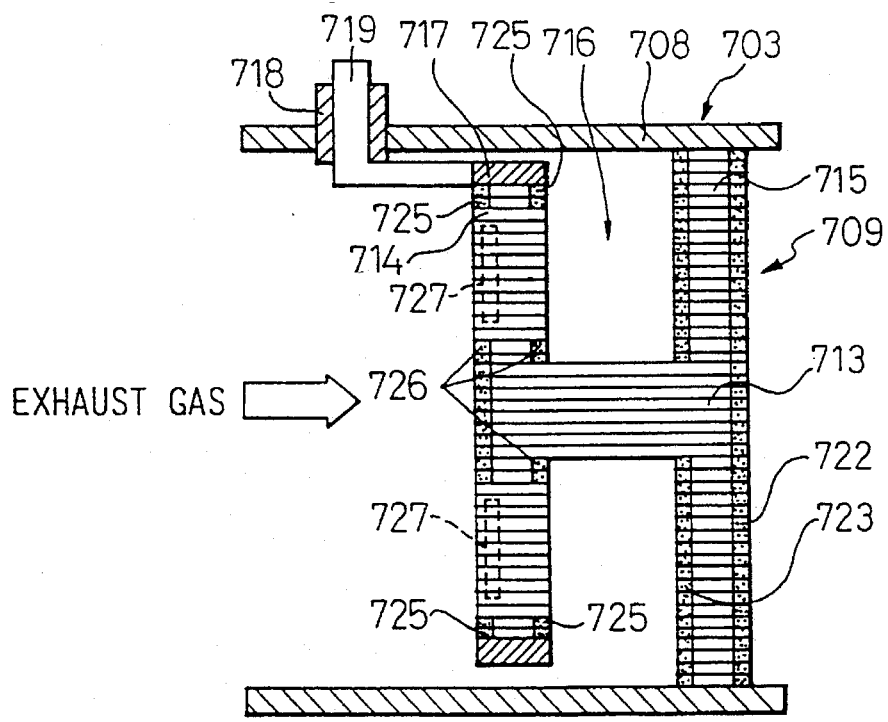
Figure 105:
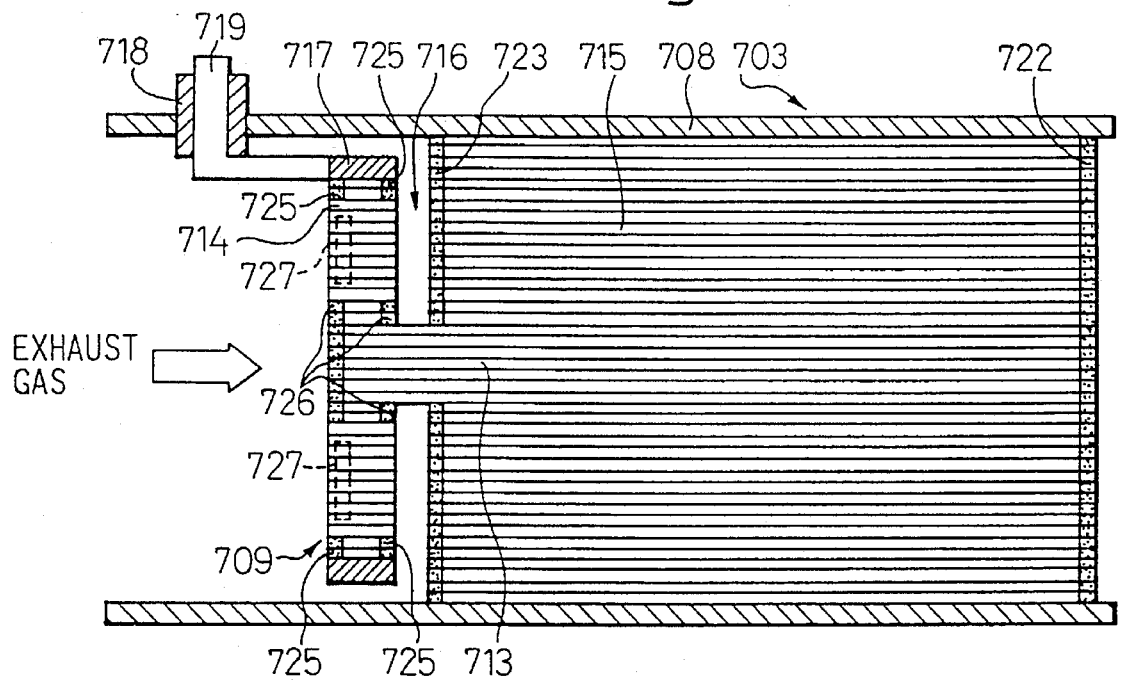
Figure 106:
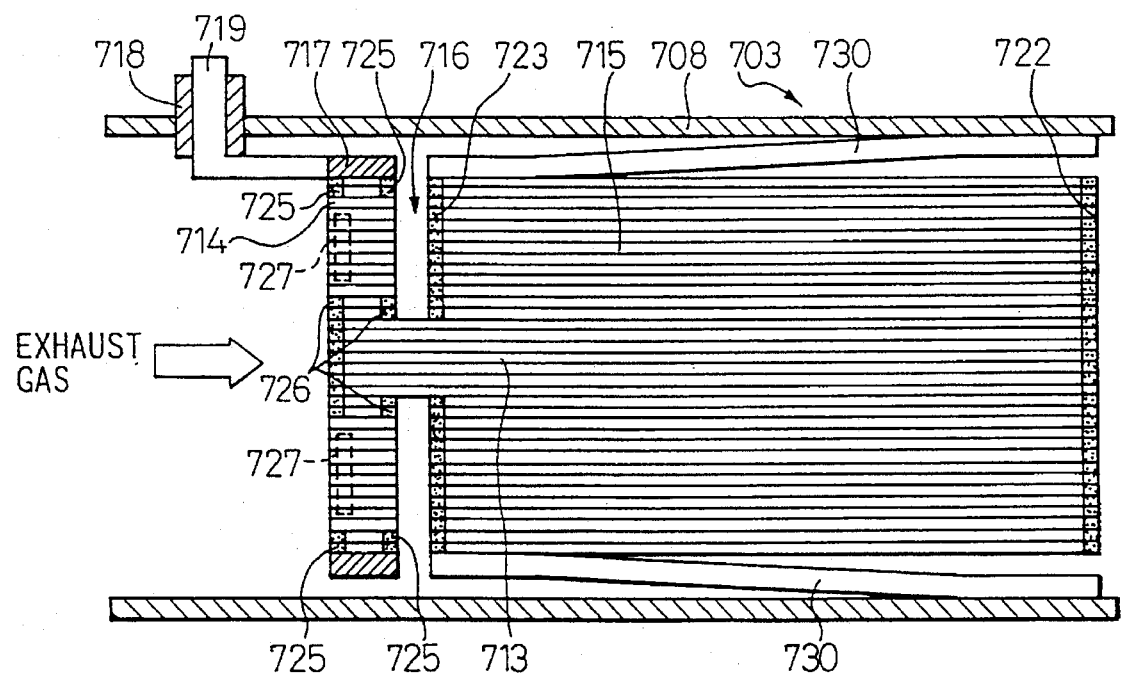
Figure 107:
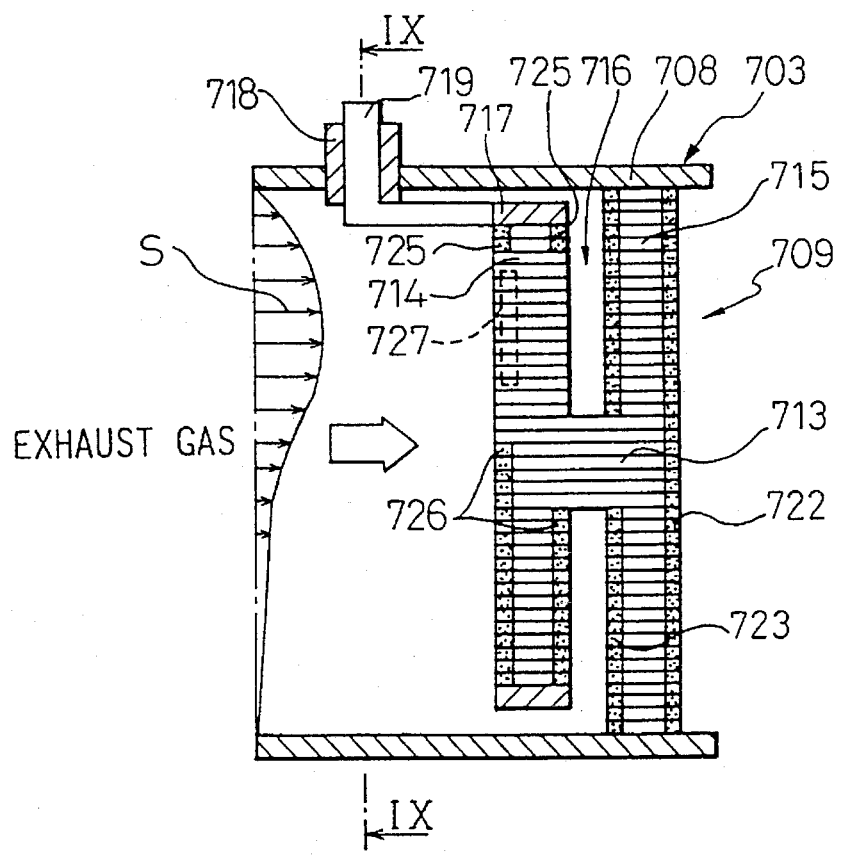
Figure 108:
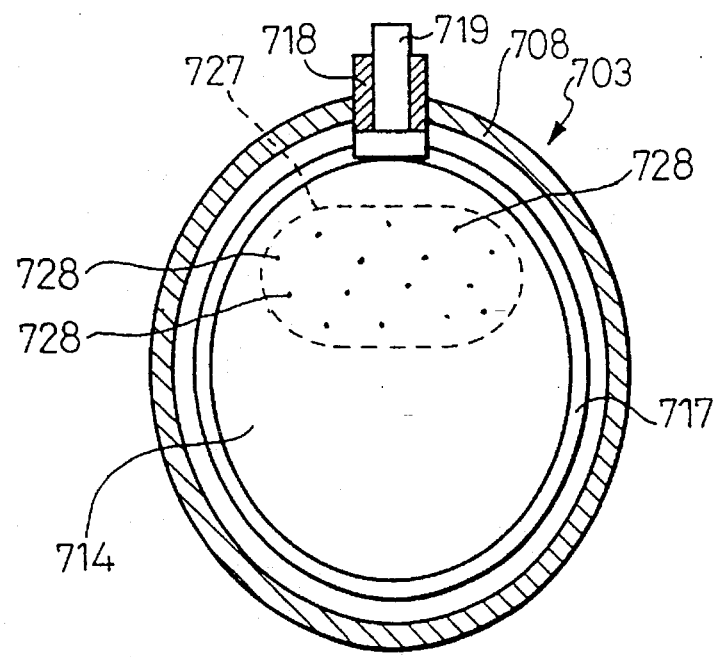
Figure 109:
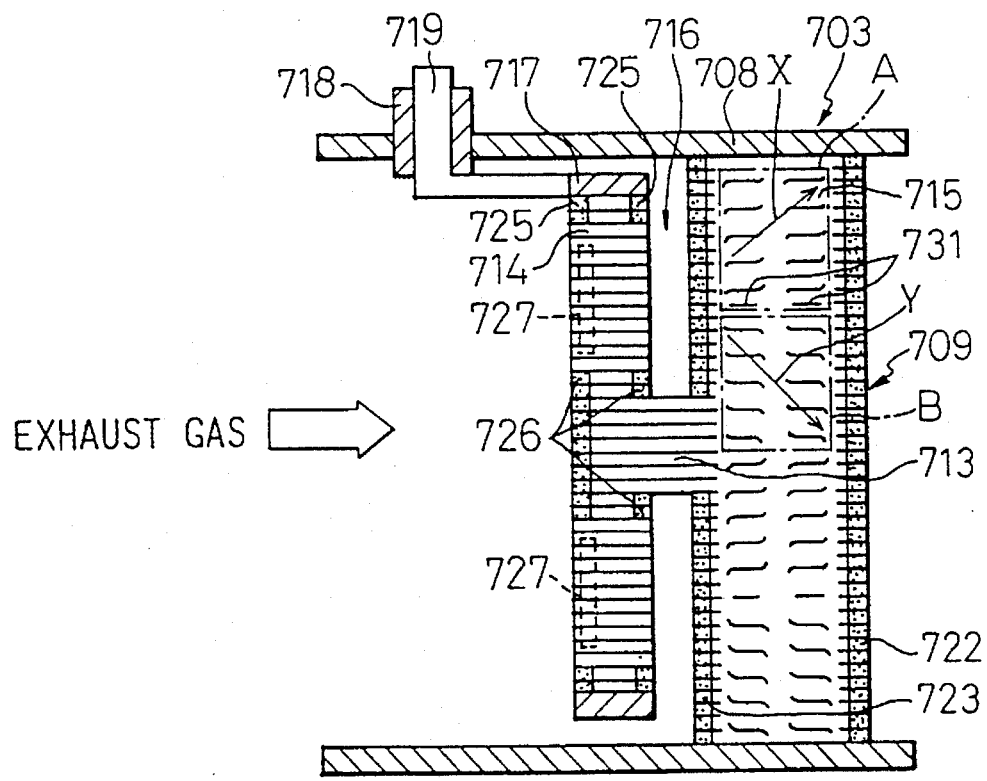
Figure 110A:
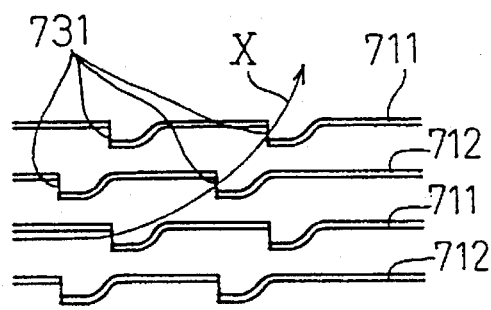
Figure 110B:
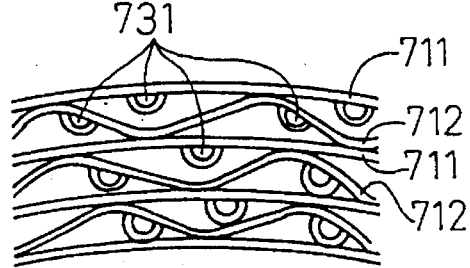
Figure 111:
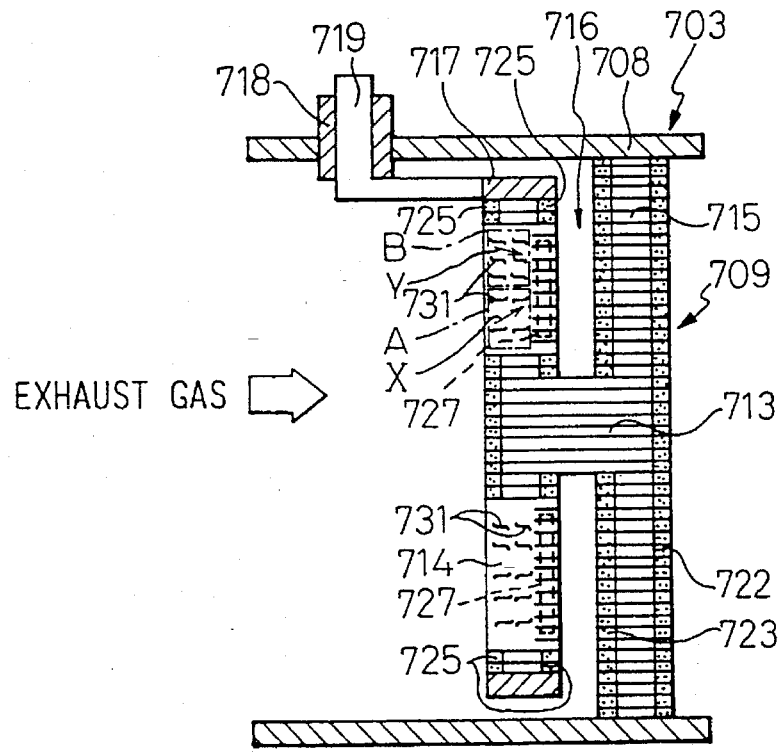
Figure 112:
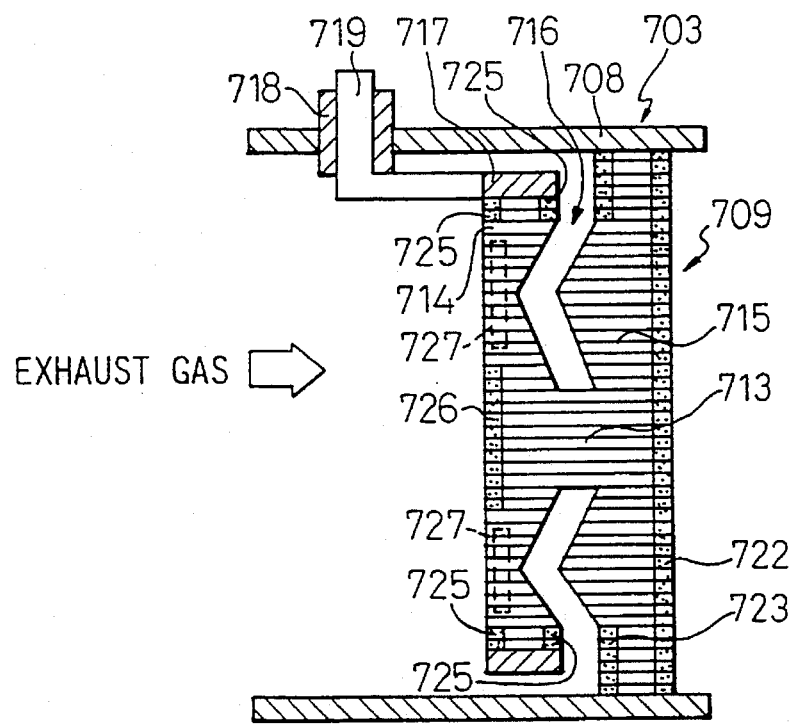
Figure 113:
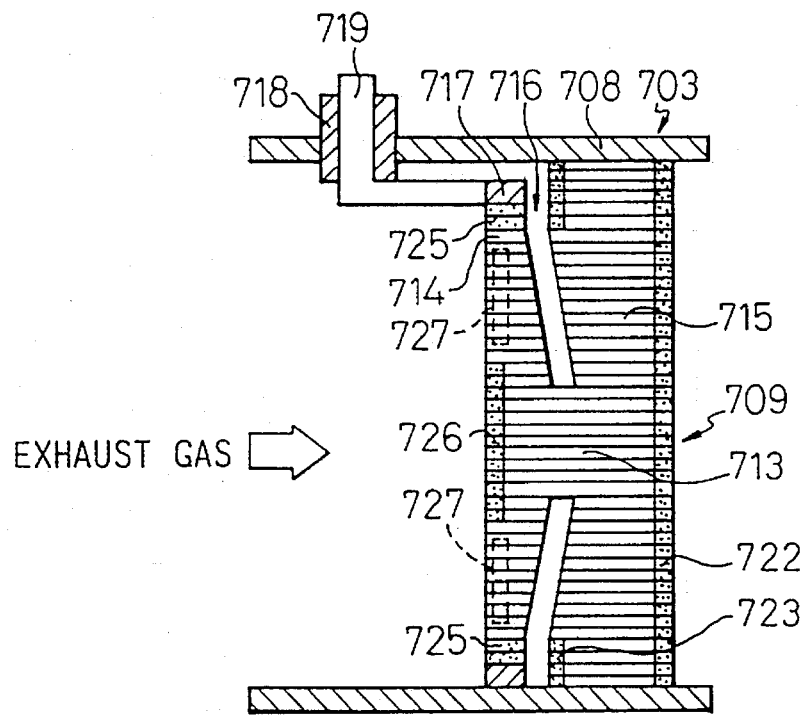
Figure 114:
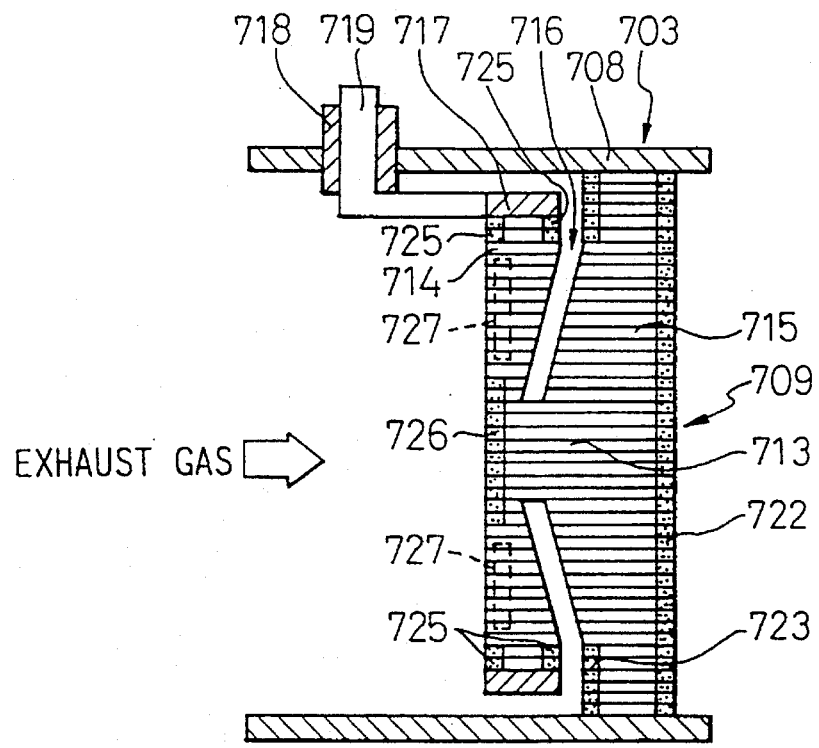
Figure 115:
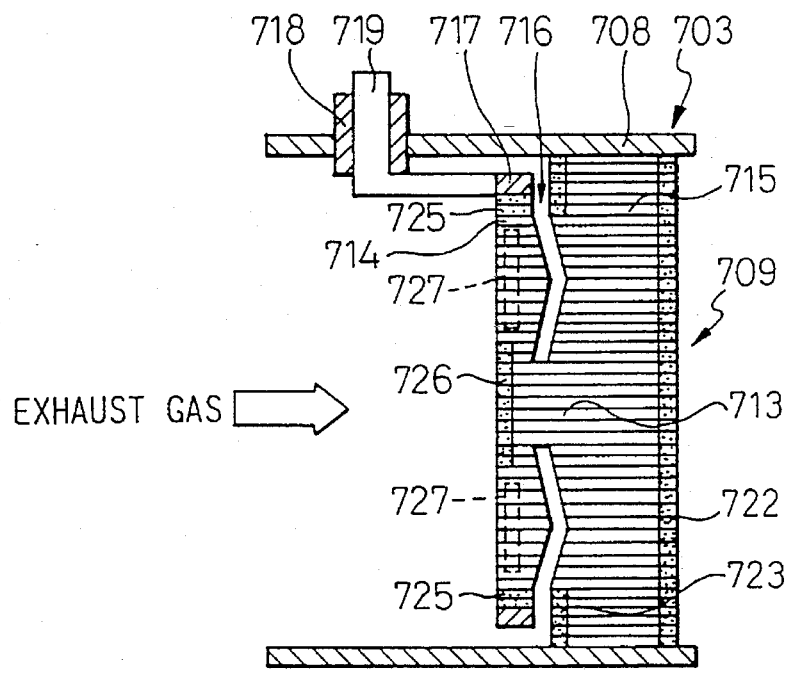
Figure 116:
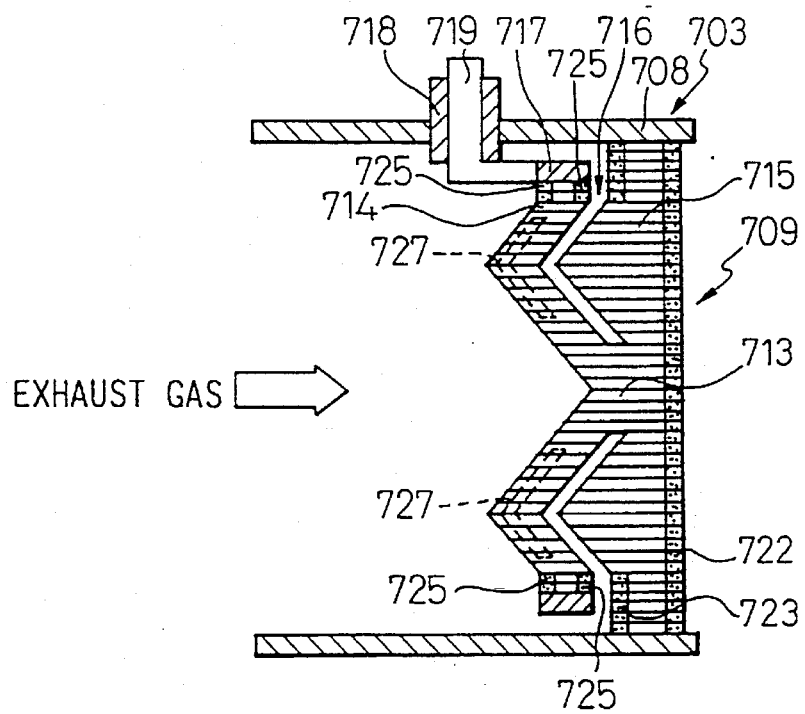
Figure 117:
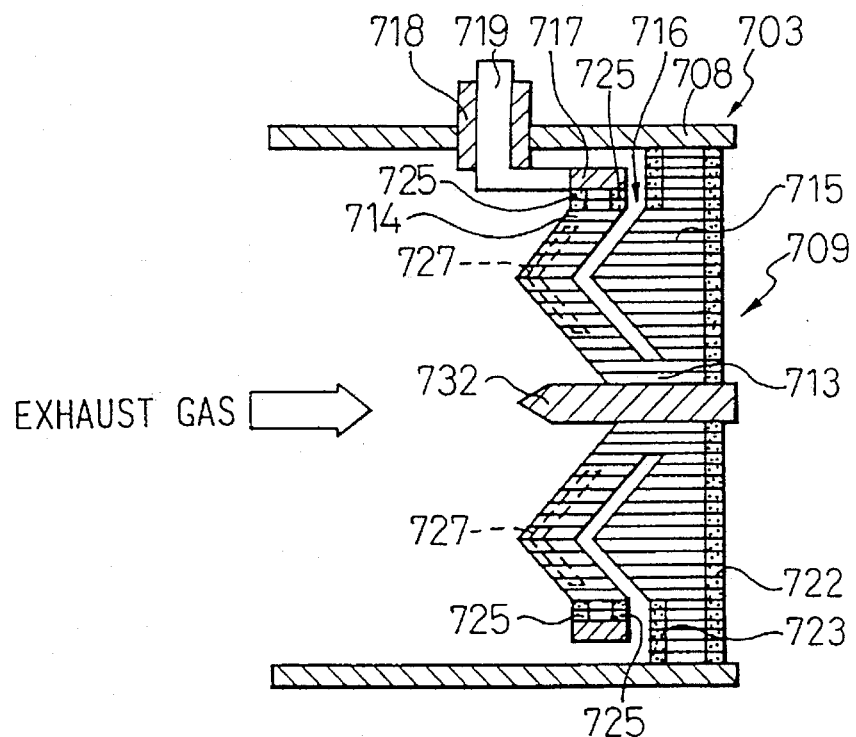
Figure 118:
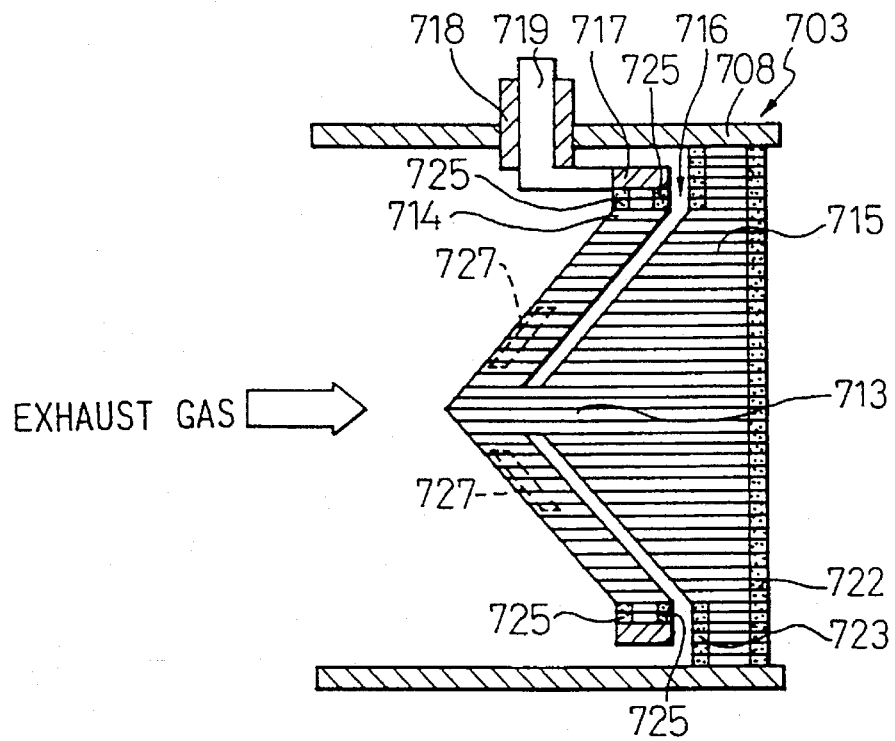
Figure 119:
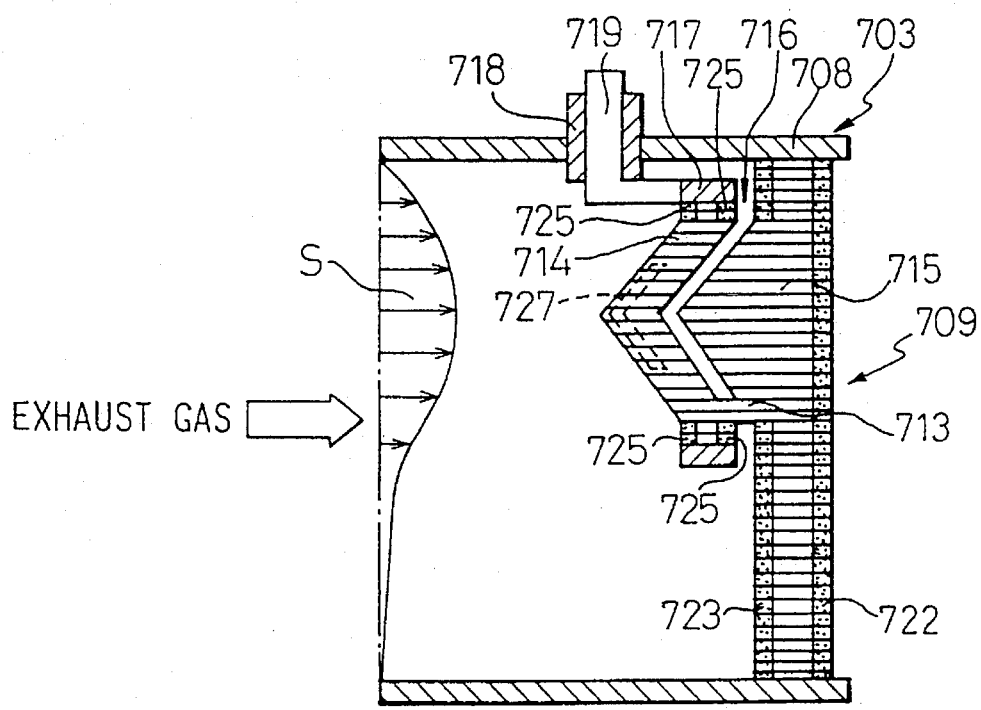
Figure 120:
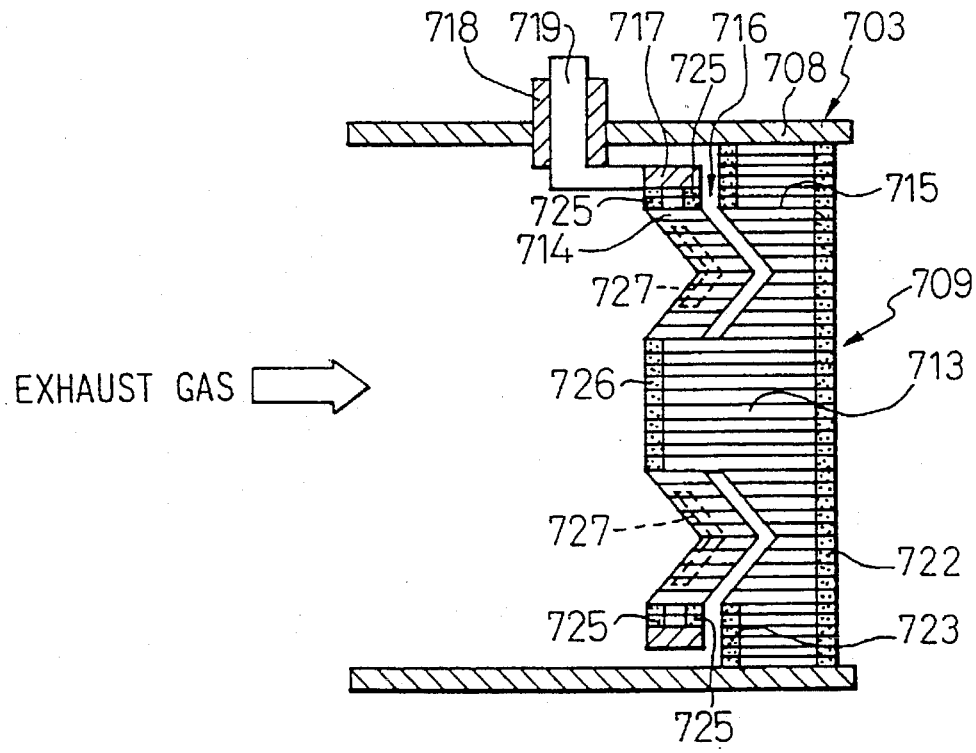
Figure 121:
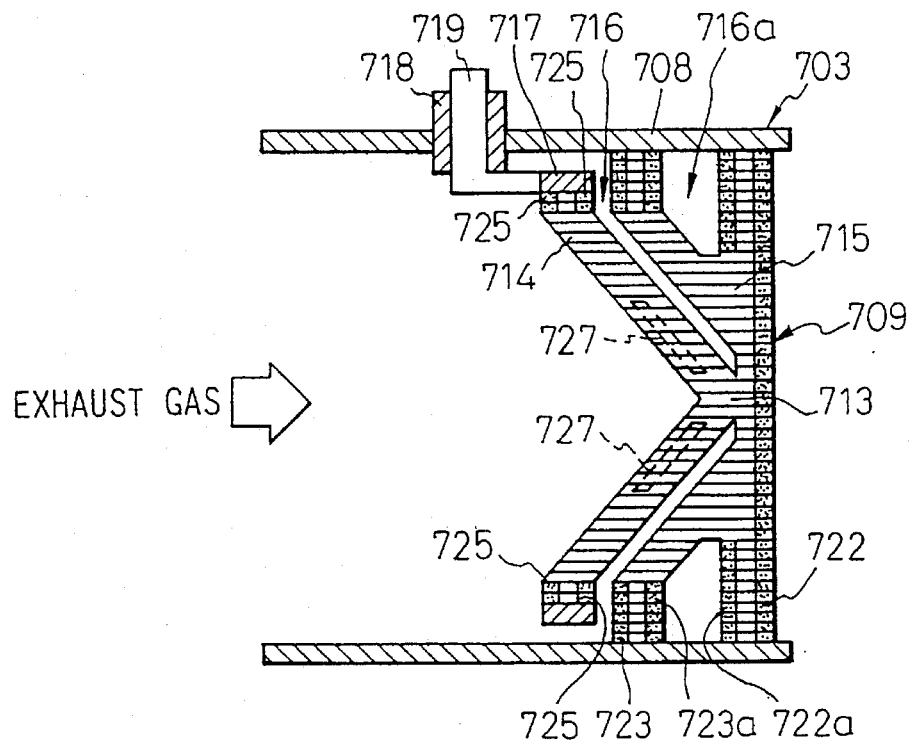
Figure 122:
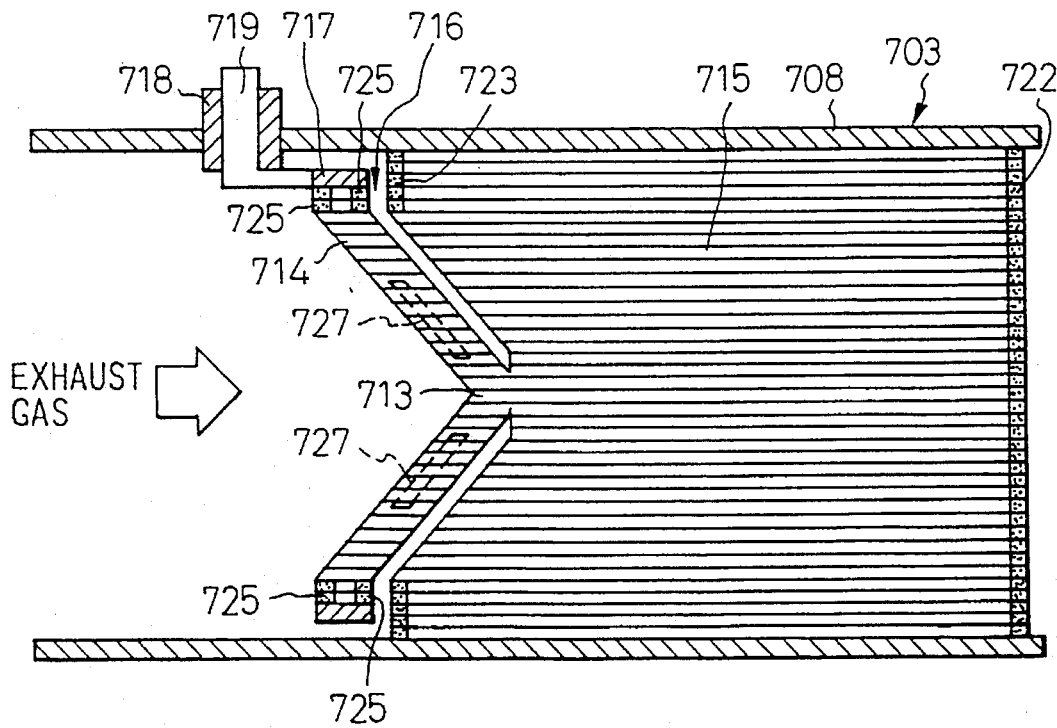
Figure 123:
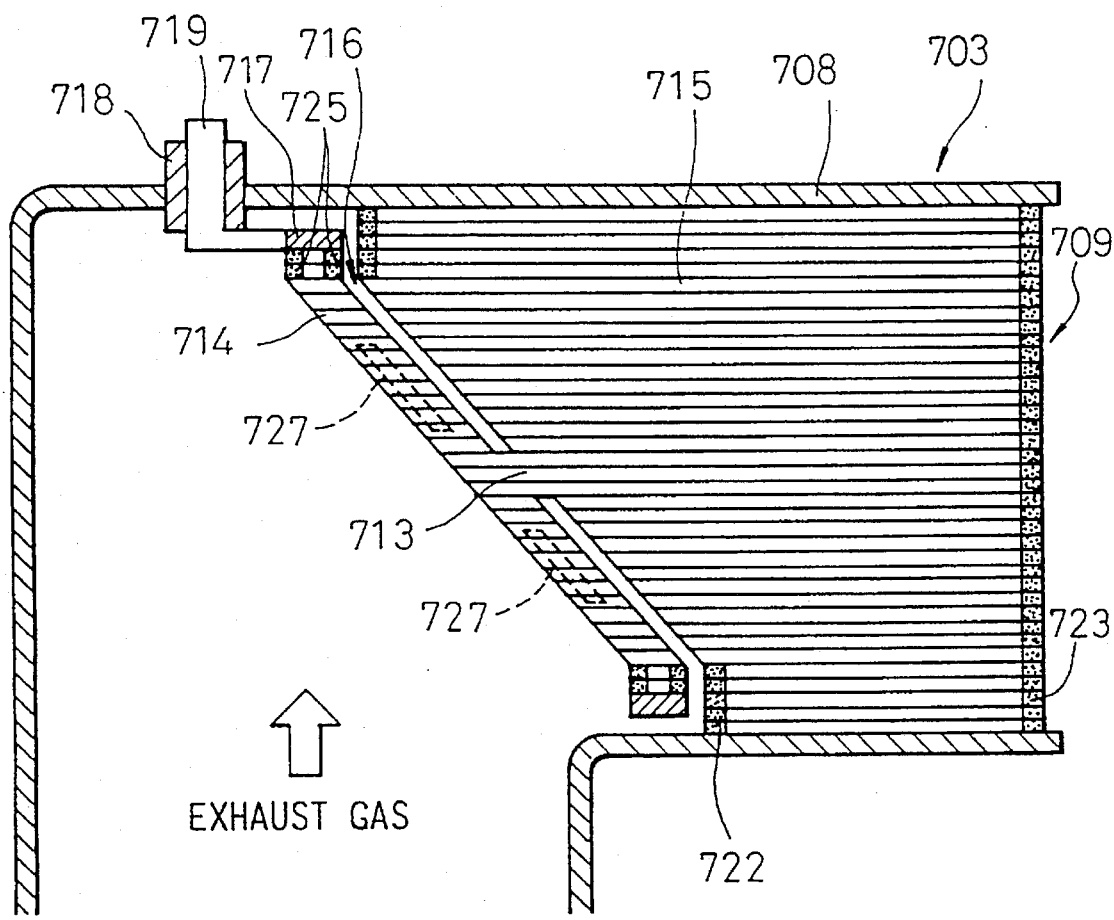
Figure 124:
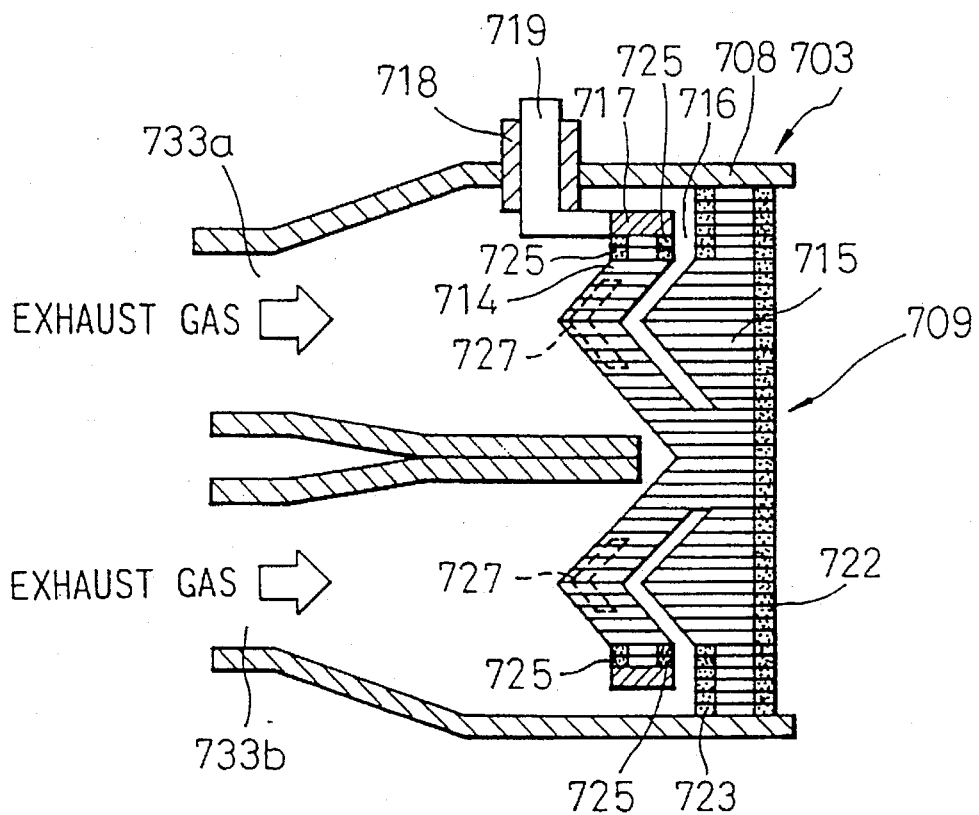
Figure 125:
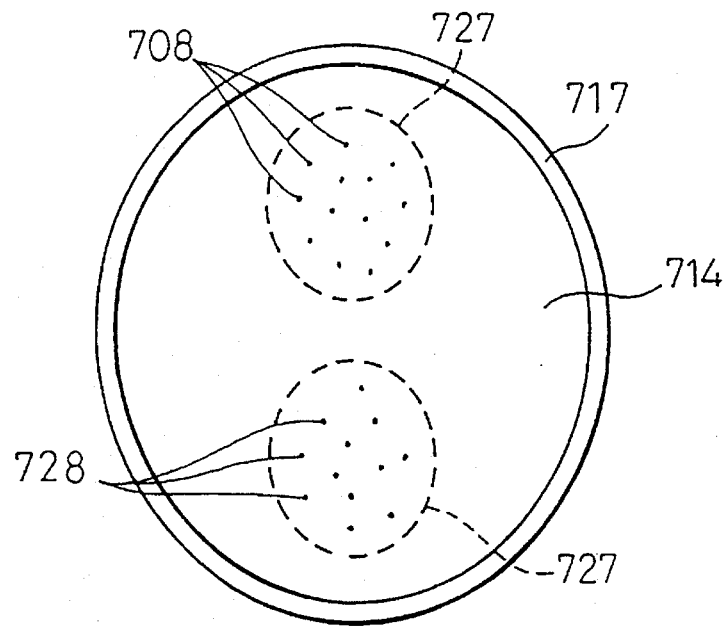
Figure 126:
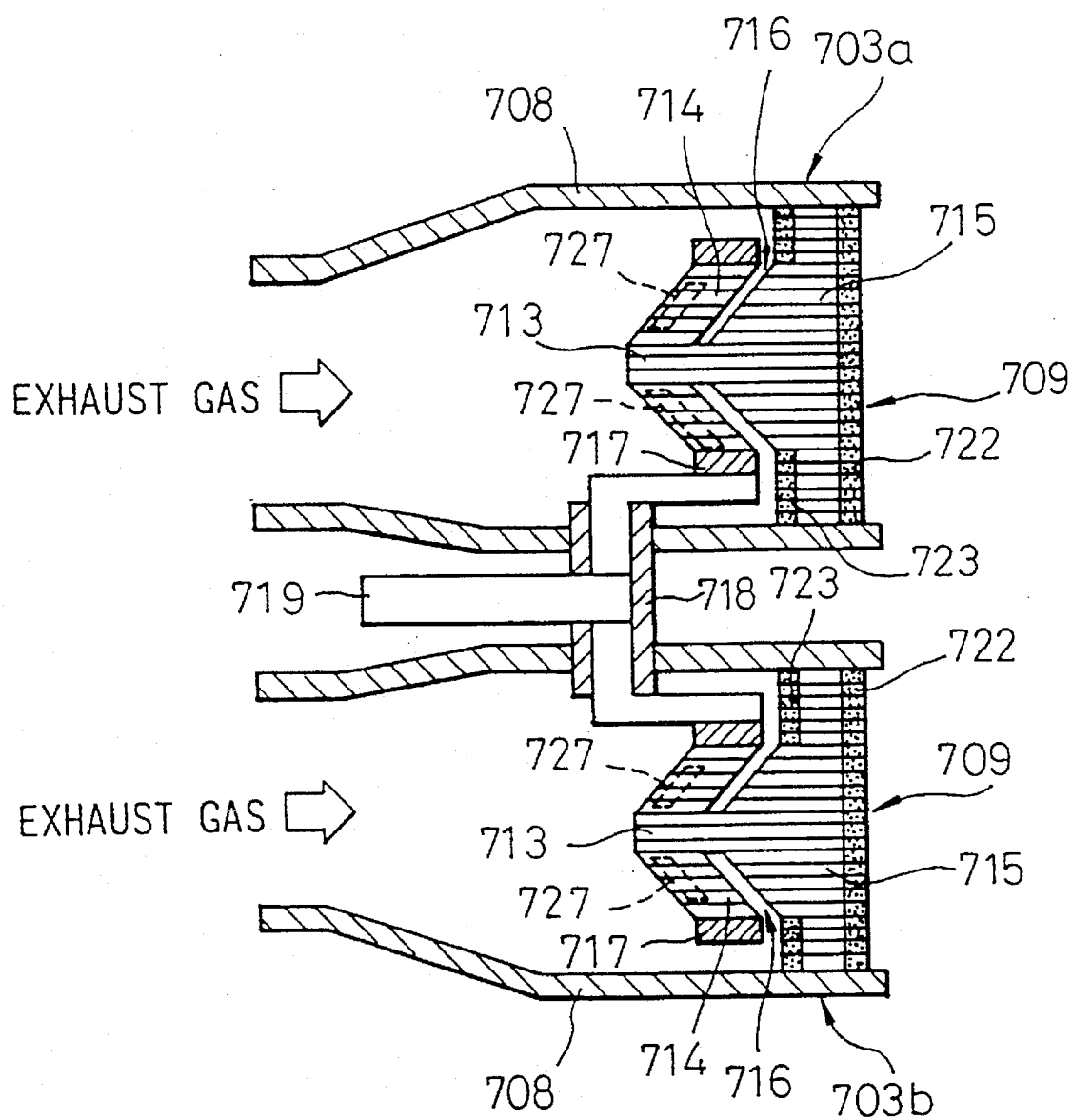
Figure 127:
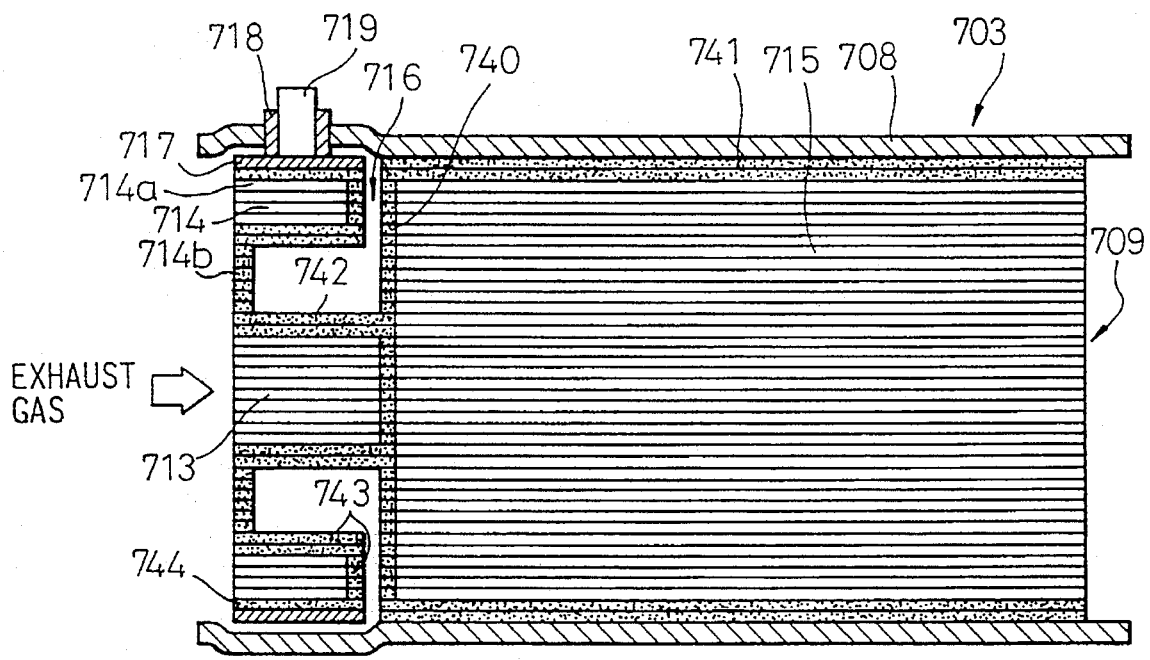
Figure 128:
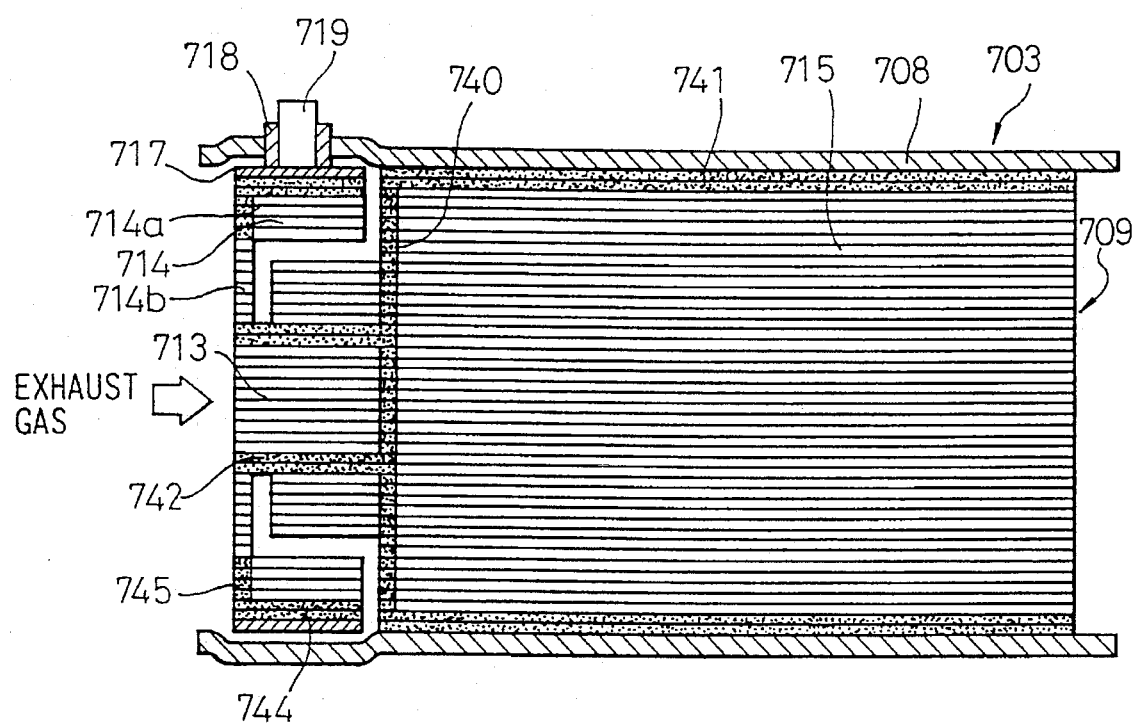
Figure 129:
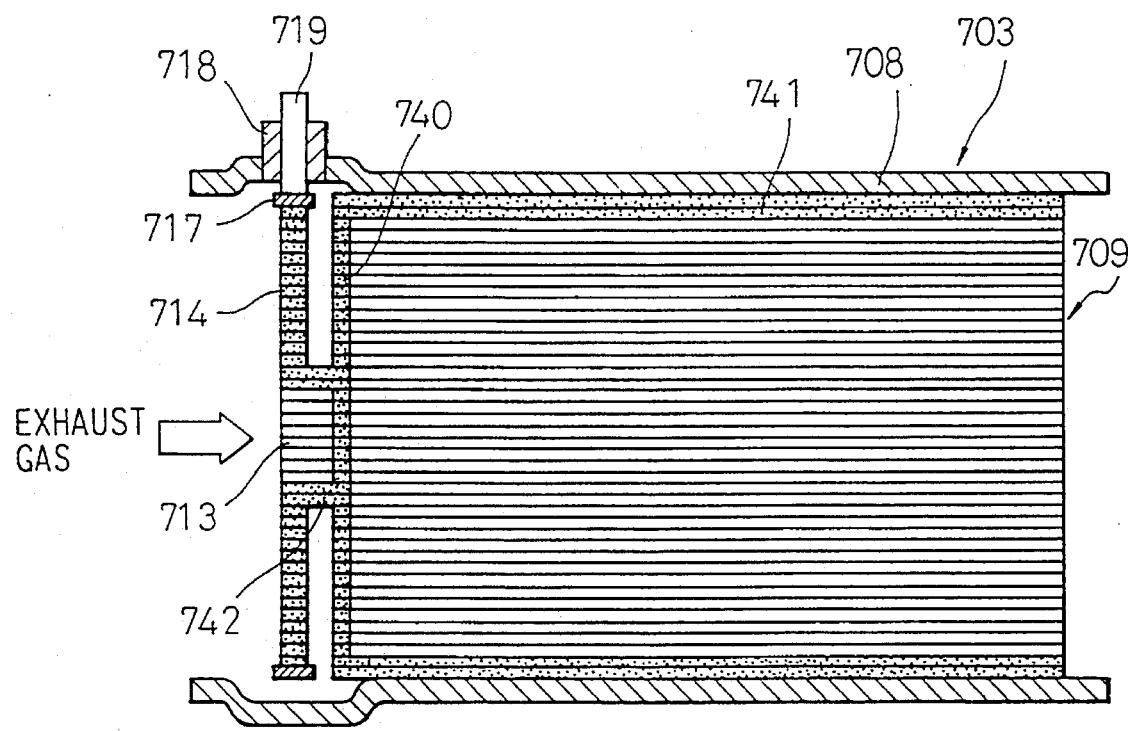
Figure 130:
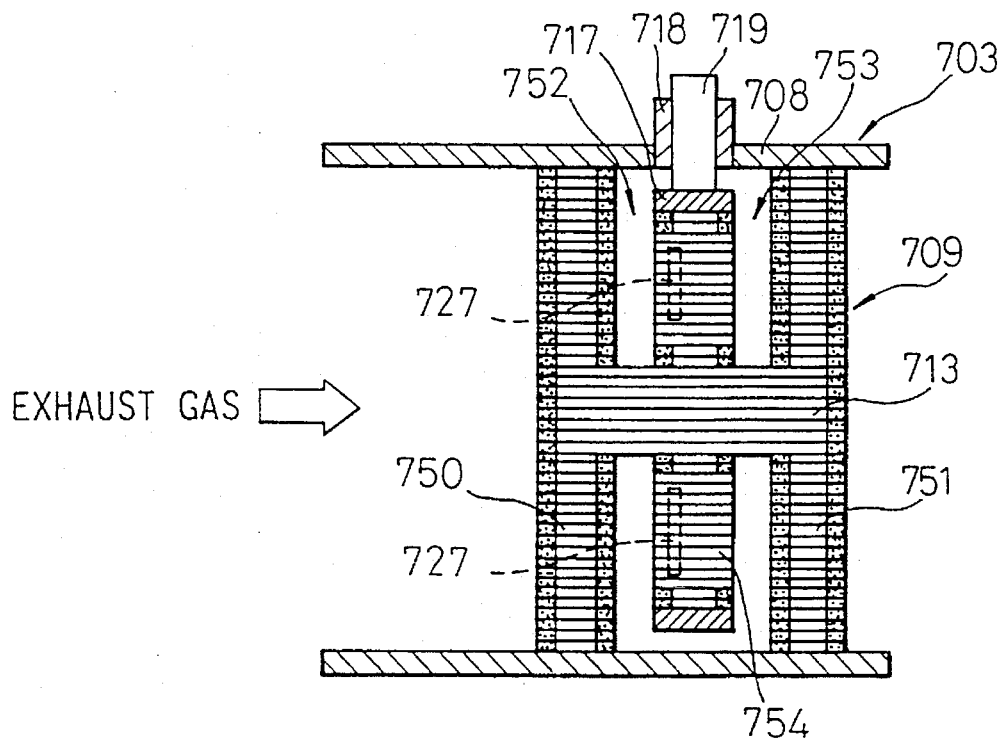
Figure 131:
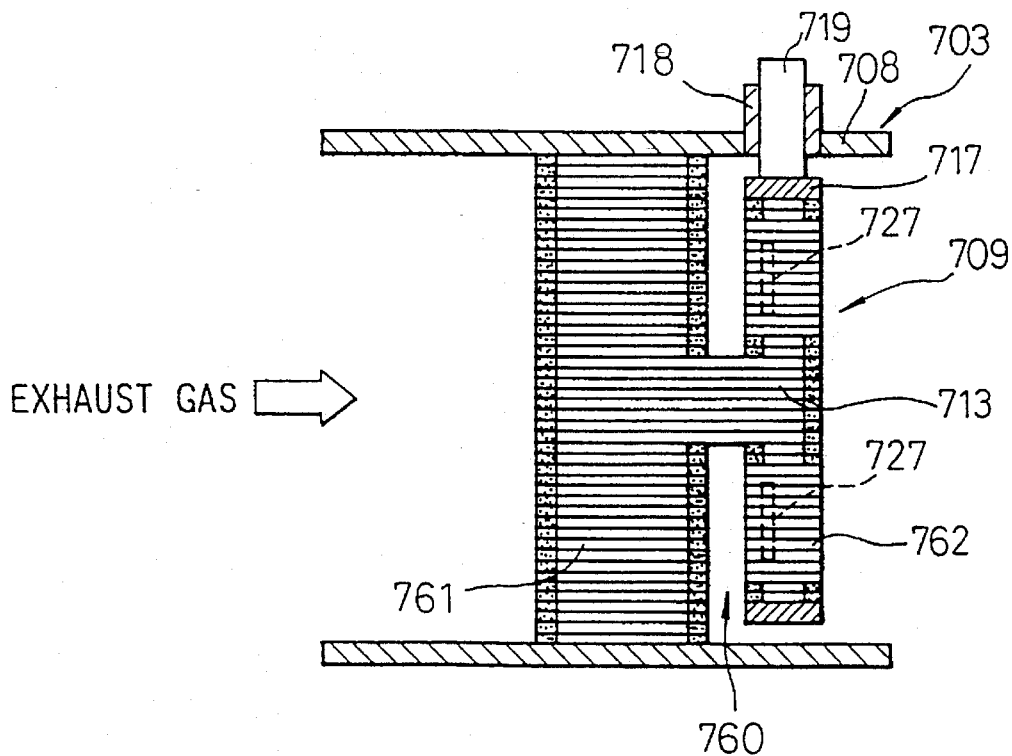
Figure 132:
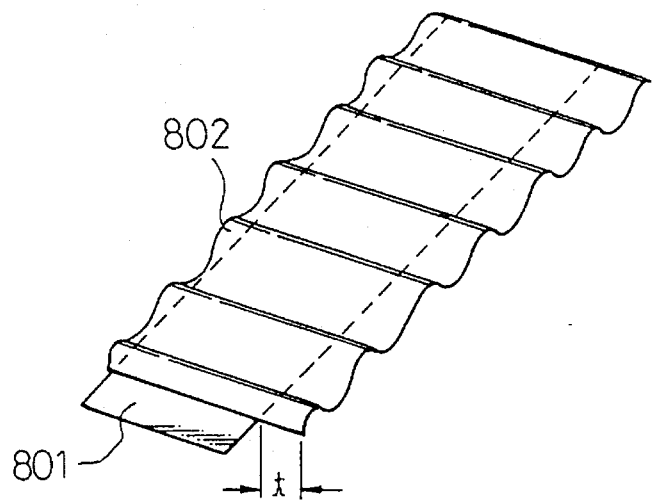
Figure 133A:
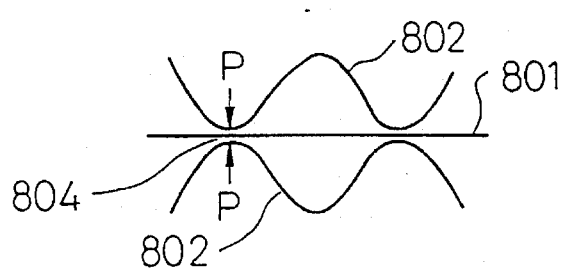
Figure 133B:
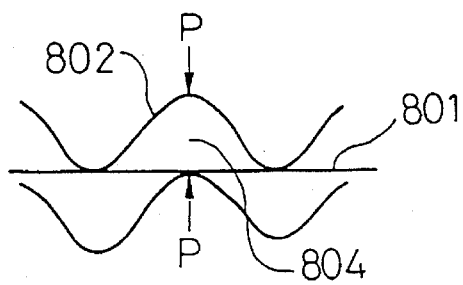
Figure 134:
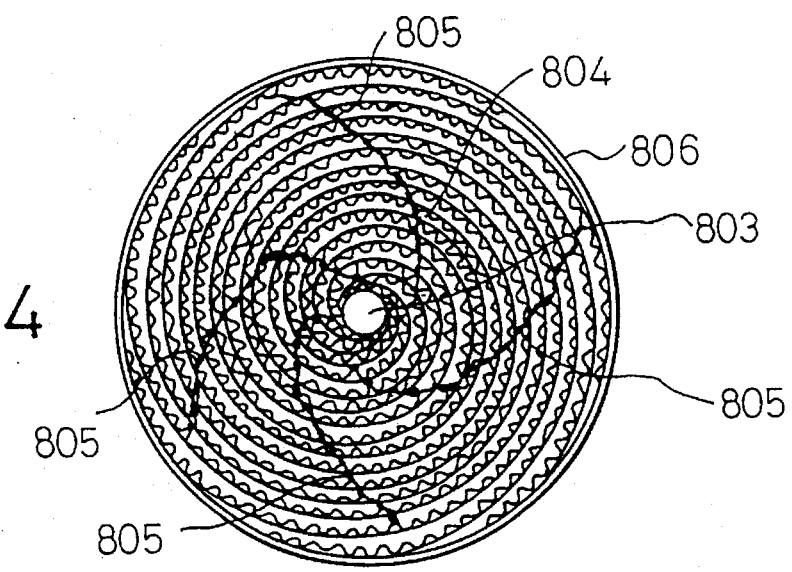
Figure 135:
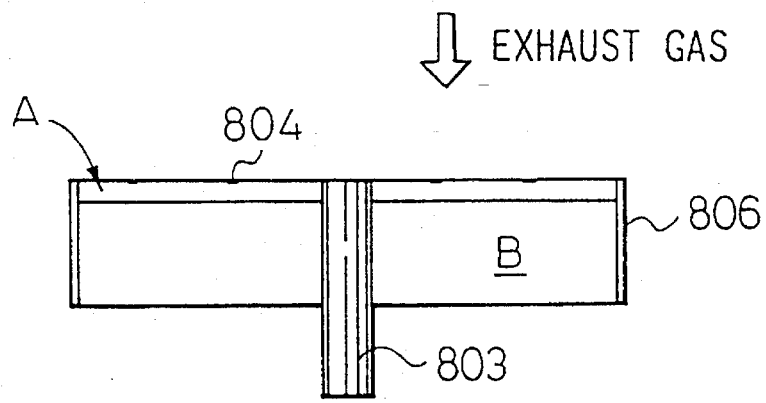
Figure 136:
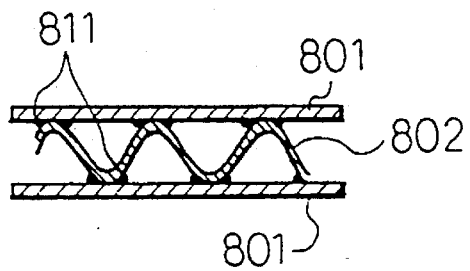
Figure 137:
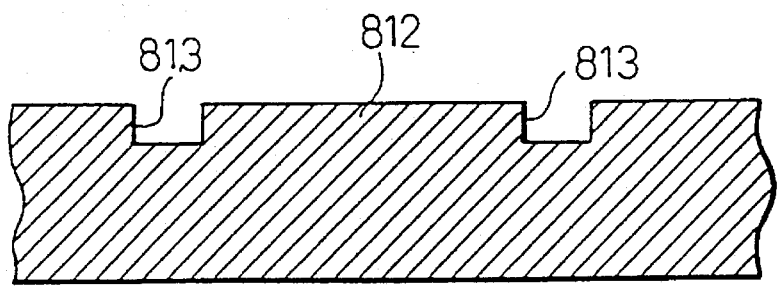
Figure 138:
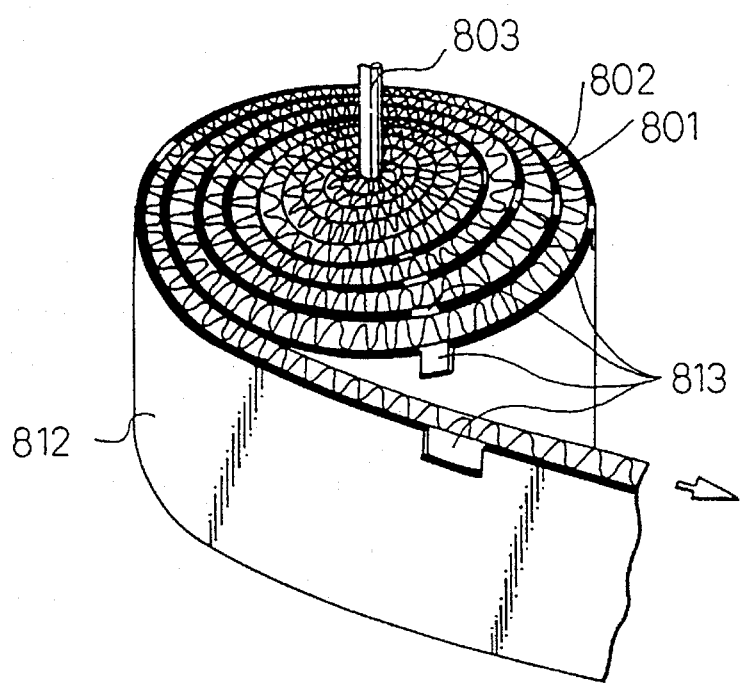
Figure 139:
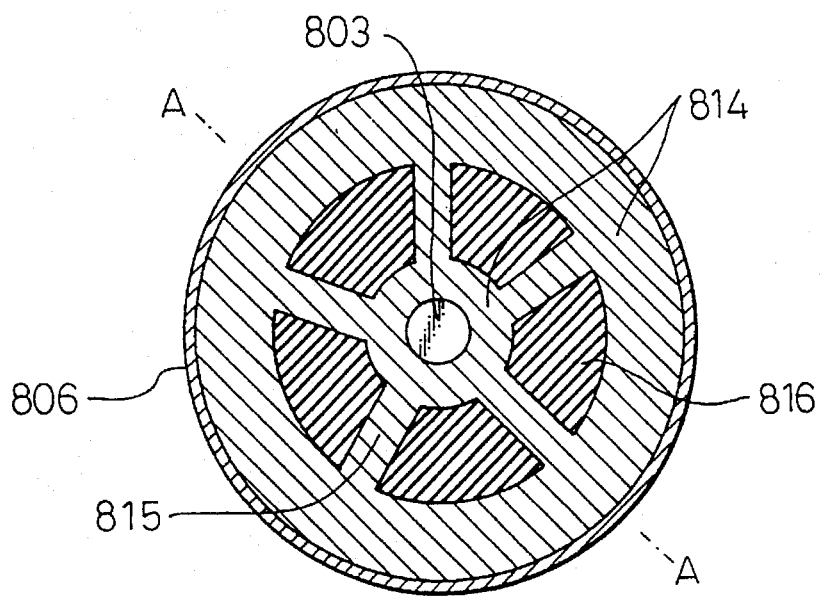
Figure 140A:
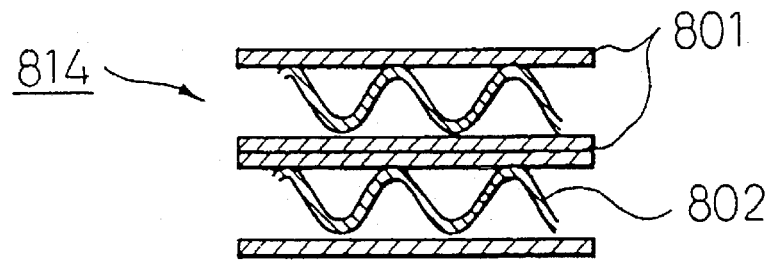
Figure 140B:
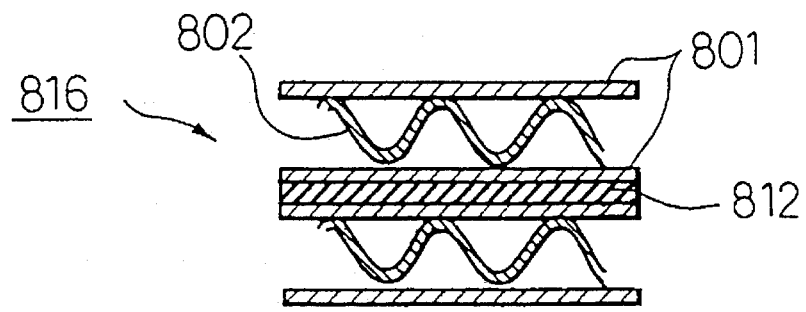
Figure 140C:
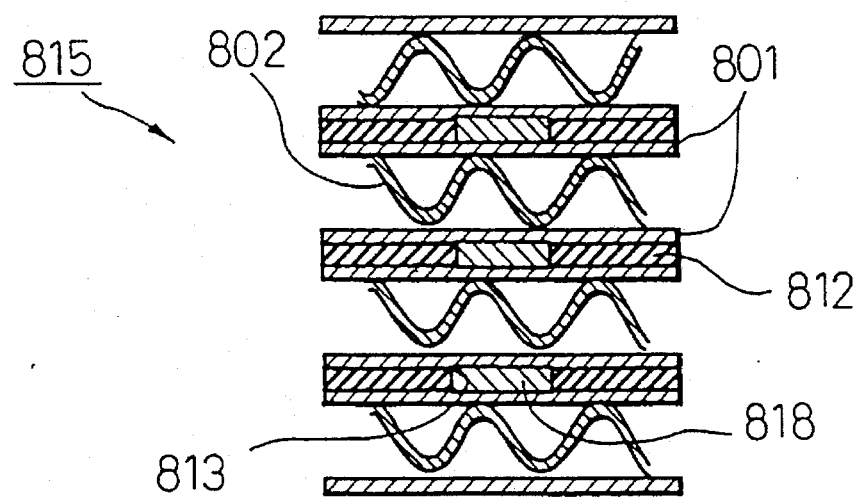
Figure 141:
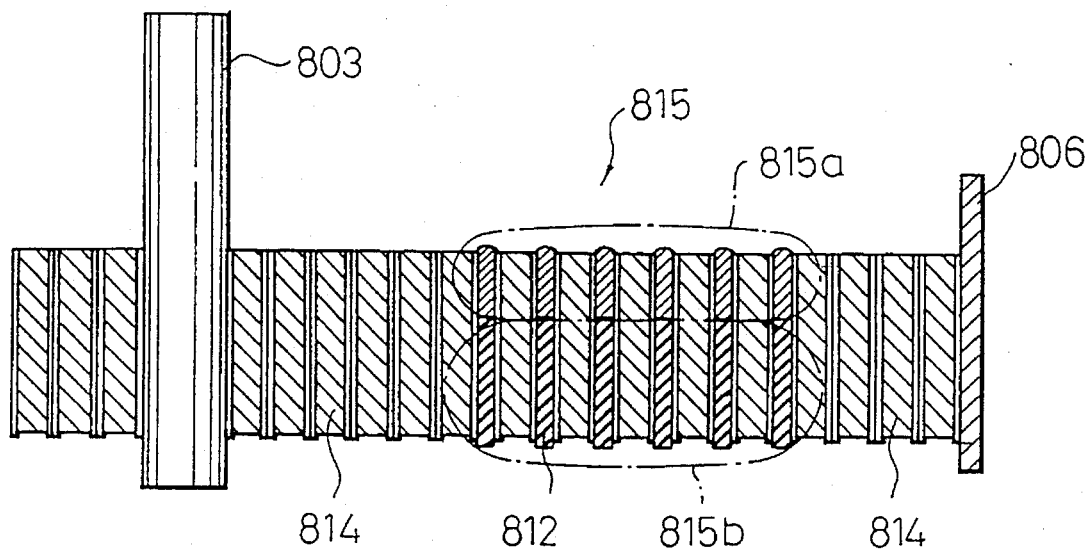
Figure 142:
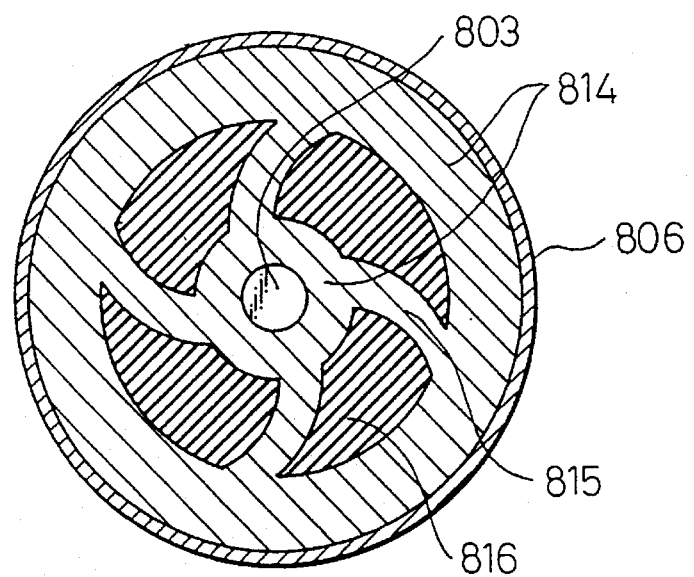
Figure 145:
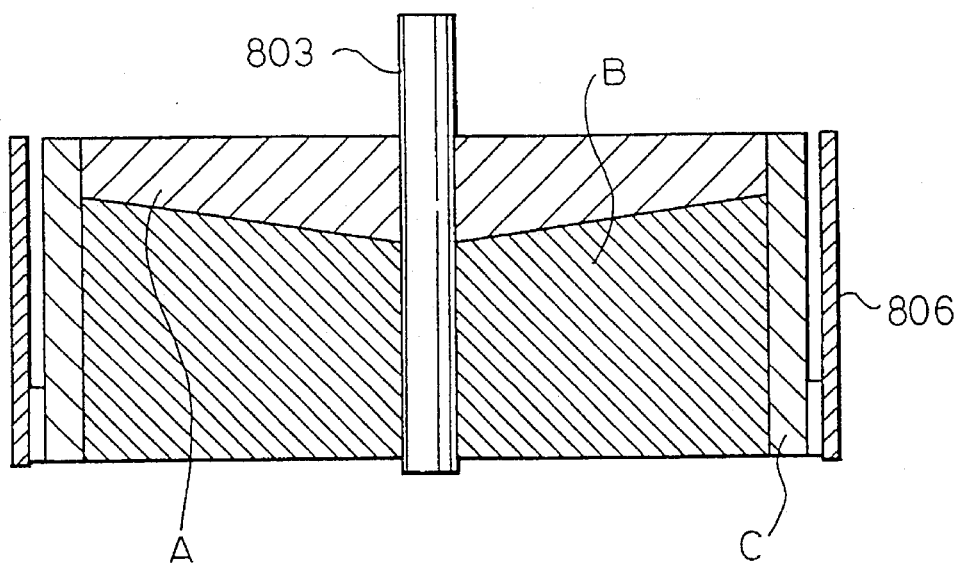
Figure 146:
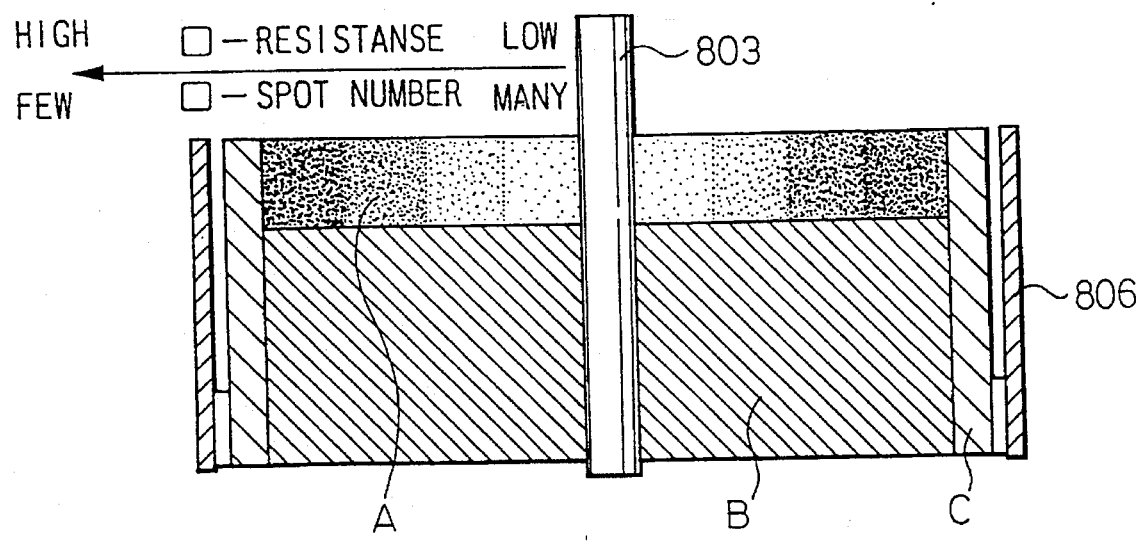
Figure 147:
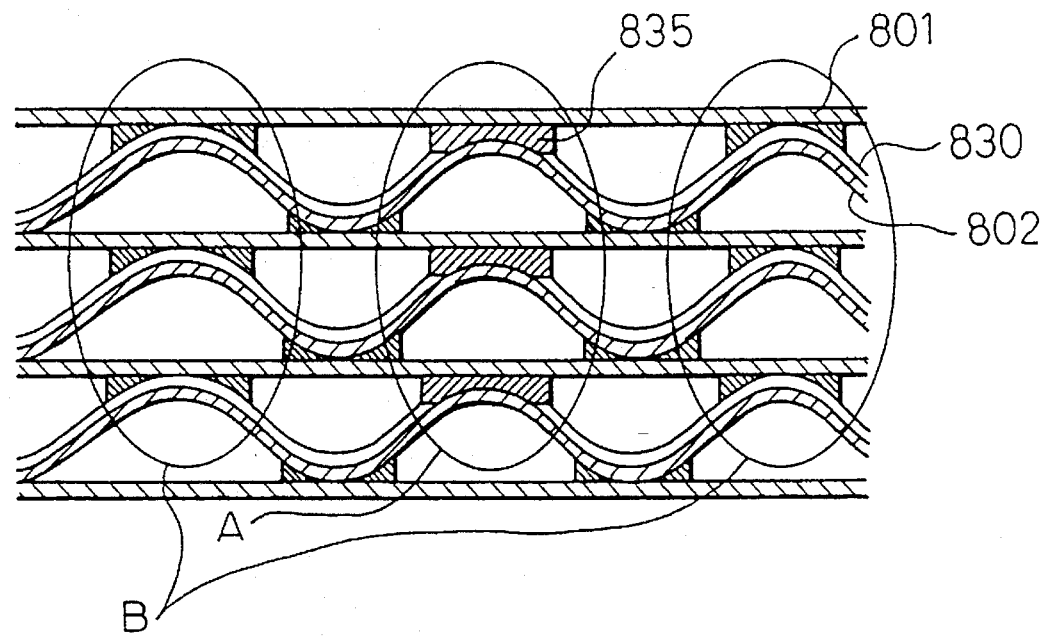
Figure 148:
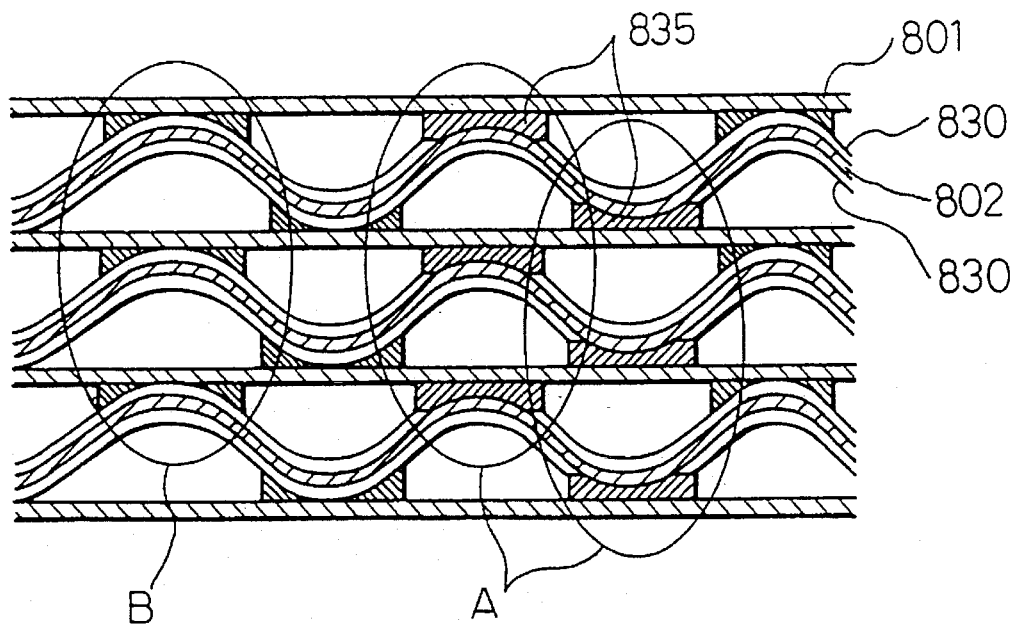
Figure 149A:
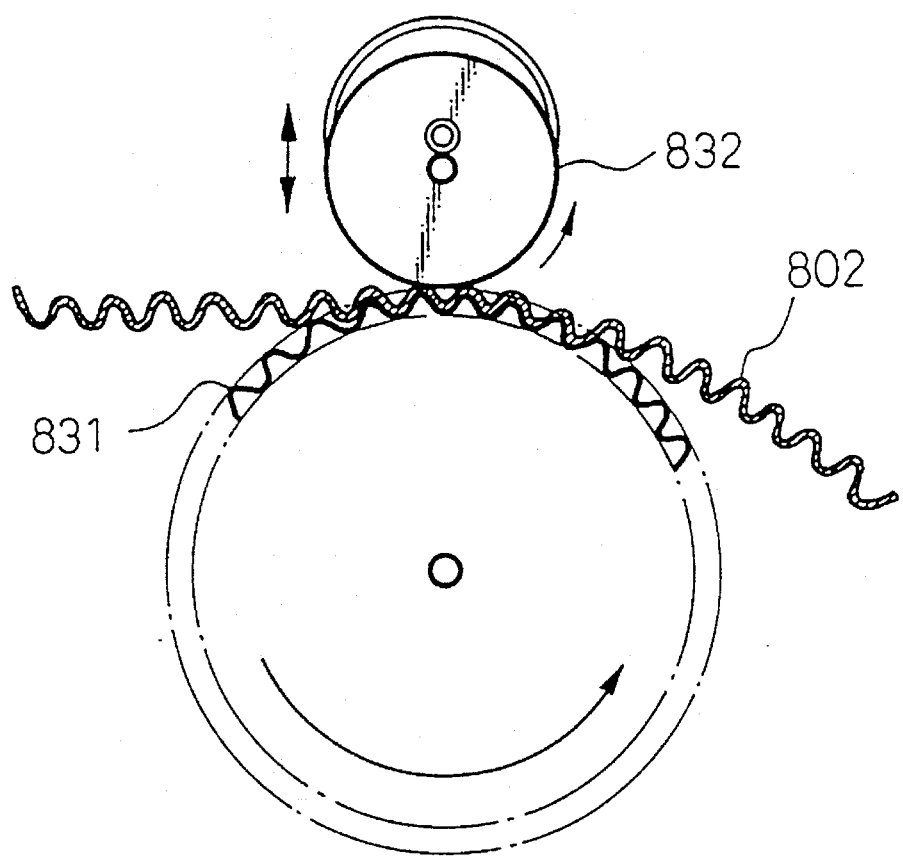
Figure 149B:
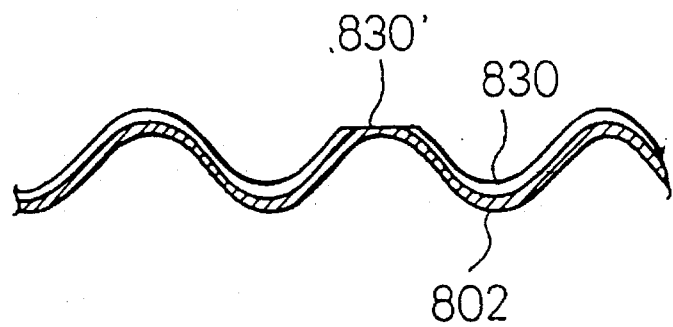
Figure 150A:
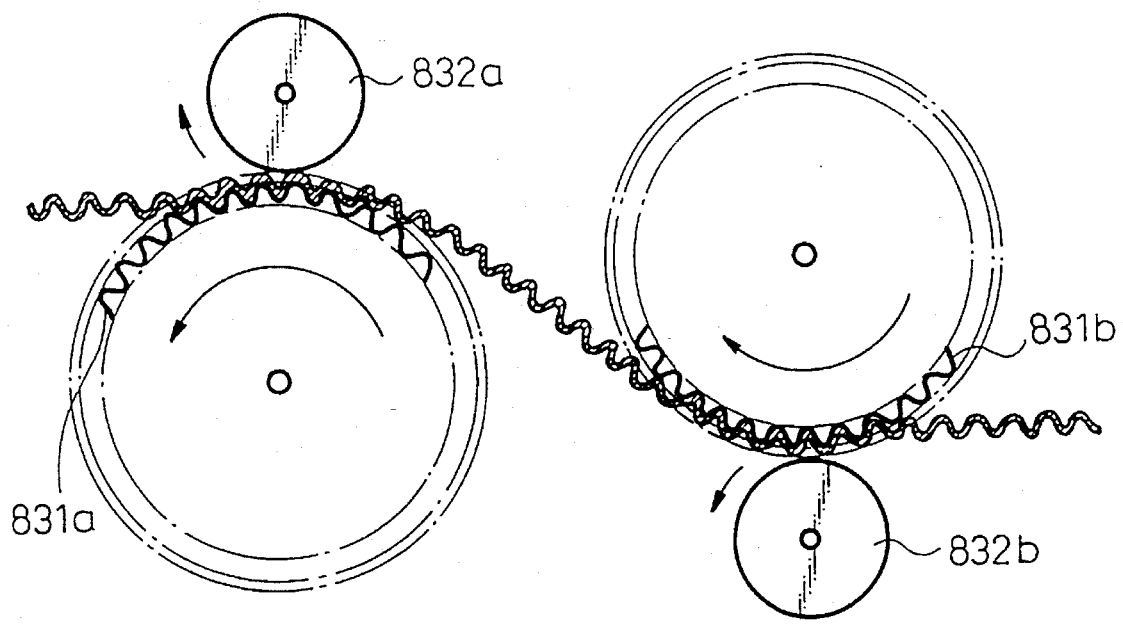
Figure 150B:
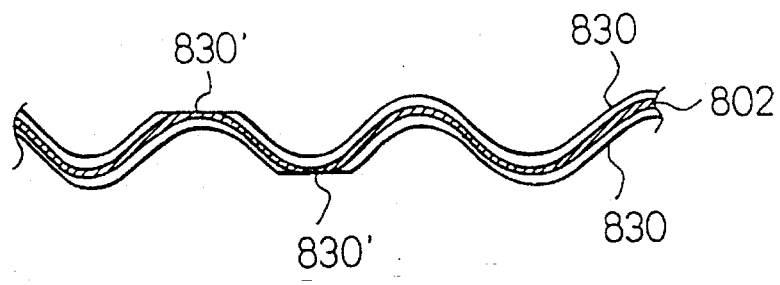
Figure 151:
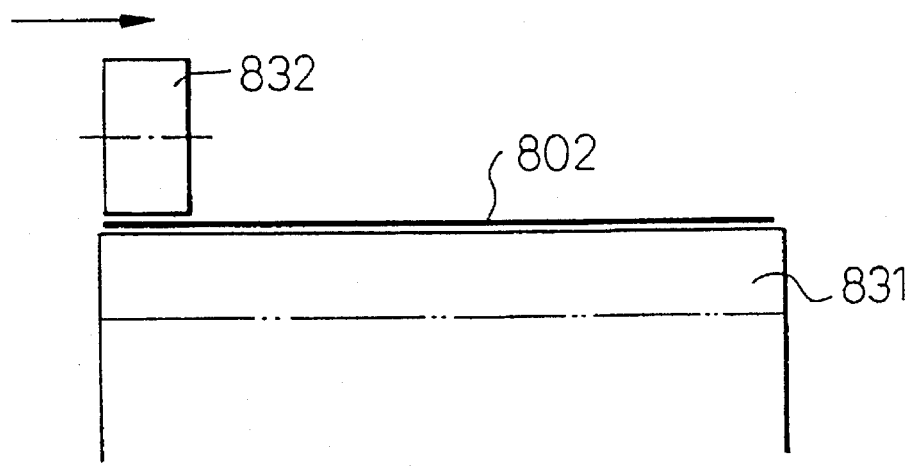
Figure 152:
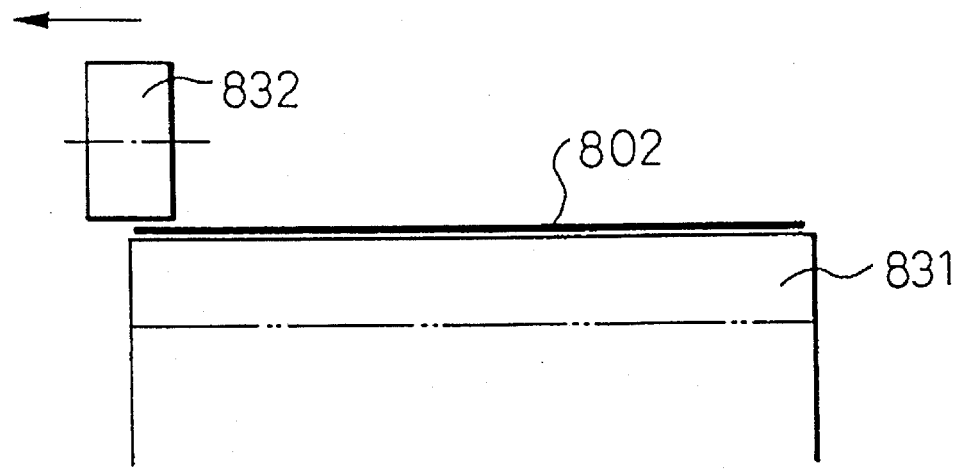
Figure 155A:
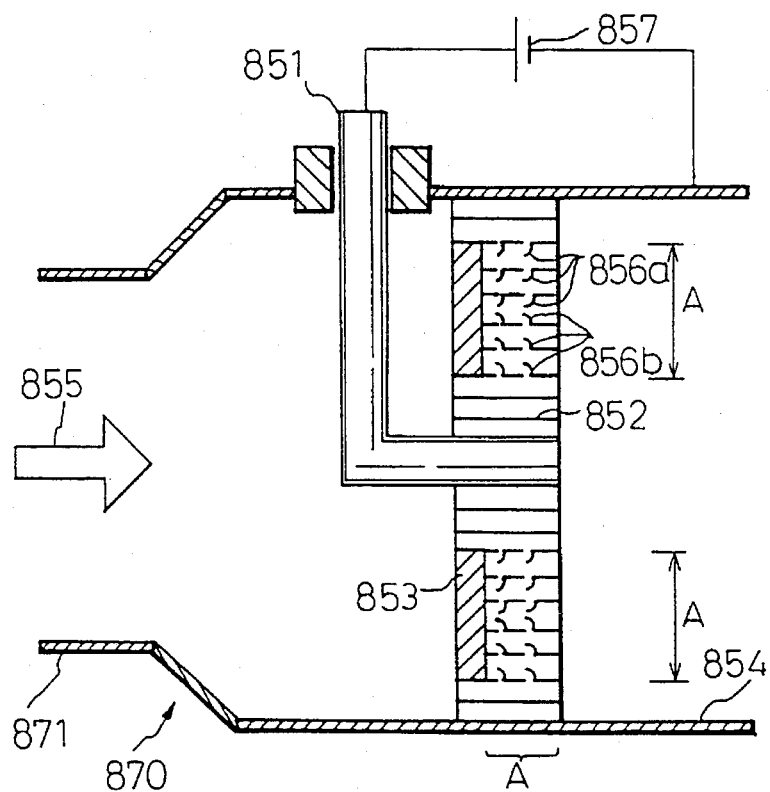
Figure 155B:
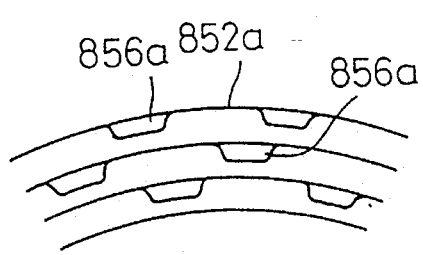
Figure 155C:
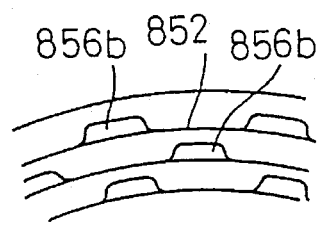
Figure 155D:
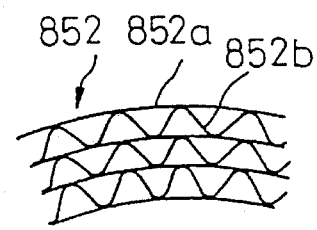
Figure 156:
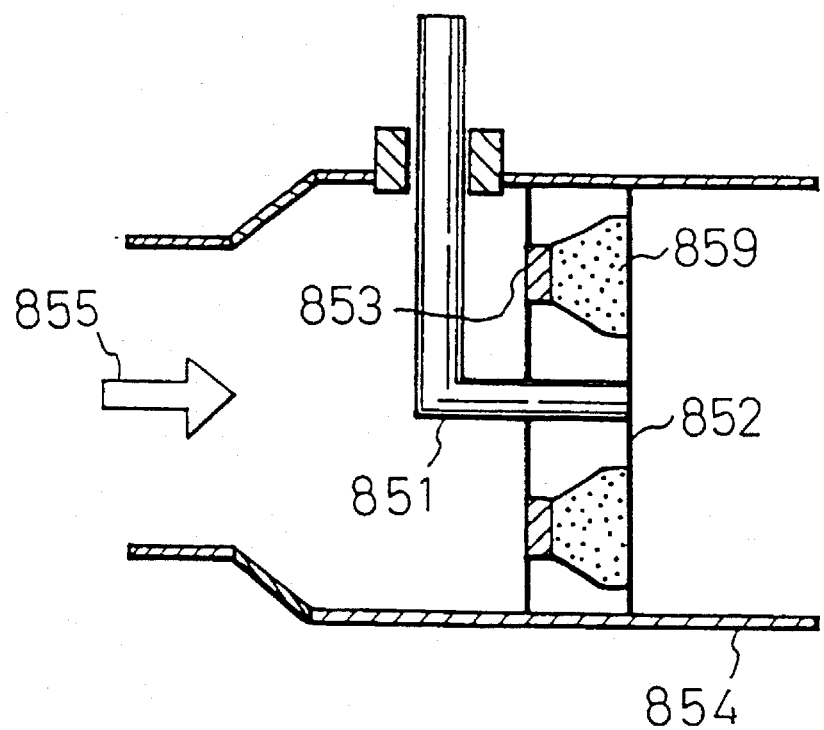
Figure 157:
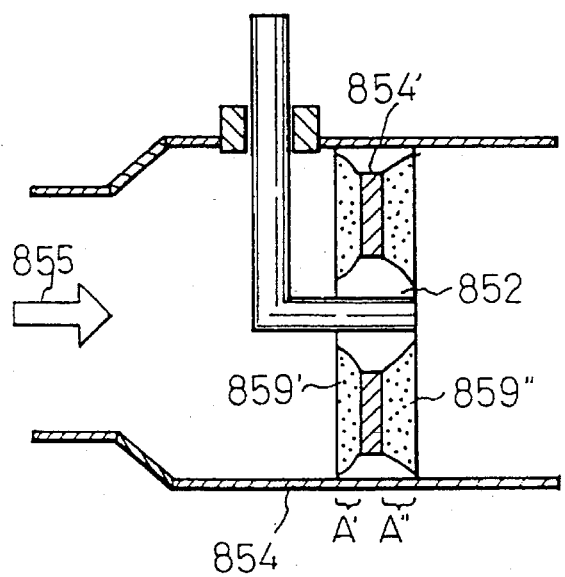
Figure 158:
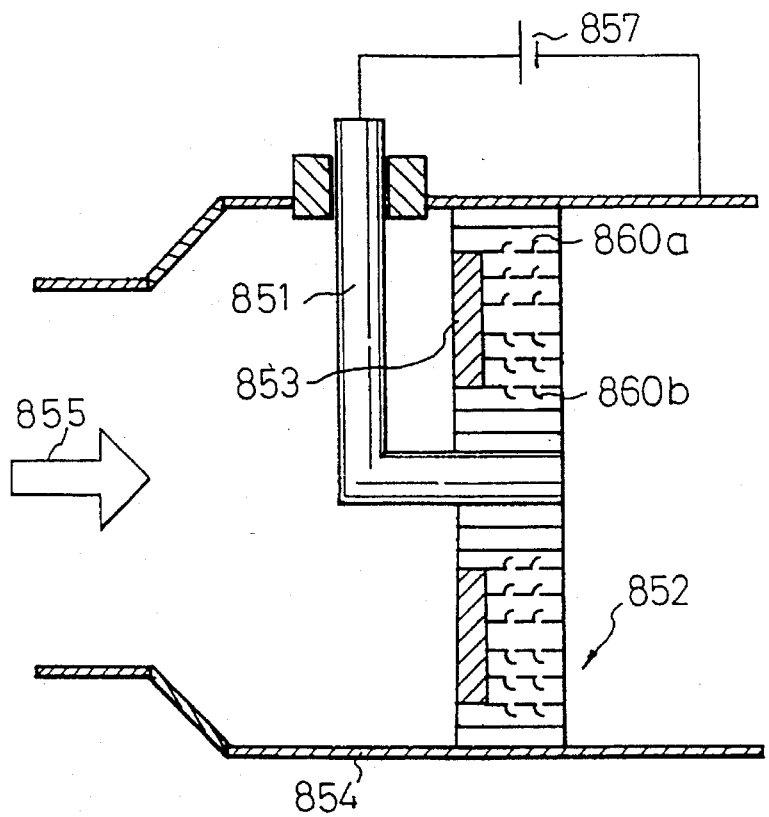
Figure 159:
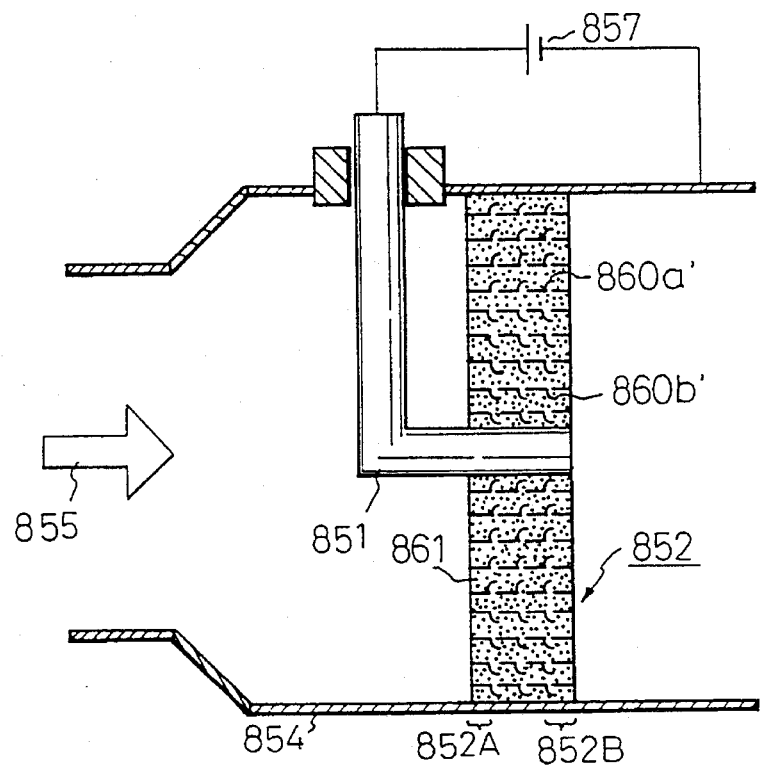
Figure 160:
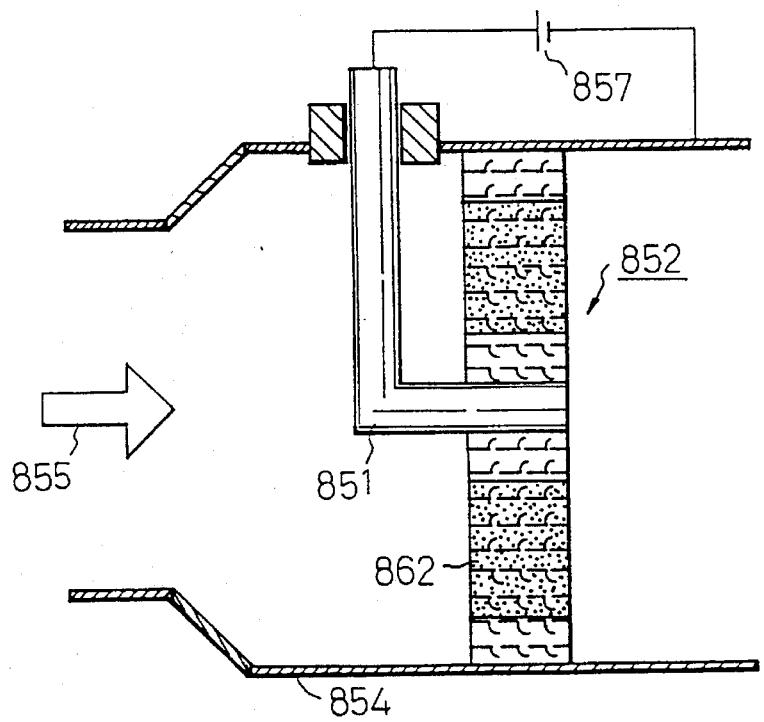
Figure 161:
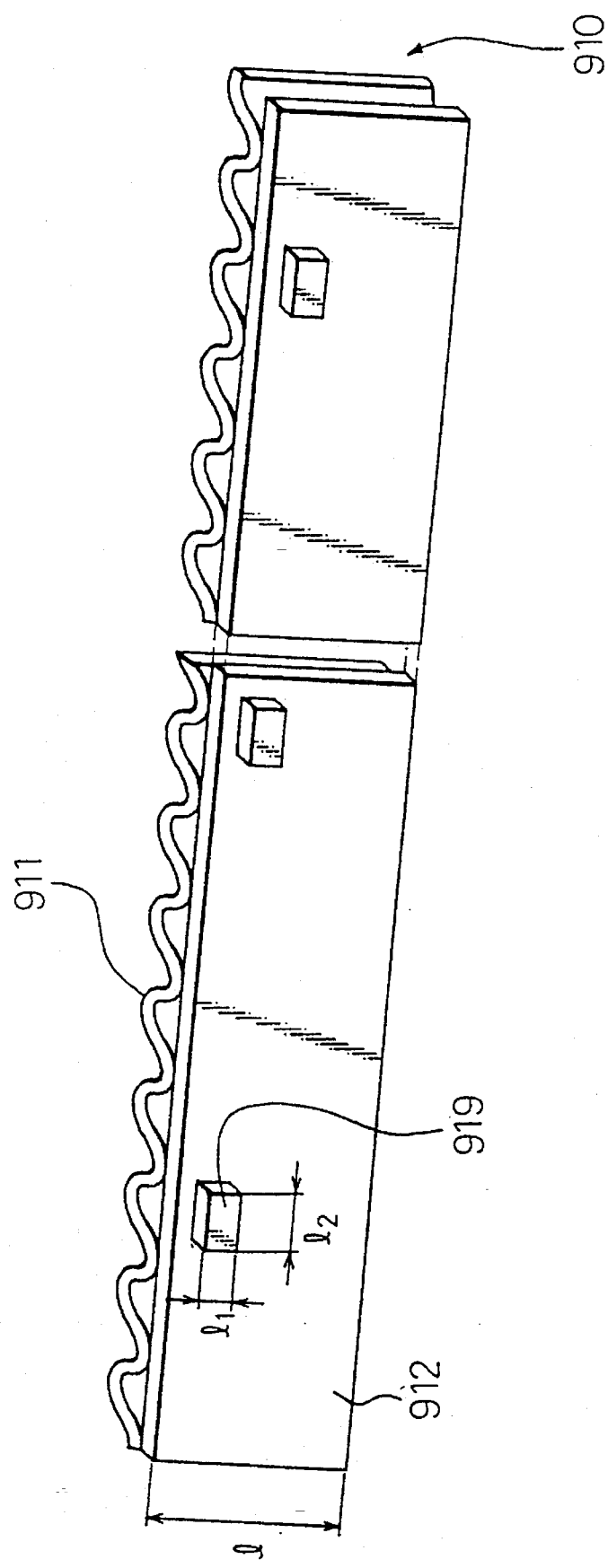
Figure 162:
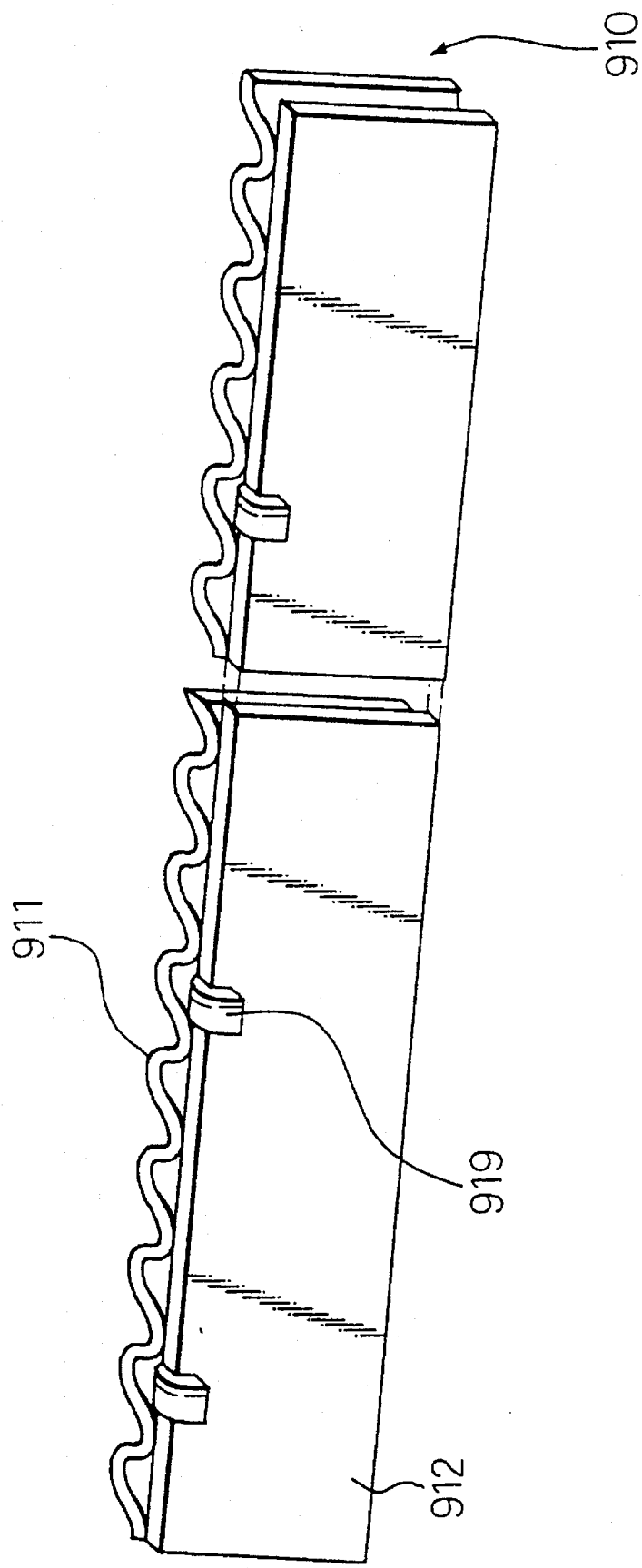
Figure 163:
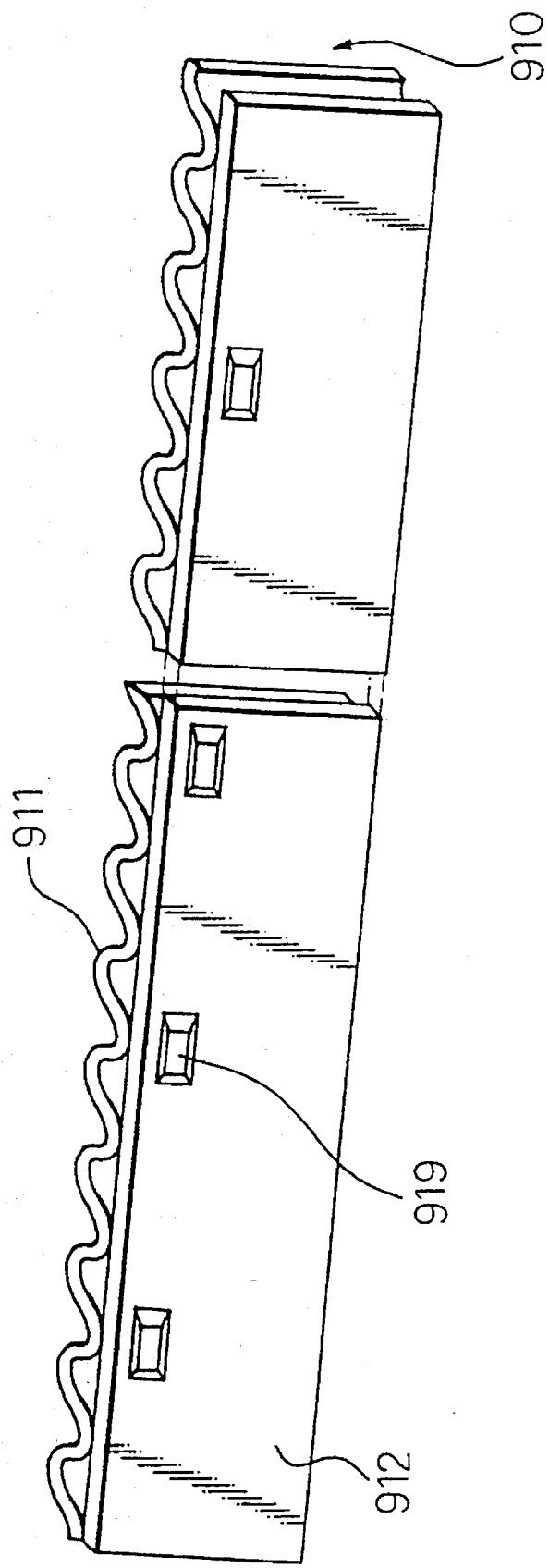
Figure 164:
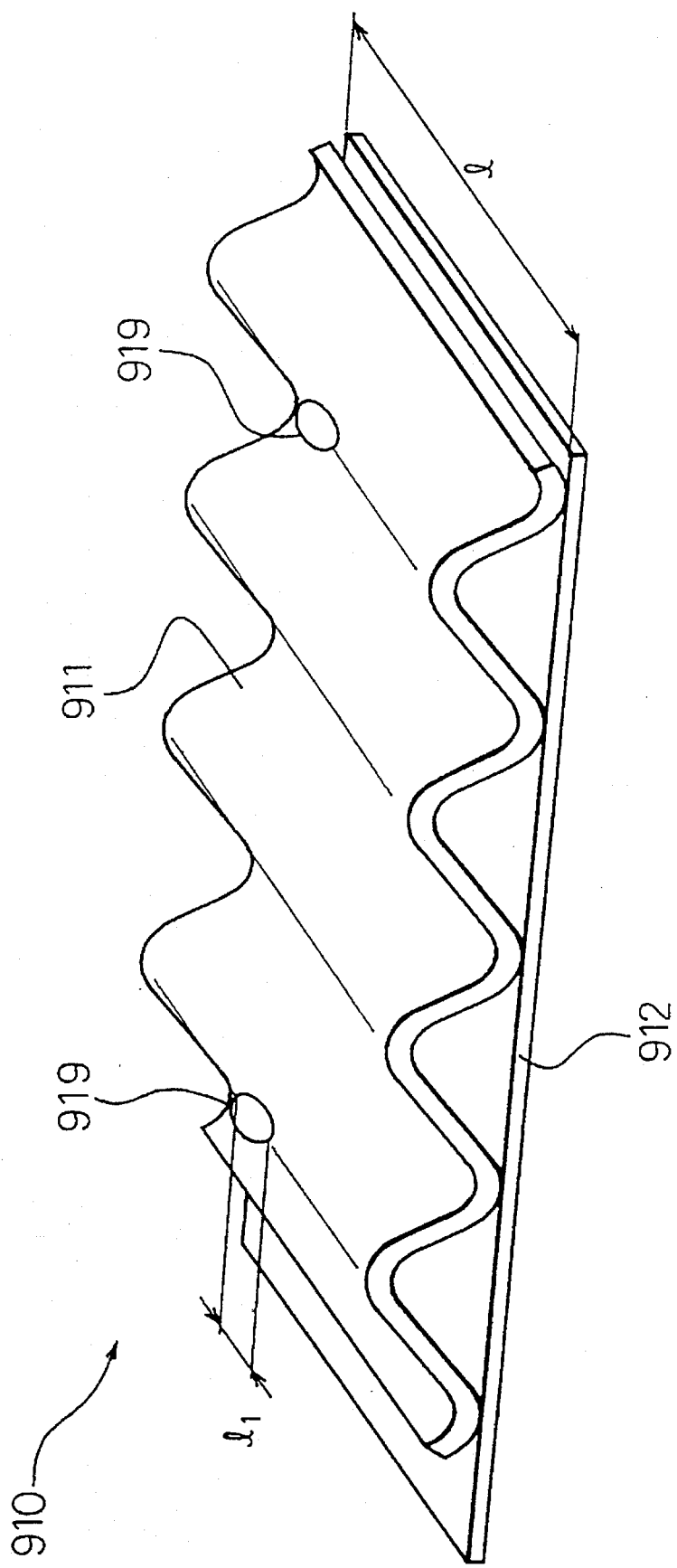
Figure 165:
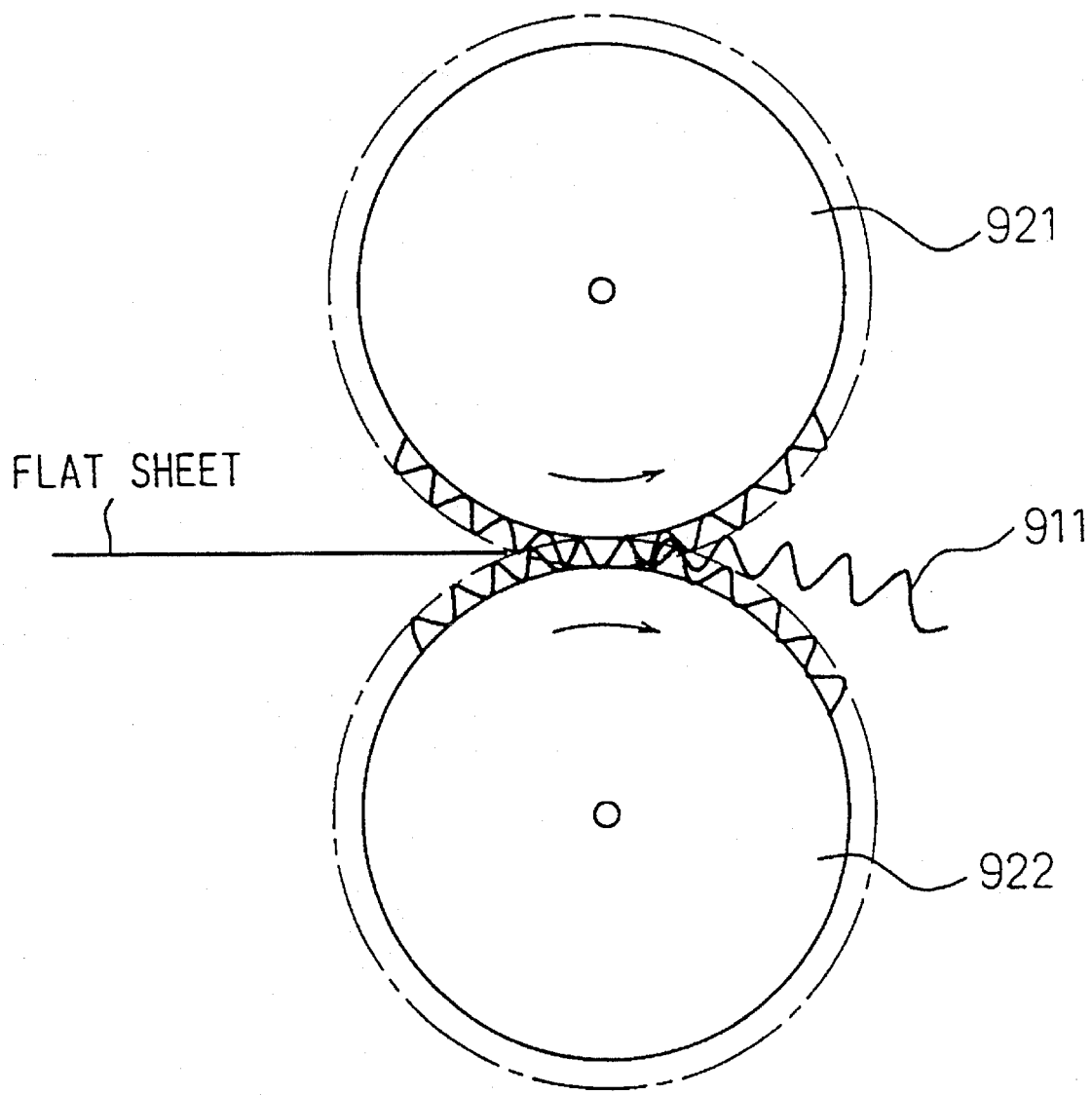
Figure 166:
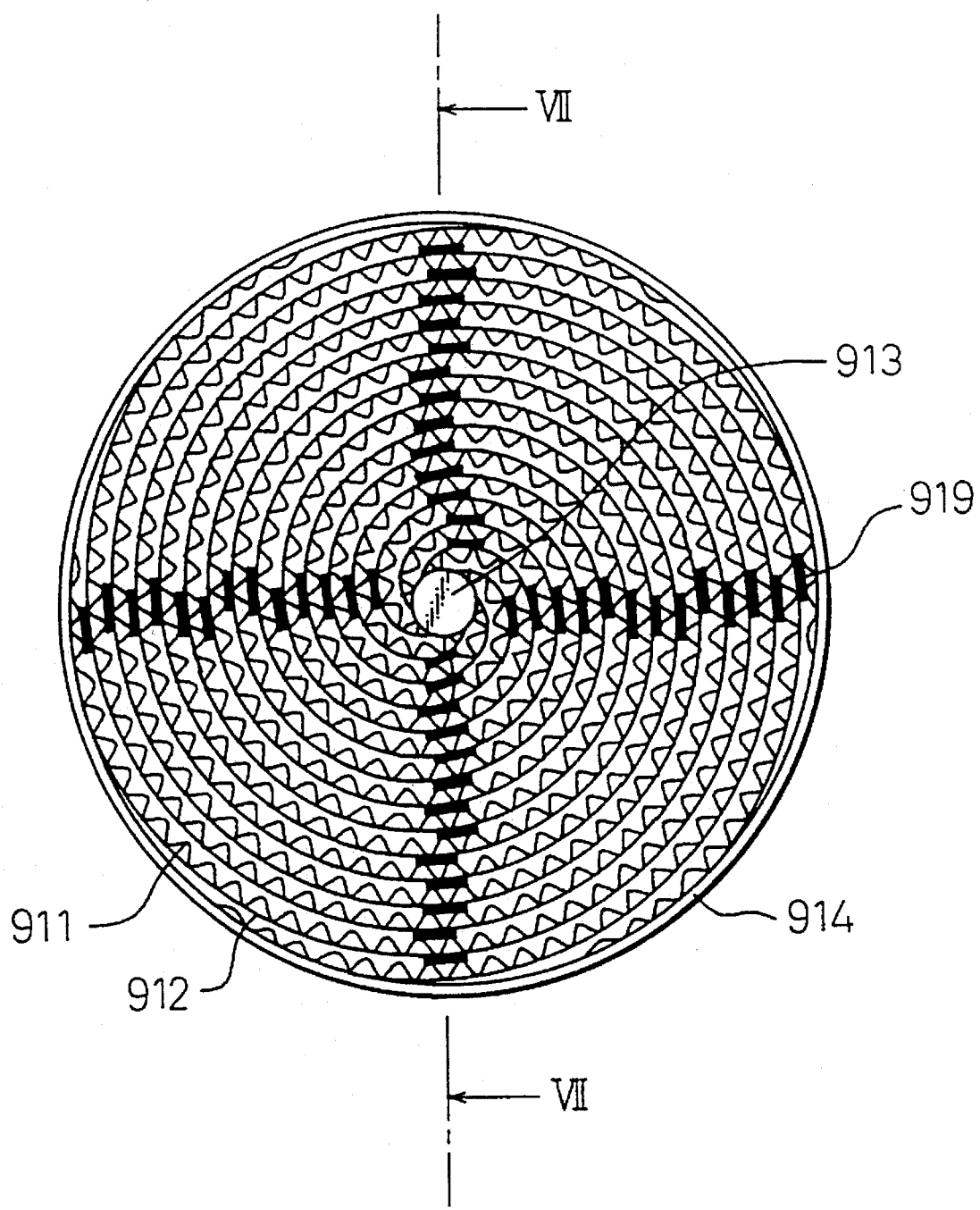
Figure 167:
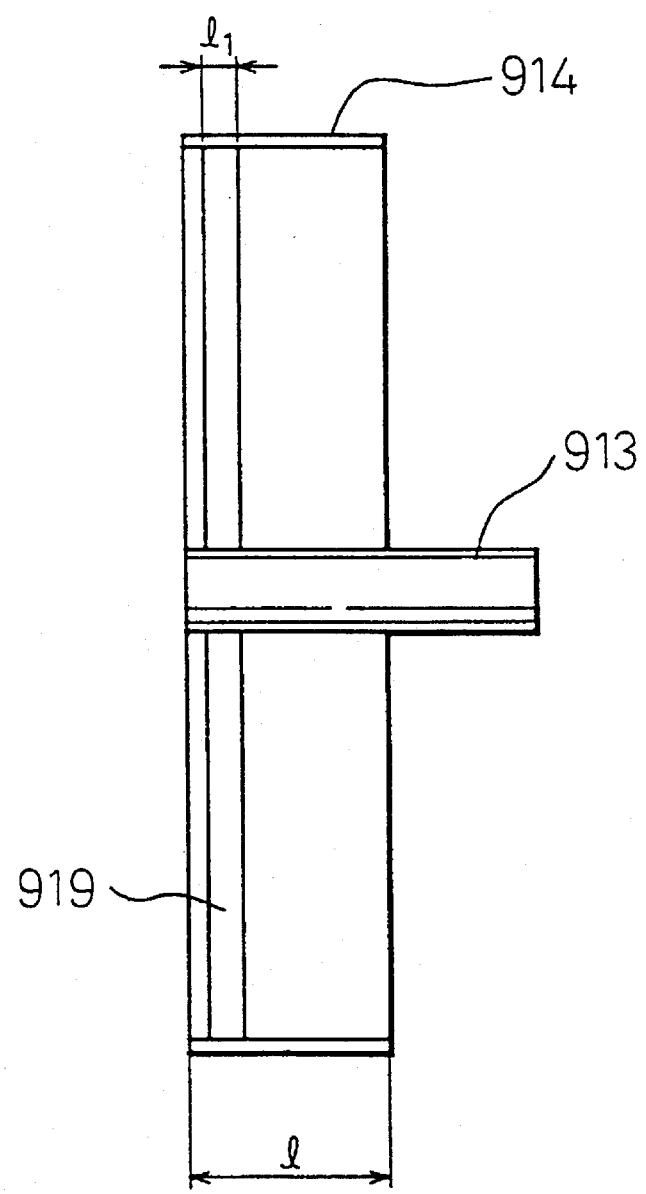
Figure 168:
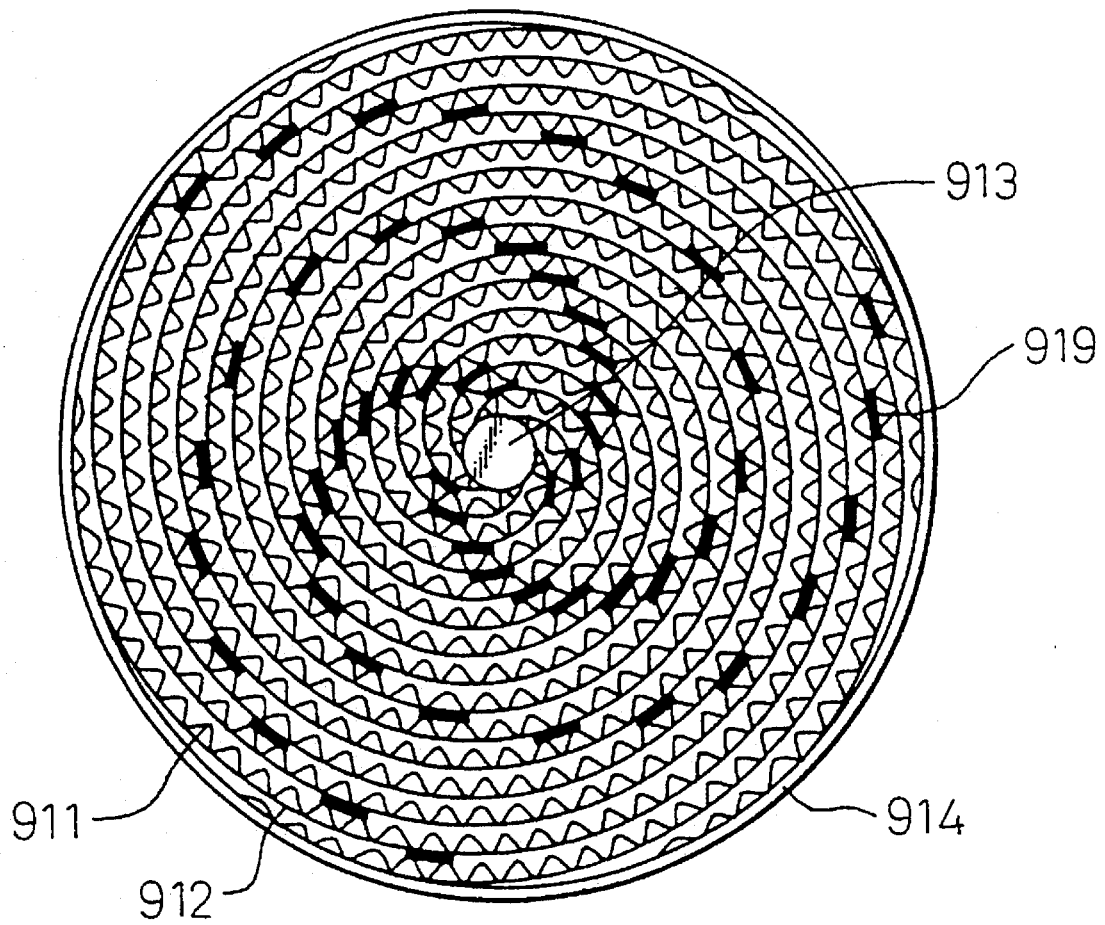
Figure 169:
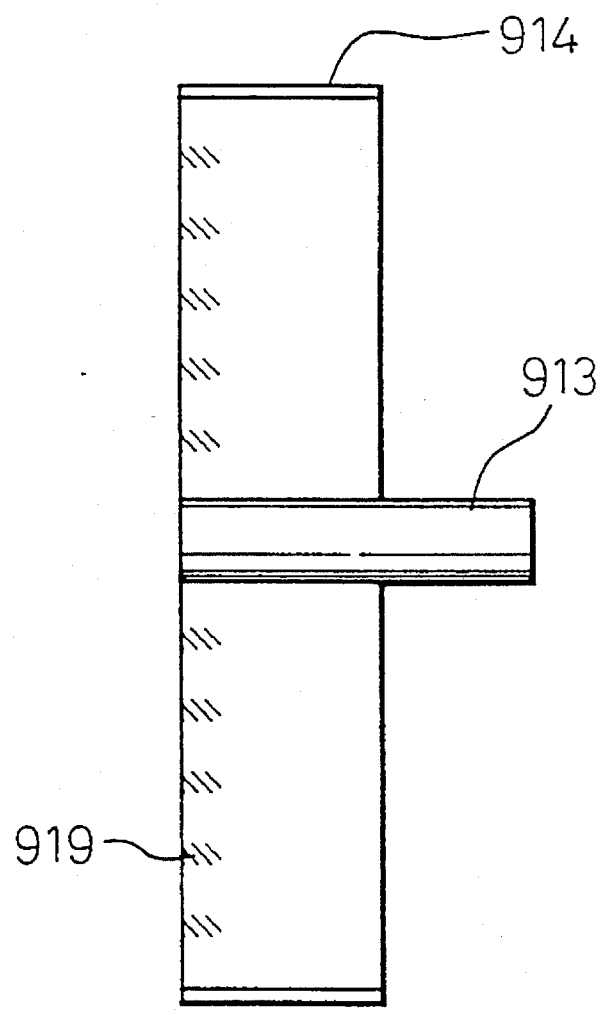
Figure 170:
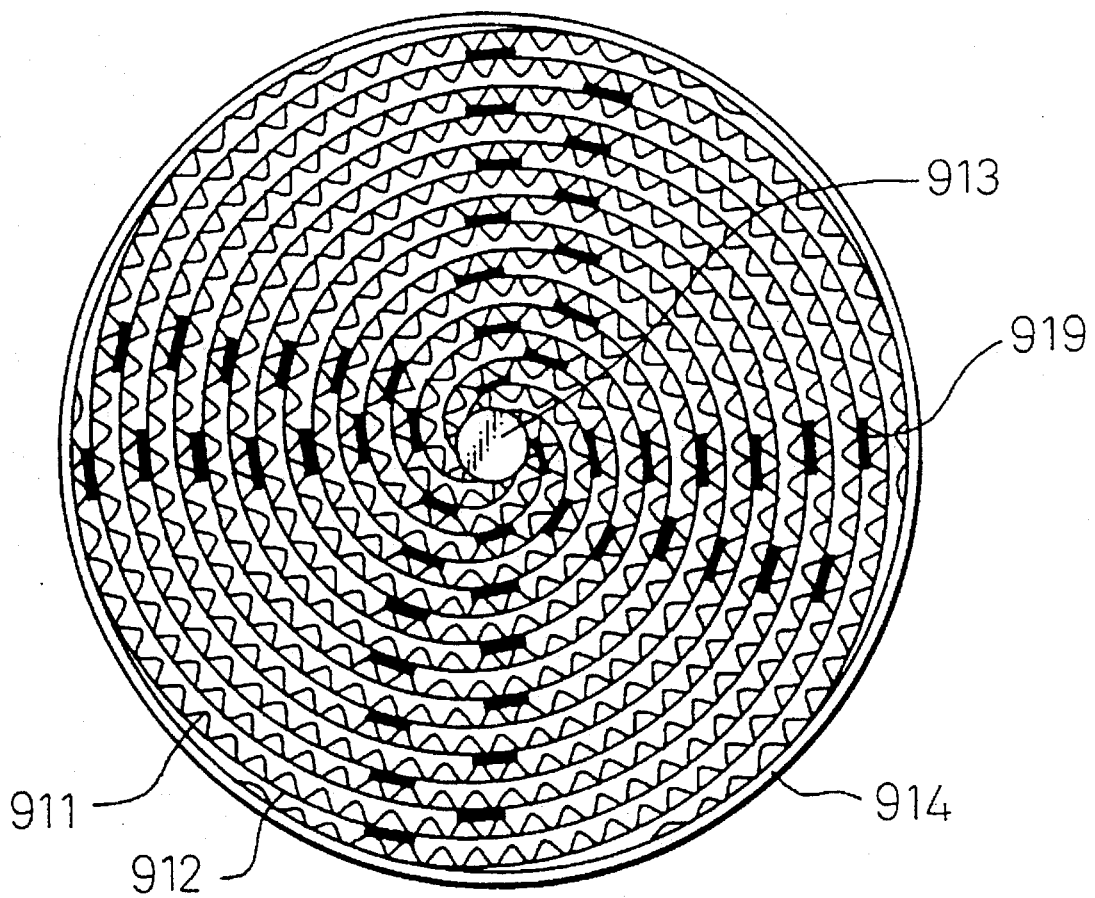
Figure 171:
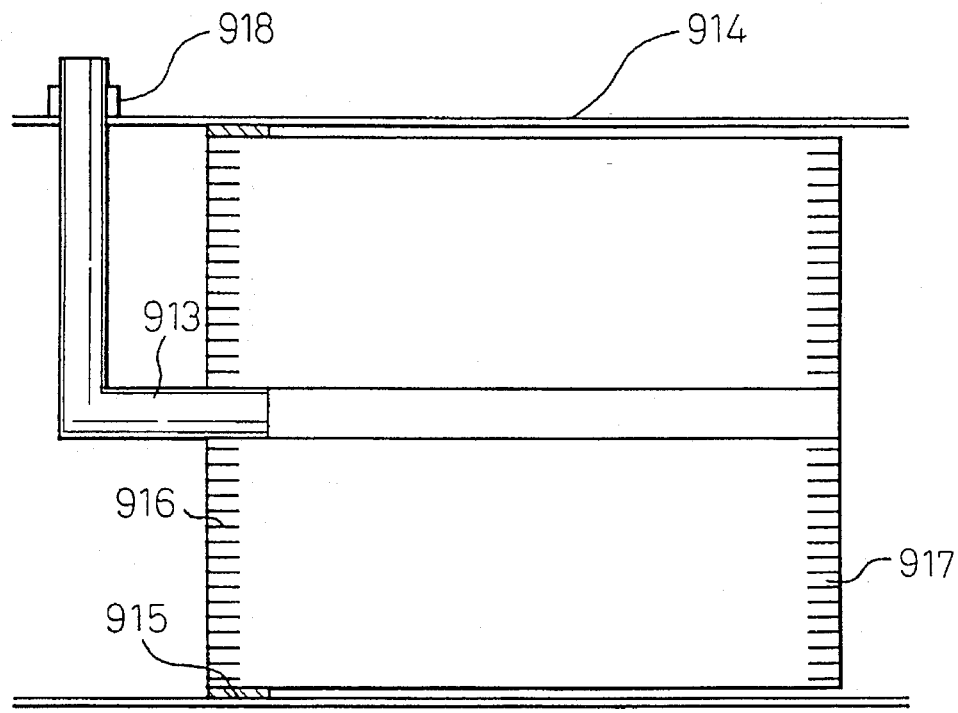
Figure 172:
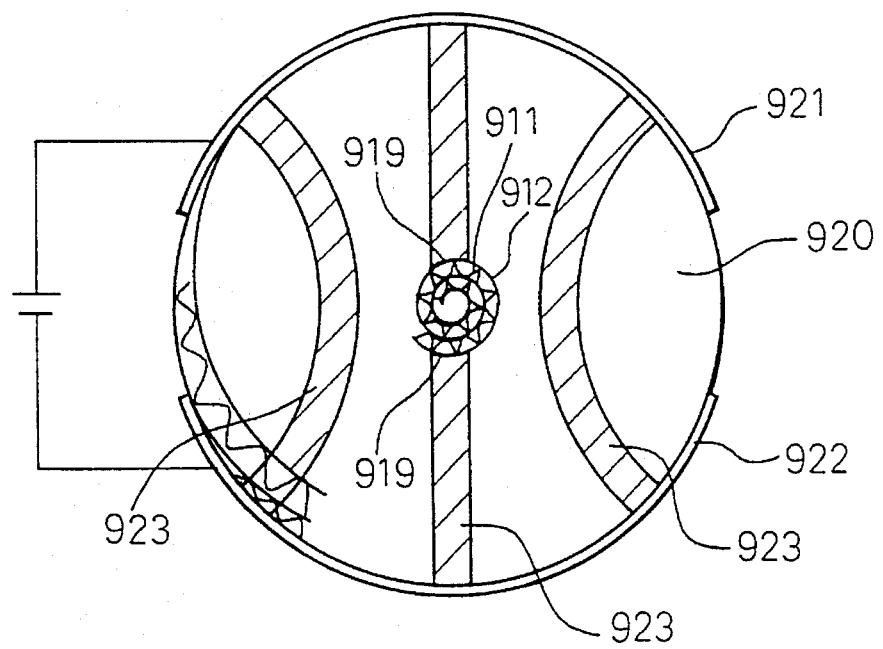
Figure 173:
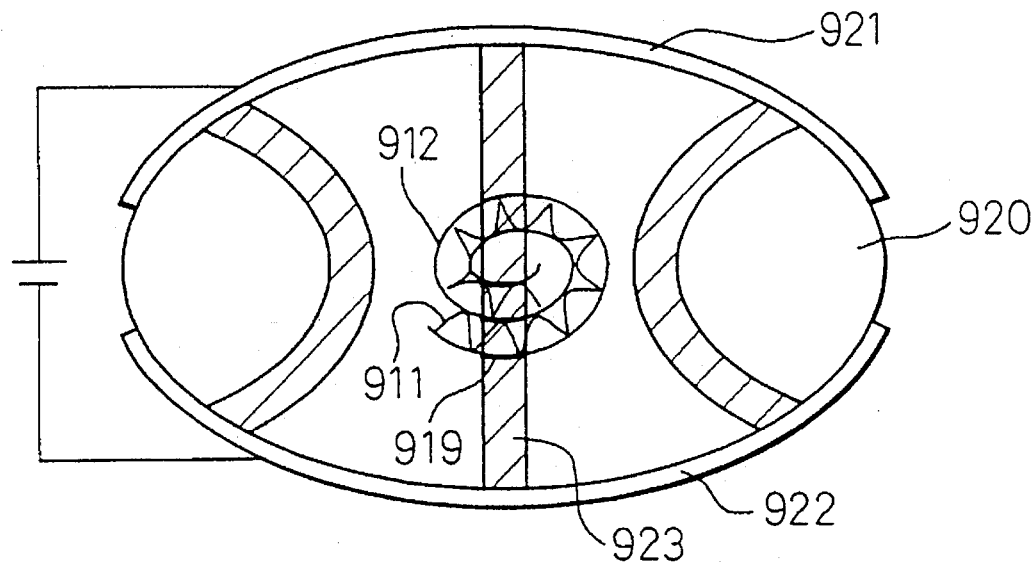
Figure 174:
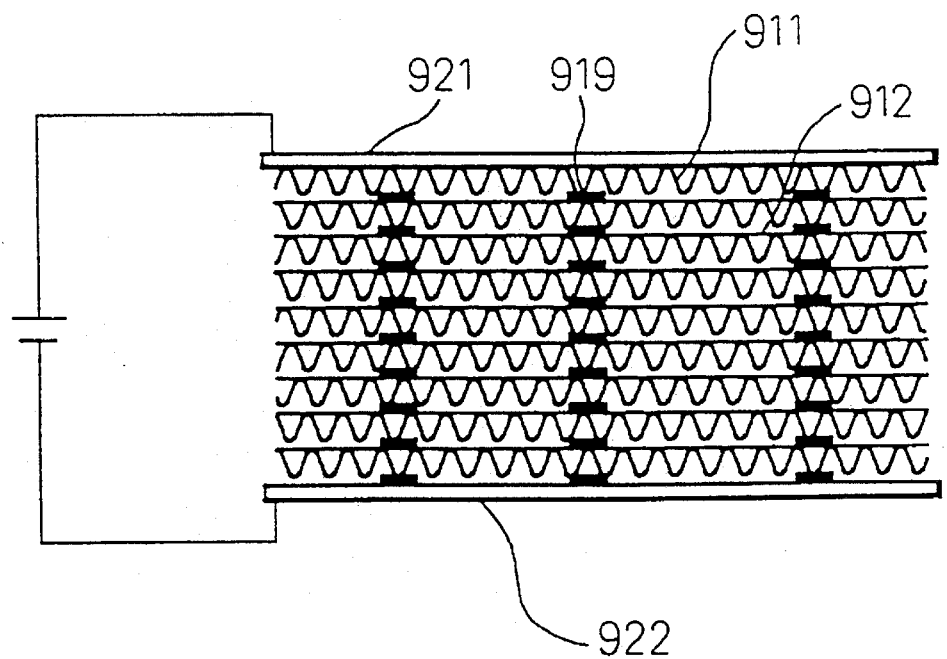

FIGS. 102(a) and 102(b) show a process of jointing a flat metal sheet and a corrugated metal sheet together;

FIG. 103 is a sectional side view showing an electrically heating catalyst according to 45th embodiment;

FIG. 104 is a sectional side view showing an electrically heating catalyst according to 46th embodiment;

FIG. 105 is a sectional side view showing an electrically heating catalyst according to 47th embodiment;

FIG. 106 is a sectional side view showing an electrically heating catalyst according to 48th embodiment;

FIG. 107 is a sectional side view showing an electrically heating catalyst according to 49th embodiment;

FIG. 108 is a cross section taken along a line IX—IX of FIG. 107;

FIG. 109 is a sectional side view showing an electrically heating catalyst according to 50th embodiment;

FIGS. 110(a) and 110(b) show louvers formed on flat and corrugated metal sheets;

FIG. 111 is a sectional side view showing an electrically heating catalyst according to 51st embodiment;

FIG. 112 is a sectional side view showing an electrically heating catalyst according to 52nd embodiment;

FIG. 113 is a sectional side view showing an electrically heating catalyst according to 53rd embodiment;

FIG. 114 is a sectional side view showing an electrically heating catalyst according to 54th embodiment;

FIG. 115 is a sectional side view showing an electrically heating catalyst according to 55th embodiment;

FIG. 116 is a sectional side view showing an electrically heating catalyst according to 56th embodiment;

FIG. 117 is a sectional side view showing an electrically heating catalyst according to 57th embodiment;

FIG. 118 is a sectional side view showing an electrically heating catalyst according to 58th embodiment;

FIG. 119 is a sectional side view showing an electrically heating catalyst according to 59th embodiment;

FIG. 120 is a sectional side view showing an electrically heating catalyst according to 60th embodiment;

FIG. 121 is a sectional side view showing an electrically heating catalyst according to 61st embodiment;

FIG. 122 is a sectional side view showing an electrically heating catalyst according to 62nd embodiment;

FIG. 123 is a sectional side view showing an electrically heating catalyst according to 63rd embodiment;

FIG. 124 is a sectional side view showing an electrically heating catalyst according to 64th embodiment;

FIG. 125 is a front view showing an upstream catalyst of FIG. 124;

FIG. 126 is a sectional side view showing an electrically heating catalyst according to 65th embodiment;

FIG. 127 is a sectional side view showing an electrically heating catalyst according to 66th embodiment;

FIG. 128 is a sectional side view showing an electrically heating catalyst according to 67th embodiment;

FIG. 129 is a sectional side view showing an electrically heating catalyst according to 68th embodiment;

FIG. 130 is a sectional side view showing an electrically heating catalyst according to 69th embodiment;

FIG. 131 is a sectional side view showing an electrically heating catalyst according to 70th embodiment;

FIG. 132 is a perspective view showing a flat sheet and a corrugated sheet according to 71st embodiment of the present invention;

FIGS. 133(a) and 133(b) show positional relationships between adjacent layers of the corrugated sheet according to the 71st embodiment;

FIG. 134 is a cross section showing a complete catalytic carrier according to the 71st embodiment;

FIG. 135 is a longitudinal section showing the complete catalytic carrier according to the 71st embodiment;

FIG. 136 shows flat and corrugated sheets forming a honeycomb sheet according to 72nd embodiment of the present invention;

FIG. 137 is a plan view showing an insulation layer according to the 72nd embodiment;

FIG. 138 shows the honeycomb sheet wound according to the 72nd embodiment;

FIG. 139 is a cross section showing a complete catalytic carrier according to the 72nd embodiment;

FIGS. 140(a), 140(b), and 140(c) show different parts of the catalytic carrier of FIG. 139;

FIG. 141 is a section taken along a line A—A of FIG. 139;

FIG. 142 corresponds to FIG. 139 and shows a modifications of the 72nd embodiment;

FIG. 143 is a longitudinal section showing a catalytic carrier according to 73rd embodiment of the present invention;

FIGS. 144(a), 144(b), 144(c) show different parts of the catalytic carrier of FIG. 143;

FIG. 145 is a longitudinal section showing a modification of the catalyst carrier according to the 73rd embodiment of FIG. 142;

FIG. 146 is a longitudinal section showing another modification of the catalyst carrier according to the 73rd embodiment;

FIG. 147 is a section showing part of a catalytic carrier according to 74th embodiment of the present invention;

FIG. 148 is a section showing part of a modification of the catalytic carrier according to the 74th embodiment;

FIG. 149(a) shows a process of forming the catalytic carrier according to the embodiment of FIG. 147, and FIG. 149(b) shows a corrugated sheet with a ground insulation layer;

FIG. 150(a) shows a process of forming the catalytic carrier according to the embodiment of FIG. 147, and FIG. 150(b) shows a corrugated sheet with a ground insulation layer;

FIG. 151 shows a large grinding width on an insulation layer according to the 74th embodiment;

FIG. 152 shows a small grinding width on an insulation layer according to the 74th embodiment;

FIG. 153(a) shows a process of forming a catalytic carrier according to 75th embodiment of the present invention, and FIG. 153(b) shows a corrugated sheet and a flat sheet joined together with an insulation layer being removed;

FIGS. 154(a) and 154(b) correspond to FIGS. 153(a) and 153(b) and show a modification of the 75th embodiment;

FIG. 155(a) is a section showing a catalytic converter according to 76th embodiment, and FIGS. 155(b), 155(c), and 155(d) are sections showing different parts of the catalytic converter;

FIG. 156 shows a flow of a heated exhaust gas according to the 76th embodiment;

FIG. 157 is a section showing a catalytic converter according to 77th embodiment;

FIG. 158 is a section showing a catalytic converter according to 78th embodiment;

FIG. 159 is a section showing a catalytic converter according to 79th embodiment;

FIG. 160 is a section showing a catalytic converter according to 80th embodiment;

FIG. 161 shows 81st embodiment of the present invention;

FIG. 162 shows 82nd embodiment of the present invention;

FIG. 163 shows 83rd embodiment of the present invention;

FIG. 164 shows 84th embodiment of the present invention;

FIG. 165 shows an example of a process of forming a corrugated sheet of FIG. 164;

FIG. 166 is a front view schematically showing an electrically heating metal catalytic carrier;

FIG. 167 is a section schematically showing the catalytic carrier;

FIG. 168 is a front view schematically showing an electrically heating metal catalytic carrier;

FIG. 169 is a section schematically showing the catalytic carrier;

FIG. 170 is a front view schematically showing an electrically heating metal catalytic carrier;

FIG. 171 is a section schematically showing an electrically heating metal catalytic carrier;

FIG. 172 is a front view schematically showing an electrically heating metal catalytic carrier;

FIG. 173 is a front view schematically showing an electrically heating metal catalytic carrier; and FIG. 174 is a front view schematically showing an electrically heating metal catalytic carrier.

DETAILED DESCRIPTION OF THE EMBODIMENTS

Figure 2:
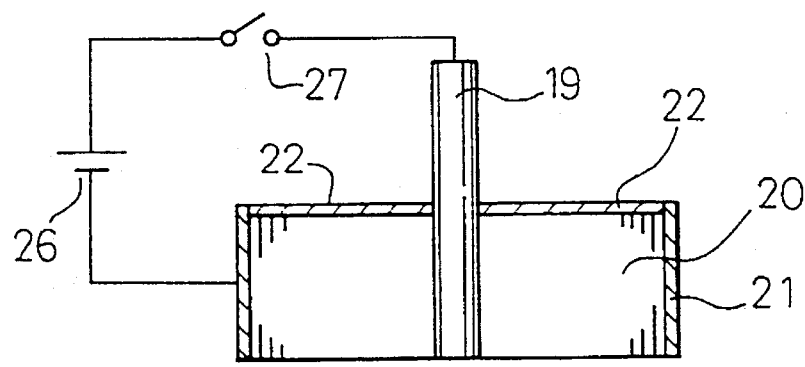
FIG. 2 is a longitudinal section showing the carrier of FIG. 1.
Figure 3:
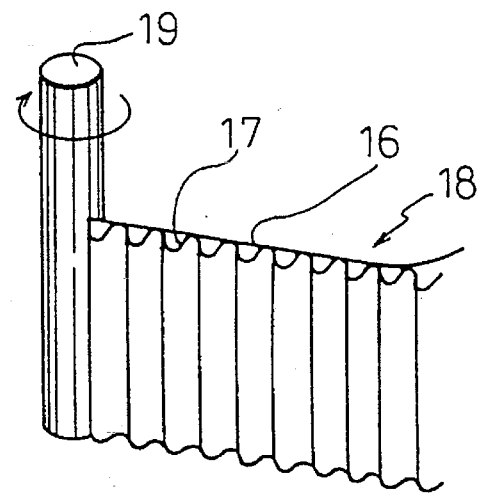
FIG. 3 is a perspective view explaining a process of fabricating the carrier of FIG. 1.
Figure 4:
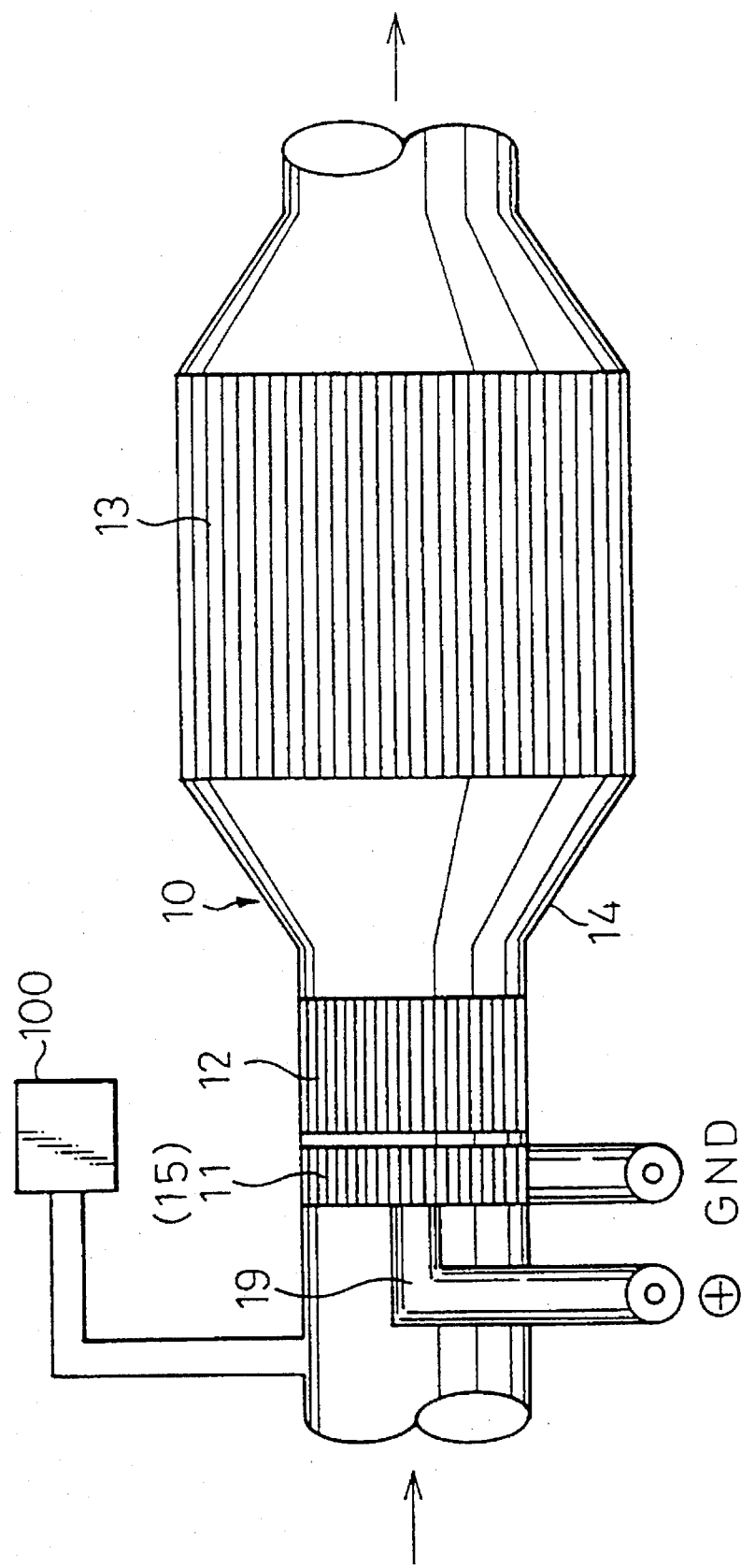
FIG. 4 is a general longitudinal section showing a catalytic apparatus.

FIGS. 1 to 6 show the structure, manufacturing processes, and effects of an electrically heated catalytic apparatus 10 according to a first embodiment of the present invention. In FIG. 4, the catalytic apparatus 10 involves three catalytic converters connected in series along a flow path of exhaust from an internal combustion engine. The flow of exhaust is indicated with arrow marks in the figure. The first catalytic converter 11 arranged on the upstream side in the exhaust flow is the smallest of the catalyst carriers of, for example, 100 cc in volume. Just behind the first catalytic converter 11, a second catalytic converter 12, which is larger than the converter 11, is arranged. Behind the second catalytic converter 12, the largest third catalytic converter 13 is arranged. These three catalytic converters 11, 12, and 13 are sequentially arranged in a continuous path 14. An air supply unit 100 such as an air pump is arranged on the upstream side of the catalytic apparatus 10, to supply air to the catalytic apparatus 10.

The first converter 11 is a characteristic of the first embodiment of the present invention and will be explained later in detail. The second converter 12 may be double the size of the first converter 11. Compared with the first and second converters 11 and 12, the third converter 13 is quite large. Although the second and third catalytic converters 12 and 13 have different volumes, they are preferably of a conventional type employing a known catalyst carrier such as a ceramic or metallic honeycomb carrier, or a pellet-like carrier with no electric heater.

The first catalytic converter 11 according to the first embodiment of the present invention is very small and employs a metallic honeycomb carrier 15 to be electrically heated.

Figure 1:
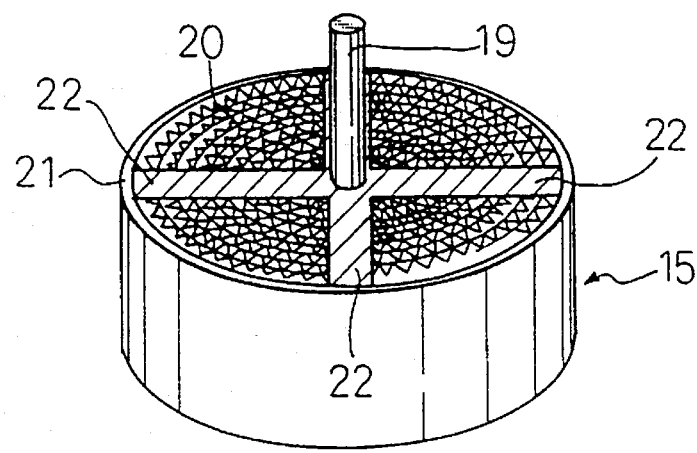
FIG. 1 is a perspective view showing a catalyst carrier according to a first embodiment of the present invention.

FIG. 1 shows a complete form of the carrier 15 of the first catalytic converter 11 of the catalytic apparatus 10. The carrier 15 is made from heat resistant electrically conductive thin metal sheets 16 and 17 such as stainless steel sheets. The sheet 16 is flat and the sheet 17 is corrugated. In FIG. 3, the sheets 16 and 17 are laid one upon another. Contact points between the sheets 16 and 17 are joined to each other by spot welding, etc., into a corrugated band 18.

The band 18 is coated with an insulation layer made of, for example, an oxide film. One end of the band 18 is physically and electrically connected to a center electrode 19. The band 18 is wound around the electrode 19 in a spiral shape and is tightened into a honeycomb cylinder 20. The honeycomb cylinder 20 is placed in an outer casing 21 and is fixed thereto. The casing 21 serves as a grounding electrode. An outer end of the band 18 is electrically connected to the casing 21. The electrode 19 and casing 21 are connected to a power source. When a current is supplied to the band 18, the metal sheets 16 and 17 of the band 18 generate heat to heat a catalyst such as precious metal carriered by a coat layer made from, for example, activated alumina.

The structure and manufacturing processes of the catalyst carrier 15 of the first catalytic converter 11 are known ones. The first catalytic converter 11 according to the first embodiment of the present invention is characterized in that an upstream end face of the honeycomb cylinder 20 is provided with short-circuit cross paths 22 by laser welding or brazing. The paths 22 are narrow and radially extend to directly connect the center electrode 19 to the outer casing 21.

The catalyst carrier 15 with the short-circuit paths 22 forms the first catalytic converter 11 of the catalytic apparatus 10 of FIG. 4. The carrier 15 is connected to a power source 26 such as a battery, as shown in FIG. 2. A switch 27 is arranged in a circuit for supplying power to the carrier 15. The switch 27 is closed and opened by a controller (not shown) for the engine.

As soon as the engine is started, the switch 7 is closed to supply power from the power source 6 to the carrier 5. Unlike known devices which uniformly supply a current to the corrugated band 18 of the honeycomb cylinder 20, the first embodiment of the present invention collectively supplies a large current to the short-circuit paths 22. This is because the radial short-circuit paths 22 form an electric circuit having lower resistance than the band 18, in parallel with the band 18 of the honeycomb cylinder 20. At this time, the band 18, except for the areas around the paths 22, receives a smaller current.

Figure 5:
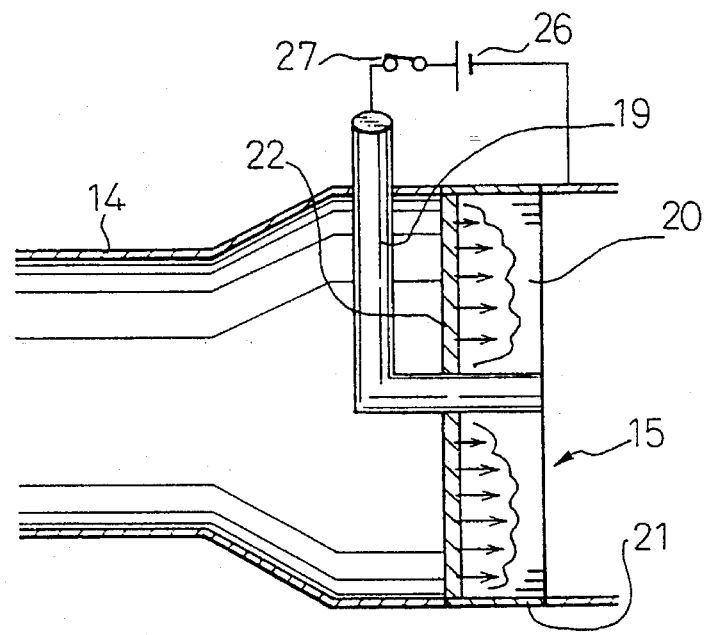
FIG. 5 is a longitudinal section showing the operation of the carrier according to the first embodiment.

When the large current collectively flows through the radial short-circuit cross paths 22, the paths 22 generate heat to rapidly heat limited areas around the paths 22. As a result, the catalyst in these areas reaches an activation temperature as soon as the engine is started, to oxidize components such as HC and CO contained in an exhaust gas from the engine, as shown in FIG. 5. In FIG. 5, arrow marks indicate the progress of oxidization around the short-circuit paths 22. Although the area of the short-circuit paths 22 are narrow they generate hot spots therearound, to maintain catalytic reactions at the spots.

For a limited time period after the start, the engine emits a large quantity of incompletely burnt pollutants such as HC. The quantity of HC emitted during a first idling operation is about 0.2 g according to our measurements. HC is contained in gasoline as $C_6H_{14}$ and $C_8H_{18}$, which provide a heating value of about 10000 cal/g. If HC of 0.2 g is oxidized (burnt) in the first catalytic converter 11, it will provide a heating value of about 2000 cal.

During the first idling operation, the air-fuel ratio of an intake air-fuel mixture is rich, and therefore, the exhaust contains a large quantity of incompletely burnt HC. If the catalyst is activated under this state and if a sufficient quantity of oxygen is supplied with secondary air to the exhaust, the incompletely burnt HC is burnt (oxidized) to produce heat. This heat and the heat of the exhaust itself heat the first catalytic converter 11 and the second catalytic converter 12 that follows the first converter 11, to thereby successively increase the temperatures of the converters 11 and 12.

In practice, the heat generated by the combustion of the incompletely burnt components may not be entirely absorbed by the catalyst carrier 15 of the first converter 11. It is possible, however, that the first and second converters 11 and 12 are rapidly heated, with heat produced by currents passing through the short-circuit paths 22 and the band 18 of the carrier 15, with heat produced by fuel combustion in the engine and carried with exhaust, and with heat produced by incompletely burnt components in the exhaust oxidized by heat spots around the short-circuit paths 22, to a catalyst activation temperature.

The present invention utilizes the incompletely burnt components in exhaust as fuel for speedily warming up and activating the catalytic converters to sufficiently remove pollutants such as HC produced in a relatively large quantity. The heat of reaction produced by the converters 11 and 12 is useful for warming up the third large volume catalytic converter 13.

Even if the areas of the short-circuit paths 22 of the carrier 15 are narrow, the paths 22 cause hot spots as soon as the engine is started, to start catalytic reactions around the hot spots. The heat of the reactions successively heats and activates the catalyst located at the remaining spots. Accordingly, even with a small electric power of, for example, 1 Kw or below that is smaller than that consumed by known devices, the catalytic apparatus 10 as a whole is warmed up in a short time and quickly starts an exhaust purifying reaction. This results in shortening a time period in which the exhaust is not purified, to thereby reduce the quantity of pollutants to be discharged.

Figure 6:
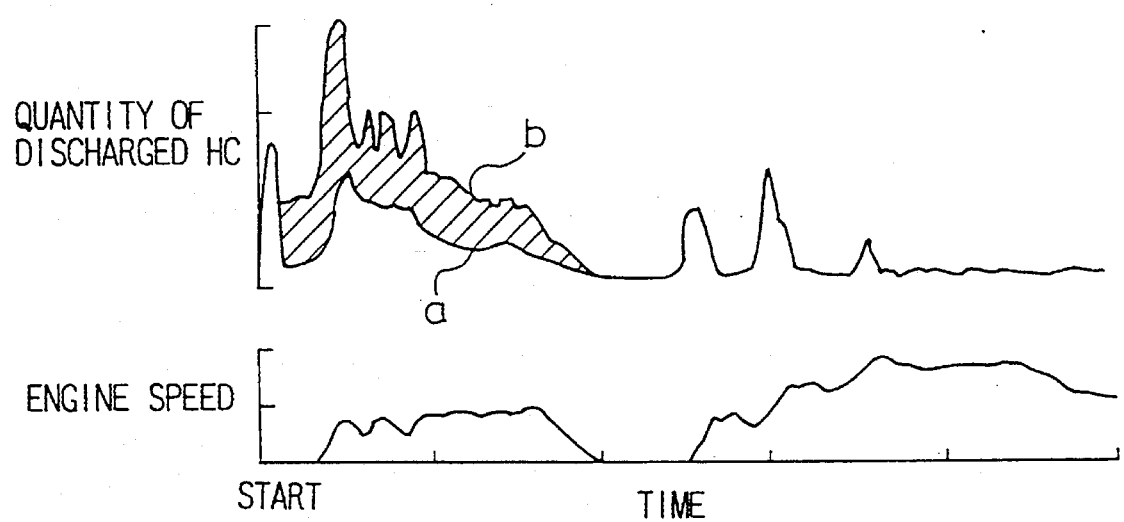
FIG. 6 is a characteristic diagram showing the effect of the first embodiment.

FIG. 6 shows temporal relationships between engine speeds and the quantities of HC discharged from the catalytic apparatus 10, to explain the effect of the first embodiment. Curves shown in the figure have been obtained according to a so-called LA#4 mode of engine operation. In the figure, the curve "a" is of the first embodiment of the present invention and indicates that the quantity of discharged HC quickly decreases after the start of the engine. The curve "b" is of a conventional electrically heating catalytic apparatus and indicates that the catalyst is warmed up slower than the catalyst of the present invention and that the prior art is incapable of decreasing the quantity of discharged HC just after the start of the engine. The difference in the quantity of the discharged HC between the present invention and the prior art corresponds to a hatched area in FIG. 6. Electric power consumed by catalyst carriers of the prior art is larger than that of the first embodiment of the present invention. The quantities of the discharged HC of the first embodiment and prior art become equal to each other after a while.

Figure 7:
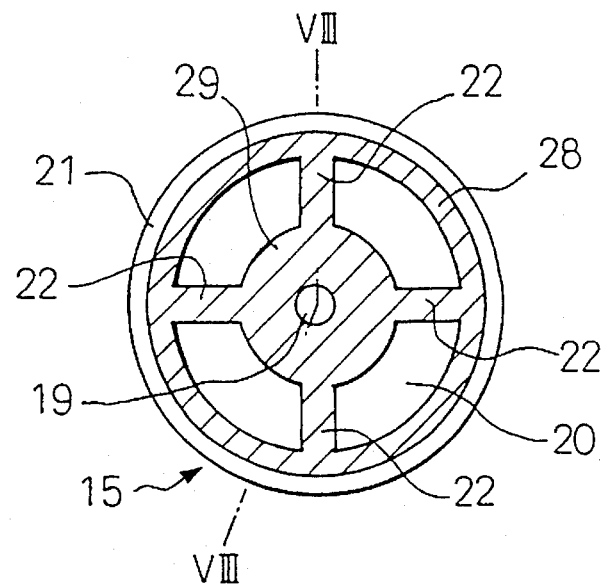
FIG. 7 is a plan view showing a catalyst carrier according to a second embodiment of the present invention.
Figure 8:
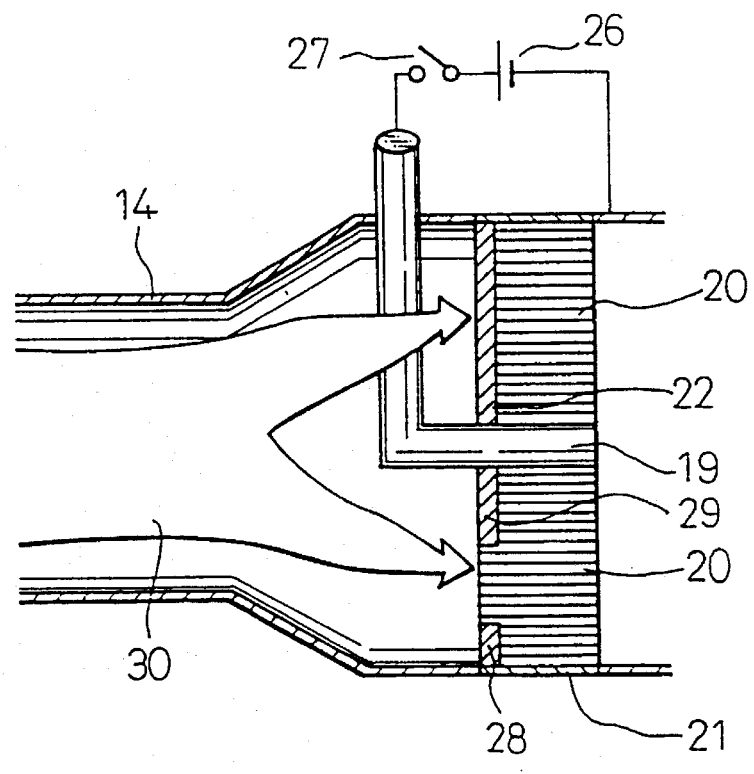
FIG. 8 is a longitudinal section showing the operation of the second embodiment.

FIGS. 7 and 8 show a catalytic converter according to a second embodiment of the present invention. In each of the following embodiments, the same parts as those of the first embodiment are represented with like reference marks, and their explanations will not be repeated. The second embodiment aims to further reduce power consumption for heating a catalyst carrier 15. To achieve this, the length of each of the radial short-circuit paths 22 of the second embodiment is shorter than that of the first embodiment, to reduce an area heated by the short-circuit paths 22. The paths 22 of the second embodiment are formed on an upstream end face of a honeycomb cylinder 20 made of a lamination of flat and corrugated metal sheets, similar to the first embodiment. Annular short-circuit plates 28 and 29 are laser-welded or brazed along an outer casing 21 and around a center electrode 19 on the upstream end face.

Sections of the honeycomb cylinder 20 behind the annular plates 28 and 29 have lower electric resistance than the short-circuit paths 22, so that the sections behind the plates 28 and 29 do not generate substantial heat. This reduces power consumption. Even if no heat is generated along the outer casing 21 and around the center electrode 19 on the upstream end face, the same effect as the first embodiment is achievable.

The reason for this will be explained. In FIG. 8, an exhaust flow 30 in the honeycomb cylinder 20 of the catalyst carrier 15 is not uniformly distributed over the cross-sectional area of the honeycomb cylinder 20. Substantially no exhaust flows around the center electrode 19 and along the outer casing 21, and the fastest exhaust flow occurs in an annular area between the center electrode 19 and the outer casing 21. Therefore, even if the sections around the center electrode 19 and along the outer casing 21 are heated, the heat will not be effective to heat the downstream parts of the carrier 15. Accordingly, the second embodiment collectively heats the area where the speed of the exhaust flow 30 is fastest and suppresses heat in the other areas. Namely, the second embodiment arranges the radial short-circuit pats 22 only in the areas where heat is effectively used. Each of the first and second embodiments employs four radial short-circuit paths 22. The number of the paths 22, however, is optional and does not limit the present invention.

Figure 9:
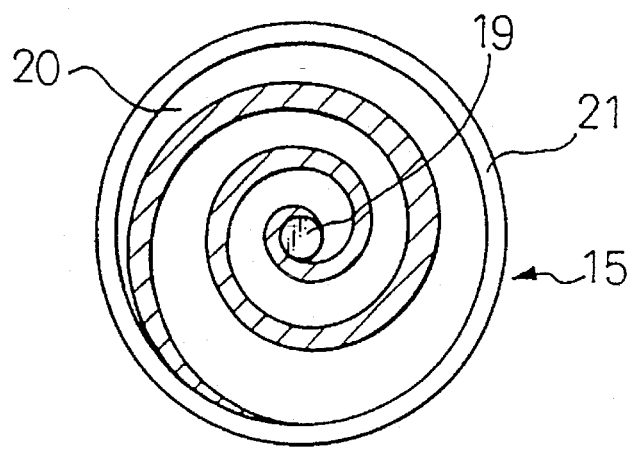
FIG. 9 is a plan view showing a catalyst carrier according to a third embodiment of the present invention.

FIG. 9 shows a catalytic converter according to a third embodiment of the present invention. Instead of the radial short-circuit paths 22 of the first and second embodiments, the third embodiment arranges a spiral short-circuit metal path 31 on an upstream end face of a honeycomb cylinder 20 of a catalyst carrier 15. The spiral path 31 may be prepared in the same manner as the radial short-circuit paths 22 only with changing the control pattern of electrodes of a laser welder. The spiral short-circuit path 31 uniformly distributes hot spots on the upstream end face of the honeycomb cylinder 20, to quickly activate the catalytic apparatus 10. Instead of the single spiral path, it is possible to prepare multiple spiral short-circuit paths.

Figure 10:
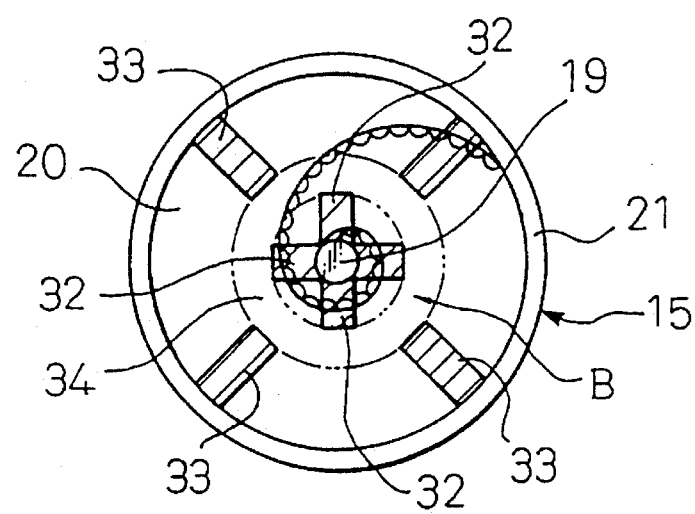
FIG. 10 is a plan view showing a catalyst carrier according to a fourth embodiment of the present invention.

FIG. 10 shows a catalytic converter according to a fourth embodiment of the present invention. This embodiment cuts the middle of each of the radial short-circuit paths 22 of the first or second embodiment and turns the cut paths, to form radial short-circuit paths 32 and 33 that are not directly connected to each other. Namely, a clearance 34 is formed between them. At the clearance 34, a current flows through a part of a corrugated band 18 of a honeycomb cylinder 20. Since the electric resistance of the clearance 34 is large, the clearance 34 limits currents flowing through the paths 32 and 33. In this embodiment, main current paths are the paths 32 and 33 and an area B (FIG. 10) of the corrugated band 18. These paths and the area generate heat. The size of the clearance 34 may be properly selected to adjust currents such that no excessive load is applied to contacts between the paths 32 and 33 and the honeycomb cylinder 20, to prevent malfunctions.

Figure 11:
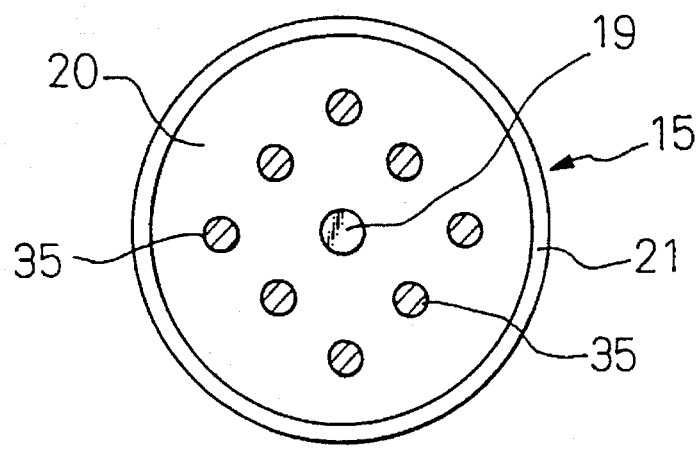
FIG. 11 is a plan view showing a catalyst carrier according to a fifth embodiment of the present invention.

FIG. 11 shows a catalytic converter according to a fifth embodiment of the present invention. This embodiment is characterized in that many island-like short-circuit paths 35 each having a proper area are distributed at random on an upstream end face of a honeycomb cylinder 20 made of a lamination of flat and corrugated metal sheets. This arrangement efficiently heats a catalyst carrier 15. Even if some of the paths 35 peel off a corrugated band 18 of the honeycomb cylinder 20, the remaining ones cause hot spots. Namely, even if the carrier 15 is partly damaged, this embodiment secures hot spots.

Figure 12A:
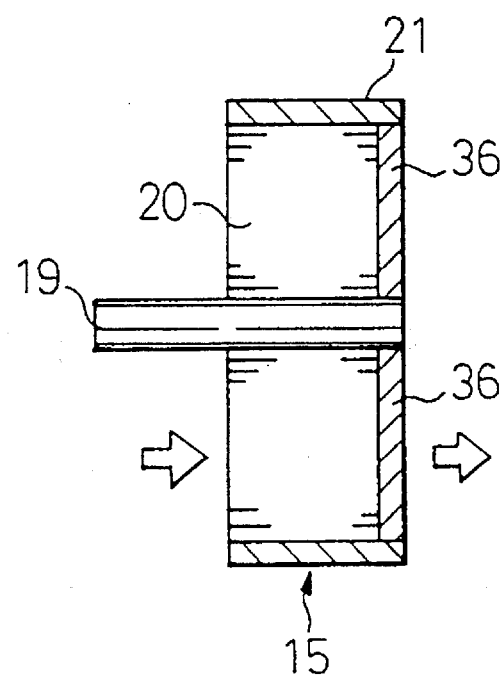
FIG. 12(a) is a longitudinal section showing a catalyst carrier according to a sixth embodiment of the present invention.
Figure 12B:
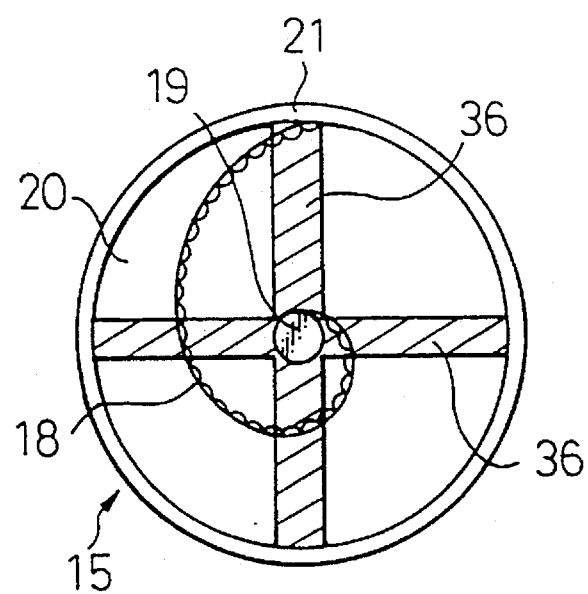
FIG. 12(b) is a plan view showing the carrier of the sixth embodiment.

FIGS. 12(*a*) and 12(*b*) show a catalytic converter according to a sixth embodiment of the present invention. This embodiment employs radial short-circuit paths 36 similar to the radial short-circuit paths 22. The paths 36 are arranged on a downstream end face of a honeycomb cylinder 20 made of a lamination of flat and corrugated metal sheets of a catalyst carrier 15. When a current is supplied to the radial paths 36, it generates heat. This heat, however, does not heat the carrier 15 itself with the help of an exhaust flow that flows in the direction of arrow marks. Instead, the heat is transferred to the upstream side of the carrier 15 only by the heat conduction of the carrier 15 itself. Compared with the paths (hot spots) 22, 31, 32, 33, and 35 arranged on the upstream end face of the honeycomb cylinder 20 of the first to fifth embodiments, the paths 36 of the sixth embodiment provide poorer heating effects. If exhaust contains led, phosphorus, etc., catalyst on the upstream side is firstly damaged by these components, to deteriorate catalytic performance. Accordingly, the paths 36 are arranged on the downstream end face that is less affected by such led and phosphorous, so that, even if the catalyst on the upstream side is deteriorated, the sixth embodiment is able to maintain successive catalytic actions.

The same idea as the sixth embodiment is applicable to the second to fifth embodiments, to arrange their short-circuit paths on the downstream end faces.

Figure 13:
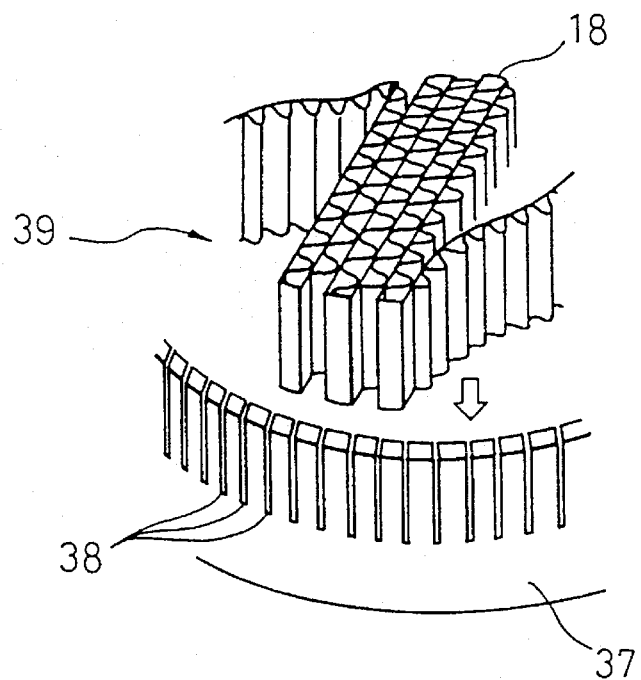
FIG. 13 is a perspective view showing a process of fabricating a catalyst carrier according to a seventh embodiment of the present invention.
Figure 14:
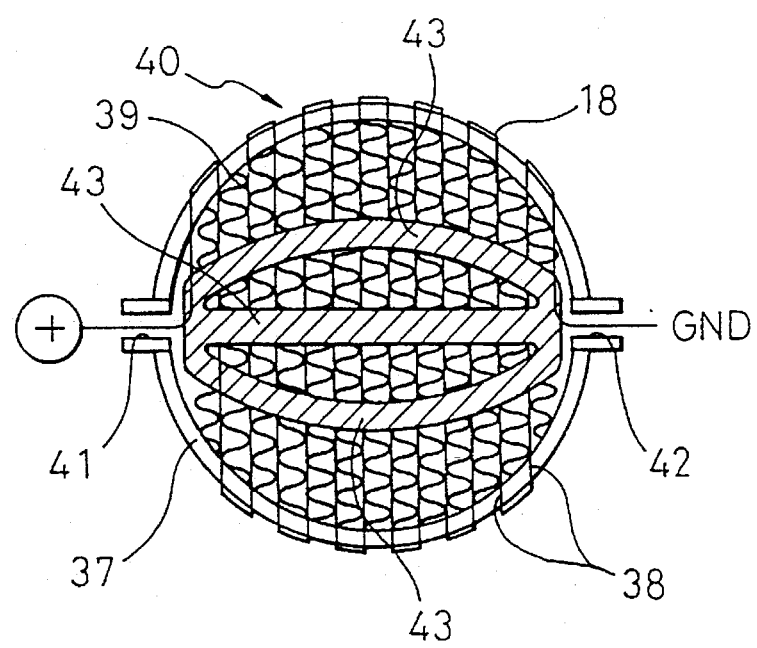
FIG. 14 is a plan view showing the carrier of the seventh embodiment.

FIGS. 13 and 14 show a catalytic converter according to a seventh embodiment of the present invention. In the first to sixth embodiments, the catalyst carrier 15 is made by winding the corrugated band 18 made of flat and corrugated metal sheets around the center electrode 19 into the honeycomb cylinder 20. The seventh embodiment forms comb slits 38 around a cylindrical slit holder 37. A corrugated band 18 (FIG. 3) made of flat and corrugated metal sheets is folded and laminated into a lamination body 39, which is placed in the holder 37. Folded parts of the band 18 are inserted into and fixed to the slits 38, to form a catalyst carrier 40.

The carrier 40 has no center electrode 19. Accordingly, ends of the band 18 are connected to leads that pass through holes 41 and 42 of the holder 37. The leads are connected to an external power source such as a battery, or to a switch. The leads are fixed to the holes 41 and 42 with heat resistant adhesive, which seals the holes 41 and 42. The carrier 40 is arranged in an outer casing.

An upstream end face of the body 39 of the carrier 40 according to the seventh embodiment is provided with three discharge-welded short-circuit paths 43 as shown in FIG. 14. Similar to the previous embodiments, the paths 43 provide hot spots after the start of the engine. The numbers and shapes of the paths 43 may be optionally selected. Similar to the sixth embodiment, the paths 43 may be arranged on a downstream end face of the body 39.

In the above embodiments, the corrugated band 18 is partly short-circuited by discharge welding, etc., on the upstream or downstream end face of the catalyst carrier 15 or 40, to form the short-circuit paths that provide hot spots. In the following embodiments, an electric heater that is discrete of a catalyst carrier is arranged on an end face of the catalyst carrier, to provide hot spots when the heater is energized.

Figure 15:
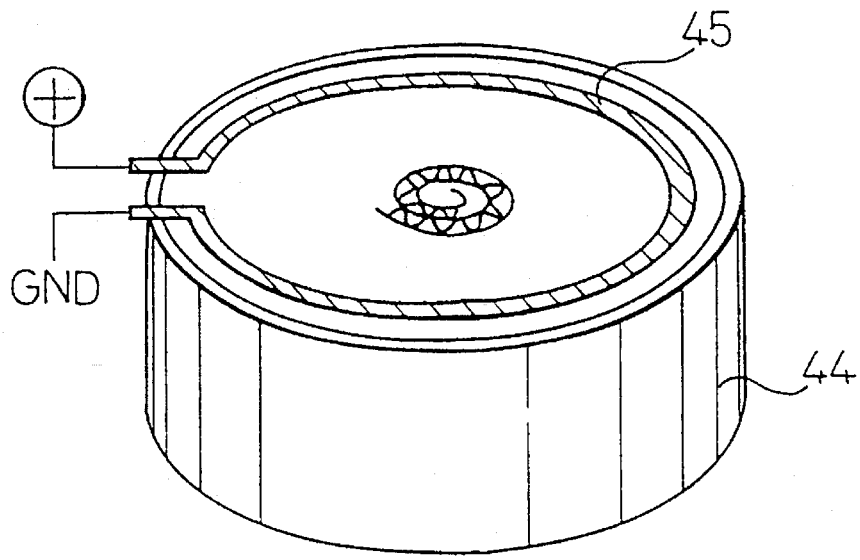
FIG. 15 is a perspective view showing a catalyst carrier according to an eighth embodiment of the present invention.

FIG. 15 shows a catalytic converter according to an eighth embodiment of the present invention. This embodiment employs a metallic honeycomb catalyst carrier 44 similar to the carrier 15. An upstream or down stream end face of the carrier 44 is provided with a circular electrically conductive heater 45 made of, for example, SiC. When energized, the heater 45 provides hot spots to burn combustible components such as HC and CO contained in exhaust, to thereby increase the temperature of the carrier 44. The circular shape of the heater 45 corresponds to an annular cross-sectional area of the carrier 44 where the flow rate of the exhaust is largest.

Figure 16:
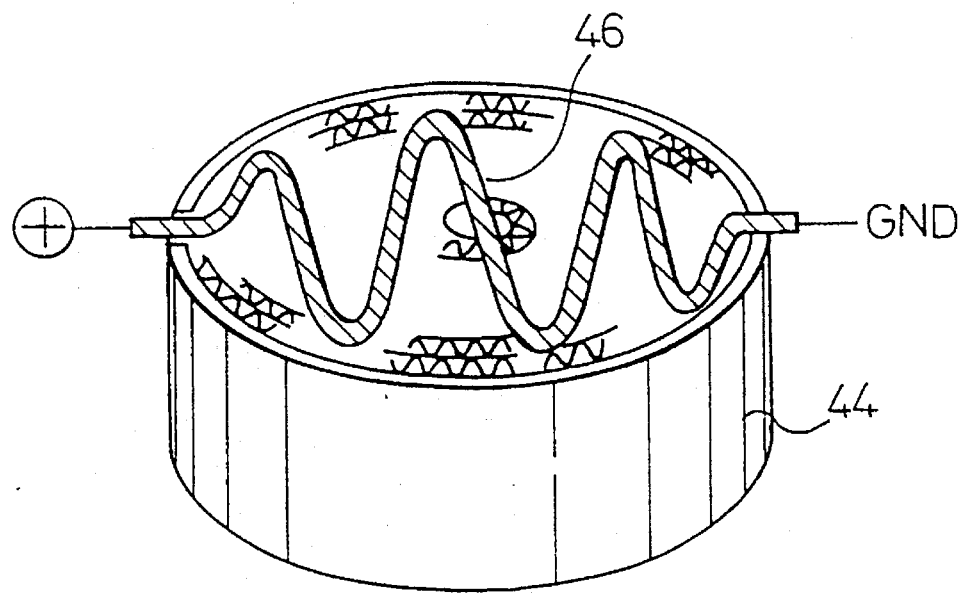
FIG. 16 is a perspective view showing a catalyst carrier according to a modification of the eighth embodiment.

The heater 45 of the eighth embodiment may have any other shape. FIG. 16 shows a modification of the eighth embodiment, employing a winding heater 46. The heater 46 uniformly heats the end face of the carrier 44, to promote reactions over the carrier 44 among incompletely burnt components contained in exhaust.

Figure 17:
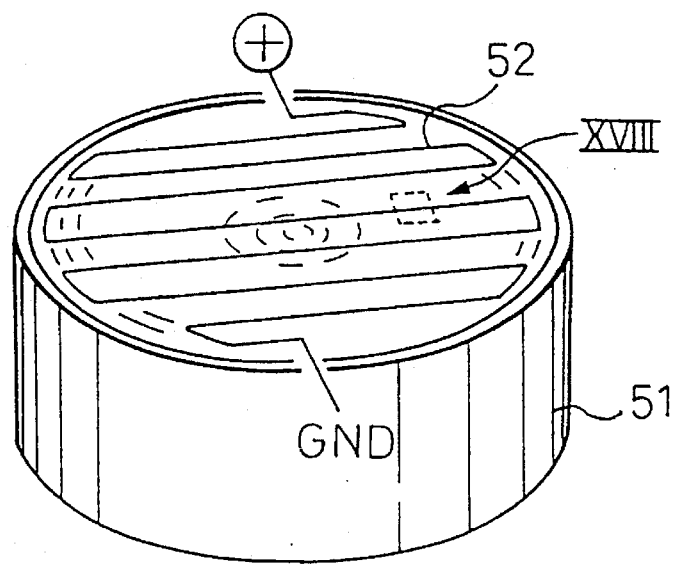
FIG. 17 is a perspective view showing a catalyst carrier according to a ninth embodiment of the present invention.
Figure 18:
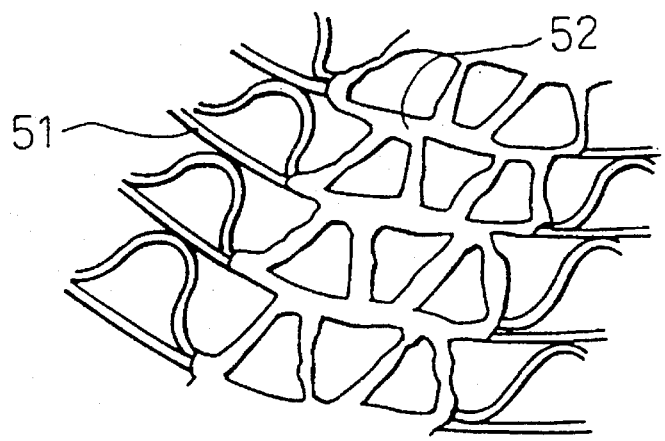
FIG. 18 is an enlarged perspective view showing a part of FIG. 17.
Figure 19:
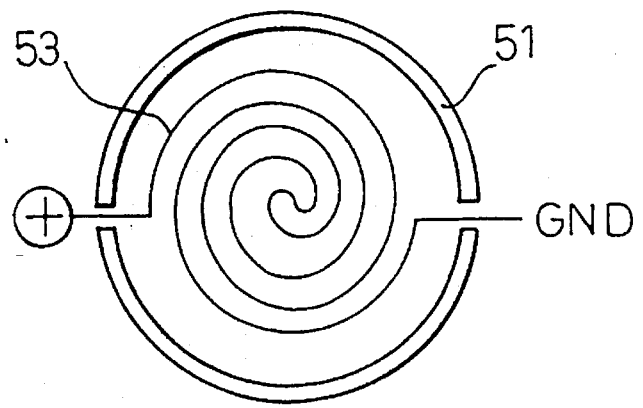
FIG. 19 is a plan view showing a catalyst carrier according to a modification of the ninth embodiment.

FIGS. 17 to 19 show a catalytic converter according to a ninth embodiment of the present invention. An oxygen sensor disposed in an exhaust system of an internal combustion engine has a printed heater made from platinum to heat the sensor at low temperatures, to thereby secure correct operation of the sensor. The ninth embodiment employs this technique. In FIG. 17, an end face of a honeycomb catalyst carrier 51 made of ceramics or metal having a surface insulation film is provided with a platinum printed heater 52. FIG. 18 is an enlarged view showing a part XVIII of FIG. 17. Most of holes of the carrier 51 are left without being covered with the printed heater 52. Since the platinum of the heater 52 provides catalytic reactions, the exhaust purifying efficiency of the catalytic apparatus is promoted thereby.

The printed heater 52 may have any pattern. FIG. 19 shows a modification of the ninth embodiment, having a printed heater 53 of double spiral shape.

The heater 52 is arranged not only on the upstream end face of the carrier 44 or 51 but also on the downstream end face thereof, to avoid damages on the heater due to heat shocks or lead and phosphorous contained in exhaust.

Figure 22:
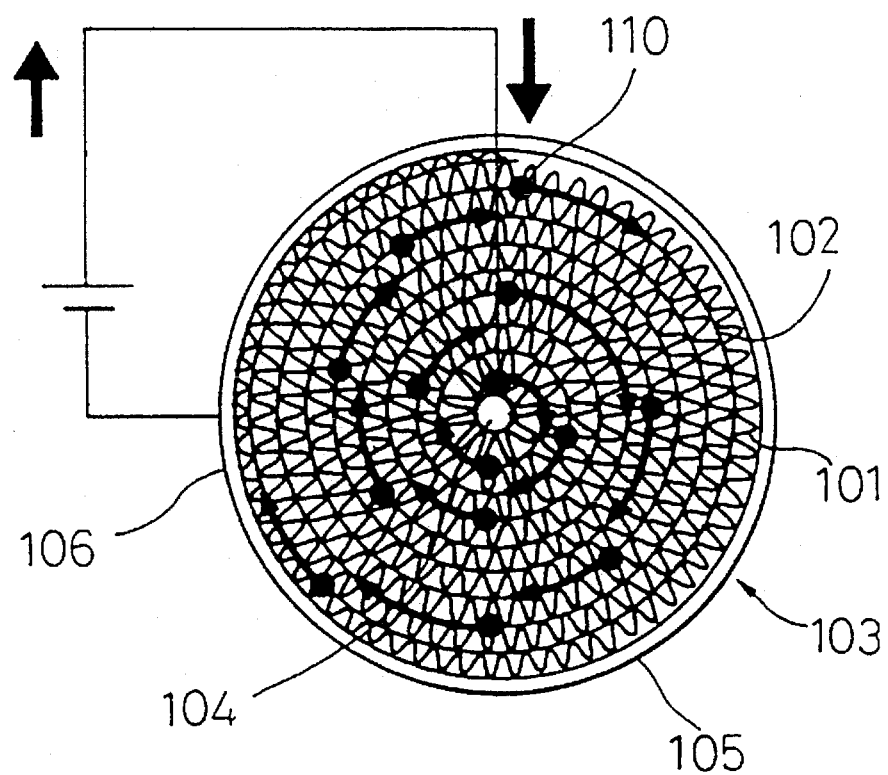
FIG. 22 is a view showing a current flowing through locally joined parts of the embodiment of FIG. 20.
Figure 23:
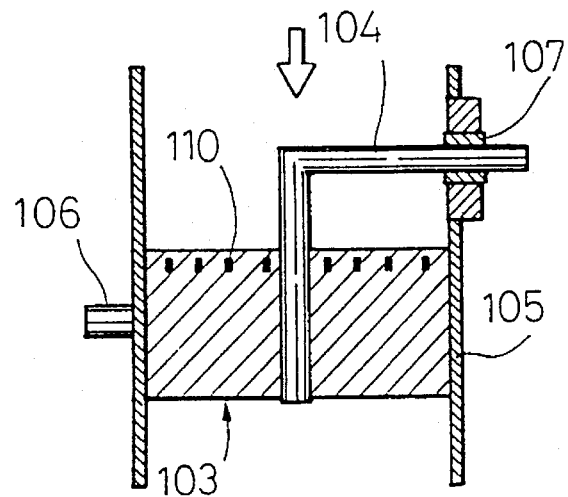
FIG. 23 is a longitudinal section showing the embodiment of FIG. 20.
Figure 24:
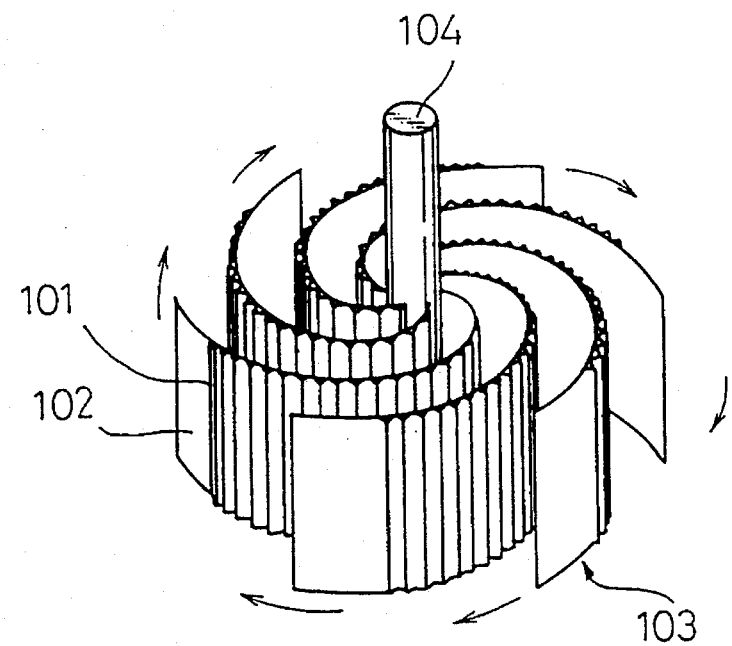
FIG. 24 is a view showing corrugated and flat metal sheets wound into alternate spiral shapes around a positive electrode, to form the honeycomb catalyst carrier of FIG. 20.

FIG. 20 to 24 show a catalytic converter according to a 10th embodiment of the present invention. In FIG. 24, corrugated and flat thin metal sheets 101 and 102 are alternately laminated and wound around a positive electrode 104 into a spiral shape, to form a honeycomb catalyst carrier 103. Each of the metal sheets 101 and 102 is made of, for example, 20% Cr, 5% Al, and 75% Fe and has a thickness of about 50 micrometers. Noncontact areas on the surface of each of the sheets 101 and 102 are provided with an alumina insulation layer by oxidization.

Figure 20:
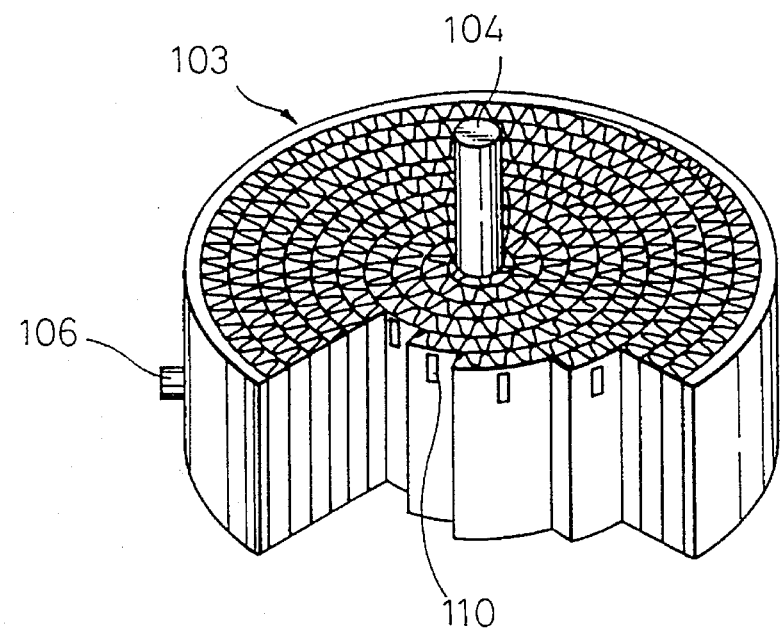
FIG. 20 is a partly broken perspective view showing a catalyst carrier according to a 10th embodiment of the present invention.

In FIGS. 20 and 23, the positive electrode 104 is axially arranged at the center of the carrier 103. The electrode 104 is physically and electrically connected to the carrier 103. The carrier 103 is inserted into a cylindrical metal casing 105 and fixed thereto by, for example, brazing. The carrier 103 is electrically conductive to the casing 105. In FIG. 20, a negative electrode 106 is connected to a side face of the casing 105. In FIG. 23, the positive electrode 104 extends along the axis of the casing 105 and is bent in an L shape to pass through the side face of the casing 105. The electrode 104 is electrically isolated from the casing 105 with an insulation material 107.

Figure 21A:
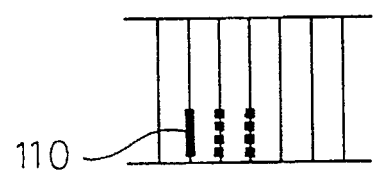
FIGS. 21(a) and 21(b) are views showing a current flowing through partly joined parts of the embodiment of FIG. 20.
Figure 21B:
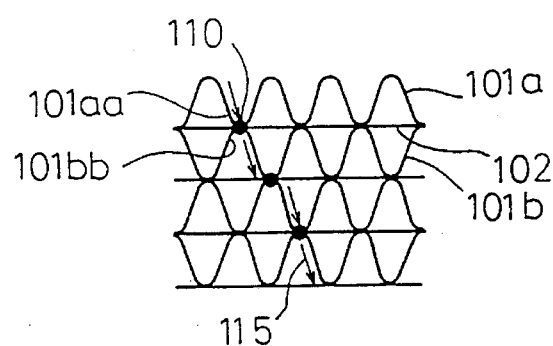

In FIGS. 20 to 22, each zone 110 extends for about 3 mm behind an upstream end face of the carrier 103. In the zone 110, a valley 101aa of a corrugated sheet 101a is joined with a crest 101bb of a corrugated sheet 101b that is adjacent to a flat sheet 102 by brazing, discharge welding, laser welding, etc. The zone 110 forms a short-circuit path for passing a current 115 from the center electrode 104 to the casing 105.

The carrier 103 is coated with activated alumina, etc., and carriers catalyst such as precious metal such as Pt, Pd, and Ph, to form an electrically heating catalytic converter.

The catalytic converter shown in FIGS. 20 to 24 is arranged in an exhaust path of an internal combustion engine, and behind this converter, a main catalytic converter is disposed. The catalyst provides an exhaust purifying reaction only when it is heated above an activation temperature. Accordingly, while the engine is cold, the electrically heating catalytic converter is energized to quickly increase the catalyst on the carrier 103 above the activation temperature, to purify noxious components contained in exhaust. In FIG. 22, there are about 20 heat generating zones each extending for several millimeters in the direction of an exhaust flow, to rapidly heat the catalyst, together with effectively using energy generated when unpurified gas components such as HC are oxidized. This results in greatly reducing power consumption.

Figure 25:
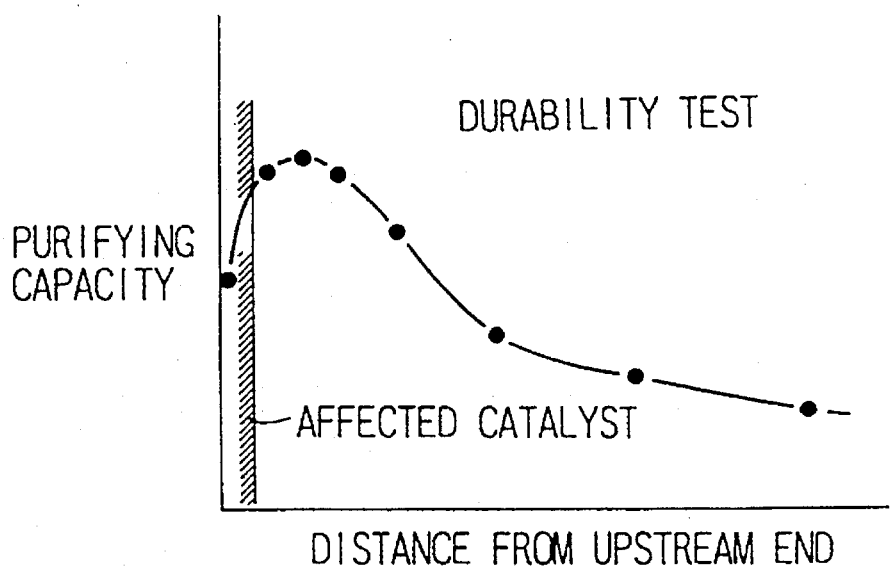
FIG. 25 is a graph showing a relationship between a distance from an upstream end and exhaust purifying capacity in an electrically heating catalytic apparatus.

As shown in FIG. 25, the inventors have found through experiments that catalyst located at hot spots is damaged at high temperatures by Pb, P, and S contained in exhaust, if the hot spots are positioned on an upstream side in the flow of the exhaust. This results in deteriorating catalytic performance. In addition, the hot spots themselves will be short-circuited and damaged due to metal components discharged from a combustion chamber. If the hot spots are spaced apart from the upstream end face by about 1 mm, the above problems will be avoided and catalytic reaction will be secured.

In FIG. 22, when a voltage is applied, a current spirally flows from the positive electrode 104 through the joined corrugated and flat sheets 101 and 102 and is collected at each zone 110 whose area is smaller than those of the sheets 101 and 102, to form hot spots. The current is short-circuited from the zone 110 to the adjacent sheets 101 and 102. This is repeated, and the current flows to the negative electrode 106.

When a voltage is applied, each zone 110 is heated to the catalyst activation temperature, to start purifying noxious substances contained in exhaust. This catalytic reaction generates heat to increase the temperature of the carrier 103 around the zones 110. Accordingly, the main catalytic converter is also heated by the heat of the catalytic reaction.

In this way, this embodiment energizes the zones 110 while the engine is cold, to quickly increase the temperature of the carrier 103 to the catalytic activation temperature, to thereby promptly purify exhaust. This embodiment greatly reduces power consumption and prevents the catalyst from being damaged by noxious compositions contained in the exhaust. Even if the carrier 103 is subjected to the exhaust of high temperature, the carrier 103 will not be axially deformed because of the joined zones 110. Namely, this embodiment improves the strength of the carrier 103.

FIGS. 26 to 39 show 11th to 19th embodiments of the present invention.

Figure 26:
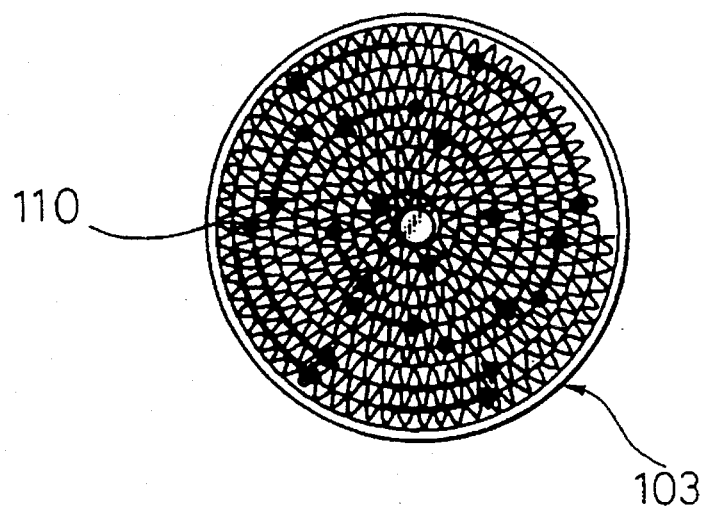
FIG. 26 is a plan view showing a catalyst carrier according to an 11th embodiment of the present invention with hot spots being located around a diametral center.

The 11th embodiment of FIG. 26 employs heating zones 110 formed in a limited central area, to further reduce power consumption. The zones 110 are required to be energized only just after the start of an engine when the quantity of exhaust is small. At this time, the exhaust flows through an annular intermediate section of a catalyst carrier 103. Accordingly, the exhaust is sufficiently purified even if only the annular section is heated.

Figure 27:
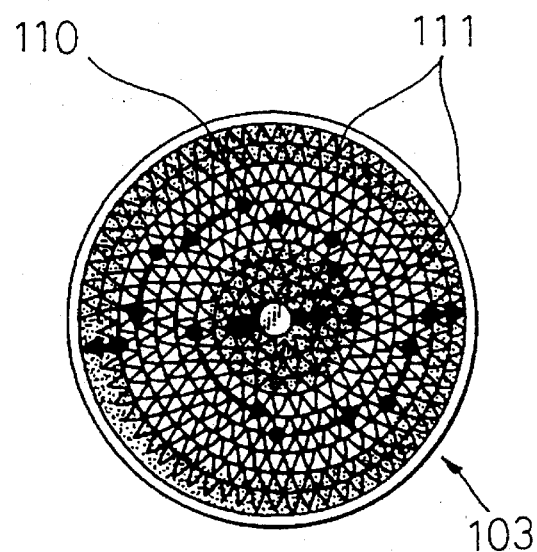
FIG. 27 is a plan view showing a catalyst carrier according to a 12th embodiment of the present invention with flat and corrugated sheets being entirely joined together to reduce resistance except for a diametral intermediate annular heat generation area.
Figure 28:
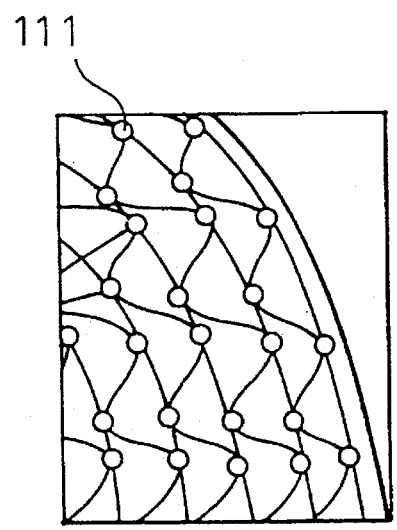
FIG. 28 is an enlarged view showing the flat and corrugated sheets entirely joined together of the embodiment of FIG. 27.

The 12th embodiment of FIGS. 27 and 28 is a modification of the 11th embodiment of FIG. 26. The 12th embodiment brazes all contacts between flat and corrugated sheets of a catalyst carrier 103 except in an annular heating area 110, to reduce resistance. Non-heating portions 111 thus formed generate no heat to further reduce power consumption.

Figure 29:
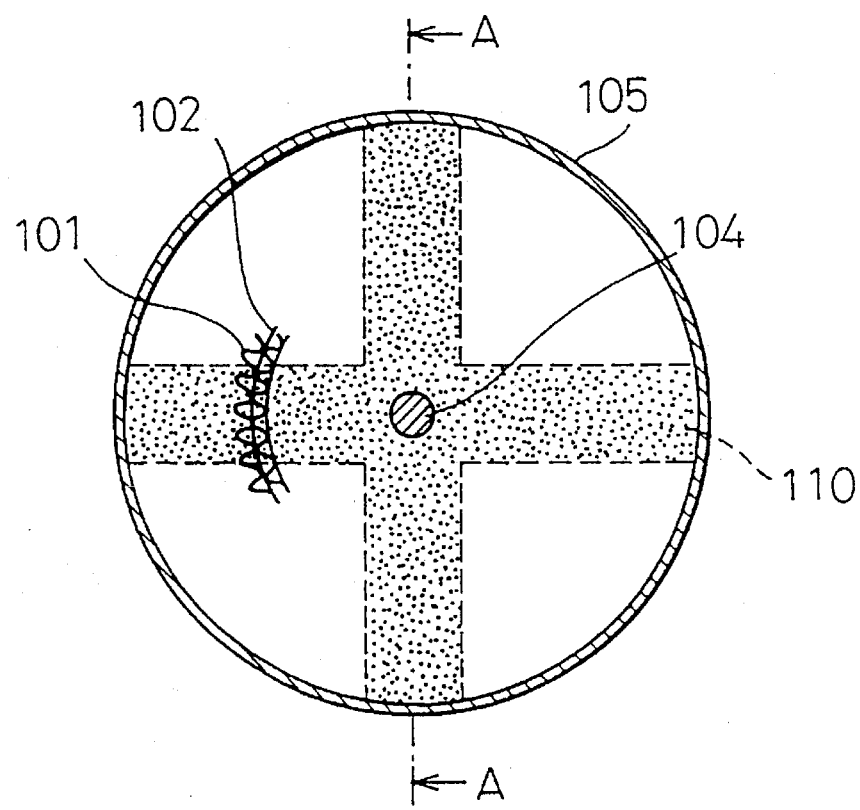
FIG. 29 is a plan view showing a catalyst carrier according to a 13th embodiment of the present invention with cross hot spot areas being formed around a center electrode.
Figure 30:
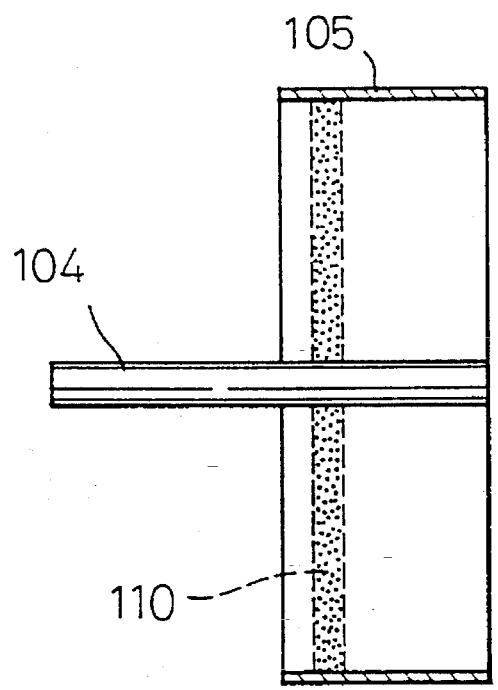
FIG. 30 is a sectional view taken along a line A—A of FIG. 29.

The 13th embodiment of FIGS. 29 and 30 forms cross heat generating zones 110 around a center electrode 104. In the heat generating zones 110, contacts between corrugated and flat sheets 101 and 102 are joined with one another by brazing or welding. When the welding is employed, the sheets 101 and 102 are wound while being welded by laser welding or by spot welding. When the brazing is employed, binder is applied to the sheets 101 and 102 in the heat generating zones 110, and the sheets are wound. It is preferable to apply the binder to contacts between the sheets 101 and 102, or to shoulders of the corrugated sheet 101 in contact with the flat sheet 102. After the sheets are completely wound, brazing material is applied thereto, and the sheets are heat-treated. Before the brazing, insulation films on the surfaces of the sheets 101 and 102 are removed at the parts to be brazed, to improve the strength of the brazed parts.

Figure 31A:
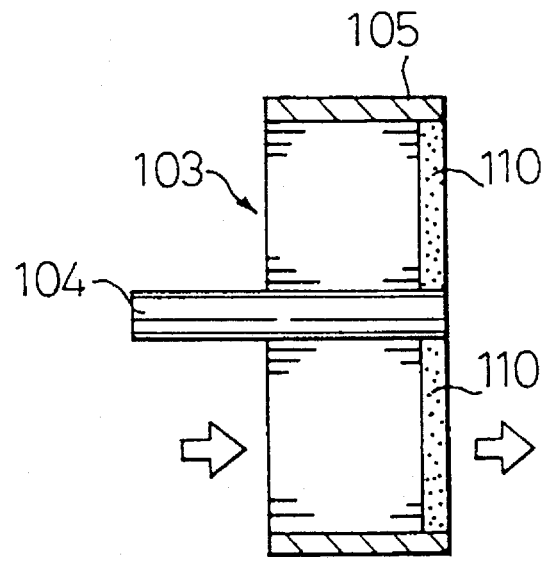
FIG. 31(a) is a longitudinal section showing a catalyst carrier according to a 14th embodiment of the present invention with cross hot spot areas formed around a center electrode on a downstream end face of the carrier.
Figure 31B:
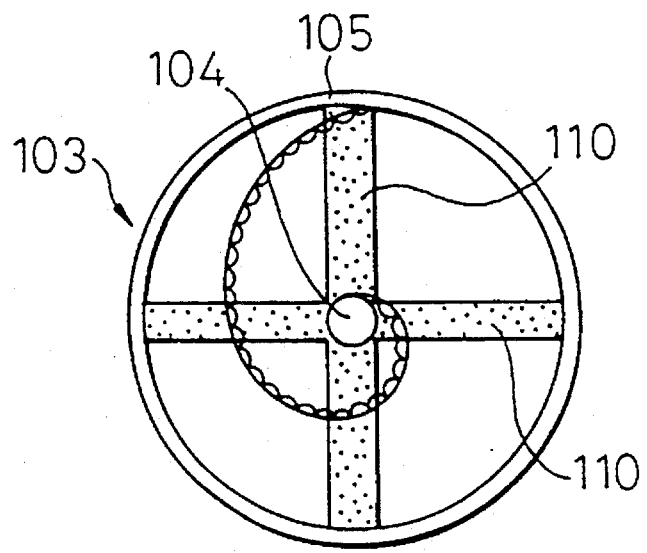
FIG. 31(b) is a plan view showing the 14th embodiment.

The 14th embodiment of FIGS. 31(a) and 31(b) arranges short-circuit paths 110 similar to those of the 13th embodiment on a downstream end face of a honeycomb metallic catalyst carrier 103 made of a lamination of corrugated and flat sheets. The paths 110 are energized to generate heat, which does not heat the carrier 103 with the help of a flow of exhaust in the direction of arrow marks. The upstream side of the carrier 103 is heated only by heat conduction through the carrier 103 itself. Accordingly, the heating efficiency of the 14th embodiment is poorer than the embodiments that form the short-circuit paths on the upstream end face of the carrier 103. If the exhaust contains led and phosphorous, catalyst on the upstream side is affected by them to loose catalytic capability. When the short-circuit paths 110 are arranged on the downstream end face where the noxious components hardly affect the paths 110, successive catalytic reactions will be secured even if the upstream side of the carrier 103 is affected by the noxious components.

Figure 32:
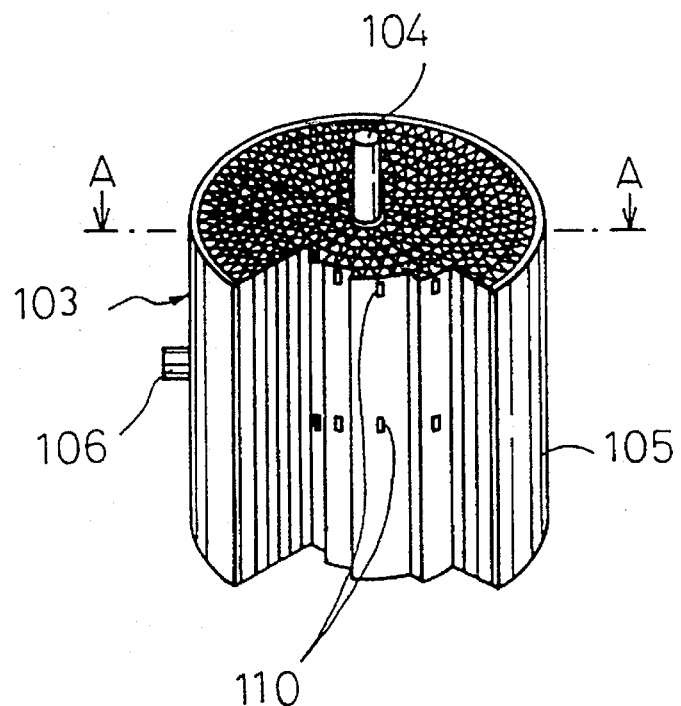
FIG. 32 is a partly broken perspective view showing a catalyst carrier according to a 15th embodiment of the present invention with a plurality of hot spots being formed in the direction of an exhaust flow.
Figure 33:
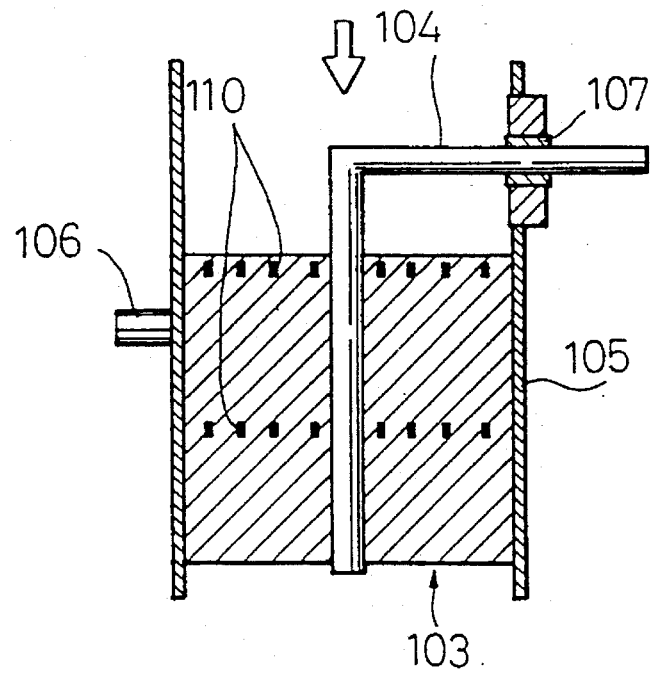
FIG. 33 is a sectional view taken along a line A—A of FIG. 32.

The 15th embodiment of FIGS. 32 and 33 employs a large catalyst carrier 103. Heating zones 110 are formed at several axial locations along the flow of exhaust, to rapidly activate the carrier 103 as a whole.

Figure 34:
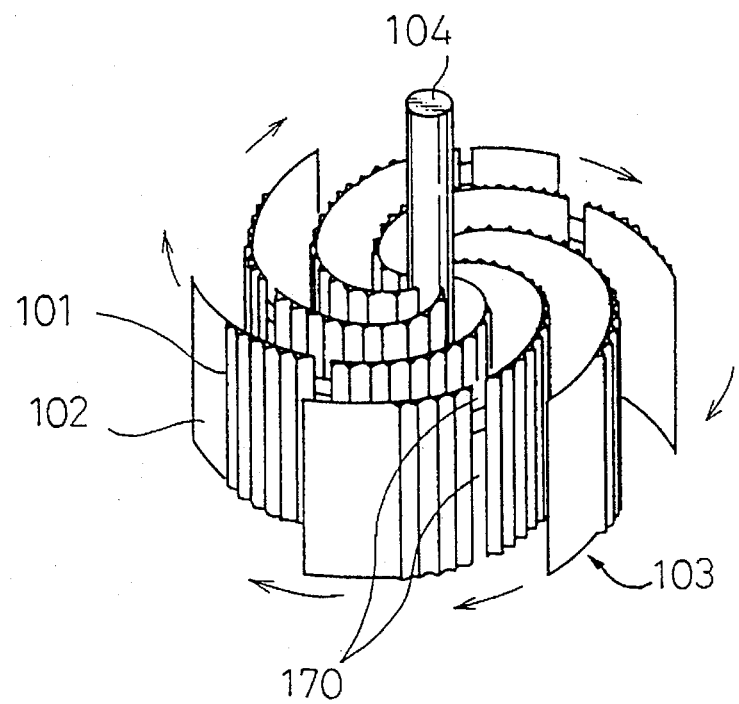
FIG. 34 is a perspective view showing a catalyst carrier according to a 16th embodiment of the present invention with corrugated sheets having axial slits to generate heat at the remaining parts.
Figure 35:
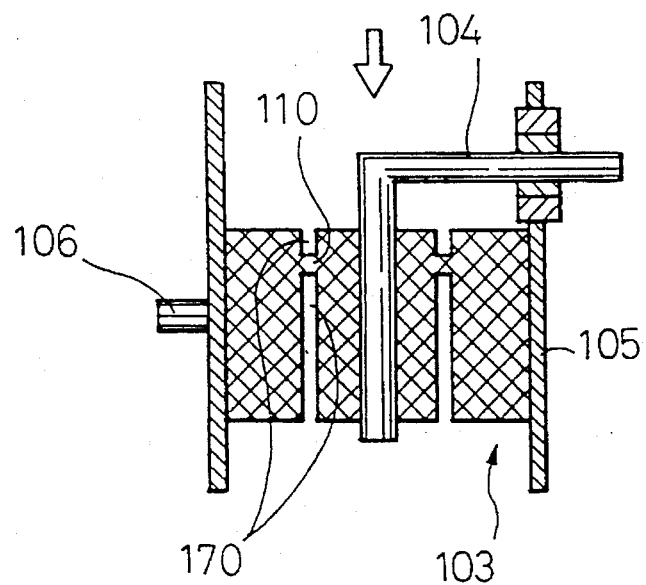
FIG. 35 is a longitudinal section showing the completed carrier according to the 16th embodiment.

The 16th embodiment of FIGS. 34 and 35 forms axial slits 170 at several locations of a honeycomb carrier 103 so that each continuous part 110 generates heat.

Figure 36A:
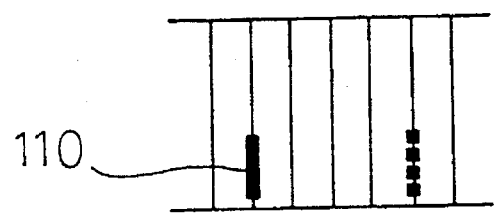
FIGS. 36(a) and 36(b) are views showing a catalyst carrier according to a 17th embodiment of the present invention with a corrugated sheet being partly flattened.
Figure 36B:
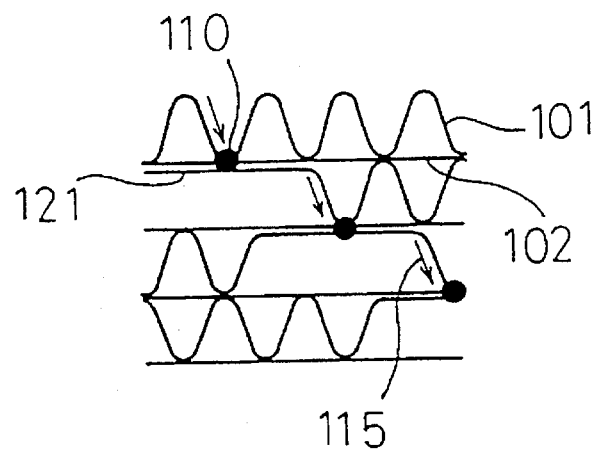
Figure 37A:
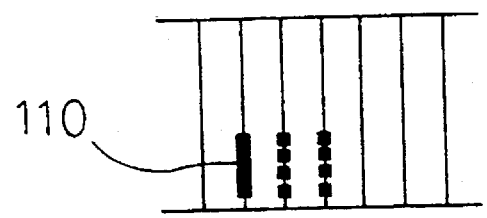
FIGS. 37(a) and 37(b) are views showing a catalyst carrier according to an 18th embodiment of the present invention with flat strips being interposed between corrugated and flat sheets.
Figure 37B:
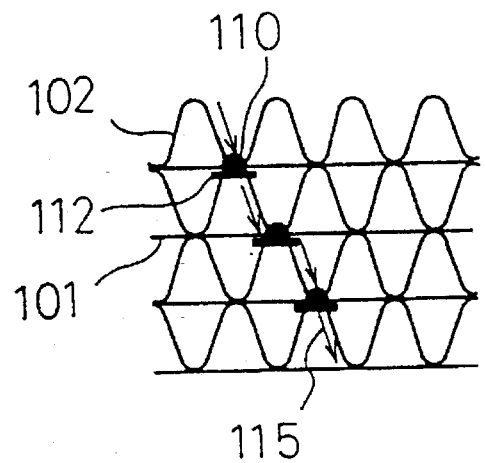

FIGS. 36 and 37 show the 17th and 18th embodiments, respectively. To easily fabricate each heating zone 110, the embodiment of FIG. 36 forms a flat part 121 on a corrugated sheet 101 in the zone 110 and welds the part with laser. In FIG. 37, a flat sheet 112 is added to the zone 110, and the zone is welded with laser, to simply fabricate the zone 110. In these figures, numeral 115 indicates a current.

Figure 38:
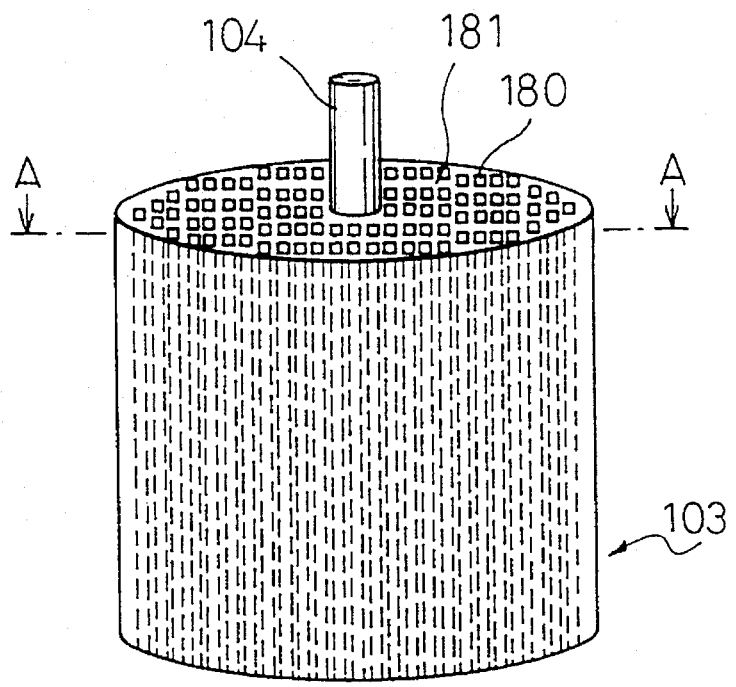
FIG. 38 is a perspective view showing a honeycomb ceramic catalyst carrier according to a 19th embodiment of the present invention with a tungsten heat generation wire.
Figure 39:
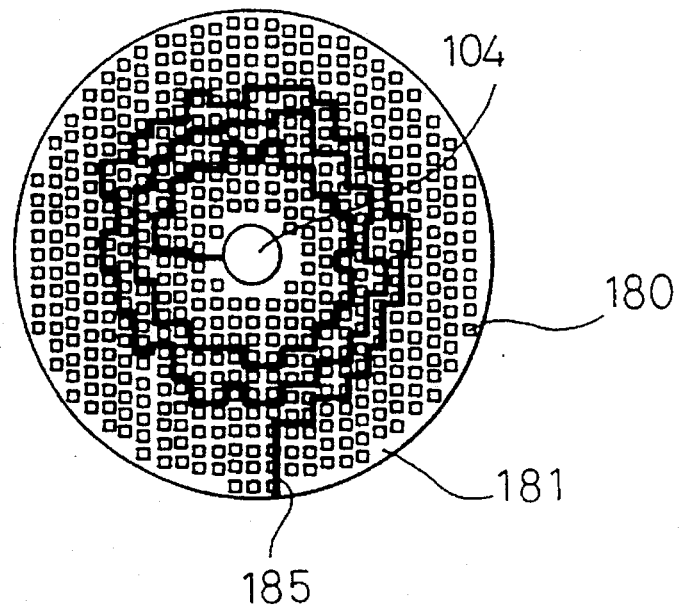
FIG. 39 is a sectional view taken along a line A—A of FIG. 38.

FIGS. 38 and 39 show the 19th embodiment. A ceramic carrier 103 has openings 180 extending from the upstream side to the downstream side of the carrier 103 in the direction of a flow of exhaust. A metal wire 185 made of, for example, tungsten is arranged on ceramic parts other than the openings 180 on an end face of the carrier 103, to form a heat generating zone. Similar to the 11th embodiment of FIG. 26 and the 12th embodiment of FIG. 27, the 19th embodiment limits the heat generating zone to a center area on the end face, to reduce power consumption. Although this embodiment employs the ceramic honeycomb catalyst structure, granular catalyst, i.e., pellet catalyst may be employable to provide the same effect.

Figure 40:
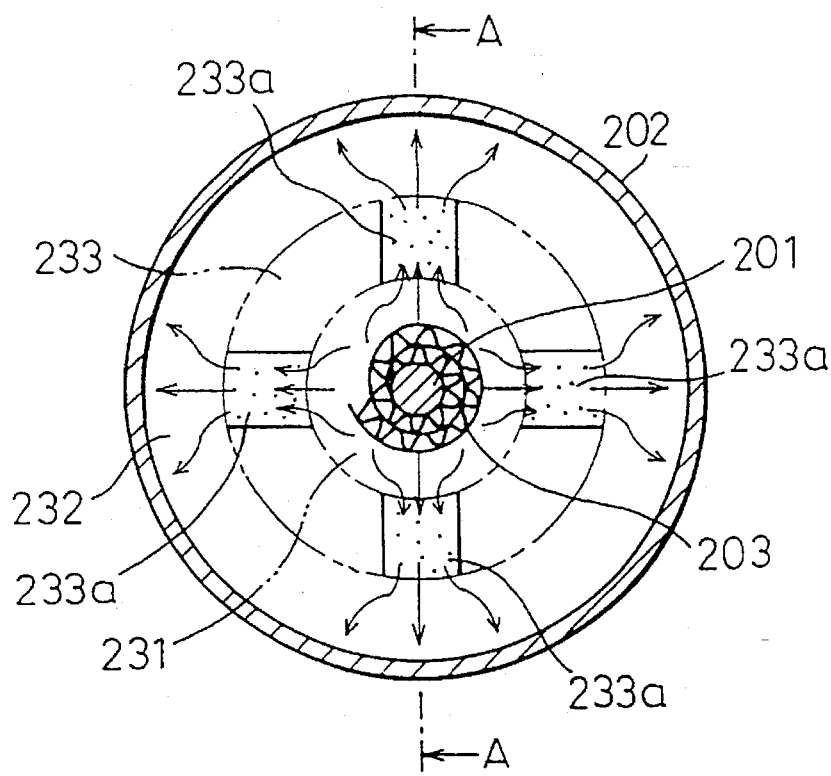
FIG. 40 is a front view showing a catalyst carrier of an electrically heating catalytic converter according to a 20th embodiment of the present invention.
Figure 41:
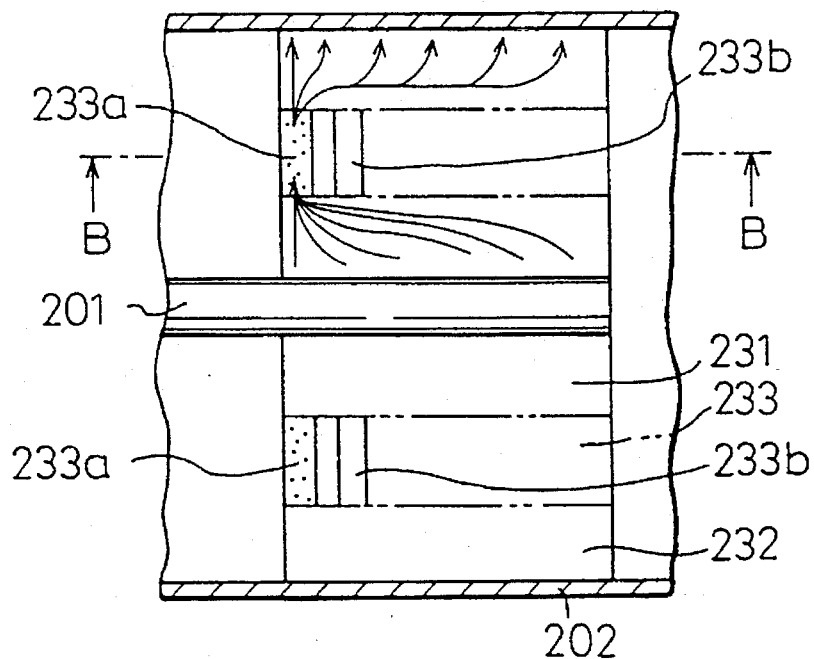
FIG. 41 is a sectional view taken along a line A—A of FIG. 40.

FIG. 40 is a front view showing a catalyst carrier of a electrically heating catalytic converter according to a 20th embodiment of the present invention. FIG. 41 is a sectional view taken along a line A—A of FIG. 40. The left side of the figure is an upstream side in a flow of exhaust. Numeral 201 is a center electrode and 202 is an outer casing serving as the other electrode. Numeral 203 is a corrugated metal band made of corrugated and flat sheets to carrier catalyst. At one corrugated band 203 is arranged in a spiral shape from the center electrode 201 to the outer casing 202. The band 203 is electrically insulated with an alumina film. Large part of a first annular area 231 around the center electrode 201 is radially short-circuited by discharge welding, etc. Similarly, large part of a second annular area 232 adjacent to the outer casing 202 is radially short-circuited by discharge welding, etc. On the other hand, a third annular area 233 between the annular areas 231 and 232 is radially short-circuited only at four rectangular specific parts 233a on the upstream side as indicated with dots in FIGS. 40 and 41. The remaining parts of the third annular area 233 are radially insulated with insulation films.

Figure 44:
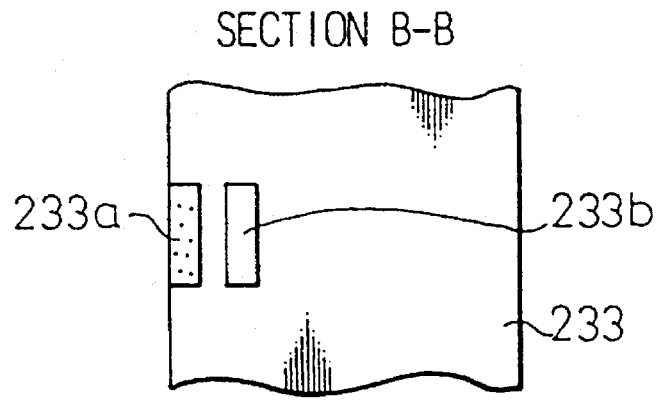
FIG. 44 is a sectional view taken along a line B—B of FIG. 41.

Inner spaces 233b are formed behind the specific parts 233a. FIG. 44 is a sectional view taken along a line B—B of FIG. 41. Each inner space 233b has substantially the same projected area as the corresponding specific part 233a in a front view. The inner spaces 233b are formed in the corrugated band 203 before winding.

When a voltage is applied to the center electrode 201 and the other electrode 202 at the start of an engine that is cool, a current radially flows through the specific parts 233a as indicated with arrow marks in FIGS. 40 and 41 because the other parts in the third annular area 233 are radially insulated. Since the electric resistance of the specific parts 233a is larger that of the first and second annular areas 231 and 232, only the specific parts 233a generate heat to reach a catalyst activation temperature to purify exhaust. The heat of chemical reaction thus caused heats the remaining parts of the carrier. As a result, the carrier as a whole reaches the activation temperature within a relatively short time, to sufficiently purify the exhaust.

This embodiment heats only the specific parts 233a of the carrier, so that its power consumption is smaller than that of the catalytic converter that heats the whole of the carrier. This helps reduce the size of a power source battery. Only the specific parts 233a thermally expand at this time. The extension of the parts in an axial direction is absorbed by the inner spaces 233b, so that no axial stress is applied to the other parts. Inner stress in the carrier may cause cracks on the corrugated band 203 within a short period. Such cracks will cause fatal electric trouble in the converter. This embodiment prevents such trouble and extends the mechanical service life of the carrier.

Figure 42:
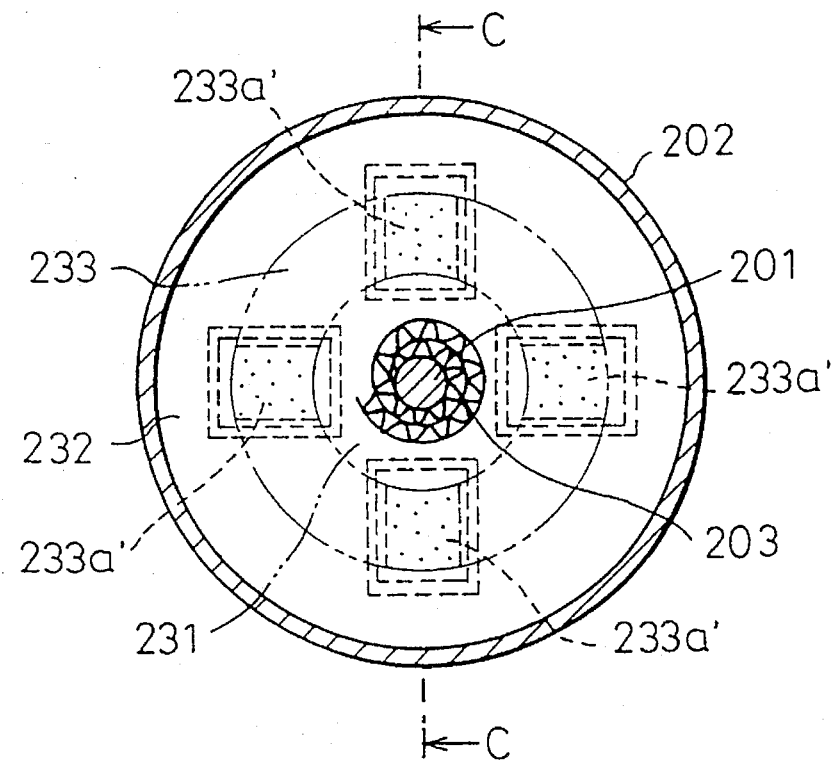
FIG. 42 is a front view showing a catalyst carrier of an electrically heating catalytic converter according to a 21st embodiment of the present invention.
Figure 43:
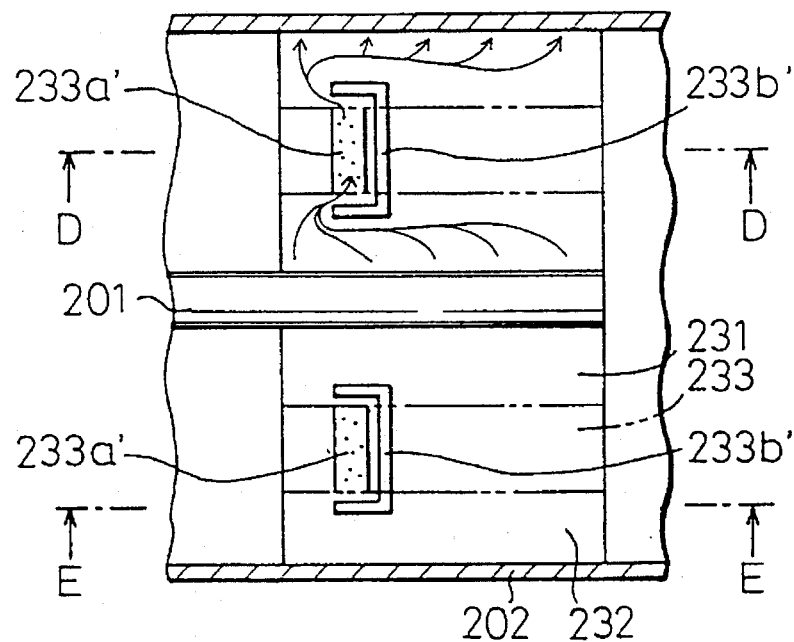
FIG. 43 is a sectional view taken along a line C—C of FIG. 42.

FIG. 42 is a front view showing an electrically heating catalytic converter according to a 21st embodiment of the present invention. FIG. 43 is a sectional view taken along a line C—C of FIG. 42. Similar to FIG. 41, the left side of FIG. 43 is an exhaust upstream side. Only the difference of this embodiment from the 20th embodiment will be explained. Each specific part 233a' for generating heat is arranged inside a catalyst carrier away from an upstream end face of the carrier. Since the upstream end face of the carrier is easily damaged by adhesion of noxious substances contained in exhaust, the specific parts 233a' of this embodiment are disposed behind the upstream end face. Although the exhaust purifying capability of this embodiment is lower than that of the 20th embodiment, the 21st embodiment is advantageous in extending the service life of the carrier.

Figure 45:
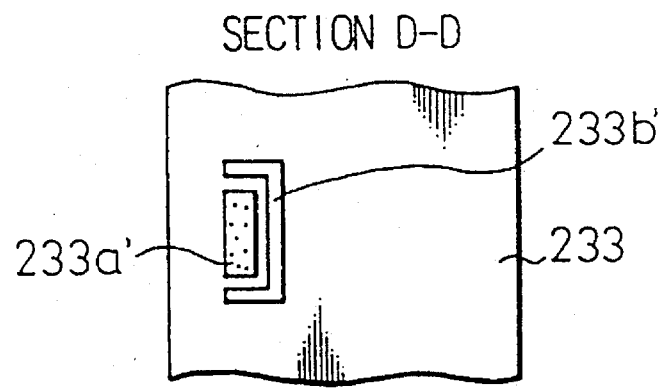
FIG. 45 is a sectional view taken along a line D—D of FIG. 43.
Figure 46:
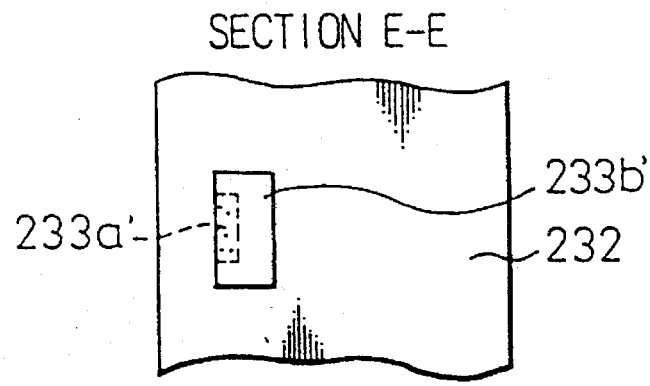
FIG. 46 is a sectional view taken along a line E—E of FIG. 43.

An inner space 233b' is formed in the vicinity of each specific part 233a'. As shown in FIG. 43 and FIG. 45 that is a sectional view taken along a line D—D of FIG. 43, the inner space 233b' is formed not only behind the specific part 233a' but also in the vicinities of the four side faces thereof.

Similar to the previous embodiment, only the specific parts 233a' generate heat to purify exhaust after the start of an engine that is cool. Accordingly, this embodiment consumes low power. Since the inner spaces 233b' absorb not only the axial elongation of the specific parts 233a' but also the radial and circumferential expansions thereof, no stress is applied in any direction to the other parts. The 21st embodiment, therefore, further improves the mechanical service life of the carrier.

According to the 20th and 21st embodiments, the first and second annular areas 231 and 232 are radially strongly connected to each other through the specific parts. Accordingly, even if the inner spaces are provided, the carrier will not be deformed toward the downstream side due to a flow of exhaust.

The shape and position of each inner space are not limited to those of the above two embodiments. For example, the space may be formed adjacent to one side face of the heat generating specific part. Even such space may absorb the thermal expansion of the specific part in the direction. This results in relaxing stress on the carrier, to extend the mechanical service life of the carrier.

Figure 47:
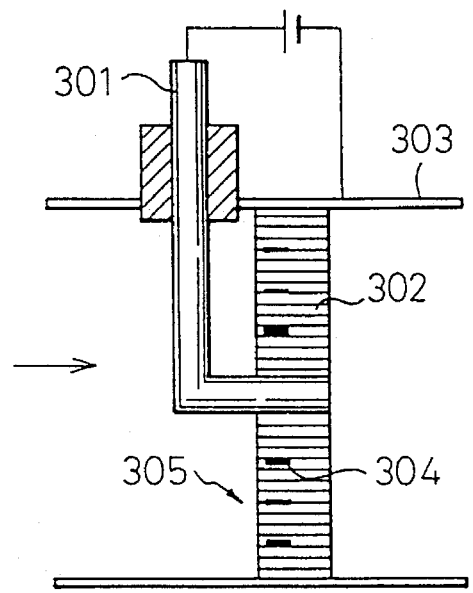
FIG. 47 is a longitudinal section showing an electrically heating catalytic converter according to a 22nd embodiment of the present invention.

FIG. 47 is a sectional view showing an electrically heating catalytic converter according to a 22nd embodiment of the present invention. A corrugated band 302 made of flat and corrugated metal sheets 302a and 302b are wound around a center electrode 301, to form a catalyst carrier, which is inserted in an outer casing 303.

Figure 48:
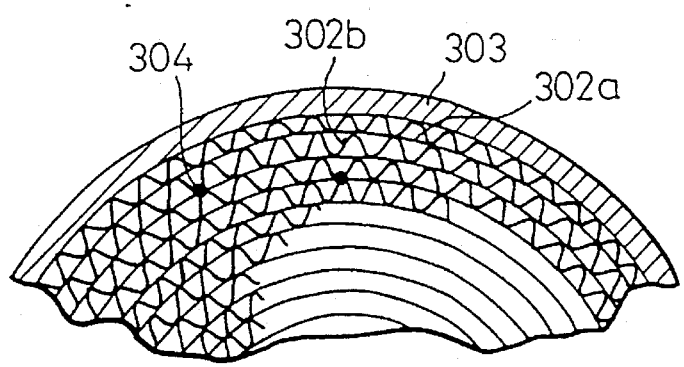
FIG. 48 is a front view showing a part of a catalyst carrier of the 22nd embodiment.

In FIG. 48, the flat and corrugated sheets 302a and 302b are laminated one upon another and wound such that a valley of a given layer of the corrugated sheet, a layer of the flat sheet, and a crest of an adjacent inner layer of the corrugated sheet form a joint 304.

Figure 49:
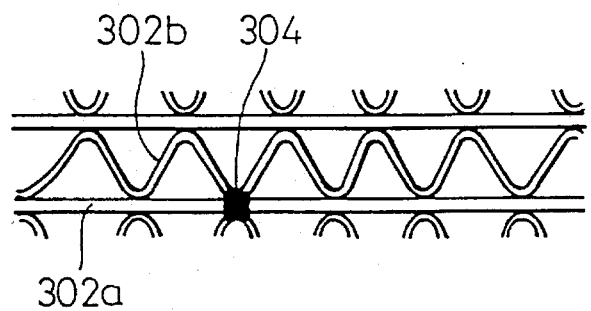
FIG. 49 is an enlarged view showing a part of FIG. 48.

In FIG. 49, the flat sheet 302a is thicker than the corrugated sheet 302b.

Figure 50:
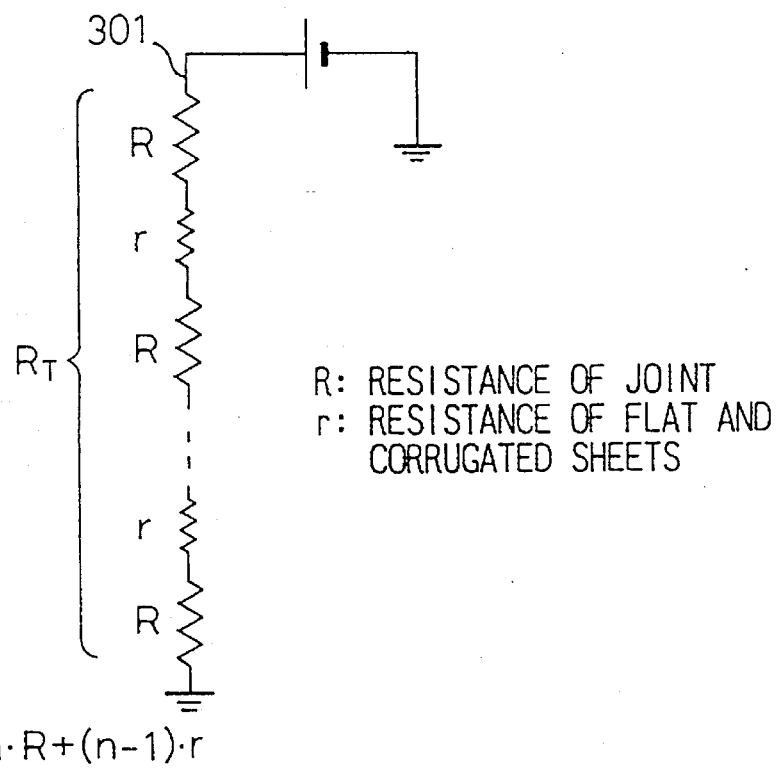
FIG. 50 is a circuit diagram showing an equivalent circuit of the 22nd embodiment.

FIG. 50 shows an equivalent circuit of the catalytic converter according to the 22nd embodiment. Each joint 304 has a resistance of R and the flat and corrugated sheets between the two joints 304 have a resistance of r. Then, a combined resistance of RT is expressed as n·R+(n−1)·r where n is the number of the joints 304. Accordingly, the quantity of heat generated by the joints 304 is expressed as Q·n·R/RT where Q is supplied power. Increasing the thickness of the flat sheet 302a decreases the combined resistance RT, so that the quantity of heat generated at the joints 304 will be increased if the power is unchanged. Increasing the thickness of the flat sheet 302a improves the durability of the catalyst carrier.

Figure 51:
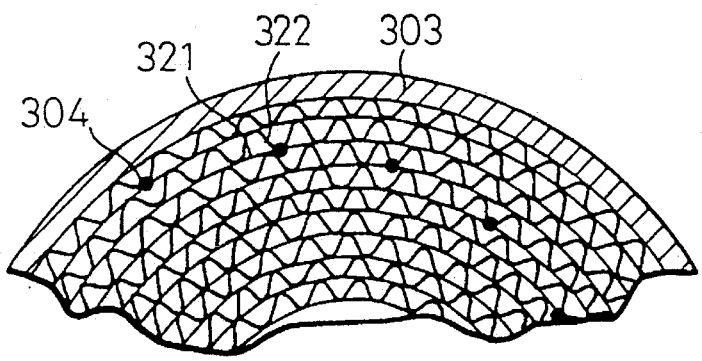
FIG. 51 is a front view showing a part of an electrically heating catalytic converter according to a 23rd embodiment of the present invention.

FIG. 51 is a sectional view showing an electrically heating catalytic converter according to a 23rd embodiment of the present invention. Unlike the 22nd embodiment that forms each joint 304 with a valley of a layer of a corrugated sheet, a layer of a flat sheet, and a crest of an adjacent inner layer of the corrugated sheet, the 23rd embodiment forms a joint 304 at a contact between a layer of a flat sheet 321 and a layer of a corrugated sheet 322. Namely, each joint of the 23rd embodiment is formed of two layers instead of three of the 22nd embodiment. This means that the quantity of heat generated at each joint 304 of the 23rd embodiment is two thirds of that of the 22nd embodiment, and that the 23rd embodiment involves a shorter temperature increasing period. As a result, a catalyst carrier according to the 23rd embodiment is quickly heated to early start the purification of HC after the start of an engine. Since the resistance of each joint 304 according to the 23rd embodiment is large, the number of the joints 304 may be increased if the catalytic converter is operated under a constant voltage.

Figure 52:
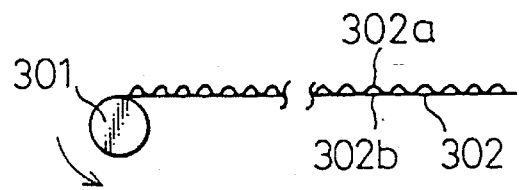
FIG. 52 is a view showing a process of fabricating an electrically heating catalytic converter according to a 24th embodiment.

FIGS. 52 and 53 show an electrically heating catalytic converter according to a 24th embodiment of the present invention. A corrugated band 302 made of flat and corrugated metal sheets is wound around a center electrode 301 such that the corrugated sheet 302a comes outside the flat sheet 302b as shown in FIG. 52. The wound band 302 is stored in an outer casing 303, to form a catalyst carrier. FIG. 53 is a front view showing a part of the completed catalyst carrier. Each joint 304 is formed with a valley 321c of a layer of the corrugated sheet, a layer of the flat sheet, and a crest 322c of an adjacent inner layer of the corrugated sheet.

FIG. 54 shows a method of forming each joint 304 with use of a laser welder 305. A laser beam 306 is emitted to weld a valley of an external layer of the corrugated sheet. The flat sheet 302 is wound, and joints 304 are successively formed. This method is possible because the corrugated sheet is outside the flat sheet. This embodiment easily joins the flat and corrugated sheets with the corrugated sheet being outside the flat sheet. An outermost layer will be the flat sheet, which is attached to the outer casing 303, to improve the strength of the catalyst carrier.

FIG. 55(a) is a cross-sectional view showing an electrically heating catalytic converter according to a 25th embodiment of the present invention, and FIG. 55(b) is a longitudinal section showing the same. A corrugated band made of flat and corrugated sheets is wound around a center electrode 301 and stored in an outer casing 303, to form a catalyst carrier 302. Joints 304a and 304b are made by a laser welder while the corrugated band is being wound. The joints 304a are arranged on the upstream side of the carrier 302, and the joints 304b are arranged around the longitudinal center of the carrier 302. The joints 304a and 304b alternate in a radial direction.

When power is supplied to the center electrode 301 and outer casing 303 at the start of an engine, the joints 304a and 304b generate heat. When exhaust from the engine is rich, it contains a large quantity of incompletely burnt components. If there are only the upstream joints 304a, the heat of catalytic reactions may be conducted to the downstream side of the carrier 302, to activate the carrier as a whole in a short time. When the exhaust reaches a theoretical air-fuel ratio, the incompletely burnt components in the exhaust become smaller. This results in reducing the heat of reactions. Accordingly, this embodiment arranges the joints 304a and 304b in two steps in the axial direction as shown in FIG. 55, to easily activate the whole of the carrier 302.

Figure 56:
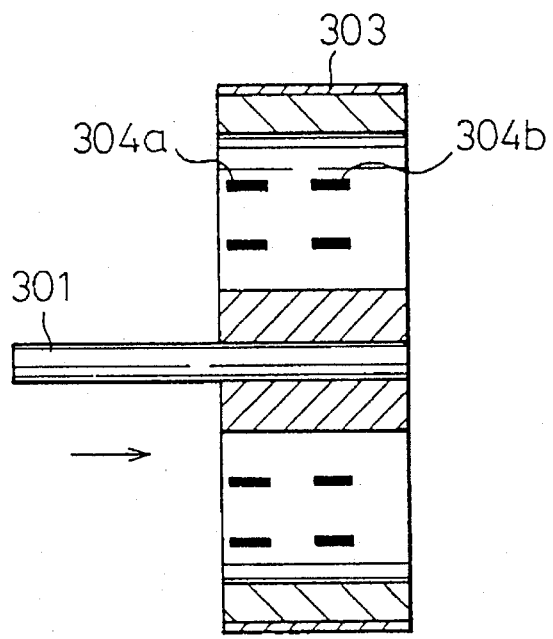
FIG. 56 is a longitudinal section showing a modification of the 25th embodiment.

FIG. 56 shows a modification of the 25th embodiment of the present invention. This modification arranges central joints 304b in line with upstream joints 304a. If many joints are employed, this modification provides the same effect as the 25th embodiment.

Figure 57:
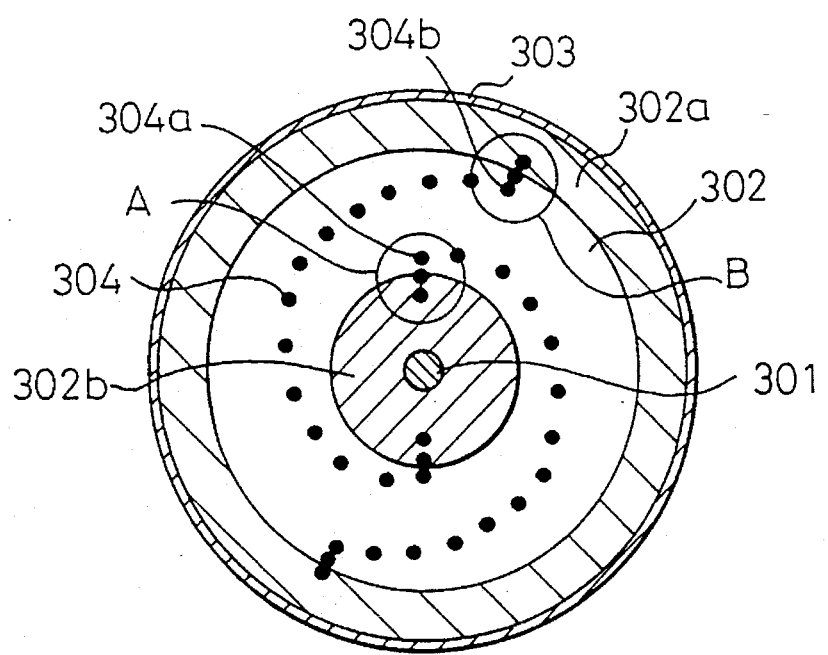
FIG. 57 is a front view showing an electrically heating catalytic converter according to a 26th embodiment of the present invention.

FIG. 57 is a sectional view showing an electrically heating catalytic converter according to a 26th embodiment of the present invention. A corrugated band formed of flat and corrugated metal sheets is wound around a center electrode 301 and stored in an outer casing 303, to form a catalyst carrier. A joined area 302a is formed along the outer casing 303, and a joined area 302b is formed around the center electrode 301. In each of the joined areas 302a and 302b, contacts between the flat and corrugated sheets are joined to each other by discharge welding, etc. Inner joints 304 are arranged as shown in the figure. In areas A and B adjacent to the joined areas 302a and 302b, the inner joints 304a and 304b are radially oriented so that the inner joints 304a and 304b are connected to the joined areas 302a and 302b, respectively.

Figures 58A, 58B:
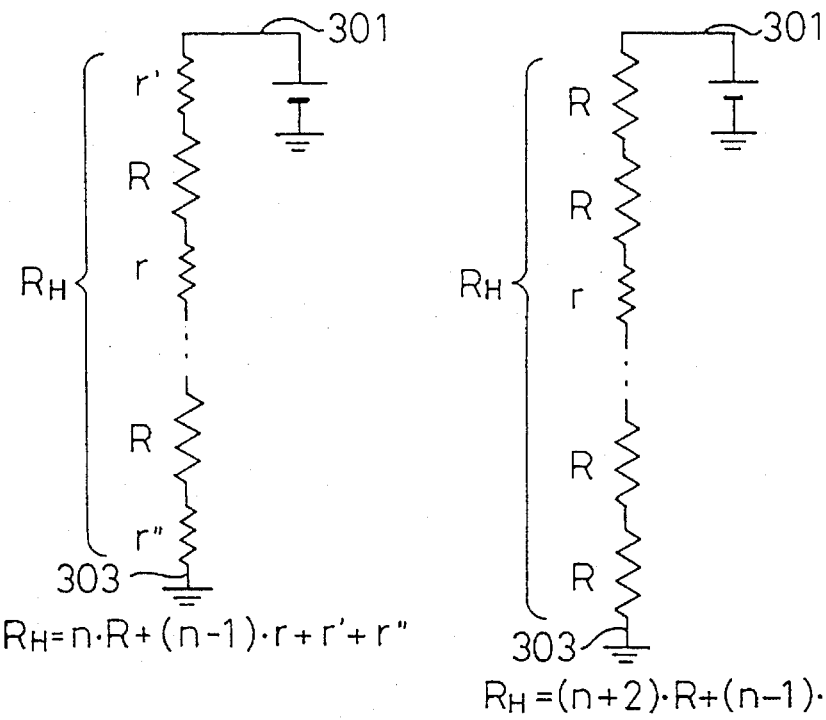
FIGS. 58(a) and 58(b) are views showing equivalent circuits of a heat generating section of a catalytic converter.

If the inner joints 304a and 304b are not directly conductive to the joined areas 302a and 302b, the catalytic converter will have resistance RH shown in FIG. 58(a). Namely, a current flows from end ones of the joints 304 to the connection areas 302a and 302b through the corrugated band. In this case, the resistances r' and r" of the corrugated band are uncertain to manage the resistance RH of the catalytic converter. When the end ones 304a and 304b among the joints 304 are connected to the joined areas 302a and 302b as shown in FIG. 58(b), the resistance RH will be a function of the resistance R of the joints and the resistance r of the corrugated band between the joints, so that the resistance RH may be accurately managed.

Figure 59:
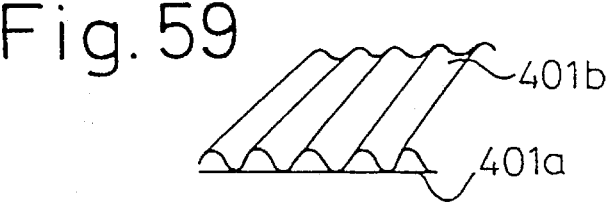
FIG. 59 is a perspective view showing a combination of flat and corrugated sheets according to a 27th embodiment of the present invention.
Figures 60A, 60B:
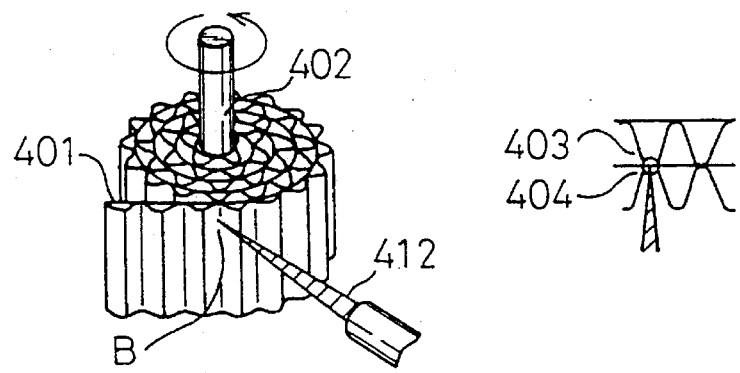
FIGS. 60(a) and 60(b) are views showing a process of laser-welding metal sheets of an electrically heating catalytic converter according to the 27th embodiment.

FIGS. 59 to 61 show essential parts of an electrically heating catalytic converter according to a 27th embodiment of the present invention. A corrugated band serving as a heating catalyst carrier 401 is formed from a flat metal sheet 401a and a corrugated metal sheet 401b as shown in FIG. 59. The band 401 is coated with an insulation film. The band 401 is wound around a center electrode 402 and welded by laser 412. The welded spots serve as hot spots. Each hot spot is formed where a valley 403 of a corrugated layer meets a crest 404 of another corrugated layer. Namely, the hot spots are not formed at optional positions, to deteriorate the workability of manufacturing the hot spots.

Figure 61A:
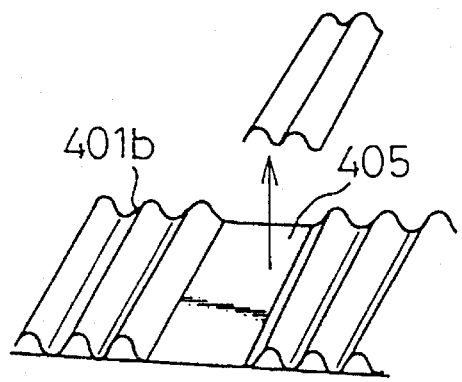
FIG. 61(a) is a view showing a cut formed on the metal sheet of the 27th embodiment.
Figure 61B:
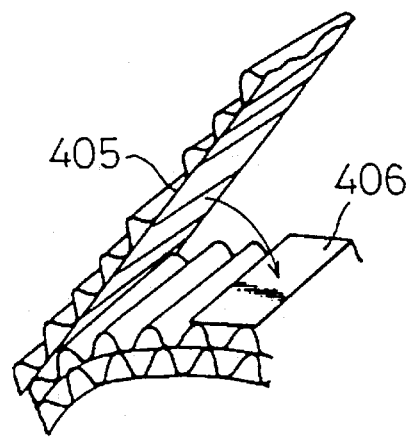
FIG. 61(b) is a process of laminating the metal sheets of the 27th embodiment.
Figure 61C:
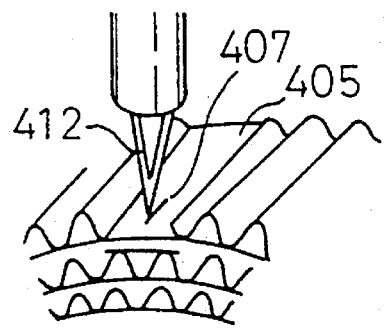
FIG. 61(c) is a view showing a laser welding process.

Accordingly, this embodiment cuts the corrugated sheet at proper positions. When the corrugated band is wound around the center electrode 402, a flat strip is joined to each cut formed on the corrugated sheet. As a result, the hot spots may be formed at optional positions. Namely, the corrugated sheet 401b is cut to form a cut 405 as shown in FIG. 61(a). When the corrugated band is wound around the center electrode 402, a flat strip 406 is joined to the cut 405 and to an adjacent inner layer as shown in FIG. 61(b). Thereafter, a hot spot 407 is formed on the cut 405 by laser welding as shown in FIG. 61(c). In this way, the embodiment enables the hot spots to be formed at optional positions with the laser 412 being easily positioned.

Figure 62:
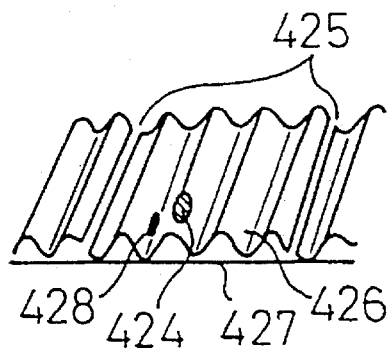
FIG. 62 is a perspective view showing part of metal sheets of an electrically heating catalytic converter according to a 28th embodiment of the present invention.

FIGS. 62 and 63 show essential parts of an electrically heating catalytic converter according to a 28th embodiment of the present invention. Only the difference of the 28th embodiment from the 27th embodiment will be explained. In FIG. 62, a corrugated sheet 426 is cut at a position 425 around a crest 424 where a hot spot is to be formed. The corrugated sheet 426 is joined with a flat sheet 427 only at a laser-welded spot 428. Each hot spot position is processed as shown in FIG. 62. While a corrugated band formed of the corrugated and flat sheets 426 and 427 is being wound around a center electrode into a catalyst carrier, the hot spots are formed by laser welding.

Figure 63A:
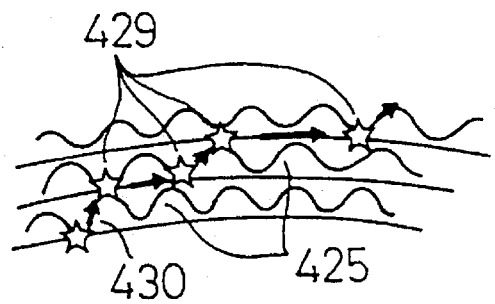
FIG. 63(a) is a view explaining a flow of a current according to the 28th embodiment with no cuts.
Figure 63B:
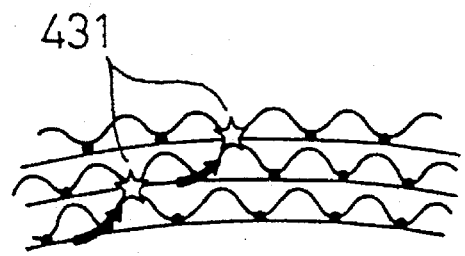
FIG. 63(b) is a view explaining a flow of a current according to the 28th embodiment with cuts.
Figure 64:
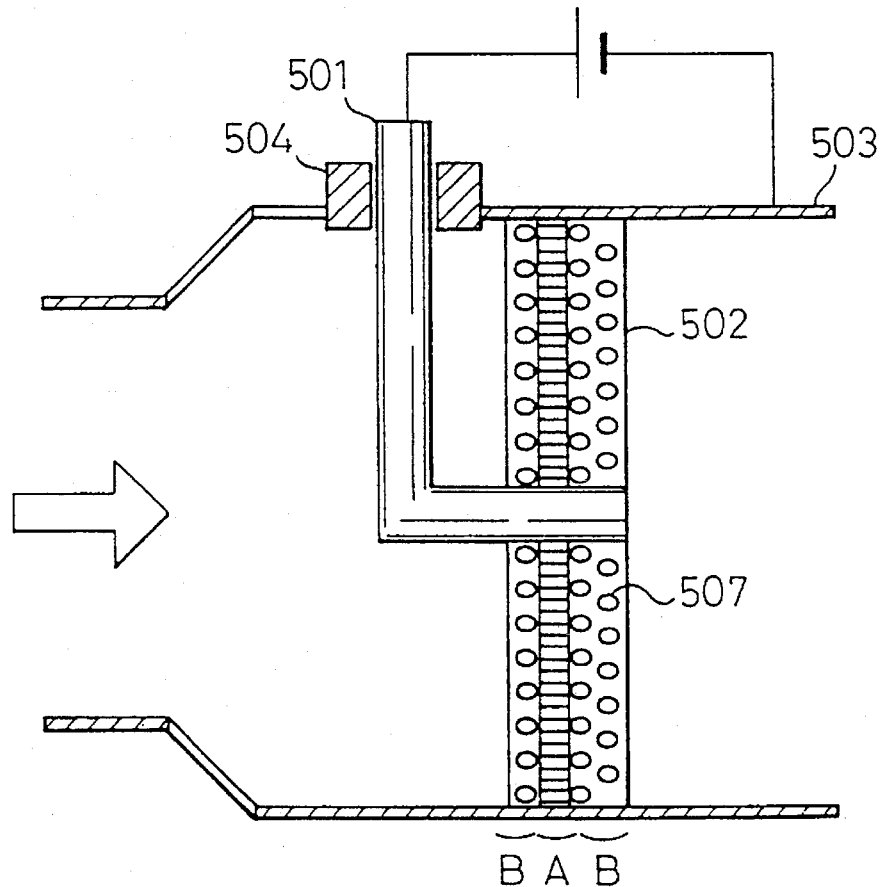
FIG. 64 is a longitudinal section showing an electrically heating catalytic converter according to a 29th embodiment of the present invention.

FIG. 63(a) shows a part of a current path of the catalyst carrier. When a voltage is applied to the center electrode, a current 429 flows from the center electrode toward an outer casing. Then, each of the hot spots of high resistance generates heat. FIG. 63(b) shows a current path of a catalyst carrier without the cuts 425. In this case, the flat and corrugated sheets are entirely joined with each other to have low resistance. Accordingly, only hot spots 431 generate heat. In this way, the 28th embodiment forms the hot spots even at the joints between the flat and corrugated sheets, to increase the number of the hot spots and easily activate catalyst.

Figure 65:
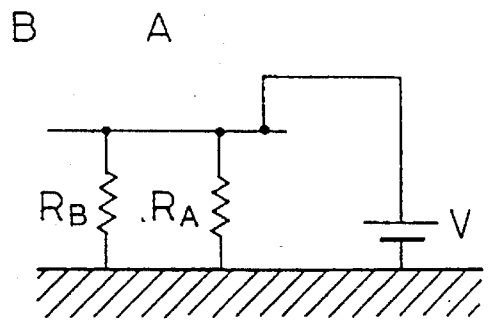
FIG. 65 is a circuit diagram showing an equivalent circuit of a heat generation section of the 29th embodiment.
Figure 66:
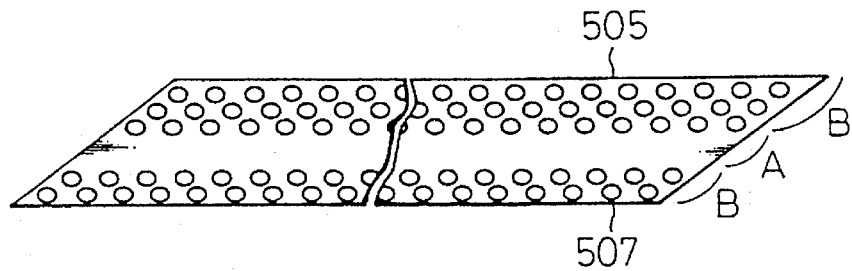
FIG. 66 is a perspective view showing a flat sheet according to the 29th embodiment.
Figure 67:
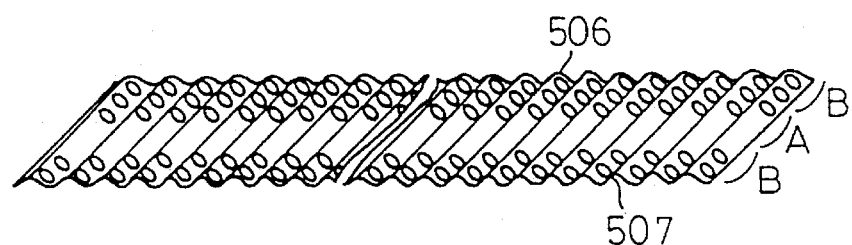
FIG. 67 is a perspective view showing a corrugated sheet according to the 29th embodiment.

FIGS. 64 to 70 show a catalytic converter according to a 29th embodiment of the present invention. In FIGS. 64 to 67, a flat sheet 505 and a corrugated sheet 506 are wound around a positive electrode 501 into a catalyst carrier 502. Areas B of the sheets 505 and 506 have many resistance adjusting holes 507. The areas B longitudinally extend between ends of each of the sheets 505 and 506. FIG. 65 is an equivalent circuit formed between the positive electrode 501 and a casing 503 to which a DC voltage is applied. The areas B and an area A defined between the areas B extend in parallel with each other.

In each of the areas B, the adjusting holes 507 restrict a current path, so that the resistance RB of the areas B is very high compared with the resistance RA of the area A. Accordingly, the areas B generate substantially no heat. Since the resistance RA of the area A is low, a current mostly flows through the area A, which generates heat. Heat quantity QA generated in the area A is $V^2/RA$, and heat quantity QB generated in the areas B is $V^2/RB$ where QA>QB. When a voltage is applied, the area A generates heat to quickly reach a catalyst activation temperature, to thereby purify noxious components contained in exhaust. When the area A reaches the catalyst activation temperature to start purifying the noxious components in the exhaust, the heat of catalytic reactions increases the temperature of the other areas. As the catalytic reactions advance, the heat of the reactions begins to heat a main catalytic converter.

In this way, the 29th embodiment promptly heats the area A to the catalyst activation temperature at low engine temperature and quickly purifies exhaust. Since only the area A of the catalyst carrier 502 is electrically heated, power consumption for heating the carrier 502 is greatly reduced.

Figure 68:
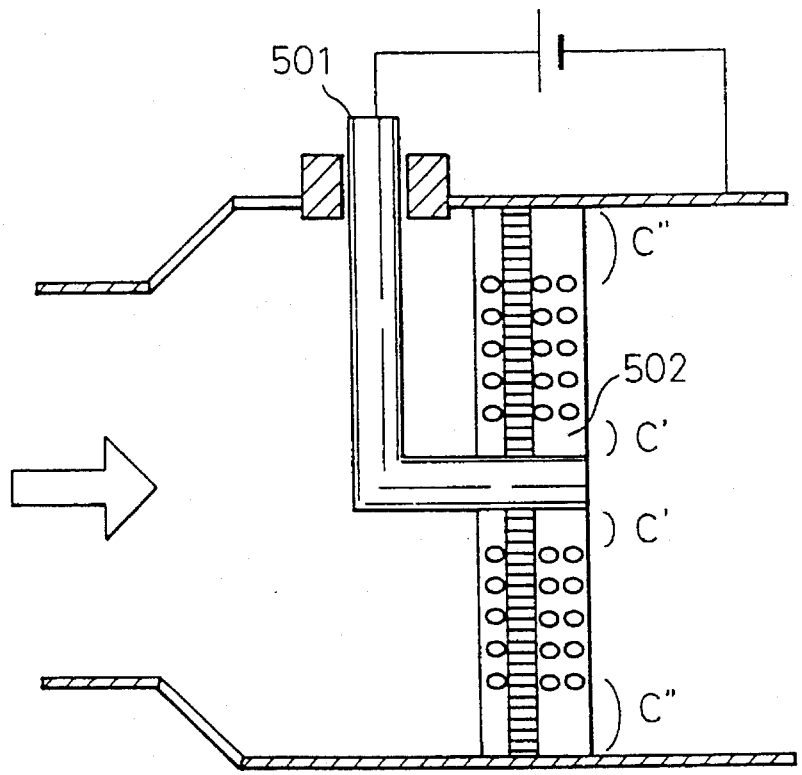
FIG. 68 is a longitudinal section showing an electrically heating catalytic converter according to a 30th embodiment of the present invention.
Figure 69:
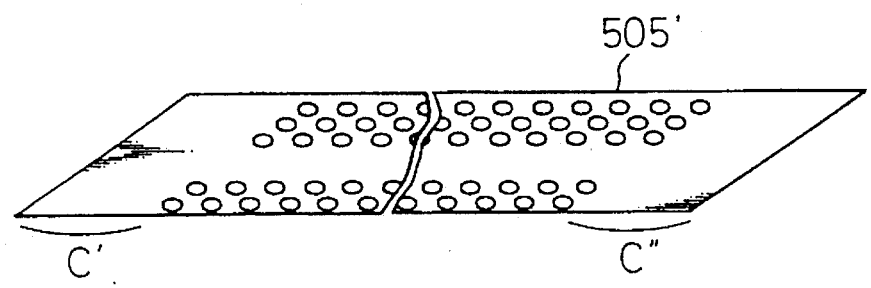
FIG. 69 is a perspective view showing a flat sheet according to the 30th embodiment.
Figure 70:
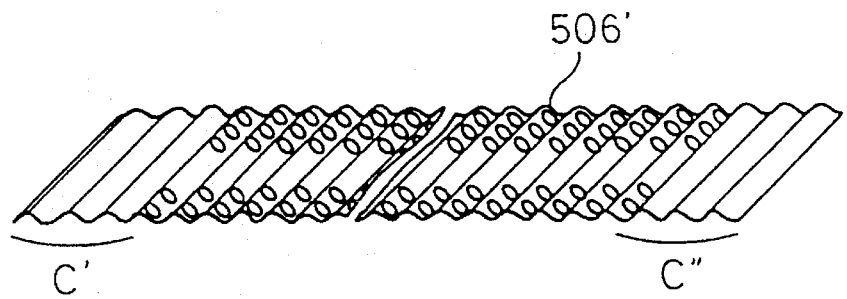
FIG. 70 is a perspective view showing a corrugated sheet according to the 30th embodiment.

FIGS. 68 to 70 show a catalytic converter according to a 30th embodiment of the present invention. The 30th embodiment has a different heating area from the 29th embodiment. Only the difference will be explained. A catalyst carrier 502 of the 30th embodiment has an area C' adjacent to a positive electrode 501 and an area C" adjacent to an outer casing. The areas C' and C" have no adjusting holes 507. The carrier 502 is made of a flat sheet 505' and a corrugated sheet 506' as shown in FIGS. 69 and 70. The sheets are wound around the positive electrode 501 into the carrier 502. In each of the areas C' and C", the current concentration of the area A is equal to that of the area B, so that the areas C' and C" generate no heat. This results in reducing a heating area and power consumption.

Although the shape of the adjusting holes of the 29th and 30th embodiments is circle, the shape may be rectangle, slit, or any other. According to the 29th and 30th embodiments, the catalyst carrier 502 locally generates heat when energized, to reduce power consumption.

Figure 71:
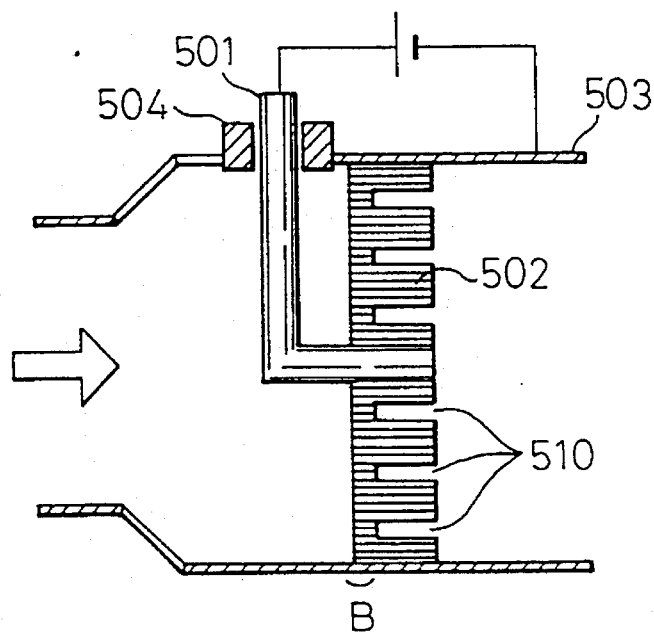
FIG. 71 is a longitudinal section showing an electrically heating catalytic converter according to a 31st embodiment of the present invention.
Figure 72:
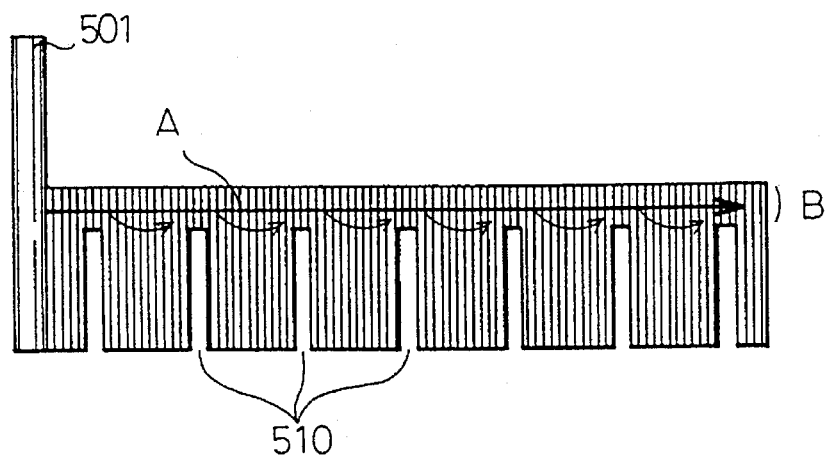
FIG. 72 is an extended view showing a metal sheet according to the 31st embodiment.

FIGS. 71 and 72 show a catalytic converter according to a 31st embodiment of the present invention. This embodiment forms axial slits on a catalyst carrier, to generate no heat at the slits. The slits cut current paths, so that only the upstream side of the carrier where no slits exist generate heat. This arrangement reduces power consumption. In FIG. 71, a corrugated metal band formed of flat and corrugated metal sheets is wound around a center electrode 501 and stored in an outer casing 503, to form the catalyst carrier. The center electrode 501 is guided to the outside through an insulation material 504. FIG. 72 shows an extended view of the metal band 502 connected to the center electrode 501. The slits 510 are formed on the corrugated band 502 in parallel with the center electrode 501. These slits are formed before the band 502 is wound around the center electrode 501.

When a voltage is applied to the center electrode 501 and outer casing 503, a current flows in the direction of an arrow mark A. An area B defined on the upstream side of the band 502 is the only area that generates heat because the area B has high current density. Since the current collectively flows through the area B having a small heat mass, the temperature of catalyst rapidly increases even with small electric power. When the catalyst in the upstream area B speedily reaches a catalyst activation temperature, incompletely burnt components in exhaust are burnt, so that the whole catalyst quickly reaches the activation temperature.

Figure 73A:
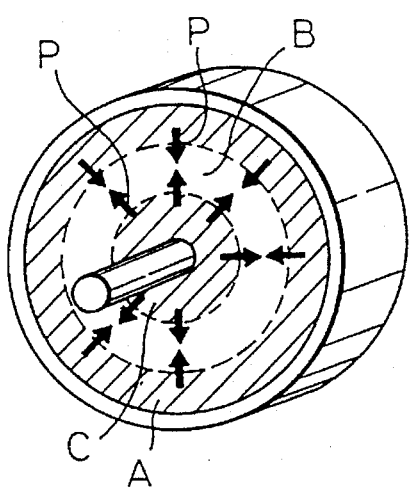
FIG. 73(a) is a perspective view showing an electrically heating catalytic converter according to a 32nd embodiment of the present invention.
Figures 73B, 73C:
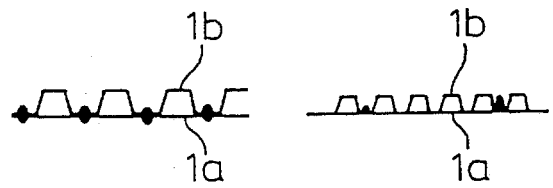
FIG. 73(b) is a view showing metal sheets of a rigid structure according to the 32nd embodiment.
FIG. 73(c) is a view showing metal sheets of a soft structure according to the 32nd embodiment.

FIG. 73 shows a catalytic converter according to a 32nd embodiment of the present invention. When a flat sheet 1a and a corrugated sheet 1b are attached to each other with every valley or crest being spot-welded as shown in FIG. 73(b), rigidity against axial compression force will be excessively strong. As a result, when the sheets 1a and 1b are exposed to high temperatures under high engine load, the sheets 1a and 1b will thermally expand to cause large thermal stress, which may crush the corrugation or bend the flat sheet. It is possible to attach the flat sheet 1a and corrugated sheet 1b to each other with, for example, every fifth valley or crest being welded as shown in FIG. 73(c). This technique reduces radial rigidity and provides a soft structure, which may be dislocated toward a downstream side due to the pressure of exhaust, to cause a scooping phenomenon.

Accordingly, the 32nd embodiment employs both the rigid and soft structures. The soft structure absorbs thermal expansion, to improve thermal durability. As shown in FIG. 73, in areas A and C in the vicinities of an outer casing and a center electrode, every valley or crest of the corrugated sheet 1b is welded to the flat sheet 1a to form the rigid structure of FIG. 73(b). In an intermediate area B between the areas A and C, every fifth valley or crest of the corrugated sheet 1b is spot-welded to the flat sheet 1a, to form the soft structure of FIG. 73(c). When the catalytic converter is subjected to high temperatures, the rigid structures A and C will cause thermal expansion P, which is absorbed by the soft structure B, to thereby prevent crush of the corrugations. At the same time, the rigid structures A and C prevent the scoping that the converter is deformed toward the downstream side due to the pressure of exhaust.

Figure 74:
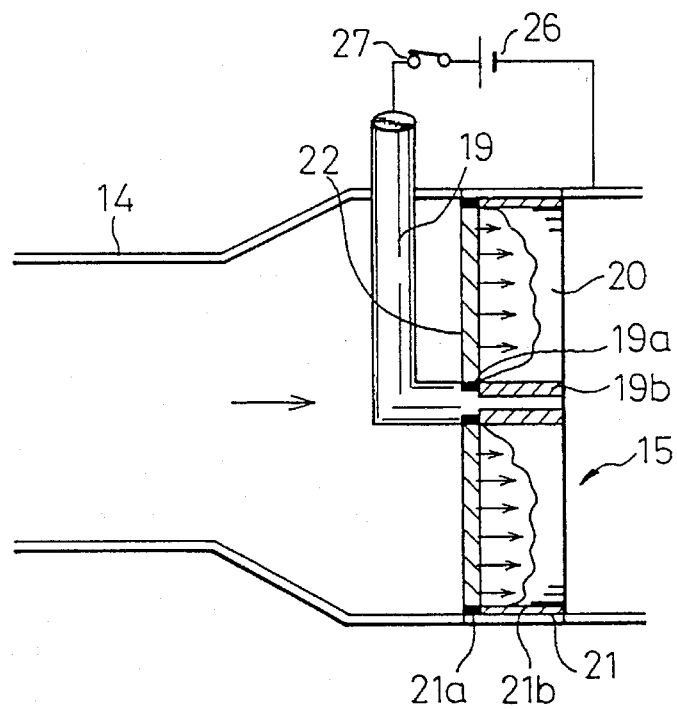
FIG. 74 is a longitudinal section showing an electrically heating catalytic converter according to a 33rd embodiment of the present invention.

FIG. 74 shows a catalytic converter according to a 33rd embodiment of the present invention. This embodiment is basically the same as the embodiment of FIG. 5. The same parts as those of FIG. 5 are represented with like reference marks, and only the difference of the 33rd embodiment from FIG. 5 will be explained.

A center electrode 19 is connected to a catalyst carrier 20. The center electrode 19 involves a conductive part 19a at an upstream end where short-circuit paths 22 are formed. Except the conductive part 19a, the center electrode 19 is covered with an insulation layer 19b to insulate the center electrode 19 from the catalyst carrier 20. Similarly, an outer casing 21 connected to the carrier 20 involves a conductive part 21a at an upstream end adjacent to the short-circuit paths 22. The other part of the outer casing 21 is covered with an insulation layer 21b to insulate the casing 21 from the carrier 20. This arrangement collectively supplies electricity to the narrow areas involving the parts 19a and 21a, to locally heat catalyst.

Figure 75A:
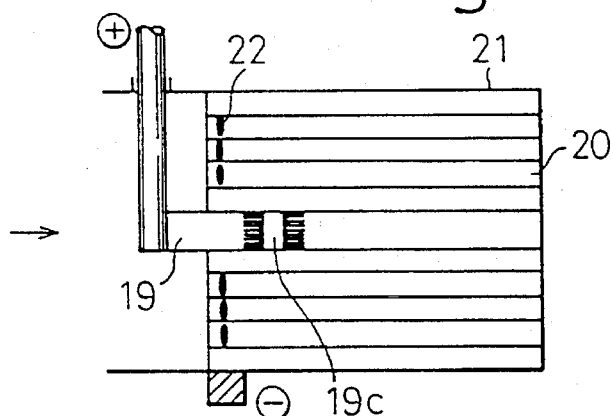
FIG. 75(a) is a longitudinal section showing an electrically heating catalytic converter according to a 34th embodiment of the present invention.
Figure 75B:
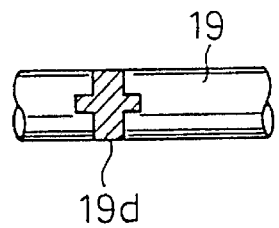
FIG. 75(b) is a view showing a part of a center electrode according to the 34th embodiment.
Figure 75C:
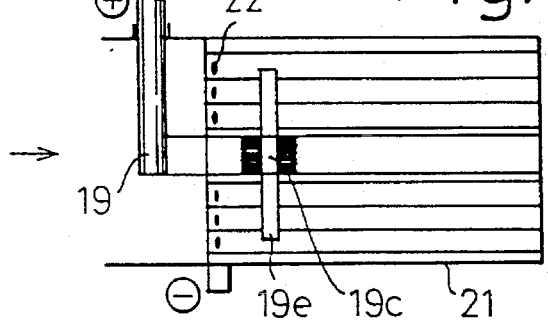
FIG. 75(c) is a longitudinal section showing a modification of the 34th embodiment.

FIG. 75 shows a catalytic converter according to a 34th embodiment of the present invention. Similar to the 33rd embodiment, a center electrode 19 is connected to a catalyst carrier 20. As shown in FIG. 75(a), the center electrode 19 has a clearance 19c so that the electrode 19 is conductive to the carrier 20 only in an area corresponding to heat generation zones 22. Alternatively, an insulation material 19d is inserted into the center electrode 19 as shown in FIG. 75(b), to provide the same insulation effect as FIG. 75(a). Instead, a clearance 19c may be formed in the middle of the center electrode 19, to cut a current path of the electrode 19 as shown in FIG. 75(c). In this case, a radial slit 19e is formed in the carrier 20 behind the heat generation zones 22. The carrier 20 is made of flat and corrugated metal sheets wound around the center electrode 19. The 34th embodiment limits a current path to the upstream side of the carrier 20, to shorten an electric circuit and efficiently generate heat.

As explained above, the 33rd and 34th embodiments shorten or narrow an electric circuit, to save power.

Figure 76:
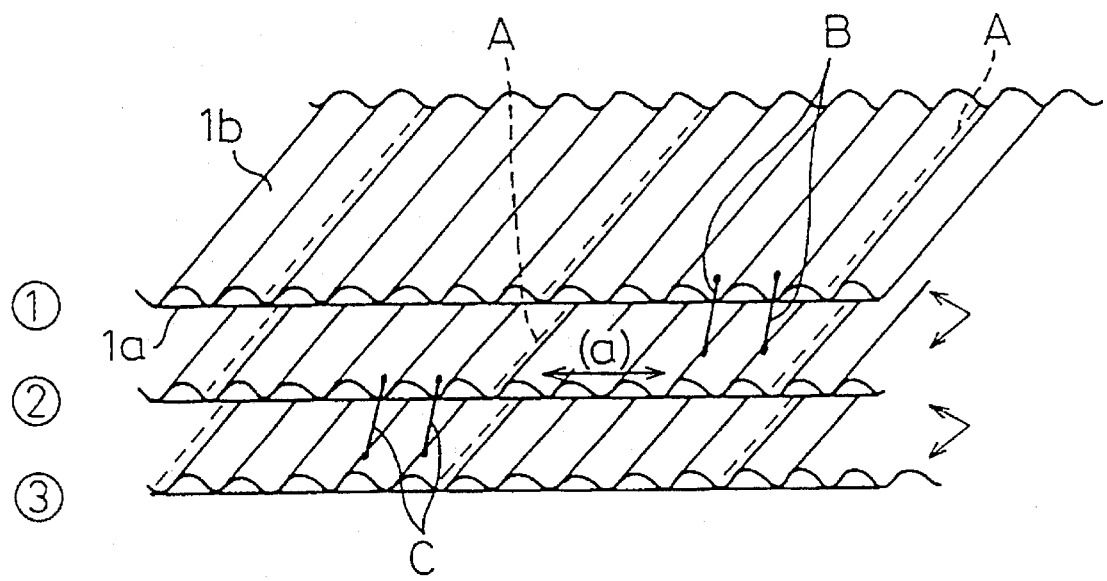
FIG. 76 is a view showing a state of jointing metal sheets of an electrically heating catalytic converter according to a 35th embodiment of the present invention.

FIG. 76 shows a catalytic converter according to a 35th embodiment of the present invention. Flat and corrugated oxide metal sheets 1a and 1b are laminated one upon another, and every fifth valley or crest of the corrugated sheet 1b is spot-welded to the flat sheet 1a as indicated with a reference mark A, to form a corrugated band. The band is wound around a center electrode, to form a catalyst carrier. Adjacent layers of the band are welded to each other at optional positions with laser. Namely, layers 1 and 2 are joined with each other at positions B with a valley of the layer 1 being joined with a crest of the layer 2. Similarly, the layers 2 and 3 are joined with each other at positions C with a valley of the layer 2 being joined with a crest of the layer 3.

When a current flows from the layer 3 toward the layer 1, the current passes only for a distance "a" between the position A adjacent to the position C and the position B in the intermediate layer 2. Namely, electric resistance varies depending on the laser weld positions. Accordingly, the 35th embodiment determines in advance the distance between the laser weld positions B and C, the spot welding positions A, and the number of the spot welding positions, to stabilize resistance.

Figure 77:
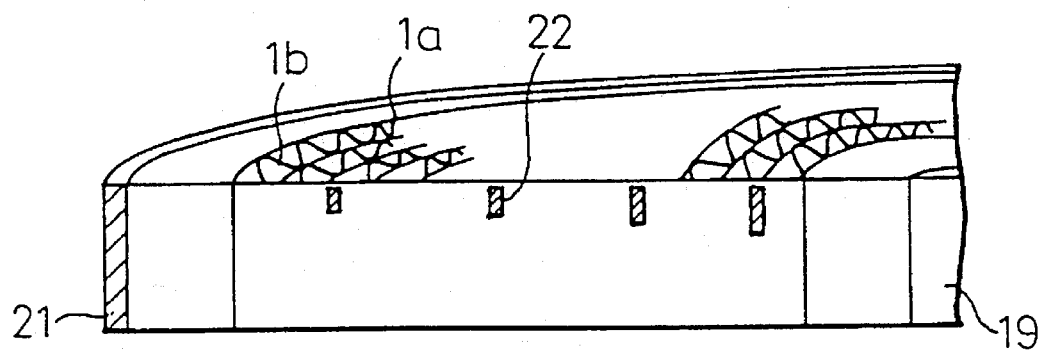
FIG. 77 is a perspective sectional view showing a part of an upstream end of an electrically heating catalytic converter according to a 36th embodiment of the present invention.

FIG. 77 shows a part of a catalytic converter according to a 36th embodiment of the present invention. This embodiment laser-welds a flat sheet 1a and a corrugated sheet 1b, or a combinations of them together, to form axial hot spots 22. The hot spots have different axial lengths depending on their positions. For example, the hot spots 22 adjacent to a center electrode 19 are long, and the hot spots 22 adjacent to an outer casing 21 are short. As a result, optional heat quantities are achievable at optional positions in the catalytic converter.

Figure 78:
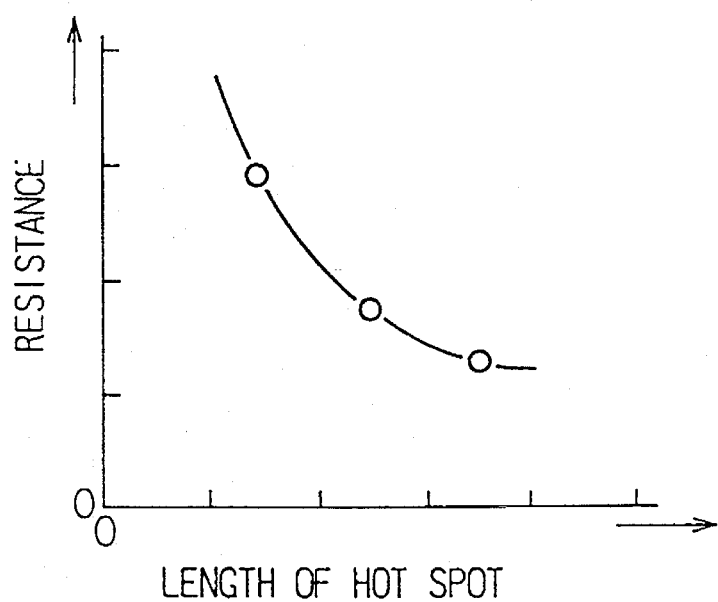
FIG. 78 is a graph showing a relationship between the length of a hot spot and the resistance thereof.

FIG. 78 shows a relationship between the length of a hot spot and the resistance thereof. The longer the length of a given hot spot, the lower the resistance thereof and the higher the heat quantity thereat.

Figure 79:
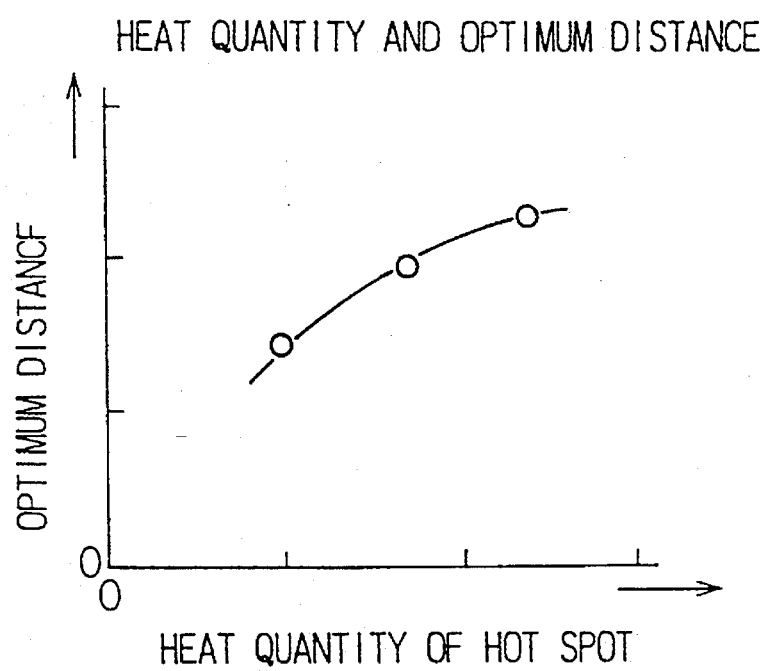
FIG. 79 is a graph showing a relationship between the heat quantity of a hot spot and an optimum distance.

FIG. 79 shows a relationship between the heat quantity at a hot spot and an optimum hot spot distance. The larger the heat quantity, the longer the hot spot distance.

Figure 80A:
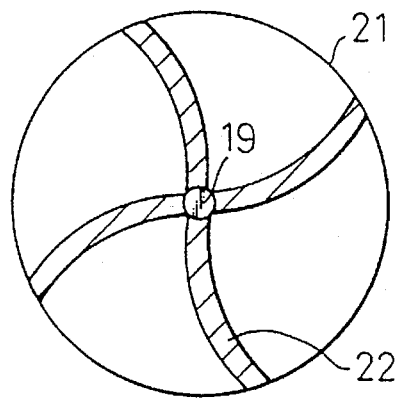
FIG. 80(a) is a front view showing an electrically heating catalytic converter according to a 37th embodiment of the present invention.
Figure 80B:
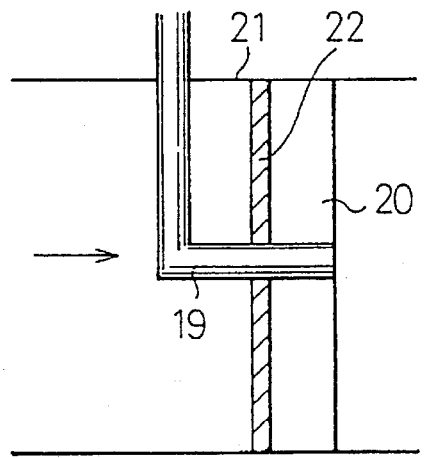
FIG. 80(b) is a longitudinal section showing the 37th embodiment.

FIGS. 80(a) and 80(b) show a catalytic converter according to a 37th embodiment of the present invention. In FIG. 80(a), a hatched area corresponds to a heat generation area 22, which is disposed on an upstream end face of a catalyst carrier. The heat generation area 22 is curved. In this way, the heat generation area 22 may have an optional pattern.

Figure 80C:
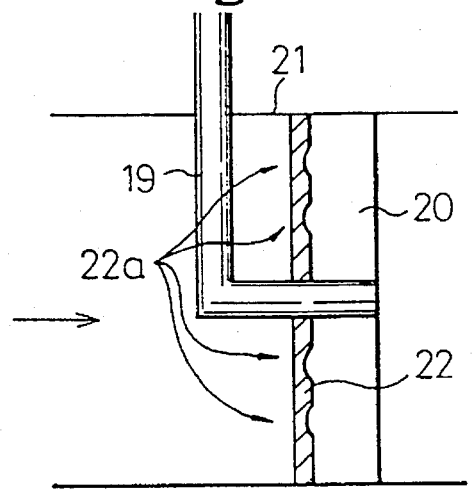
FIG. 80(c) is a longitudinal section showing a modification of the 37th embodiment.

FIG. 80(c) shows a modification of the 37th embodiment. This modification employs a heat generation area 22 having axial short sections 22a. Each of the short sections 22a is formed by shortening a joint length, to positively increase the quantity of heat generated by the section.

Figure 81:
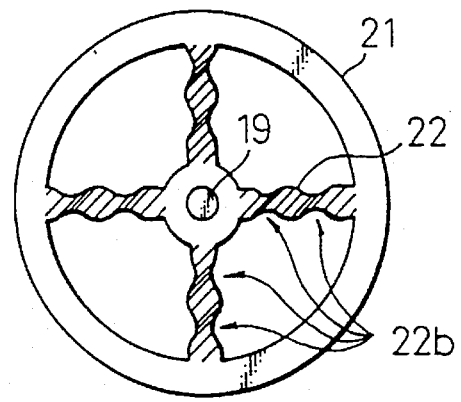
FIG. 81 is a front view showing an electrically heating catalytic converter according to a 38th embodiment of the present invention.

FIG. 81 shows a catalytic converter according to a 38th embodiment of the present invention. This embodiment employs a heat generation area 22 having a cross shape and narrowed parts 22b. The narrowed parts 22b locally provide larger heat quantities to speedily start catalytic reactions. This results in improving the performance of the converter and reducing power consumption.

Figure 82A:
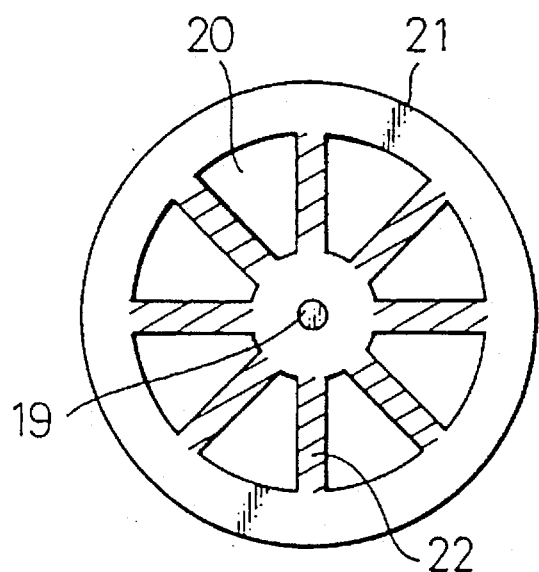
FIG. 82(a) is a front view showing an electrically heating catalytic converter according to a 39th embodiment of the present invention.
Figure 82B:
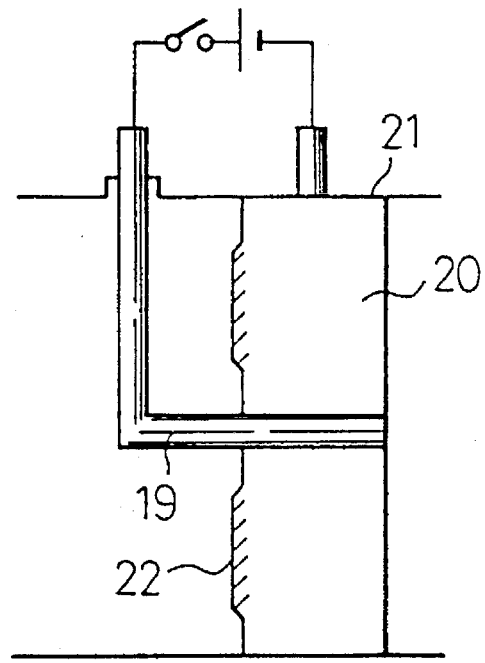
FIG. 82(b) is a longitudinal section showing the 39th embodiment.
Figure 83:
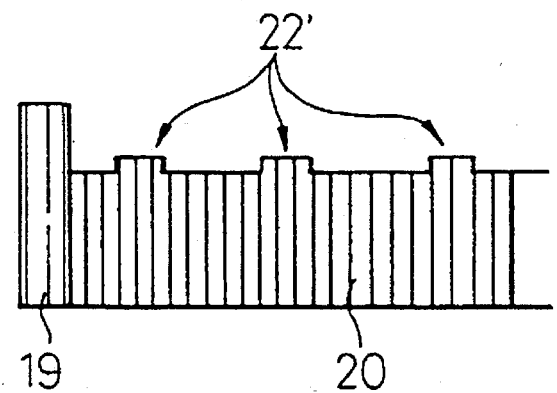
FIG. 83 is a view showing an extended metal sheet according to the 39th embodiment.
Figure 84:
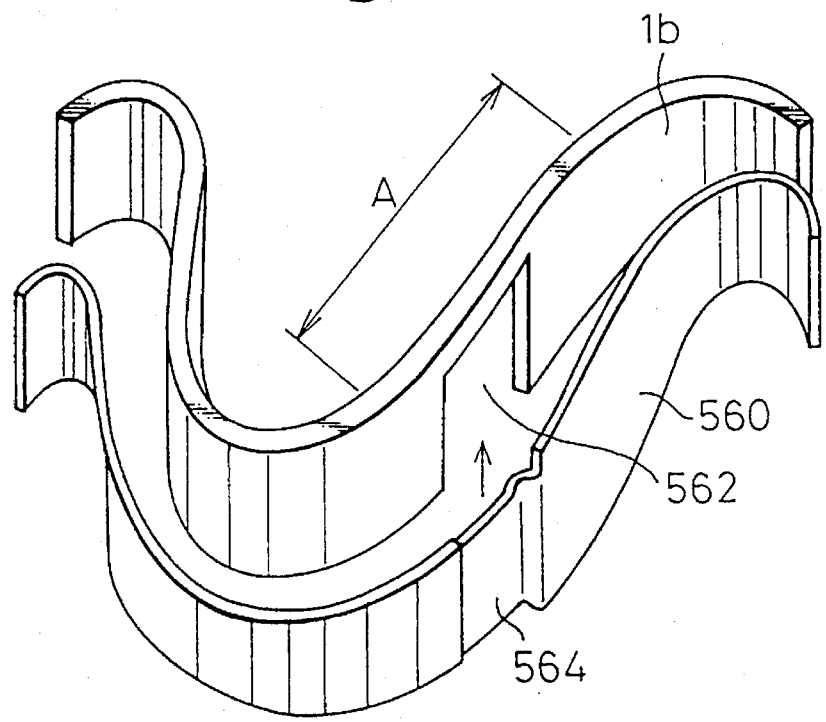
FIG. 84 is a perspective view showing part of metal sheets of an electrically heating catalytic converter according to a 40th embodiment of the present invention.
Figure 85A:
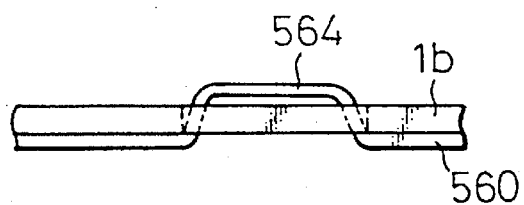
FIGS. 85(a), 85(b) and 85(c) are views showing a bridge formed on the metal sheet of the 40th embodiment, seen in three different directions.
Figures 85B, 85C:
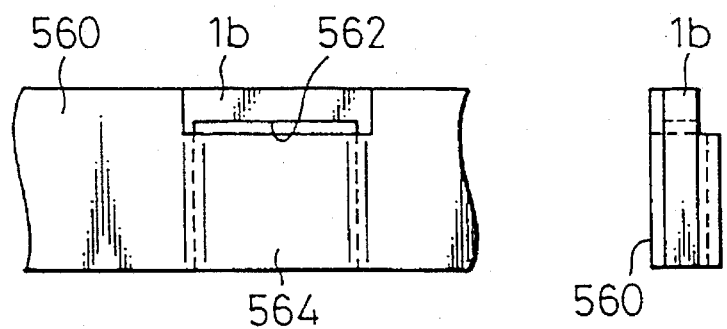

FIGS. 82(a), 82(b), and 83 show a catalytic converter according to a 39th embodiment of the present invention. This embodiment forms surface heat generation paths 22 of optional pattern on an upstream end face of a catalyst carrier 20. The paths 22 protrude from the upstream end face that generates no heat. This arrangement reduces an escape of heat and promotes the heat generation effect of the paths 22. To fabricate the paths 2, projections 22' are formed on metal sheets or on a combination of flat and corrugated metal sheets before the sheets are wound around a center electrode 19, so that the projections 22' may be continuous to form the protruding heat generation paths 22 once the sheets are wound around the center electrode 19.

FIGS. 84 to 88 show a catalytic converter according to a 40th embodiment of the present invention. A flat sheet 1a and a corrugated sheet 1b are wound around a center electrode 19, to form a catalyst carrier. At least one of the wound sheets 1a and 1b (in the figure, the corrugated sheet 1b) is provided with an insulation space 562 at each position A where the corrugated and flat sheets are not in contact with each other. The insulation space 562 (the position A provided with the space 562 is referred to as the bridge) is prepared by cutting the position A with only an axial upstream end being left for several millimeters. A reinforce sheet 560 covered with an oxide insulation film, etc., is attached to the corrugated sheet 1b. The reinforce sheet 560 has projections 564 engaging with the spaces 562. The reinforce sheet 560 is attached to the corrugated sheet 1b by lamination or by winding.

Figure 86:
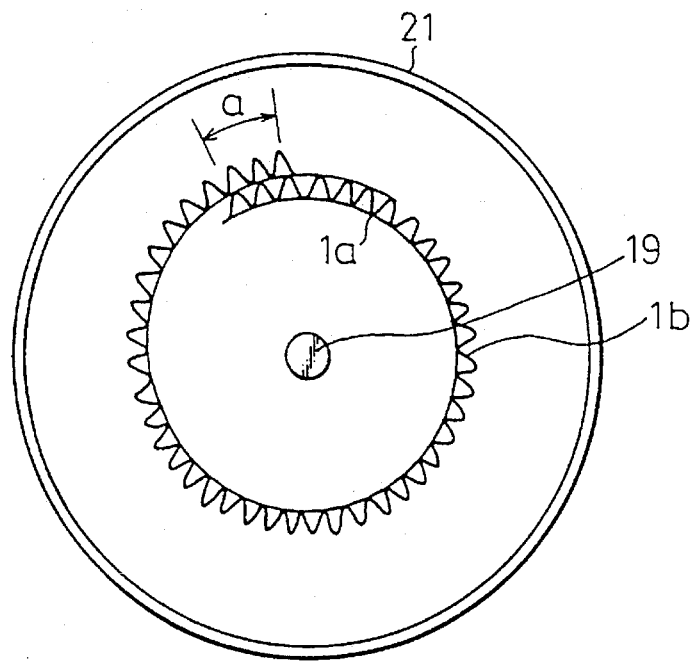
FIG. 86 is a plan view showing an electrically heating catalytic converter according to the 40th embodiment.
Figure 87:
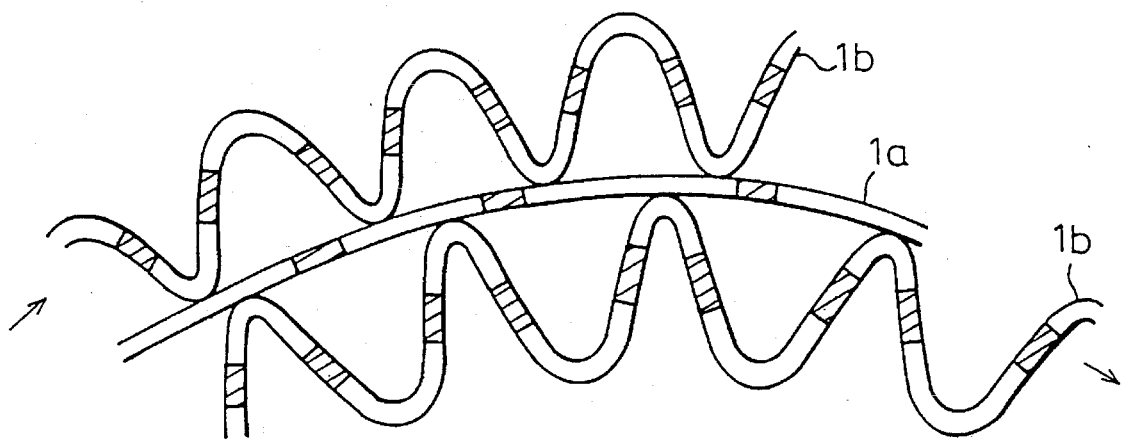
FIG. 87 is an enlarged view showing the bridges of the 40th embodiment.

In FIG. 86, the flat and corrugated sheets 1a and 1b are wound around the center electrode 19. The flat and corrugated sheets 1a and 1b in an area "a" are provided with the bridges. FIG. 87 is an enlarged view showing the area "a" of FIG. 86. In the figure, the reinforce sheet 560 is omitted. In this way, the bridges in the area "a" narrow current paths, to collect a current flowing from the center electrode (positive electrode) 19 toward an outer casing (negative electrode) 21 to the bridges, to thereby generate heat at the bridges. This arrangement is so structured that the current must pass the bridges to reach the grounding (outer casing) 21. In FIG. 87, hatched parts correspond to the insulation spaces 562, i.e., the narrowed current paths.

Figure 88A:
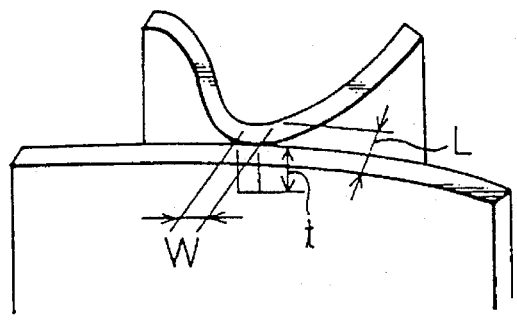
FIG. 88(a) is a view showing an example with no bridges.
Figure 88B:
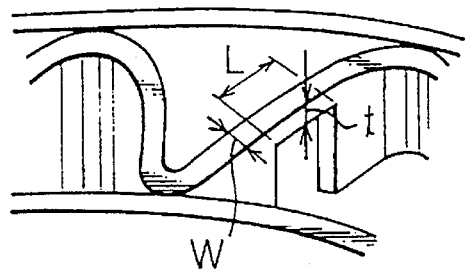
FIG. 88(b) is a view showing the 40th embodiment with the bridges.
Figure 89A:
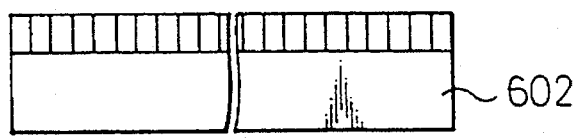
FIG. 89(a) is a plan view showing a pair of metal sheets of an electrically heating catalytic converter according to a 41st embodiment of the present invention.
Figure 89B:
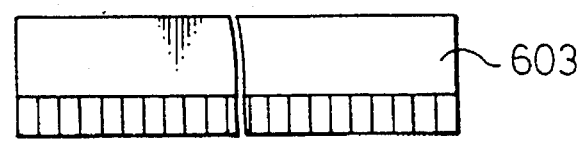
FIG. 89(b) is a plan view showing another pair of metal sheets according to the 41st embodiment.
Figure 89C:
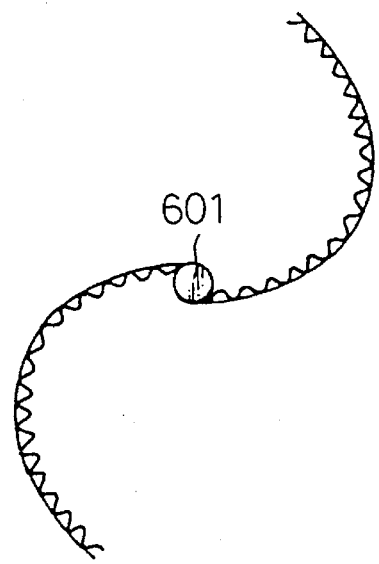
FIG. 89(c) is a view showing a process of winding the metal sheet pairs around a center electrode according to the 41st embodiment.

FIG. 88(a) shows a part with no bridge, and FIG. 88(b) shows a part with a bridge. In FIG. 88(a), a joint between a corrugated sheet and a flat sheet corresponds to a narrowed current path serving as a hot spot. To secure the strength and durability of the joint, the area of the joint must be large. On the other hand, to reduce power consumption, the area of the joint must be small to provide a narrow current path.

In FIG. 88(a), the depth t of the joint, i.e., a hot spot must be 3.0 mm or over to secure structural strength. The thickness L of the hot spot is equal to the thickness of two sheets. For example, L=100 micrometers=0.1 mm. The width W of the hot spot is in the range of 50 to 200 micrometers due to fluctuations in winding pressure. Then, the resistance R of the hot spot is expressed as follows:

$$R = Pr \cdot [L/(W \cdot t)] \cdot 1/N$$

where Pr is a specific resistance (ohm cm) and N is the number of current paths. If W fluctuates, the resistance R also fluctuates, so that heat will not be uniformly generated. Since L is determined by the thicknesses of the sheets, the resistance R will be increased if the joint is thickened in a radial direction. This, however, has a limit. Namely, the cross-sectional area, i.e., the radius of a catalytic converter is limited. Increasing t will be advantageous in improving the durability of the joint, but it will increase power consumption. In addition, inaccuracy in the width of brazing that determines t will fluctuate the resistance R. For example, the resistance R of a current path formed by one hot spot is calculated as follows:

$$R = 0.004 \times [0.01/(0.005 \text{ to } 0.020)] \times 0.3 = 0.027 \text{ to } 0.007 \text{ (ohms)}$$

Namely, the resistance R involves four times of fluctuations.

When the bridge of FIG. 88(b) is employed, a current path formed by the bridge is not affected by the pressing force of the sheets, so that the resistance R of the current path is as follows:

$$R = 0.004 \times 0.05/0.005 \times 0.3 = 0.133 \text{ (ohms)}$$

The resistance R is large and fluctuations are reduced because fluctuations in W are limited to fluctuations in the thickness of the sheet.

Figure 90:
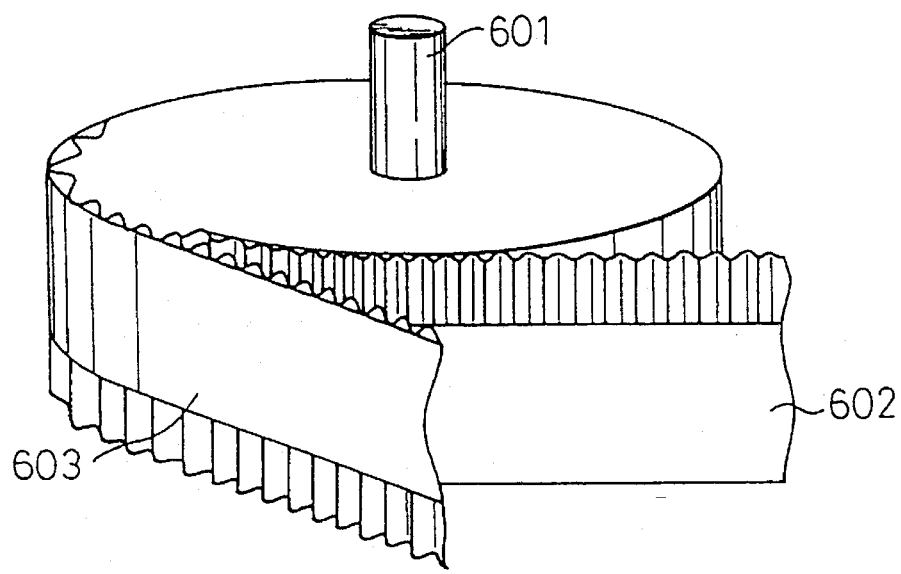
FIG. 90 is a perspective view showing the process of winding the metal sheet pairs around the center electrode according to the 41st embodiment.
Figure 91:
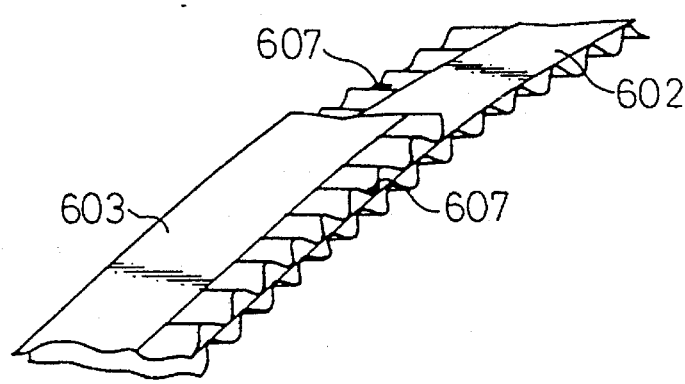
FIG. 91 is a perspective view showing a joint of the metal sheet pairs according to the 41st embodiment.
Figure 92:
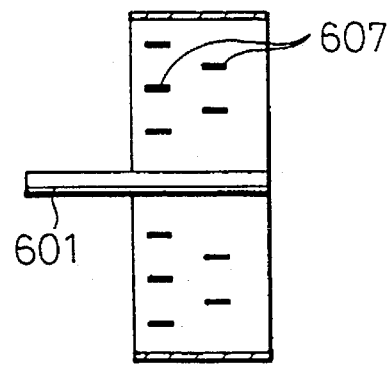
FIG. 92 is a longitudinal section showing a completed catalyst carrier according to the 41st embodiment.

FIGS. 89 to 92 show a catalytic converter according to a 41st embodiment of the present invention. This embodiment employs a corrugated sheet and a flat sheet with the width of the flat sheet being narrower than that of the corrugated sheet. The sheets are joined to each other into a corrugated band 602 (FIG. 89(a)) with the no-flat part being positioned on an upstream side, and into a corrugated band 603 (FIG. 89(b)) with the no-flat part being positioned on a downstream side. The two types of bands 602 and 603 are alternately wound around a center electrode 601 into a catalyst carrier as shown in FIGS. 89(c) and 90. Hot spots 607 are formed by laser welding, etc. In this case, valleys in the no-flat part of a layer of the bands 602 and 603 are welded to the flat-part of an adjacent inner layer of the bands at positions 607 by laser. As a result, the hot spots 607 are alternately formed on the upstream and downstream sides in the catalyst carrier as shown in FIG. 92. To form the heat spots 607 alternately at the upstream and central positions, the width of the flat sheet of the band 603 must be narrower.

Figure 93:
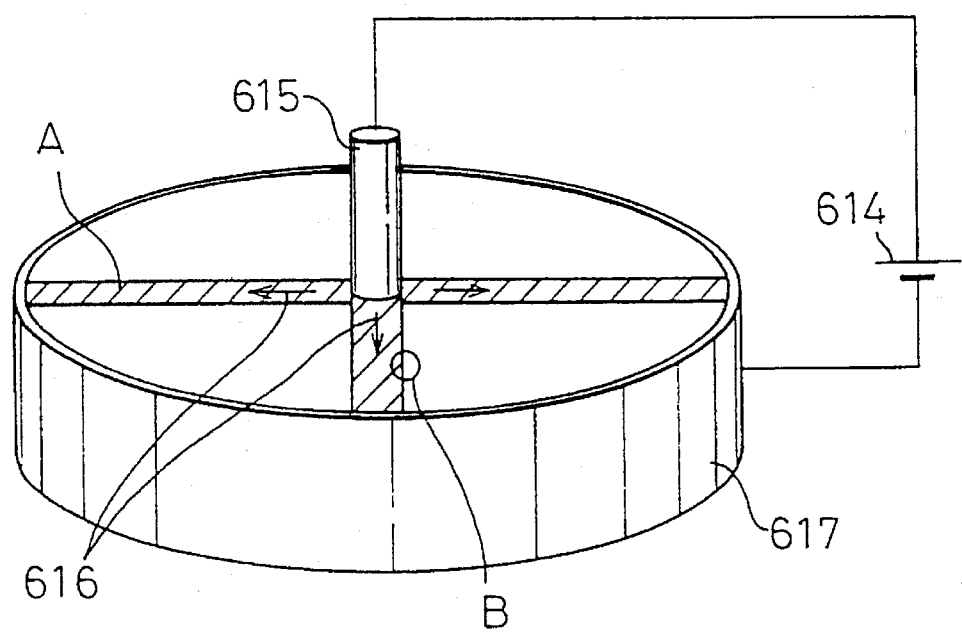
FIG. 93 is a perspective view showing a catalyst carrier according to a 42nd embodiment of the present invention.
Figure 94:
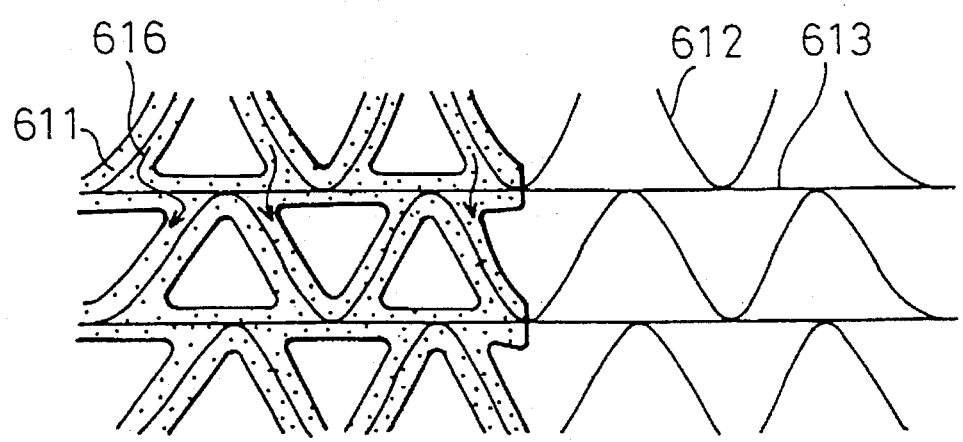
FIG. 94 is an enlarged view showing brazed parts in an area B of FIG. 93.
Figure 95:
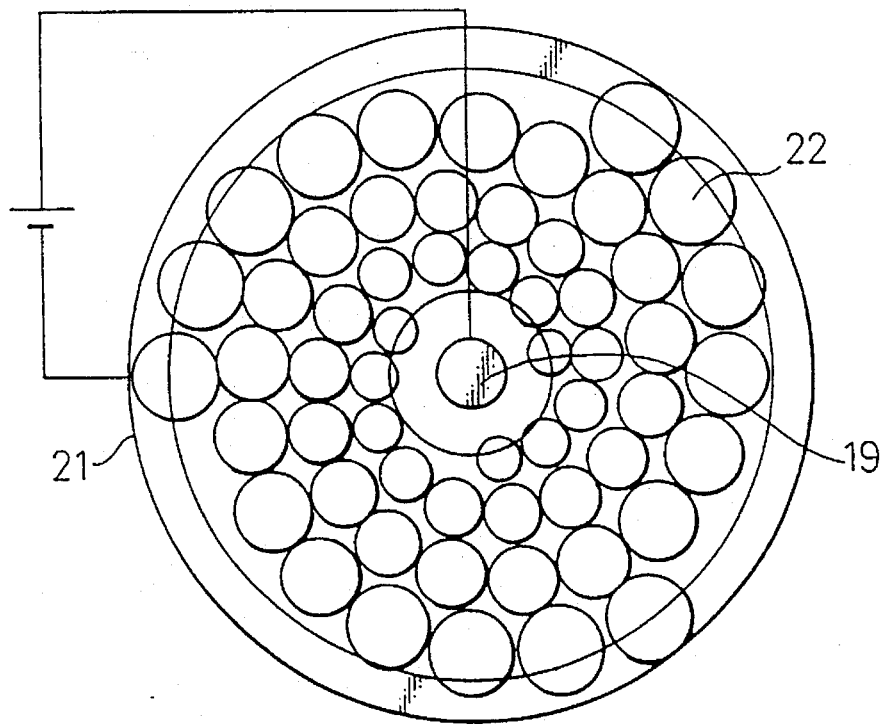
FIG. 95 is a front view showing a catalyst converter according to a 43rd embodiment of the present invention.

FIG. 93 shows a catalytic converter according to a 42nd embodiment of the present invention. FIG. 94 is an enlarged view showing a part B of FIG. 93. A hatched area A of FIG. 93 is coated with brazing material 611 to cover layers of corrugated and flat sheets 612 and 613 that form a catalyst carrier, to form current paths on an upstream end face of the catalyst carrier. A current 616 flows from a battery 614 to a center electrode 615 and then to an outer casing 617 through the current paths.

FIGS. 95 to 98 are views showing a catalytic converter according to a 43rd embodiment of the present invention. A flat metal sheet 1a and a corrugated metal sheet 1b, each coated with an insulation film, are wound in a spiral shape around a center electrode 19, to form a catalyst carrier. These sheets are partly welded to each other by laser to form hot spots 22. To uniformly heat the whole surface of the catalyst carrier, it is necessary to equidistantly arrange the hot spots 22. Since current paths are oriented from the center toward the periphery of the carrier, the hot spots 22 become more sparse from the center toward the periphery. Then, it is impossible to uniformly heat the carrier as a whole.

Figure 96:
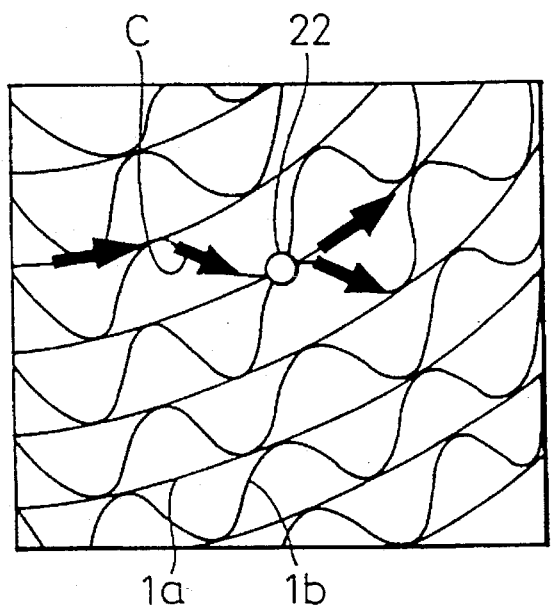
FIG. 96 is an enlarged view showing part of an end face of the 43rd embodiment.

For example, three bands each made of the flat and corrugated metal sheets 1a and 1b are wound around the center electrode 19 starting from three equiangular positions on the electrode 19, and crests of the corrugated sheets 1b are welded to the flat sheet 1a by laser at regular intervals (for example, intervals of five crests), to form a catalyst carrier. A current C flows from the center electrode 19 toward the outer casing 21 always through nearest joints as shown in FIG. 96. As a result, the concentration of the hot spots becomes thinner from the center toward the periphery as shown in FIG. 97. Namely, a distance between the adjacent hot spots becomes larger from the center toward the periphery. Accordingly, the heat generation quantities of the hot spots 22 are set to become larger as they approach the periphery, as indicated with circles in FIG. 95. To change the heat generation quantities of the hot spots 22, the length of each hot spot in the direction of an exhaust flow is changed to change the resistance thereof, as shown in FIG. 78, when the spot is laser welded. Similar to the embodiment of FIG. 77, the hot spots made by laser welding are shortened as they are spaced away from the center electrode, to increase the resistance thereof and the heat generation quantity thereof determined by the resistance and a current ($Ri^2$).

FIG. 98(a) shows an example of an equidistant arrangement of hot spots. FIG. 98(b) shows an example of a variable distance arrangement of hot spots. In FIG. 98(b), the hot spots 22 are substantially uniformly distributed. In FIG. 98(a), the ratio of a radial distance "b" to a circumferential distance "a" becomes larger as the hot spots 22 approach the periphery. In FIG. 98(b), the ratio of b' to a' is substantially unchanged irrespective of the positions of the hot spots 22.

Figure 99:
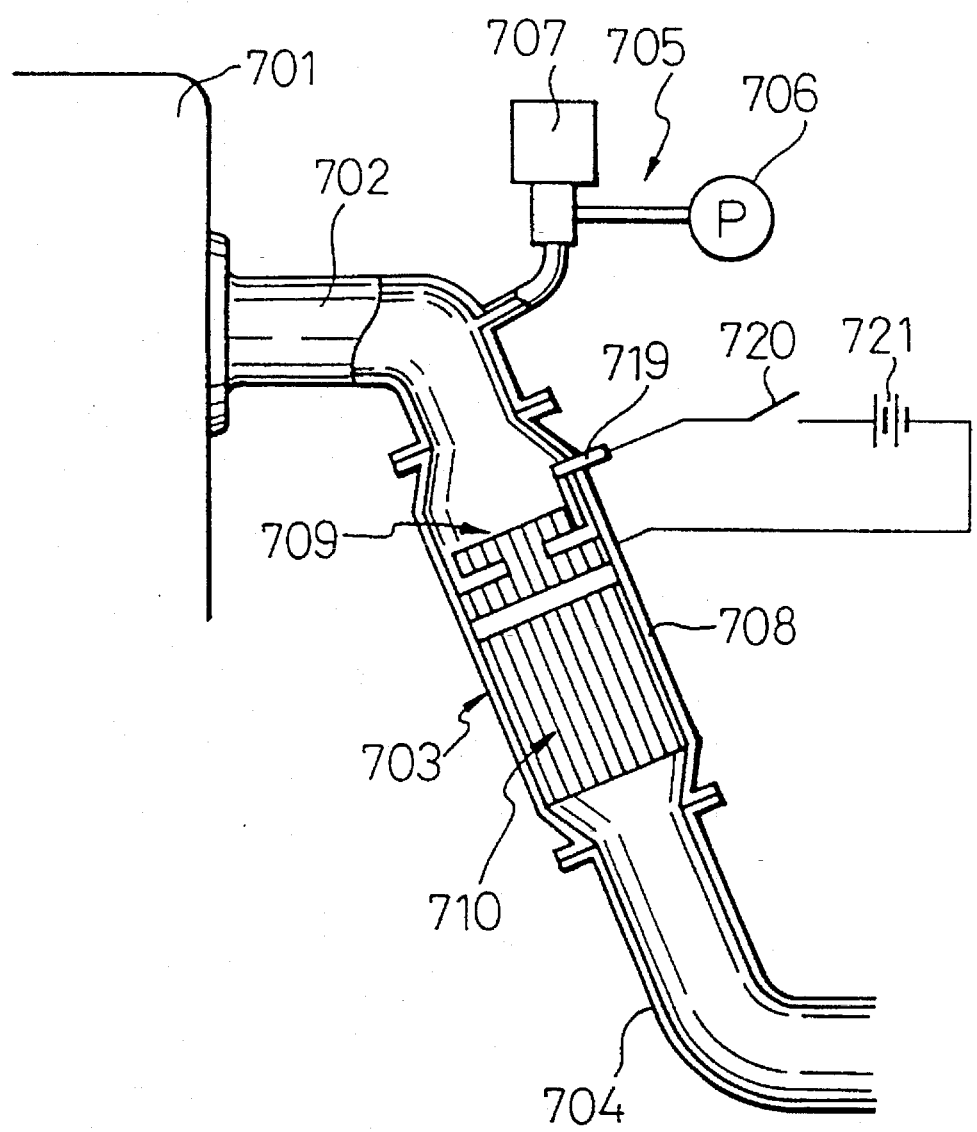
FIG. 99 shows an exhaust path from an engine.

Referring to FIG. 99, numeral 701 is an engine, 702 is an exhaust manifold, 703 is a catalytic converter, 704 is an exhaust pipe, 705 is a secondary air supply unit prepared as and when required. The secondary air supply unit 705 includes an air pump 706 driven by the engine and a control valve 707 for controlling the quantity of secondary air supplied to the exhaust manifold 702. The catalytic converter 703 has a casing 708 containing an electrically heating catalyst 709 and a main three-way catalyst 710 arranged behind the catalyst 709.

Figure 100:
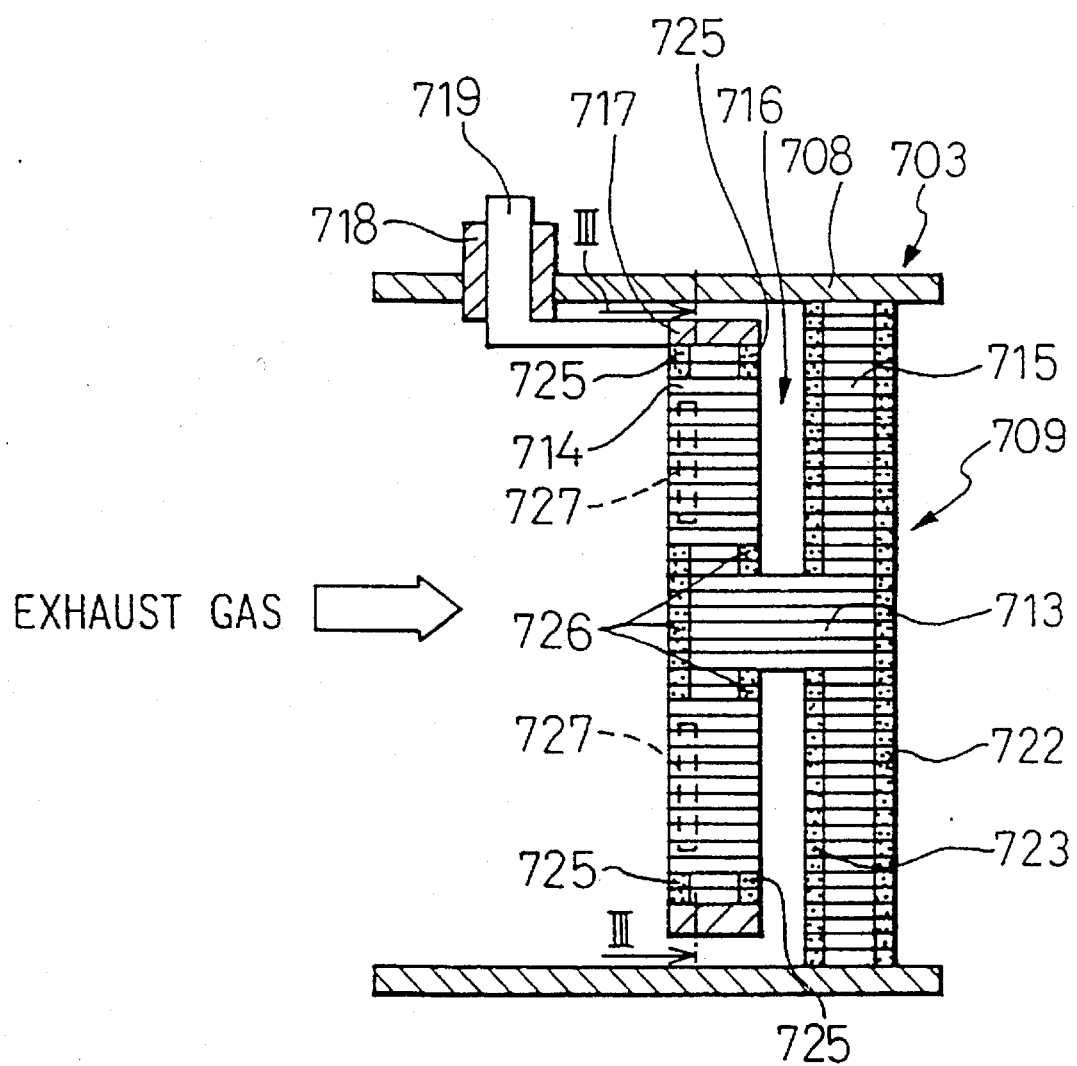
FIG. 100 is a sectional side view showing an electrically heating catalyst according to 44th embodiment.

FIG. 100 shows a 44th embodiment of the electrically heating catalyst 709 incorporated in the catalytic converter 703. In FIG. 103, the catalyst 709 has a resistive flat metal sheet 711 and a resistive corrugated metal sheet 712. The sheets 711 and 712 are alternately laminated around a center axis. The laminated structure has a common core 713, an upstream laminated structure 714, and a downstream laminated structure 715. The upstream structure 714 radially outwardly extends from the core 713 to the vicinity of the inner face of the casing 708. The downstream structure 715 radially outwardly extends from the core 713 up to the inner face of the casing 708. Each of the structures 714 and 715 has a disk shape having a substantially uniform axial width. An insulation space 716 is defined between the structures 714 and 715. The space 716 extends outwardly from the core 713.

The periphery of the upstream laminated structure 714 is welded to the inner face of a metal cylinder 717. The metal cylinder 717 is connected with an electrode 719 that protrudes from the casing 703 through an insulator 718. The periphery of the downstream laminated structure 715 is welded to the inner face of the casing 703. In FIG. 99, the electrode 719 is connected to a positive terminal of a power source 721 through a switch 720. A negative terminal of the power source 721 is connected to the casing 708.

The core 713 and structures 714 and 715 are formed with the flat metal sheet 711 and corrugated sheet 712. Both faces of each of the sheets 711 and 712 are coated with an alumina oxide layer that is electrical insulation material. Further, the both faces of each of the sheets 711 and 712 carry three-way catalytic particles so that the laminated structures serve as catalysts. The upstream laminated structure 714 is called the upstream catalyst, and the downstream laminated structure 715 is called the downstream catalyst.

As explained above, each face of the flat and corrugated metal sheets 711 and 712 is coated with the electrically insulating alumina oxide layer. When the switch 720 is turned on, a current flows from the metal cylinder 717, circumferentially passes through the sheets 711 and 712, and reaches the core 713. The current then circumferentially passes the sheets 711 and 712 of the downstream catalyst 715 and reaches the casing 703. At this time, the laminated structures entirely generate heat because the sheets 711 and 712 are resistive. This embodiment, however, causes only part, instead of the whole, of the laminated structures to generate heat. According to the 44th embodiment of FIG. 100, a special process is carried out so that only part of the upstream catalyst 714 generates heat. This special process will now be explained.

In FIG. 100, the downstream catalyst 715 has end face zones 722 and 723 filled with dot marks. In each of the zones 722 and 723, edges of the flat and corrugated metal sheets 711 and 712 are joined together by discharge melting as shown in FIG. 102(b). When each contact 724 is formed, the alumina oxide layer is broken, so that the adjacent sheets 711 and 712 are short-circuited to each other. As a result, a current flows radially in the downstream catalyst 715 through the short-circuited parts. Although the current flows from one short-circuited part to an adjacent short-circuited part through the sheets 711 and 712, a current flowing distance in the sheets 711 and 712 is very short. Accordingly, the downstream catalyst 715 becomes conductive with substantially no radial resistance, and therefore, the downstream catalyst 715 produces substantially no heat.

In FIG. 100, the upstream catalyst 714 has peripheral end face zones 725 and central end face zones 726 filled with dot marks. In these zones, the sheets 711 and 712 are joined together at each contact 724 by discharge melting as shown in FIG. 102(b). Accordingly, the peripheral and central zones of the upstream catalyst 714 are conductive with substantial no resistance in a radial direction, and therefore, produce substantially no heat.

Figure 101:
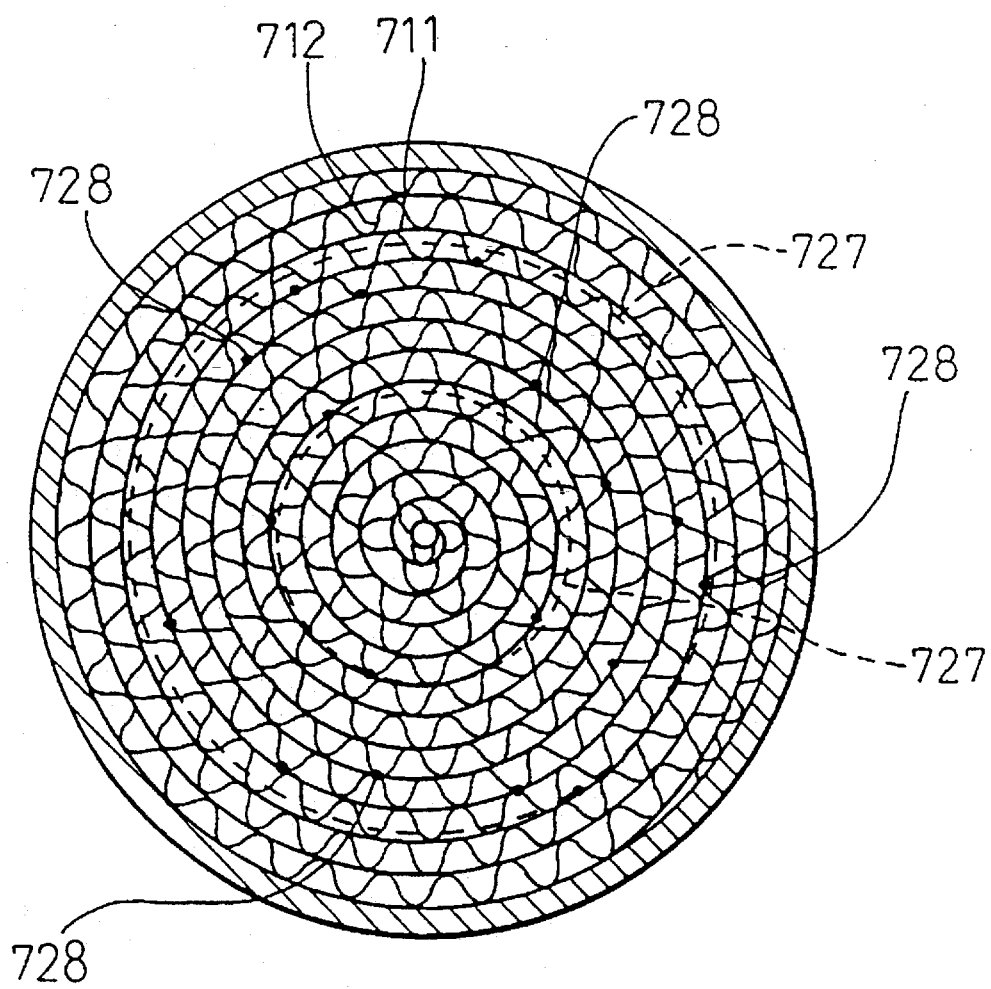
FIG. 101 is a cross section taken along a line III—III of FIG. 100, showing an upstream catalyst.

In FIGS. 100 and 101, the upstream catalyst 714 has a zone 727 surrounded with dash lines. When the flat and corrugated metal sheets 711 and 712 are wound, contacts, between them are partly joined together with a laser beam as indicated with numeral 728 in FIG. 102(a). The joints 728 are uniformly distributed as shown in FIG. 101. When the sheets 711 and 712 are partly joined together with a laser beam, the alumina oxide layer at each joint 728 is broken, so that the sheets 711 and 712 become conductive to each other. The resistance of the joint 728 is very small. As a result, the quantity of a current flowing through the joints 728 becomes quite larger than that of a current circumferentially flowing through the sheets 711 and 712. Accordingly, the joints 728 generate very large Joule heat compared with that generated by the sheets 711 and 712, although the joints 728 have low resistance. The joints 728, therefore, generate heat when a current is supplied to the upstream catalyst 714.

In this way, only the zone surrounded with the dash lines 727 generates heat when a current is supplied to the laminated structure of FIG. 100, and the remaining part generates no heat. As is apparent in FIG. 100, the heating zone 727 is slightly behind the upstream end face of the upstream catalyst 714. This zone 727 may be formed on the upstream end face of the upstream catalyst 714. In any case, when the switch 720 of the 44th embodiment of FIG. 99 is turned on, the annular heating zone 727 between the periphery and center zones of the upstream catalyst 714 generates heat.

The electrically heating catalyst 709 of FIG. 100 is energized as soon as the engine is started. Once it is energized, the heating zone 727 generates heat so that the temperature of the three-way catalyst in the zone 727 quickly increases to an activation temperature. When an air-fuel mixture is rich for a given period after the start of the engine, the engine discharges a large quantity of unburned HC and CO. At this time, the concentration of oxygen in the exhaust gas is very low so that the unburned HC and CO are not oxidized even if the three-way catalyst reaches the activation temperature. Accordingly, when the air-fuel mixture is set to be rich for a certain period after the start of the engine, the secondary air supply unit 705 supplies secondary air once the three-way catalyst reaches the activation temperature, to start the oxidation of the unburned HC and CO.

When the unburned HC and CO start to oxidize in the heating zone 727 due to the secondary air, the oxidation generates a large amount of heat. This heat and the heating action of the exhaust gas quickly increases the temperature of the whole of the upstream catalyst 714 to the activation temperature. As the temperature of the upstream catalyst 714 increases, the heat thereof is transported by the exhaust gas to the downstream catalyst 715. As a result, the temperature of the downstream catalyst 715 also reaches the activation temperature. In this way, the upstream and downstream catalysts 714 and 715 starts to purify the unburned HC and CO within a short time after the start of the engine.

When the upstream catalyst 714 starts the oxidation, heat due to the oxidation increases the temperature of the catalyst 714. Then, the electrically heating catalyst 709 is turned off. After a while, the main three-way catalyst 710 reaches the activation temperature, to start the purification of the unburned HC and CO. During a fast idling operation just after the start of the engine, the quantity of the exhaust gas is small. The unburned HC and CO during this period, therefore, are purified only by the electrically heating catalyst 709. Until the car starts to run, the main three-way catalyst 710 would have reached the activation temperature, so that the catalyst 710 will mainly purify the exhaust gas then.

When the air-fuel mixture is lean or at a theoretical air-fuel ratio just after the start of the engine, the exhaust gas may contain a sufficient quantity of oxygen. In this case, the secondary air supply unit 705 is not required. To start the oxidation of the unburned HC and CO just after the start of the engine, the electrically heating catalyst 709 must be energized before starting the engine.

The unburned HC and CO are actively oxidized in an area where a large quantity of the unburned HC and CO exist, i.e., an area of the catalyst 709 where a large quantity of the exhaust gas passes. In the catalytic converter 703, the flow rate of the exhaust gas is greater in a central part than in a peripheral part. Accordingly, the central part of the upstream catalyst 714 more actively oxidizes the unburned HC and CO and generates more heat of oxidation than the peripheral part thereof. It is preferred not to let the heat escape outside. The heat must be employed to heat the downstream catalyst 715. According to this embodiment, the electrode 719 is connected to the periphery of the upstream catalyst 714 where a small quantity of oxidation heat is generated. Accordingly, only a small quantity of oxidation heat may escape outside through the electrode 719. Most of the heat generated by oxidation in the upstream catalyst 714 is used for heating the downstream catalyst 715, to thereby quickly increase the temperature of the whole of the catalyst 709 up to the activation temperature. The electrode 719 does not block an exhaust gas entering the upstream catalyst 714, so that the central part of the upstream catalyst 714 evenly and quickly start to oxidize the unburned HC and CO.

To efficiently achieve a purification action in the electrically heating catalyst 709, the catalyst 709 must have a predetermined surface area. Namely, the catalyst 709 must have a predetermined axial length. According to this embodiment, the catalyst 709 is provided with the predetermined axial length and divided into the upstream and downstream catalysts 714 and 715 with the insulation space 716 between them. This arrangement has advantages.

A first advantage will be explained. The resistance of the catalyst 709 as a whole must be large to reduce power consumption. When the catalyst 709 is configured to partly generate heat as in the case of the present invention, the heat generation part must have large resistance. When the catalyst 709 is divided into the upstream and downstream catalysts 714 and 715 as shown in FIG. 100, the axial width of the heating zone of the upstream catalyst 714 except the peripheral and central zones thereof becomes narrow to increase the resistance of the heating zone of the catalyst 714. This results in reducing power consumption needed for heating the catalyst 709.

A second advantage will be explained. When the catalyst 709 is electrically heated, a large thermal expansion difference occurs between the catalyst 709 and the casing 703. If the axial length of a joint between the catalyst 709 and the casing 703 is long, a large axial shearing force acts on the joint. When the catalyst 709 is divided into the upstream and downstream catalysts 714 and 715, only the periphery of the downstream catalyst 715 is joined with the casing 703, to thereby shorten the axial length of the joint between the catalyst 709 and the casing 703. Namely, only a small axial shearing force acts on the joint between the catalyst 715 and the casing 703, to thereby prevent a breakage of the joint.

The temperature of an exhaust gas flowing through an exhaust path gradually decreases. Namely, a temperature increasing effect of the exhaust gas is strongest at the upstream end face of the upstream catalyst 714. This means that, if the upstream end face of the upstream catalyst 714 generates heat, the catalyst 709 will be locally heated to the activation temperature in a shortest time compared with heating the other parts of the catalyst. This is why the 44th embodiment arranges the heating zone 727 in the vicinity of the upstream end face of the upstream catalyst 714. As explained above, the heating zone 727 may be formed on the upstream end face of the upstream catalyst 714.

The flat and corrugated metal sheets 711 and 712 are alternately wound around the center axis. Due to this structure, the adjacent sheets 711 and 712 will axially move relative to each other if they are not fixed to each other. Namely, the central part of the laminated structure will axially protrude like an inner cylinder of a telescope. According to the 44th embodiment of FIG. 100, the adjacent sheets 711 and 712 are strongly joined together by discharging in the end face zones 722 and 723 of the downstream catalyst 715 and in the peripheral and central end face zones 725 and 726 of the upstream catalyst 714. In addition, the adjacent sheets 711 and 712 are partly joined together with a laser beam in the heating zone 727 of the upstream catalyst 714. According to this arrangement, the central part of the laminated structure will never axially protrude.

FIGS. 103 to 131 show various embodiments based on the electrically heating catalyst 709 of FIG. 100. These embodiments will be explained one by one. In FIGS. 103 through 131, the same elements as those of the 44th embodiment of FIG. 100 are represented with the same reference marks.

FIG. 103 shows a 45th embodiment. An electrode 719 straightly radially extends from the periphery of a metal cylinder 717 of an upstream catalyst 714. The electrode 719 involves small heat capacity to reduce the quantity of heat escaping outside through the electrode 719.

FIG. 104 shows a 46th embodiment. A heat insulation space 716 defined between an upstream catalyst 714 and a downstream catalyst 715 is axially wide. Due to the wide heat insulation space 716, an exhaust gas passed through the upstream catalyst 714 is radially mixed while it is flowing through the space 716. As a result, the concentration and temperature of the exhaust gas is averaged when it enters the downstream catalyst 715. This results in quickly uniformly increasing the temperature of the downstream catalyst 715 to an activation temperature, to uniformly oxide unburned HC and CO in the catalyst 715.

FIG. 105 shows a 47th embodiment. A downstream catalyst 715 is very long in an axial direction so that the catalyst 715 serves as the main catalyst 710 of FIG. 99. Accordingly, the 47th embodiment requires no main catalyst 710 of FIG. 99.

FIG. 106 shows a 48th embodiment. Similar to the 47th embodiment of FIG. 105, the axial length of a downstream catalyst 715 is very long so that it serves as the main catalyst 710 of FIG. 99. Unlike the 47th embodiment, the outer diameter of the downstream catalyst 715 of the 48th embodiment is smaller than the inner diameter of a casing 708. The downstream catalyst 715 is supported by the casing 708 through a plurality of stress absorption plates 730 each having a band shape. The stress absorption plates 730 are arranged at equiangular positions around the downstream catalyst 715, and the adjacent plates 730 are tightly in contact with each other. An upstream end of each of the stress absorption plates 730 is welded to an upstream end of a peripheral surface of the downstream catalyst 715, and a downstream end thereof is welded to an inner face of the casing 708. When the temperature of the downstream catalyst 715 increases, the downstream catalyst 715 can freely expand in radial and axial directions due to the stress absorption plates 730. Namely, no large stress acts on the downstream catalyst 715.

FIGS. 107 and 108 show a 49th embodiment. A heating zone 727 is formed only in an upper half of an upstream catalyst 714. The velocity distribution of an exhaust gas in a casing 708 is influenced by the shape of an exhaust path on the upstream side of the casing 708. The velocity distribution may become one indicated with a mark S in FIG. 107. In this case, increasing the temperature of the whole of the upstream catalyst 714 is ineffective because most of unburned HC and CO are oxidized in the upper half area of the upstream catalyst 714 where a large part of the exhaust gas flows. Namely, oxidation heat is mostly generated in the upper half of the upstream catalyst 714. In this case, a lower half of the upstream catalyst 714 produces only little oxidation heat, so that electric power for heating the lower half of the upstream catalyst 714 becomes useless. To effectively use electric power, the embodiment of FIGS. 107 and 108 forms the heating zone 727 only in the upper half of the upstream catalyst 714 where a large part of the exhaust gas flows.

FIG. 109 shows a 50th embodiment. A flat metal sheet 711 and a corrugated metal sheet 712 form a downstream catalyst 715. In an axial center area of the downstream catalyst 715, the sheets 711 and 712 are provided with louvers 731 for guiding an exhaust gas. FIG. 110(a) is an enlarged view showing an area A surrounded by a dot-dash line in FIG. 109, and FIG. 110(b) is a front view of FIG. 110(a). In the area A, the flat and corrugated metal sheets 711 and 712 are partly cut and downwardly bent to form the louvers 731. The louvers 731 radially outwardly bias the flow of the exhaust gas as indicated with an arrow mark X.

In an area B surrounded by a dot-dash line in FIG. 109, the thin and corrugated metal sheets 711 and 712 are partly cut and upwardly bent to form the louvers 731. Opposite to FIGS. 110(a) and 110(b), the louvers 731 in the area B radially inwardly bias the flow of the exhaust gas as indicated with an arrow mark Y. The louvers 731 are symmetrical with respect to the axis of the downstream catalyst 715. According to the 50th embodiment, heat generated by oxidation in a heating zone 727 in an upstream catalyst 714 increases the temperature of the exhaust gas, which is uniformly diffused over the downstream catalyst 715. Accordingly, the whole of the downstream catalyst 715 quickly reaches an activation temperature, and the downstream catalyst 715 uniformly oxidizes unburned HC and CO.

FIG. 111 shows a 51st embodiment. A heating zone 727 is formed in the vicinity of a downstream end face of an upstream catalyst 714. Between an upstream end face and the heating zone 727 in the upstream catalyst 714, thin and corrugated metal sheets 711 and 712 have many louvers 731 having the same shape as the louvers 731 of FIG. 109. According to the 51st embodiment, the louvers 731 in an area A are formed to bias the flow of an exhaust gas in a radial outward direction X. On the other hand, the louvers 731 in an area B are formed to bias the flow of the exhaust gas in a radial inward direction Y. The louvers 731 are symmetrical with respect to the axis of the upstream catalyst 714. The 51st embodiment collects the exhaust gas flowing into the upstream catalyst 714 to the heating zone 727. Accordingly, the temperature of the heating zone 727 is quickly increased to an activation temperature due to the heating action of the exhaust gas. Once the heating zone 727 reaches the activation temperature, it generates a large quantity of heat due to oxidation. As a result, an electrically heating catalyst 709 as a whole is quickly heated up to the activation temperature.

FIG. 112 shows a 52nd embodiment. The sectional shape of a heat insulation space 716 is angled so that the axial width of an upstream catalyst 714 becomes shorter in a heating zone 727. This arrangement reduces heat capacity around the heating zone 727, to thereby shorten a period in which the heating zone 727 reaches an activation temperature.

FIG. 113 shows a 53rd embodiment. An insulation space 716 is inclined so that the axial width of an upstream catalyst 714 gradually becomes narrower in a radial outward direction. This arrangement reduces the cross-sectional area of a heat radiation path through which heat escapes to an electrode 719. This results in reducing the quantity of heat escaping through the heat radiation path and electrode 719, thereby shortening a period in which a heating zone 727 reaches an activation temperature.

FIG. 114 shows a 54th embodiment. An insulation space 716 is inclined so that the axial width of an upstream catalyst 714 gradually becomes narrower in a radial inward direction. This arrangement reduces the cross-sectional area of a heat radiation path through which heat escapes to a core 713 of a laminated structure, to thereby reduce the quantity of heat escaping to the core 713. This results in shortening a period in which the temperature of a heating zone 727 reaches an activation temperature.

FIG. 115 shows a 55th embodiment. The cross-sectional shape of an insulation space 716 is angled so that the axial width of an upstream catalyst 714 gradually becomes narrower in radial outward and inward directions. This arrangement reduces the quantity of heat escaping outside through an electrode 719 and a core 713 of a laminated structure, to thereby further shorten a period in which a heating zone 727 reaches an activation temperature.

FIG. 116 shows a 56th embodiment. The cross-sectional shape of an upstream end face of an upstream catalyst 714 is triangle so that the center of a heating zone 727 protrudes to the upstream side. As explained above, the temperature of an exhaust gas gradually decreases while it is flowing in an exhaust path. To increase the temperature of the heating zone 727, the zone 727 must be arranged on the upstream side. This is why the 56th embodiment protrudes the upstream end face of the upstream catalyst 714 where the heating zone 727 is formed, to the upstream side.

FIG. 117 shows a 57th embodiment. Similar to the 56th embodiment of FIG. 116, an upstream end face of an upstream catalyst 714 where a heating zone 727 is formed protrudes to the upstream side. According to the 57th embodiment, an exhaust gas guide pin 732 is attached to the center of an electrically heating catalyst 709. The guide pin 732 biases an exhaust gas flowing to the center of a casing 703 toward the heating zone 727, to quickly increase the temperature of the heating zone 727.

FIG. 118 shows a 58th embodiment. An upstream end face of an upstream catalyst 714 protrudes to the upstream side into a conical shape, so that a heating zone 727 is located as close to the upstream side as possible, to receive a hot exhaust gas.

FIG. 119 shows a 59th embodiment. An upstream catalyst 714 is arranged in an upper half of an electrically heating catalyst 709. The cross-sectional shape of an upstream end face of the upstream catalyst 714 is triangle so that the center of a heating zone 727 is located on the most upstream side. The 59th embodiment arranges the upstream catalyst 714 in an area where the flow rate of an exhaust gas is large. Even if the velocity distribution of the exhaust gas in a casing 708 is biased as indicated with arrow marks S, most of the exhaust gas flows into the heating zone 727.

FIG. 120 shows a 60th embodiment. An upstream end face of an upstream catalyst 714 around a heating zone 727 is V-shaped so that the center of the heating zone 727 is positioned on the downstream side. An exhaust gas concentrates in the heating zone 727, and therefore, the temperature of the heating zone 727 quickly increases.

FIG. 121 shows an 61st embodiment. An upstream end face of an upstream catalyst 714 has an inverted conical shape to collect an exhaust gas to a heating zone 727, to thereby increase the temperature of the zone 727. An annular space 716a is formed around a downstream catalyst 715, to decrease a shearing force acting on a joint between the periphery of the downstream catalyst 715 and a casing 708. End faces 722a and 723a of the downstream catalyst 715 facing the annular space 716a are welded.

FIG. 122 shows a 62nd embodiment. Similar to the 61st embodiment of FIG. 121, an upstream end face of an upstream catalyst 714 has an inverted conical shape. In addition to this, the axial width of a downstream catalyst 715 is extended so that the catalyst 715 serves as the main catalyst. 710 of FIG. 99.

FIG. 123 shows a 63rd embodiment. An electrically heating catalyst 709 has a casing 708 that is bent in an L shape. An upstream end face of an upstream catalyst 714 is diagonal to an axis of the catalyst 709 so that an exhaust gas uniformly flows into the whole area of the upstream catalyst 714, in particular, a heating zone 727.

FIGS. 124 and 125 show a 64th embodiment. A casing 708 of an electrically heating catalyst 709 has a pair of exhaust gas inlets 733a and 733b. Heating zones 727 formed on an upstream catalyst 714 face the exhaust gas inlets 733a and 733b, respectively, so that most of an exhaust gas entering the inlets 733a and 733b passes through the heating zones 727.

FIG. 126 shows a 65th embodiment. A pair of catalytic converters 703a and 703b are arranged side by side. Each of the catalytic converters 703a and 703b has an electrically heating catalyst 709 made of an upstream catalyst 714 and a downstream catalyst 715. A common electrode 719 is arranged for metal cylinders 717 of the upstream catalysts 714.

Each of embodiments of FIGS. 127 to 129 is basically the same as the embodiment of FIG. 100 in that each of them has an upstream catalyst 714, a downstream catalyst 715, and an insulation space 716 defined between the catalysts 714 and 715. In each of the embodiments of FIGS. 127 to 129, the downstream catalyst 715 serves as the main catalyst 710 of FIG. 99, and joints between a flat metal sheet 711 and a corrugated metal sheet 712 differ from those of FIG. 100.

According to the embodiments of FIGS. 127 to 129, the flat and corrugated metal sheets 711 and 712 of the downstream catalyst 715 are alternately wound around a center axis with no electrical insulation layer made of alumina oxide on each face of the sheets 711 and 712. According to these embodiments, a current radially flows in the downstream catalyst 715, so that the downstream catalyst 715 generates substantially no heat. In an upstream end face zone filled with dot marks of the downstream catalyst 715, the flat and corrugated metal sheets 711 and 712 are joined together by brazing. A peripheral zone 741 filled with dot marks of the downstream catalyst 715 is joined with the inner face of a casing 708 by brazing. In a peripheral zone 742 filled with dot marks of a core of a laminated structure connecting the upstream catalyst 714 to the downstream catalyst 715, the flat and corrugated metal sheets 711 and 712 are joined together by brazing.

Through the embodiments of FIGS. 127 to 129, the structures of the downstream catalyst 715 and core 713 are the same. The structure of the upstream catalyst 714 slightly differs from embodiment to embodiment. The structures of the upstream catalysts 714 of the embodiments will be explained one by one.

FIG. 127 shows a 66th embodiment. The flat and corrugated metal sheets 711 and 712 of the upstream catalyst 714 are alternately wound around the center axis with each face of the sheets 711 and 712 having no electric insulation layer made of alumina oxide. Accordingly, a current radially flows in the upstream catalyst 714. The upstream catalyst 714 has a peripheral zone 714a having a large axial width. Between the wide zone 714a and the core 713 of the laminated structure, a zone 714b having a narrow axial width is formed. In the narrow zone 714b, the faces of the flat and corrugated metal sheets 711 and 712 are entirely joined together by brazing. In an inner circumferential zone and a downstream end face zone 743 both filled with dot marks in the wide zone 714a, the flat and corrugated metal sheets 711 and 712 are joined together by brazing. A peripheral zone 744 filled with dot marks around the wide zone 714a is fixed to a metal cylinder 717 by brazing. The cylinder 717 is connected with an electrode 719.

According to this embodiment, the resistance of the narrow zone 714*b* is larger than that of the other parts, so that, when the electrically heating catalyst 709 is energized, only the narrow zone 714*b* generates heat. Namely, when the catalyst 709 is energized, only the upstream end face of the annular intermediate zone between the peripheral and central zones of the upstream catalyst 714 generates heat.

FIG. 128 shows a 67th embodiment. The upstream catalyst 714 has a wide zone 714*a* along the periphery thereof and a narrow zone 714*b* defined between the wide zone 714*a* and a core 713 of a laminated structure. In an upstream end face zone 745 filled with dot marks in the wide zone 714*a*, the flat metal sheet 711 and corrugated metal sheet 712 are joined together by brazing. Namely, when the sheets 711 and 712 are wound around the center axis, every part to be brazed is coated with brazing material, and after the sheets 711 and 712 are wound, they are heated to melt the brazing material.

According to this 67th embodiment, a sheet material such as a sheet of paper that burns when heated is interposed between the flat and corrugated metal sheets 711 and 712 when the sheets 711 and 712 forming the narrow zone 714*b* are wound around the center axis. When the wound sheets are heated, the combustible sheet material burns to form a narrow gap between the metal sheets 711 and 712 as well as electric insulation oxide films over the metal sheets 711 and 712 between which the combustible sheet has been interposed. The other parts of the metal sheets 711 and 712 where no such combustible sheet is interposed form no oxide film. In FIG. 128, the metal sheets 711 and 712 in the narrow zone 714*b* are entirely coated with the electric insulation oxide films. On the other hand, the metal sheets 711 and 712 in the wide zone 714*a* and core 713 are not covered with the electric insulation oxide films.

When the electrically heating catalyst 709 is energized, the wide zone 714*a* generates substantially no heat because a current radially flows in the wide zone 714*a*. In the narrow zone 714*b*, however, the current flows in a circumferential direction. Accordingly, the resistance of the narrow zone 714*b* becomes very large compared with the other parts, to thereby generate heat. Namely, when the electrically heating catalyst 709 of this embodiment is energized, only the upstream end face of the annular zone between the peripheral and central zones of the upstream catalyst 714 generates heat.

FIG. 129 shows a 68th embodiment. The width of the upstream catalyst 714 is equally narrow. The flat metal sheet 711 and corrugated metal sheet 712 of the upstream catalyst 714 are entirely joined together by brazing. When the electrically heating catalyst 709 of this embodiment is energized, the whole of the upstream catalyst 714 except the core 713 generates heat.

FIG. 130 shows a 69th embodiment. A common laminated structure 713 has an upstream catalyst 705, a downstream catalyst 751, and an intermediate catalyst 754. The intermediate catalyst 754 is located between the upstream and downstream catalysts 750 and 751 with insulation spaces 752 and 753 between them. The intermediate catalyst 754 has a heating zone 727. In zones filled with dot marks, metal sheets are joined together by discharging. The heating zone 727 in the intermediate catalyst 754 alone generates heat.

FIG. 131 shows a 70th embodiment. A common laminated structure 713 is surrounded by an upstream catalyst 761 and a downstream catalyst 762. An insulation space 760 is defined between the upstream and downstream catalysts 761 and 762. A heating zone 727 is formed in the downstream catalyst 762. In zones filled with dot marks, metal sheets are joined together by discharging. The heating zone 727 of the downstream catalyst 762 alone generates heat.

As in the cases of FIGS. 130 and 131, the catalyst 754 and 762 having the heating zones 727 are not always arranged on the most upstream side in the electrically heating catalyst 709. When the heating zone 727 is formed in the upstream catalyst 714 located on the most upstream side in the electrically heating catalyst 709 as in the 44th to 68th embodiments, there is an advantage that heat due to oxidation in the heating zone 727 is transported by an exhaust gas flow to the downstream catalyst 715 so that the downstream catalyst 715 is quickly heated up to the activation temperature.

FIGS. 132 to 135 show an electrically heating catalytic converter according to a 71st embodiment of the present invention. FIG. 132 shows a flat sheet 801 and a corrugated sheet 802 laid one upon another. According to this embodiment, the width of the corrugated sheet 802 is wider than that of the flat sheet 801 (by t). The surfaces of the flat and corrugated sheets 801 and 802 or only of the flat sheet 801 are oxidized to form insulation oxide film layers. The flat and corrugated sheets 801 and 802 are wound around a center electrode 803 (FIG. 134) such that one ends (on the downstream side of an exhaust gas flow) of the sheets 801 and 802 are aligned, and the other end (on the upstream side of the exhaust gas flow) of the corrugated sheet 802 protrudes from the corresponding end of the flat sheet 801. FIGS. 134 and 135 show the wound sheets and electrode. An end face area A on the upstream side of the exhaust gas flow is formed only with the corrugated sheet 802, and an area B behind the area A with the alternate lamination of the flat and corrugated sheets 801 and 802.

According to this embodiment, layers of the protrusion of the corrugated sheet 802 from the flat sheet 801 is joined together during or after the winding process. Namely, adjacent layers of the corrugated sheet 802 are pressed to each other as indicated with arrow marks P in FIGS. 133(*s*) and 133(*b*), to make them electrically conductive to each other. In FIG. 133(*a*), crests and valleys of adjacent layers of the corrugated sheet 802 are closest to each other. In this case, a crest and a corresponding valley are spaced apart from each other by the thickness of the flat sheet 801, e.g., 50 micrometers. In FIG. 133(*b*), crests and valleys of adjacent layers of the corrugated sheet 802 are farthest from each other. In this case, a crest and a corresponding valley are spaced apart from each other by a pitch of corrugations, e.g., about one millimeter in the case of 400-cell concentration. Even when adjacent layers of the corrugated sheet 802 are farthest from each other (one millimeter gap) as shown in FIG. 133(*b*), they must be forcibly joined together as indicated with the arrow marks P. Namely, adjacent layers of the corrugated sheet 802 are bent by one millimeter at most. This is achievable if the protrusion t of the corrugated sheet 802 from the flat sheet 801 is about 2 to 3 millimeters. Then, adjacent layers of the corrugated sheet are sufficiently bent and joined together.

Adjacent layers of the corrugated sheet 802 are joined to form joints 804 that form electric short circuit paths 805 shown in FIG. 134. The paths 805 may be formed in optional patterns depending on requirements on hot spots to be provided by a catalytic carrier. When a voltage is applied to the center electrode 803 (positive) and an outer cylinder 806 (negative), a current flows from the center electrode 803 toward the outer cylinder 806 along the electric short circuit paths 805. The joints 804, i.e., the paths 805 of the catalytic carrier generate heat. Namely, only the corrugated sheet 802 of the catalytic carrier generates heat. This results in decreasing the heat capacity of the hot spots, quickly increasing the temperature of the catalytic carrier, quickening the start of a catalytic reaction of the catalytic carrier, and improving the performance of the catalytic carrier.

FIGS. 136 to 142 show an electrically heating catalytic converter according to a 72nd embodiment of the present invention. In FIG. 136, a corrugated sheet 802 is held between two flat sheets 801. These sheets are fixed together by brazing 811, to form a honeycomb sheet. In FIG. 137, an insulation film 812 has substantially the same width as that of the flat and corrugated sheets 801 and 802. One end (an upstream end in an exhaust gas flow) of the insulation film 812 has rectangular notches 813 at optional positions. In FIG. 138, the honeycomb sheet is wound around a center electrode 803, to form a catalytic carrier. At this time, the insulation film 812 is interposed at predetermined positions between layers of the honeycomb sheet, to thereby insulate the layers of the honeycomb sheet from each other. At each notch 813, the layers of the honeycomb sheet, i.e., layers of the flat sheet 801 are joined together by brazing 818 (FIG. 140(c)), to make the layers of the honeycomb sheet conductive to each other. Since the joints formed by the brazing 818 are only at the notches 813, each conductive area is small and has large electric resistance to generate heat with small electric power.

FIG. 139 shows an example of a heating zone. As explained above, the honeycomb sheet is wound around the center electrode 803, to form the cylindrical catalytic carrier. The catalytic carrier is stored in an outer cylinder 806. Around the center electrode 803 and in a peripheral area, the insulation film 812 is not inserted between the layers of the honeycomb sheet as shown in FIG. 140(a), so that the layers of the honeycomb sheet are attached to each other and conductive to each other to form conductive zones 814. The conductive zones 814 are large to have very low electric resistance to generate no heat. In an intermediate area between the center and peripheral areas, the insulation film 812 is inserted between the layers of the honeycomb sheet as shown in FIG. 140(b). The insulation film 812 has the notches 813 as explained above. The notches are brazed, to form conductive spots 18 as shown in FIG. 140(c). Each notch 813 is relatively shallow and small to achieve high electric resistance. The notches 813 define conductive zones 815 to generate heat. Insulation zones 816 have low electric resistance to generate no heat.

FIG. 141 is a section taken along a line A—A of FIG. 139. In the intermediate area of the catalytic carrier, the notches 813 are located on the upstream side of an exhaust gas flow, so that heating zones 815a formed by the brazing 818 are on the upstream side of the exhaust gas flow, and nonconductive zones 815b that generate no heat due to the insulation film 812 are on the downstream side of the exhaust gas flow.

As explained above, the 72nd embodiment forms heating zones at optional positions depending on the positions and intervals of the notches 813 formed on the insulation film 812. The shape and electric resistance of each heating zone are optionally set according to the size and number of the notches. In FIG. 139, the five radial conductive zones (heating zones) 815 are arranged at equiangular positions in the intermediate area. In FIG. 142, four curved conductive zones (heating zones) 815 are arranged in an intermediate area. In this way, the heating zones may have optional shapes.

FIGS. 143 to 146 show an electrically heating catalytic converter according to a 73rd of the present invention. Flat and corrugated sheets 801 and 802 alternately brazed to form a honeycomb metal catalytic carrier as shown in FIGS. 144(a) to 144(c). Brazing material having high resistance is employed so that the brazed parts generate heat. To achieve high resistance, the content of, for example, silicon (Si) in the brazing material is adjusted. In FIGS. 144(a) to 144(c), numeral 821 is high resistance brazing material and 822 is low resistance brazing material. According to this arrangement, optional part such as a front end face of the catalytic carrier may generate heat without deteriorating the durability of the structure. Usually, the brazing is carried out on the front end face of the catalyst.

The details of fabricating the above structure will be explained.

(1) Crests of each corrugated sheet 802 are coated with binder (not shown).

(2) A heating zone A is located on the upstream side of an exhaust gas flow. To form the heating zone A, crests on one face of the corrugated sheet 802 are coated with high resistance brazing material 821 as shown in FIG. 144(a). Alternatively, crests on each face of the corrugated sheet 802 are coated with the high resistance brazing material 821 as shown in FIG. 144(c). An area B on the downstream side of the exhaust gas flow generates no heat. To form the area B, crests of the corrugated sheet 802 are coated with low resistance brazing material 822. Instead of the brazing material, insulation material such as ceramics powder may be applied to the crests.

In FIG. 144(a), the high resistance brazing material 821 may be applied only in the area A, and the low resistance brazing material 822 may be applied all over the corrugated sheet.

(3) The flat and corrugated sheets 801 and 802 are wound around the center electrode 803 into a honeycomb cylinder.

(4) To form a periphery C of the catalytic carrier, crests on each face of the corrugated sheet 802 are coated with the low resistance brazing material 822 as shown in FIG. 144(b). Instead of the brazing material, insulation material such as ceramics powder may be employable.

(5) A heat treatment for brazing is carried out.

The catalytic carrier thus fabricated generates heat only in the heating zone A.

FIG. 145 shows a modification of the 73rd embodiment of the present invention. A heating zone A is formed on the upstream side of an exhaust gas flow. In the area A, the axial length of high resistance brazing material gradually becomes shorter toward the periphery. This prevents the resistance of the heating zone from gradually changing depending on a distance from an electrode, to thereby uniformly generate heat.

FIG. 146 shows another modification of the 73rd embodiment of the present invention. The ingredients of brazing material are adjusted so that the resistance of the brazing material becomes higher toward the periphery of a heating zone A defined on the upstream side of an exhaust gas flow. Alternatively, the numbers of points where the brazing material is applied are decreased toward the periphery, to increase the resistance toward the periphery.

FIG. 147 to 152 show an electrically heating catalytic converter according to a 74th embodiment of the present invention. In FIGS. 147 and 148, an insulation layer 830 such as an oxide layer is formed on one or both faces of a corrugated sheet 802. The corrugated sheets 802 and flat sheets 801 are solidly wound and brazed to form a honeycomb metal catalytic carrier. Before the corrugated sheet 802 is attached to the flat sheet 801, predetermined locations of the insulation layer 830 on the corrugated sheet 802 are removed. Each removed location forms an electric conductive part 835 at which the flat and corrugated sheets 801 and 802 are conductive to each other. In this way, this embodiment forms a conductive zone, i.e., heating zone A and a nonconductive zone B that generates no heat. A method of removing the insulation layer 830 will be explained.

In FIG. 149(a), a feed gear 831 feeds the corrugated sheet 802. A rotary grindstone 832 faces the gear 831. The grindstone 832 moves up and down at predetermined timing, to get in contact with the corrugated sheet 802, to thereby grind and remove the insulation layer 830 at crests of the corrugated sheet 802. As a result, the corrugated sheet 802 will have parts 830' where the insulation layer 830 is removed from crests on one face of the corrugated sheet 802, as shown in FIG. 149(b).

FIGS. 150(a) and 150(b) show a corrugated sheet 802 having an insulation layer 830 on each face thereof. The insulation layer 830 on each face is removed at predetermined positions, to form parts 830'. In FIG. 150(a), a pair of feed gears 831a and 831b face a pair of rotary grindstones 832a and 832b, respectively, to grind and remove the insulation layer 830 at crests on each face of the corrugated sheet 802. Predetermined teeth of the feed gears 831a and 831b are higher than the others so that crests of the corrugated sheet 803 get in contact with the grindstones 832a and 832b when the high teeth face the grindstones 832a and 832b. As a result, the insulation layers 830 are partly removed.

The grinding width of the insulation layer 830 formed on the corrugated sheet 802 can be optionally set by adjusting the relative positions of the rotary grindstone 832 and feed gear 831 as shown in FIGS. 151 and 152. FIG. 151 shows a large grinding width, and FIG. 152 shows a small grinding width. It is possible to provide a conductive zone 835 with different sizes at the center and periphery of a cylindrical catalytic carrier. This results in changing the electric resistance of a heating zone.

FIGS. 153(a), 153(b), 154(a) and 154(b) show an electrically heating catalytic converter according to a 75th embodiment of the present invention. An insulation layer 830 such as an oxide film is formed on one face of a corrugated sheet 802. When the corrugated sheet 802 and a flat sheet 801 are joined into a honeycomb sheet and wound, they are welded together at predetermined positions with a laser or electron beam, or by discharging. At each of the welded spots, the insulation layer 830 disappears so that the flat and corrugated sheets 801 and 802 are directly joined together. Namely, the oxide layer 830 is dispersed and removed due to the laser welding energy. This results in forming conductive parts 836 that generate heat.

In FIGS. 153(a) and 153(b), a pair of the flat and corrugated sheets 801 and 802 is fed by a feed gear 831. While they are being fed, they are welded together by a laser or electron beam, or by discharging at predetermined timing (for example every 10 teeth in response to a signal provided by a tooth detector 837). When employing the discharge welding, an electrode is brought close to the feed gear 831 at predetermined timing, to cause discharge. The insulation layer 830 on the corrugated sheet 802 is removed due to a high temperature of the welding, and the corrugated sheet 802 becomes electrically conductive to the flat sheet 801.

FIGS. 154(a) and 154(b) show another example of discharge welding. Predetermined teeth of a feed gear 831 are higher than the others. When one of the high teeth faces an electrode 838, discharge occurs to weld flat and corrugated sheets together with the electrode 838 being immobile. Numeral 839 is a power source.

The feed gear 831 may be stopped or slowed when the welding is started at a predetermined position, to sufficiently carry out the welding. When the feed gear 831 is temporarily stopped, a laser beam from a welder may be moved to optionally set the length of the welded conductive part 836.

FIGS. 155(a) to 155(d), 156, and 157 show a 76th embodiment of the present invention. In FIGS. 155(a) to 155(d), a flat metal sheet 852a and a corrugated metal sheet 852b welded together are wound around a positive electrode bar 851, to form a spirally layered honeycomb metal catalytic carrier 852. An annular intermediate area between the center and peripheral areas of the carrier 852 in the vicinity of an upstream end of the carrier 852 forms a heating zone 853.

The wound flat and corrugated sheets 852a and 852b in the heating zone 853 are electrically conductive to each other. In the other area, these metal sheets are insulated from each other with an oxide film formed between them.

The positive electrode 851 is arranged along the center axis of the catalytic carrier 852 and electrically connected to the carrier 852. The carrier 852 is inserted in a cylindrical casing 854 and fixed thereto by, for example, brazing. The carrier 852 is electrically connected to the casing 854 serving as a ground (negative) electrode. The positive electrode 851 has an L shape. Namely, the electrode 851 extends along the axis of the casing 854 toward the upstream side of an exhaust flow, runs in a radial direction of the casing 854, and passes through the side face of the casing 854. The electrode 851 is electrically isolated from the casing 854 with an insulator 855. To heat the carrier 852, a power source 857 applies a voltage to the electrodes 851 and 854.

An area A corresponds to the annular heating zone 853 and is located on the downstream side of the carrier 852. The area A is equal to or larger than the heating zone 853 (in FIG. 155(a), it is equal to the heating zone 853). In the area A, only the flat sheet 852a is wound as shown in FIGS. 155(b) and 155(c), and the flat sheet 852a in the area A is partly bent to form louvers 856a and 856b. The outer louvers 6a are inwardly bent as shown in FIG. 155(b), to outwardly guide an exhaust gas in inner cells. The inner louvers 6b are outwardly bent as shown in FIG. 155(c), to inwardly guide an exhaust gas in outer cells.

The electrically heating catalytic converter of FIG. 155(a) is arranged in an exhaust path 870 of an internal combustion engine. A main catalytic converter is arranged in the exhaust path behind the catalytic converter. Catalyst purifies an exhaust gas only when it is heated to or above an activation temperature. While the engine is cool, the electrically heating catalytic converter is energized to quickly heat the catalyst up to or above the activation temperature and purify noxious components in an exhaust gas.

In FIG. 155(a), the catalytic converter is arranged in the exhaust path. An exhaust gas 855 enters the catalytic converter and reaches the catalytic carrier 852. The cross sectional area of a path 871 is smaller than that of the catalytic carrier 852. The positive electrode 851 is located at the center of the catalytic carrier 852. The exhaust gas 855 stays in the vicinity of the casing 854 and around the positive electrode 851 and collectively flows through an annular area corresponding to the heating zone 853 of FIG. 155(a). When the power source 857 energizes the catalytic converter, the heating zone 853 collectively generates heat. As a result, the exhaust gas passing through the heating zone 853 is heated and outwardly and inwardly diffused by the louvers 856a and 856b into an area 859 of FIG. 156. This results in quickly heating the catalytic carrier 852 as a whole.

As explained above, the partial heating zone 853 according to this embodiment is heated at first when energized.

Since the heating zone 853 is partial, it is quickly heated. The louvers 856a and 856b cause an exhaust gas to flow from the heating zone 853 to areas that generate no heat. The exhaust gas carries heat of the heating zone and reaction heat of the catalyst heated to the activation temperature to the areas that generate no heat. Namely, the heated exhaust gas effectively heats the catalytic carrier 852 as a whole. This helps decrease electric power supplied to the catalytic converter 852.

FIG. 157 shows a 77th embodiment of the present invention. Similar to the 76th embodiment, a heating zone 854' is annular and positioned between the periphery and center areas of a catalytic carrier 852. The heating zone 854' is inwardly spaced away from an upstream end of the catalytic converter 852. An area A' in front of the heating zone 854' is wider than the heating zone 854'. In the area A', louvers are arranged opposite to the louvers 856a and 856b of the 76th embodiment. Namely, the outer louvers inwardly guide an exhaust gas flow, and the inner louvers outwardly guide the exhaust gas flow. As a result, the exhaust gas is collected to the heating zone 854' as indicated with a hatched area 859'.

In a downstream area behind the heating zone 854', louvers are arranged in the same manner as the louvers 6a and 6b of the 76th embodiment, to diffuse the exhaust gas flow from the heating zone 854' into a hatched area 859".

The 77th embodiment has advantages that (1) a flow of an exhaust gas to the front face of the catalytic carrier concentrates in the heating zone 854' so that a larger quantity of gas than the 76th embodiment is fed to the heating zone 854', and (2) the heating zone 854' is inside the catalytic carrier 852 so that the heating zone is not so affected by noxious components in the exhaust gas.

FIG. 158 shows a 78th embodiment. This embodiment employs reverse louvers 860a and 860b instead of the louvers 856a and 856b of the 76th embodiment. The outer louvers 860a are outwardly bent, and the inner louvers 860b are inwardly bent. An exhaust gas diffusing effect of this embodiment is substantially the same as that of the 76th embodiment. Since the louvers of this embodiment are bent in the direction of an exhaust flow, their durability is better than that of the louvers 856a and 856b of the 76th embodiment.

FIG. 159 shows a 79th embodiment.

Reverse louvers 860a' and 860b' similar to those of the embodiment of FIG. 158 are entirely arranged in a catalytic carrier 852. In an upstream partial area 852A and in a downstream partial area 852B in the catalytic converter 852, a combination of a flat sheet 852a and a corrugated sheet 852b is wound as shown in FIG. 155(d) to support the flat sheet 852a that forms the reverse louvers 860a' and 860b'. No reverse louvers are formed in the areas 852A and 852B. A heating zone 861 spreads over the catalytic carrier. (Namely, this is not a partial heating system.) When the whole of the catalytic carrier 852 is heated, the reverse louvers 860a' and 860b' bias an exhaust gas flow, which becomes a turbulent flow to efficiently transfer heat from the exhaust gas to the catalytic carrier 852. Since the exhaust gas efficiently heats the catalytic carrier 852, power consumption is reduced.

FIG. 160 shows a 80th embodiment.

This embodiment limits radial extent of the heating zone 861 of the 79th embodiment of FIG. 159, to form a partial heating zone 862. (This heating zone is defined between a central area and a peripheral area.) Reverse louvers are entirely arranged in a catalytic converter 852. This embodiment provides the same effect as the 76th embodiment.

In the 79th and 80th embodiments, the reverse louvers for biasing an exhaust gas flow may be oriented in the same direction as the louvers of the 76th embodiment of FIG. 155(a), to provide the same effect.

FIGS. 161 to 163 show an 81st embodiment of the present invention. FIG. 161 shows a combination sheet with a flat sheet having projections. The combination sheet is used to form a metal catalytic carrier such as the one shown in FIGS. 166 and 167.

In FIG. 161, the flat sheet 912 of the combination sheet 910 has the projections 919 each extending in longitudinal and lateral directions. The width $l_1$ of the projection 919 is narrower than the width l of the flat sheet 912, and the length $l_2$ of the projection 919 is shorter than the full length of the flat sheet 912. The projection 919 protrudes outwardly from the combination sheet. The material of the projections 919 is preferably the same as that of the corrugated and flat sheets 911 and 912. The projections 919 are made by attaching brazing material to the flat sheet 912, or by attaching metal pieces to the flat sheet 912 by brazing.

When the combination sheet 910 of FIG. 161 is wound around the center electrode 913, the projections 919 interpose between the flat sheet 912 of a given layer and the corrugated sheet 911 of an adjacent layer. Namely, the adjacent layers are in contact with each other through the projections 919, and accordingly, a radial gap corresponding to the thickness of the projections is formed between the adjacent layers. The projections 919 are positioned such that, when the combination sheets are wound around the center electrode 913, the projections 919 form linear radial patterns extending from the center electrode 913 to the outer cylinder 914 as shown in FIG. 166. The reason why the projections are radially and flatly arranged is to uniformly heat the whole section of the catalyst. The adjacent layers are joined together by brazing the projections 919, and the spiral structure is oxidized to form oxide films over the combination sheets except the joints with the projections 919. Since the adjacent layers are not in touch with each other except at the projections, the whole surfaces of the sheets are coated with the oxide films. The oxide films are not formed on the projections or parts of the sheets facing the projections. Accordingly, the layers of the sheets are conductive to each other through the projections.

The projections 919 are axially inwardly spaced away from an upstream end of the spiral structure in an exhaust flow. The reason why the projections 919 are positioned close to the upstream end of the structure is because, when the projections 919 generate heat, the heat is easily transferred to the downstream area of the catalyst by a flow of an exhaust gas. Namely, it is advantageous to heat the whole of the catalyst.

FIG. 162 shows projections 919 formed on a flat sheet 912 according to an 82nd of the present invention.

According to this embodiment, the flat sheet 912 is provided with laterally protruding tongues, which are bent to form the projections 919. When a combination 910 of the flat sheet and a corrugated sheet is wound, the projections 919 interpose between the flat sheet 912 of a given layer and the corrugated sheet of an adjacent layer. The adjacent layers of the combination sheet 910 are joined together by brazing the projections 919. As a result, a gap corresponding to the thickness of the projections 919 is formed between the adjacent layers.

FIG. 163 shows a flat sheet 912 having projections 919 according to an 83rd embodiment. According to the embodiments of FIGS. 161 and 162, the projections 919 are formed on the flat sheet 912 by attaching metal pieces or tongues to the flat sheet 912. In this case, the volume of the projections 919 increases the heat mass of the heating zone, to slightly slow the heating speed of the catalytic carrier. Accordingly, this embodiment forms the projections 919 at predetermined positions on the flat sheet 912 by pressing. Namely, the positions on the flat sheet 912 where the projections 919 are to be formed are locally pressed in the thickness direction, thereby forming the projections 919. This method forms the projections 919 without increasing the heat mass of the heating zone.

While a combination of the flat sheet and a corrugated sheet is being wound, the projections 919 of the flat sheet 912 are fixed to crests of the corrugated sheet by brazing, so that a gap corresponding to the thickness of the projections 919 is formed between adjacent layers except the locations of the projections 919.

FIG. 164 shows an 84th embodiment of the present invention. The figure shows a corrugated sheet 911 of a combination sheet 910 according to this embodiment. A flat sheet 912 has no projections. The combination sheet is wound as shown in FIG. 166. The projections 919 are formed on crests of the corrugated sheet 11 by plastic working. The projections 919 form a heating zone.

Similar to FIG. 161, the width $l_1$ of each projection 919 is narrower than the width l of the corrugated sheet 911. The projections 919 protrude outwardly in a width direction from the combination sheet. FIG. 165 shows an example of a method of forming the projections 919. A flat sheet material is passed between two meshing gears 921 and 922, to plastically form a corrugated sheet 911. According to this embodiment, some teeth of one of the gears 921 and 922 have projections on the surfaces thereof, and teeth of the other gear corresponding to the teeth having the projections have recesses. The projections and recesses are shaped to engage with each other. When a flat sheet is passed between the gears 921 and 922, the flat sheet is formed into a corrugated sheet with some crests partly having projections 919.

The corrugated sheet 911 thus formed and flat sheet 912 are combined into the combination sheet 910, which is wound around a center electrode. Similar to the flat sheet 912 having the projections 919, layers of the combination sheet 910 of this embodiment is joined together through the projections 919, to form a heating zone.

Compared with forming the projections 919 on the flat sheet 912, forming the projections 919 on the corrugated sheet 911 has the following advantages:

When the projections 919 are formed on the flat sheet 912, the projections 919 must be positioned to get in contact with crests of an adjacent layer of the corrugated sheet when the combination sheet is wound. Accordingly, the projections 919 must be precisely positioned on the flat sheet 912. This increases the number of processes. When the projections 919 are formed on crests of the corrugated sheet 911, the crests of the corrugated sheet and the flat sheet 912 are automatically attached to each other through the projections 919 when the combination sheet 910 is wound, to eliminate the precision positioning of the projections. In FIG. 164, the projections 919 are formed by partly deforming the crests of the corrugated sheet 911. Similar to the flat sheet of FIGS. 161 and 162, the projections 919 may be formed by attaching metal pieces to predetermined positions on the crests of the corrugated sheet by brazing. This method also eliminates the precision positioning of the projections.

The corrugated sheet 911 is formed by plastically processing a flat sheet as mentioned above. On the other hand, forming the projections 919 on the flat sheet 912 needs a process of forming the projections 919 on the flat sheet 12 and a process of forming the corrugated sheet 911 from a flat sheet. When forming the projections 919 on the corrugated sheet 911, the projections 919 and the corrugated sheet 911 are simultaneously formed, and the flat sheet 912 to be combined with the corrugated sheet 911 receives no process, to thereby greatly reduce the number of catalytic carrier fabricating processes.

In this way, the combination sheet 910 is formed of the corrugated and flat sheets 911 and 912 with one of the sheets having the projections 919. The combination sheet 910 is wound into a metal catalytic carrier. When the carrier is energized, a current collectively flows through the projections, so that only the projections generate heat. Namely, a heating zone can be limited to specific part of the carrier. The position of the heating zone is determined by the positions of the projections 919 formed on one of the corrugated and flat sheets 911 and 912. This means that the heating zone may have optional patterns on the carrier according to the positions of the projections 919.

FIGS. 166 and 167 show an electrically heating metal catalytic carrier commonly used for the 81st to 84th embodiments. FIG. 168 shows an upstream end face (an exhaust entrance) of the electrically heating catalytic carrier. The carrier is formed by winding a combination of a corrugated sheet 911 and a flat sheet 912 around a center electrode. FIG. 167 is a section taken along a line VII—VII of FIG. 166.

In FIG. 166, the combination sheet wound around the center electrode 913 is formed of the corrugated sheet 911 made of metal (such as aluminum containing stainless steel) and the flat sheet 912 made of metal (such as aluminum containing stainless steel). The sheets 911 and 912 are laid one upon another and partly joined together. At least one combination sheet, e.g., six combination sheets are spirally wound around the center electrode 913 with one ends of the combination sheets being welded to the center electrode 913, into the multilayer structure of FIG. 166. This structure is inserted into an outer cylinder 914. The other ends of the combination sheets are fixed to the outer cylinder 914 by laser welding, etc., carried out from the outside of the outer cylinder 914. The center electrode 913 is bent in, for example, L shape and is passed through the outer cylinder 914. The center electrode 913 is insulated from the outer cylinder 914 with an insulator at the position where the electrode 913 passes through the cylinder 914.

As explained above, the flat sheet 912 or the crests of the corrugated sheet 911 are provided with projections. When the combination sheets are laminated, adjacent layers thereof are joined together through the projections by brazing or laser welding. The corrugated and flat sheets 911 and 912 are spaced apart from each other except at the projections, to thereby form a heating zone at an end of the carrier as shown in FIG. 167. The width of the heating zone is equal to the width 911 of the projections. The projections (hot spots) are formed on the flat sheets 912, and therefore, are radially arranged from the center electrode when the combination sheets are wound around the center electrode.

When the adjacent layers of the combination sheets are joined together through the projections by brazing or laser welding, the surfaces of the combination sheets are not oxidized. Accordingly, the adjacent layers are surely joined together through the projections. After the sheets are joined, oxide films (electric insulation films) are formed over the surfaces of the combination sheets except the joints by firing. When the metal sheets are aluminum containing stainless steel sheets, the aluminum components form alumina films serving as electric insulation films.

Ends of the combination sheets are connected to a positive electrode, and the other ends to a negative electrode, i.e., a car body. Since the layers of the sheets are joined together only through the projections, a current collectively flows through the projections when the sheets are energized, to thereby form the heating zone of FIG. 6 radially extending from the center electrode on the end face of the carrier.

After the metal catalytic carrier is formed, the carrier is coated with alumina ($Al_2O_3$). When the metal sheets of the carrier contain aluminum, the alumina easily adheres to the carrier. Catalytic components such as platinum (Pt) and rhodium (Rh) are applied to the alumina, to form a catalyst. The catalyst is arranged as, for example, a start catalyst in an exhaust system of an internal combustion engine of a car. The outer cylinder 14 serves as part of an exhaust pipe.

FIGS. 168 to 173 show patterns of a heating zone different from that of FIG. 166. The heating zone of FIGS. 168 and 169 has a spiral pattern on an end face of a metal catalytic carrier. This example employs six combinations of corrugated and flat sheets wound around a center electrode 913. One ends of the combination sheets are fixed to the center electrode 913 by laser welding, and the other ends to an outer cylinder 914 by laser welding.

In FIGS. 168 and 169, projections 919 are formed on the flat or corrugated sheet of each combination and positioned to form spiral patterns when the combination sheets are wound. The projections 919 are located in the vicinity of an upstream end of the catalytic carrier in an exhaust gas flow as shown in FIG. 169. The surfaces of the combination sheets except the projections 919 are coated with oxide films.

FIG. 170 shows another pattern of a heating zone. In FIG. 166, the projections 919 form a radial cross pattern in a front view. In FIG. 170, the projections 919 are zigzagged in each radial branch area to distribute hot spots all around and pass a current in a zigzag way. The other parts of this example are the same as those of FIG. 166.

FIG. 171 shows a metal catalytic carrier employing strength reinforcing projections. The axial length of this carrier is longer than the axial length of any of the preceding embodiments. Accordingly, the carrier has improved rigidity, strength, and durability. Combinations of corrugated and flat sheets 911 and 912 are wound into a catalytic carrier. Projections 919 are positioned at upstream and downstream axial ends 916 and 917 of the carrier. Adjacent layers of the combination sheets are joined together by brazing the projections 919. A center electrode 913 is arranged only at an axial front end (an upstream end in an exhaust gas flow) of the carrier. The wound structure is connected to an outer cylinder 914 only at the axial front end of the carrier. A current collectively flows through the projections 919 on the upstream end in the exhaust gas flow, to heat the exhaust gas. The center electrode 913 is bent in an L shape and passes through the outer cylinder 914. An electric insulator 918 is arranged to isolate the center electrode 913 from the outer cylinder 914. Layers of the combination sheets are joined together at each end of the carrier. The long axial length of the carrier increases the rigidity, strength, and durability of the carrier. The other parts of this example are the same as those of the preceding embodiments.

FIG. 172 shows another arrangement of a heating zone. When a corrugated sheet 911 and a flat sheet 912 are combined and wound around a center axis into a catalytic carrier 920, projection pieces 919 are inserted at positions to generate heat. The projection pieces are attached to the combination sheet by brazing. The carrier 920 is held between arc electrode plates 921 and 922. A voltage is applied to the electrode plates 921 and 922 so that areas where the projections 919 are arranged collectively generate heat. The carrier is covered with an insulator and is arranged in an exhaust pipe of a car. Leads from the electrode plates 921 and 922 are guided to the outside of the exhaust pipe. The other parts of this example are the same as the preceding embodiments.

FIG. 173 shows another arrangement of a heating zone according to the present invention. A combination of a corrugated sheet 911 and a flat sheet 912 is wound into an ellipse. The elliptic structure is held between electrode plates 921 and 922 each having a partial elliptic shape. The other parts of this arrangement are the same as the arrangement of FIG. 172. This arrangement is applicable when a converter casing is flat.

FIG. 174 shows a metal catalytic carrier employing no wound structure, according to the present invention. A combination of a corrugated sheet 911 and a flat sheet 912 is laminated. Projections 919 are formed on the corrugated sheet 911 or the flat sheet 912. Adjacent layers are joined together through the projections 919 by brazing, etc. The structure is held between positive and negative electrode plates 921 and 922. This arrangement is applicable for a rectangular converter casing.

Operation of these embodiments will be explained. When an engine is started, a voltage is applied to the electrodes for a predetermined period so that a current flows to the catalyst. Due to a hot exhaust gas and electric heating, the catalyst is quickly heated to an activation temperature. Once the catalyst is partly heated to or above the activation temperature, the heated part starts oxidize HC to produce heat. This heat increases the temperature around the part. Accordingly, the whole of the catalyst is heated to the activation temperature.

According to these embodiments, the layers of the combination sheets are joined together only through the projections 919. A current mostly flows through the projections 919 because the projections 919 form paths having lowest resistance. As a result, the projections form hot spots to generate heat. The heat mass of the spots is very small, and therefore, the temperature of the spots quickly increases.

The positions of the hot spots are dependent on the positions of the projections 919 formed on the corrugated sheet 911 or the flat sheet 912. The metal catalytic carrier may have the hot spots at optional positions and in optional patterns. Namely, a heating zone in the catalytic carrier is surely and easily determined and controlled.

We claim:

1. An electrically heated catalytic apparatus, through which exhaust gas flows from an upstream end to a downstream end, comprising a casing and a catalytic carrier, said catalytic carrier including:

an upstream portion having an upstream peripheral portion that does not contact said casing;

a downstream portion having a downstream peripheral portion that contacts said casing;

an insulating space interspaced between the upstream portion and the downstream portion; and wherein the upstream portion of the carrier includes an electric path extending from the upstream peripheral portion of the carrier to a central portion thereof, and extending from the central portion back to the upstream peripheral portion of the carrier, wherein a part of the carrier adjacent to the electric path is an electrically heated area, and a remaining part of the carrier, including the downstream portion of the carrier, is a non-electrically heated region.

2. An apparatus according to claim 1, further including an insulation area extend from the upstream peripheral portion of the carrier to the central potion of the carrier, wherein said electric path is formed around said insulation area and wherein a region of the carrier upstream of the insulation area includes the heated region and a region of the carrier downstream of the insulation area includes the non-electrically heated region.

3. An electrically heated catalytic apparatus, through which exhaust gas flows from an upstream end to a downstream end, comprising an electrically conductive catalyst carrier including laminated metal sheets having insulation layers formed on the surfaces thereof, the catalyst carrier including local hot spots which are electrically heated, wherein the local hot spots include deformations in edge portions of adjacent laminated metal sheets which are in contact with an adjacent metal sheet to nullify the insulation layers so that adjacent metal sheets are electrically joined at the deformations through the nullified insulation layers and wherein the carrier includes an upstream potion and a downstream portion and the hot spots are located in the upstream portion.

4. An apparatus according to claim 3, wherein one of the metal sheets is a larger width metal sheet having a width larger than a width of an other of the metal sheets, and wherein the local hot spots are made by deforming edge portions of the larger width metal sheet after the larger width metal sheet has been laminated, so that a portion of the larger width metal sheet is electrically joined to an adjacent portion of a larger width metal sheet at the deformations.

5. An electrically heated catalytic apparatus, through which exhaust gas flows from an upstream end to a downstream end, comprising an electrically conductive catalyst carrier, including an upstream portion and a downstream portion, the carrier including a plurality of laminated metal sheets and a corresponding plurality of insulation layers, wherein an insulation layer is disposed between adjacent laminated metal sheets and wherein each insulation layer includes a plurality of notches and wherein edge portions of the adjacent laminated metal sheets have deformations that bend toward each other through the notches of each insulating layer so that each laminated metal sheet is electrically joined through the notches to an adjacent laminated metal sheet, and wherein edge portions of adjacent laminated metal sheets are joined to each other only in the upstream portion of the carrier.

6. An electrically heated catalytic apparatus, through which exhaust gas flows from an upstream end to a downstream end, comprising an electrically conductive catalyst carrier, having an upstream portion and a downstream portion, the carrier including laminated metal sheets, each laminated metal sheet including an insulation layer formed thereon, wherein adjacent laminated metal sheets coupled together by brazing, and wherein a first brazing material is used in a first portion of the catalyst carrier and a second brazing material is used in a second portion of the catalyst carrier, and wherein a resistance of the first brazing material is different from the resistance of the second brazing material to form electrically heated hot spots in the second portions of the catalyst carrier, the second portions of the carrier being located in the upstream portion of the carrier.

7. An electrically heated catalytic apparatus, through which exhaust gas flows from an upstream end to a downstream end, the apparatus comprising an electrically conductive catalyst carrier, having an upstream portion and a downstream portion, the carrier including laminated metal sheets, first portions of each laminated metal sheet including an insulation film formed thereon, wherein second portions of each metal sheet include no insulation film thereon wherein the second portions of adjacent metal sheets are coupled to each other to form electrically heated local hot spots, and wherein the hot spots are located only in the upstream portion of the carrier.

8. An electrically heated catalytic apparatus, through which exhaust gas flows from an upstream end to a downstream end, the apparatus comprising an electrically conductive catalyst carrier having an upstream portion and a downstream portion, the carrier including a plurality of layered metal sheets, each metal sheet having an insulating layer formed on first portions of the surface of the metal sheet, wherein at least one of the metal sheets is corrugated and wherein the insulating layer has been removed from second portions of the surfaces of each metal sheet and adjacent sheets are electrically connected to each other at predetermined positions within the second portions, and wherein the second portions are located only in the upstream portion of the carrier.

9. An electrically heated catalytic apparatus, through which exhaust gas flows from an upstream end to a downstream end, the apparatus comprising a catalytic carrier including an upstream portion and a downstream portion, the carrier being made of an electrically conductive material, wherein the upstream portion of the carrier is provided with localized electrically heatable spots, the apparatus further including an exhaust gas biasing means for channelling the flow of exhaust gas from the portion of the carrier including the electrically heatable spots to an unheated portion of the carrier.

10. An apparatus according to claim 9, wherein the upstream portion of the carrier extends from a carrier upstream end to a carrier upstream portion downstream end and wherein the electrically heated portion is provided downstream of the carrier upstream end the apparatus further comprising a second exhaust gas biasing means for channelling the exhaust gas toward the electrically heatable spots.

11. An electrically heated catalytic apparatus, through which exhaust gas flows from an upstream end to a downstream end, the apparatus comprising an electrically conductive catalytic carrier including layers of metal panels, wherein each panel comprises a corrugated sheet coupled to a flat sheet, and wherein each flat sheet includes a plurality of projections protruding from a surface of the panel, and wherein adjacent panels are electrically connected to each other at the projections, and wherein adjacent panels are electrically connected to each other only in the upstream portion of the carrier.

12. An electrically heated catalytic apparatus, through which exhaust gas flows from an upstream end to a downstream end, the apparatus comprising a catalytic carrier having an upstream portion and a downstream portion and including layers of laminated metal panels, wherein each panel includes a metal corrugated sheet coupled to a flat sheet, wherein each corrugated sheet includes at least one crest having a projection protruding from a surface of the panel, and wherein adjacent panels are electrically connected to each other at the projections only in the upstream portion of the carrier.

\* \* \* \* \*